(12) United States Patent
Zernicka-Goetz et al.

(10) Patent No.: US 12,467,917 B2
(45) Date of Patent: Nov. 11, 2025

(54) RECONSTRUCTING HUMAN EARLY EMBRYOGENESIS IN VITRO WITH PLURIPOTENT STEM CELLS

(71) Applicant: California Institute of Technology, Pasadena, CA (US)

(72) Inventors: Magdalena D. Zernicka-Goetz, Pasadena, CA (US); Berna Sozen, Pasadena, CA (US); Victoria Jorgensen, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 134 days.

(21) Appl. No.: 17/692,790

(22) Filed: Mar. 11, 2022

(65) Prior Publication Data

US 2022/0308041 A1   Sep. 29, 2022

Related U.S. Application Data

(60) Provisional application No. 63/161,935, filed on Mar. 16, 2021.

(51) Int. Cl.
*G01N 33/50* (2006.01)
*C12N 5/071* (2010.01)
(Continued)

(52) U.S. Cl.
CPC ....... *G01N 33/5005* (2013.01); *C12N 5/0604* (2013.01); *C12N 5/0606* (2013.01); *C12N 5/0697* (2013.01); *C12N 2310/14* (2013.01); *C12N 2501/113* (2013.01); *C12N 2501/115* (2013.01); *C12N 2501/15* (2013.01); *C12N 2501/155* (2013.01); *C12N 2501/415* (2013.01);
(Continued)

(58) Field of Classification Search
CPC .................. C12N 5/0606; C12N 2501/115
See application file for complete search history.

(56) References Cited

U.S. PATENT DOCUMENTS

| 5,322,770 A | 6/1994 | Gelfand |
| 6,186,796 B1 | 2/2001 | Wedge |

(Continued)

FOREIGN PATENT DOCUMENTS

| EP | 0684315 A1 | 11/1995 |
| KR | 10-2009-0050022 A | 5/2009 |

(Continued)

OTHER PUBLICATIONS

Eiselleova et al. A Complex Role for FGF-2 in Self-Renewal, Survival, and Adhesion of Human Embryonic Stem Cells.Stem Cells. Aug. 2009;27(8): 1847-57.(Year: 2009).*

(Continued)

*Primary Examiner* — Marcia S Noble
*Assistant Examiner* — Briana N Ebbinghaus
(74) *Attorney, Agent, or Firm* — Dickinson Wright PLLC

(57) ABSTRACT

Disclosed herein include methods and compositions for in vitro culture of three-dimensional expanded pluripotency (EP) structures from pluripotent stem cells. In some embodiments, the method can include generating expanded pluripotent stem cells (EPSCs) and culturing the EPSCs in a composition capable of supporting generation of the EP structure.

18 Claims, 66 Drawing Sheets
(66 of 66 Drawing Sheet(s) Filed in Color)
Specification includes a Sequence Listing.

(51) Int. Cl.
    *C12N 5/073*     (2010.01)
    *C12N 5/0735*    (2010.01)
(52) U.S. Cl.
    CPC ...... *C12N 2503/04* (2013.01); *C12N 2506/45* (2013.01); *C12N 2513/00* (2013.01)

(56) References Cited

U.S. PATENT DOCUMENTS

| | | | |
|---|---|---|---|
| 6,379,897 | B1 | 4/2002 | Weidenhammer |
| 6,451,536 | B1 | 9/2002 | Fodor |
| 6,548,257 | B2 | 4/2003 | Lockhart |
| 6,618,679 | B2 | 9/2003 | Loehrlein et al. |
| 6,664,377 | B1 | 12/2003 | Xu |
| 7,084,246 | B2 | 8/2006 | Coco |
| 8,247,531 | B2 | 8/2012 | Cochran |
| 2003/0157485 | A1 | 8/2003 | Bejanin |
| 2003/0215858 | A1 | 11/2003 | Templeton |
| 2005/0112764 | A1 | 5/2005 | Ivics et al. |
| 2018/0155789 | A1 | 6/2018 | Maeder et al. |
| 2022/0308041 | A1 | 9/2022 | Zernicka-Goetz |

FOREIGN PATENT DOCUMENTS

| | | | | |
|---|---|---|---|---|
| KR | 10-2010-0042649 | A | 4/2010 | |
| WO | WO1993/022461 | | 11/1993 | |
| WO | WO2010085699 | | 7/2010 | |
| WO | WO2014174470 | | 10/2014 | |
| WO | WO2016016894 | | 2/2016 | |
| WO | WO2020069339 | | 4/2020 | |
| WO | WO2020152686 | | 7/2020 | |
| WO | WO-2021067854 | A1 * | 4/2021 | ........... C12N 5/0603 |
| WO | WO2022195589 | | 9/2022 | |
| WO | WO2023114754 | | 6/2023 | |
| WO | WO2023170682 | | 9/2023 | |

OTHER PUBLICATIONS

Kosaka et al. FGF-4 regulates neural progenitor cell proliferation and neuronal differentiation. FASEB J. Jul. 2006;20(9):1484-5. (Year: 2006).*

Jinek et al. RNA-programmed genome editing in human cells. Elife. Jan. 29, 2013:2:e00471.(Year: 2013).*

Continuous Single Culture Complete by Irvine Scientific ( accessed at: http://web.archive.org/web/20200304162139/https://www.selectscience.net/products/continuous-single-culture-nx-complete/?prodID=217067) (Year: 2020).*

BioSpace. Irvine Scientific Introduces Continuous Single Culture-NX Low-lactate culture Media for IVF. (accessed at: https://www.biospace.com/article/releases/irvine-scientific-introduces-continuous-single-culture-nx-low-lactate-culture-media-for-ivf-/) (Year : 2017).*

Millman et al. The effects of low oxygen on self-renewal and differentiation of embryonic stem cells.Curr Opin Organ Transplant. Dec. 2009;14(6):694-700 (Year: 2009).*

Zachar et al. The effect of human embryonic stem cells (hESCs) long-term normoxic and hypoxic cultures on the maintenance of pluripotency.In Vitro Cell Dev Biol Anim. Apr. 2010;46(3-4):276-83 (Year: 2010).*

Schutte et al. Keratin 8/18 breakdown and reorganization during apoptosis.Exp Cell Res. Jul. 1, 2004;297(1):11-26. (Year: 2004).*

Li et al. Cancer stem cells and cell size: A causal link?. Semin Cancer Biol. Dec. 2015:35:191-9. (Year: 2015).*

Hui et al. FGF Family: From Drug Development to Clinical Application. Int J Mol Sci. Jun. 26, 2018;19(7):1875. (Year: 2018).*

Abe, Koichiro, et al. "Endoderm-specific gene expression in embryonic stem cells differentiated to embryoid bodies." Experimental cell research 229.1 (1996): 27-34.

Acampora, D., et al. "OTD/OTX2 Functional Equivalence Depends on 5' and 3' UTR-Mediated Control of Otx2 mRNA for Nucleo-Cytoplasmic Export and Epiblast-Restricted Translation." Development 128.23 (2001): 4801-13.

Addgene, "pSAM2_mCherry_Gata4," available at: https://www.addgene.org/72690/. Last accessed on Oct. 27, 2023 in 4 Pages.

Aguilera-Castrejon, A., et al. "Ex Utero Mouse Embryogenesis from Pre-Gastrulation to Late Organogenesis." Nature 593.7857 (2021): 119-24.

Aibar, Sara, et al. "SCENIC: single-cell regulatory network inference and clustering." Nature methods 14.11 (2017): 1083-1086.

Alsanie, Walaa F., et al. "Specification of murine ground state pluripotent stem cells to regional neuronal populations." Scientific Reports 7.1 (2017): 16001.

Altschuler, Steven J., and Lani F. Wu. "Cellular heterogeneity: do differences make a difference?." Cell 141.4 (2010): 559-563.

Amack, Jeffrey D., and M. Lisa Manning. "Knowing the boundaries: extending the differential adhesion hypothesis in embryonic cell sorting." Science 338.6104 (2012): 212-215.

Amadei, Gianluca et al. "Inducible Stem-Cell-Derived Embryos Capture Mouse Morphogenetic Events In Vitro." Developmental cell vol. 56,3 (2021): 366-382.

Amadei, Gianluca, et al. "Embryo model completes gastrulation to neurulation and organogenesis." Nature 610.7930 (2022): 143-153.

Anders, Simon, Paul Theodor Pyl, and Wolfgang Huber. "HTSeq—a Python framework to work with high-throughput sequencing data." bioinformatics 31.2 (2015): 166-169.

Ang, S. L., et al. "Positive and Negative Signals from Mesoderm Regulate the Expression of Mouse Otx2 in Ectoderm Explants." Development 120.10 (1994): 2979-89.

Arnold, Sebastian J., and Elizabeth J. Robertson. "Making a commitment: cell lineage allocation and axis patterning in the early mouse embryo." Nature reviews Molecular cell biology 10.2 (2009): 91-103.

Arslan, Feyza Nur, et al. "Holding it together: when cadherin meets cadherin." Biophysical Journal 120.19 (2021): 4182-4192.

Ashburner, Michael, et al. "Gene ontology: tool for the unification of biology." Nature genetics 25.1 (2000): 25-29.

Babraham Institute, Babraham Bioinformatics. "FastQC: a quality control tool for high throughput sequence data." Available at: https://www.bioinformatics.babraham.ac.uk/projects/fastqc/ last accessed on Oct. 27, 2023 in 6 Pages.

Bao, Min, et al. "Stem cell-derived synthetic embryos self-assemble by exploiting cadherin codes and cortical tension." Nature Cell Biology 24.9 (2022): 1341-1349.

Bao, Zheng-Zheng, et al. "Regulation of chamber-specific gene expression in the developing heart by Irx4." Science 283.5405 (1999): 1161-1164.

Baran, Yael, et al. "MetaCell: analysis of single-cell RNA-seq data using K-nn graph partitions." Genome biology 20.1 (2019): 1-19.

Bardot, Evan S., and Anna-Katerina Hadjantonakis. "Mouse gastrulation: Coordination of tissue patterning, specification and diversification of cell fate." Mechanisms of development 163 (2020): 103617.

Bedzhov, Ivan, and Magdalena Zernicka-Goetz. "Self-organizing properties of mouse pluripotent cells initiate morphogenesis upon implantation." Cell 156.5 (2014): 1032-1044.

Bedzhov, Ivan, et al. "Developmental plasticity, cell fate specification and morphogenesis in the early mouse embryo." Philosophical Transactions of the Royal Society B: Biological Sciences 369.1657 (2014): 20130538.

Bedzhov, Ivan, et al. "In vitro culture of mouse blastocysts beyond the implantation stages." Nature protocols 9.12 (2014): 2732-2739.

Benchling "CRISPR Guide RNA Design Tool" available at: www.benchling.com/crispr last accessed on Oct. 26, 2023 Printed in 7 Pages.

Ben-Kiki, Oren, et al. "Metacell-2: a divide-and-conquer metacell algorithm for scalable scRNA-seq analysis." Genome biology 23.1 (2022): 1-18.

Bergen, V., et al. "Generalizing Rna Velocity to Transient Cell States through Dynamical Modeling." Nat Biotechnol 38.12 (2020): 1408-14.

Bergmann, Sophie, et al. "Spatial profiling of early primate gastrulation in utero." Nature 609.7925 (2022): 136-143.

Biospherix, Oxystreamer, Cytocentric® O2 and CO2 Controller for Live Cell Microscopy, available at: https://biospherix.com/oxystreamer/ last accessed on Oct. 26, 2023 printed in 6 Pages.

(56) References Cited

OTHER PUBLICATIONS

Blij, S., et al. "Cdx2 Efficiently Induces Trophoblast Stem-Like Cells in Naive, but Not Primed, Pluripotent Stem Cells." Stem Cells Dev 24.11 (2015): 1352-65.
Boulanger, J., et al. "Patch-Based Nonlocal Functional for Denoising Fluorescence Microscopy Image Sequences." IEEE Trans Med Imaging 29.2 (2010): 442-54.
Brassard, Jonathan A., and Matthias P. Lutolf. "Engineering stem cell self-organization to build better organoids." Cell stem cell 24.6 (2019): 860-876.
Bray, Nicolas L., et al. "Near-optimal probabilistic RNA-seq quantification." Nature biotechnology 34.5 (2016): 525-527.
Bredenkamp, Nicholas, et al. "Wnt inhibition facilitates RNA-mediated reprogramming of human somatic cells to naive pluripotency." Stem Cell Reports 13.6 (2019): 1083-1098.
Briggs, J. A., et al. "The Dynamics of Gene Expression in Vertebrate Embryogenesis at Single-Cell Resolution." Science 360.6392 (2018).
Briscoe, J., et al. "Homeobox Gene Nkx2.2 and Specification of Neuronal Identity by Graded Sonic Hedgehog Signalling." Nature 398.6728 (1999): 622-7.
Brodland, G. Wayne. "The differential interfacial tension hypothesis (DITH): a comprehensive theory for the self-rearrangement of embryonic cells and tissues." J. Biomech. Eng. 124.2 (2002): 188-197.
Burren, K. A., et al. "Gene-Environment Interactions in the Causation of Neural Tube Defects: Folate Deficiency Increases Susceptibility Conferred by Loss of Pax3 Function." Hum Mol Genet 17.23 (2008): 3675-85.
Cahan, Patrick, and George Q. Daley. "Origins and implications of pluripotent stem cell variability and heterogeneity." Nature reviews Molecular cell biology 14.6 (2013): 357-368.
Canty, Laura, et al. "Sorting at embryonic boundaries requires high heterotypic interfacial tension." Nature communications 8.1 (2017): 157.
Cao, Junyue, et al. "Comprehensive single-cell transcriptional profiling of a multicellular organism." Science 357.6352 (2017): 661-667.
Cao, Junyue, et al. "The single-cell transcriptional landscape of mammalian organogenesis." Nature 566.7745 (2019): 496-502.
Castillo-Venzor, Aracely, et al. "Origin and segregation of the human germline." Life Science Alliance 6.8 (2023).
Cerchiari, Alec E., et al. "A strategy for tissue self-organization that is robust to cellular heterogeneity and plasticity." Proceedings of the National Academy of Sciences 112.7 (2015): 2287-2292.
Chen, Di, et al. "Human primordial germ cells are specified from lineage-primed progenitors." Cell reports 29.13 (2019): 4568-4582.
Chen, Dong-Yuan, et al. "Extracellular matrix stiffness cues junctional remodeling for 3D tissue elongation." Nature communications 10.1 (2019): 3339.
Cheng, Saifeng, et al. "The intrinsic and extrinsic effects of TET proteins during gastrulation." Cell 185.17 (2022): 3169-3185.
Chhabra, Sapna, and Aryeh Warmflash. "BMP-treated human embryonic stem cells transcriptionally resemble amnion cells in the monkey embryo." Biology Open 10.9 (2021): bio058617.
Cindrova-Davies, Tereza, et al. "RNA-seq reveals conservation of function among the yolk sacs of human, mouse, and chicken." Proceedings of the National Academy of Sciences 114.24 (2017): E4753-E4761.
Clark, Amander T., et al. "Human embryo research, stem cell-derived embryo models and in vitro gametogenesis: Considerations leading to the revised ISSCR guidelines." Stem Cell Reports 16.6 (2021): 1416-1424.
Copp, A. J., N. D. Greene, and J. N. Murdoch. "The Genetic Basis of Mammalian Neurulation." Nat Rev Genet 4.10 (2003): 784-93.
Copp, A. J., P. Stanier, and N. D. Greene. "Neural Tube Defects: Recent Advances, Unsolved Questions, and Controversies." Lancet Neurol 12.8 (2013): 799-810.
Cross, James C., et al. "Trophoblast functions, angiogenesis and remodeling of the maternal vasculature in the placenta." Molecular and cellular endocrinology 187.1-2 (2002): 207-212.

Cullum Starr Ltd, "BTC Rotating Bottle Culture Unit" available at: http://www.cullumstarr.com/btc-engineering/rotating-bottle-culture-unit Printed in 2 Pages.
Dicicco-Bloom, E., et al. "The Developmental Neurobiology of Autism Spectrum Disorder." J Neurosci 26.26 (2006): 6897-906.
Dobin, Alexander, et al. "STAR: ultrafast universal RNA-seq aligner." Bioinformatics 29.1 (2013): 15-21.
Dobreva, Mariya P., et al. "Periostin as a biomarker of the amniotic membrane." Stem Cells International 2012 (2012).
Dohn, Tracy E., et al. "Nr2f-dependent allocation of ventricular cardiomyocyte and pharyngeal muscle progenitors." PLoS Genetics 15.2 (2019): e1007962.
Dong, Chen, et al. "Derivation of trophoblast stem cells from naïve human pluripotent stem cells." elife 9 (2020): e52504.
Donnison, Martyn, et al. "Elf5 and Ets2 maintain the mouse extraembryonic ectoderm in a dosage dependent synergistic manner." Developmental biology 397.1 (2015): 77-88.
Efremova, Mirjana, et al. "CellPhoneDB: inferring cell—cell communication from combined expression of multi-subunit ligand—receptor complexes." Nature protocols 15.4 (2020): 1484-1506.
Egli, D., et al. "Developmental Reprogramming after Chromosome Transfer into Mitotic Mouse Zygotes." Nature 447.7145 (2007): 679-85.
EMAP eMouse Atlas Project (http://www.emouseatlas.org). Human Genetics Unit, Medical Research Council, available at: "http://web.archive.org/web/20211129211233/http://www.emouseatlas.org/emap/ema/theiler_stages/StageDefinition/ts17definition.html" last accessed on Sep. 26, 2023 in 6 Pages.
Ericson, J., et al. "Pax6 Controls Progenitor Cell Identity and Neuronal Fate in Response to Graded Shh Signaling." Cell 90.1 (1997): 169-80.
Fierro-González, Juan Carlos, et al. "Cadherin-dependent filopodia control preimplantation embryo compaction." Nature cell biology 15.12 (2013): 1424-1433.
Foty, Ramsey A., and Malcolm S. Steinberg. "The differential adhesion hypothesis: a direct evaluation." Developmental biology 278.1 (2005): 255-263.
Fu, Jianping, Aryeh Warmflash, and Matthias P. Lutolf. "Stem-cell-based embryo models for fundamental research and translation." Nature materials 20.2 (2021): 132-144.
Gao, Zhiguang, et al. "Ets1 is required for proper migration and differentiation of the cardiac neural crest." Development 137.9 (2010): 1543-1551.
Gene Ontology Consortium. "The Gene Ontology resource: enriching a GOld mine." Nucleic acids research vol. 49,D1 (2021): D325-D334.
Geneassembly, "Genome assembly GRCh38" Available at https://www.ncbi.nlm.nih.gov/datasets/genome/GCF_000001405.26/ last accessed on Sep. 27, 2023 in 5 Pages.
Geneassembly, "Genome assembly GRCm38" Available at https://www.ncbi.nlm.nih.gov/datasets/genome/GCF_000001635.20/ last accessed on Sep. 27, 2023 in 4 Pages.
Germain, Pierre-Luc, et al. "Doublet identification in single-cell sequencing data using scDblFinder." F1000Research 10 (2021).
Girgin, M. U., et al. "Bioengineered Embryoids Mimic Post-Implantation Development in Vitro." Nat Commun 12.1 (2021): 5140.
Github, "Human Model" available at https://github.com/bweatherbee/human_model/tree/main last accessed on Sep. 27, 2023 in 2 Pages.
Github, "EiTiX-embryoids" available at https://github.com/hernanRubinstein/EiTiX-embryoids last accessed on Oct. 27, 2023 in 3 Pages.
Gossen, Manfred, et al. "Transcriptional activation by tetracyclines in mammalian cells." Science 268.5218 (1995): 1766-1769.
Graf, Thomas, and Matthias Stadtfeld. "Heterogeneity of embryonic and adult stem cells." Cell stem cell 3.5 (2008): 480-483.
Graner, François, and James A. Glazier. "Simulation of biological cell sorting using a two-dimensional extended Potts model." Physical review letters 69.13 (1992): 2013.
Guo, Ge, et al. "Human naive epiblast cells possess unrestricted lineage potential." Cell stem cell 28.6 (2021): 1040-1056.

(56) References Cited

OTHER PUBLICATIONS

Halbleib, Jennifer M., and W. James Nelson. "Cadherins in development: cell adhesion, sorting, and tissue morphogenesis." Genes & development 20.23 (2006): 3199-3214.

Harris, Tony JC, and Ulrich Tepass. "Adherens junctions: from molecules to morphogenesis." Nature reviews Molecular cell biology 11.7 (2010): 502-514.

Heemskerk, Idse, and Sebastian J. Streichan. "Tissue cartography: compressing bio-image data by dimensional reduction." Nature methods 12.12 (2015): 1139-1142.

Hettige, Nuwan C., and Carl Ernst. "FOXG1 dose in brain development." Frontiers in pediatrics 7 (2019): 482.

Hollnagel, Angela, et al. "Id genes are direct targets of bone morphogenetic protein induction in embryonic stem cells." Journal of Biological Chemistry 274.28 (1999): 19838-19845.

Holz, Andreas, et al. "The transcription factors Nkx2. 2 and Nkx2. 9 play a novel role in floor plate development and commissural axon guidance." Development 137.24 (2010): 4249-4260.

Hu, Dong, and James C. Cross. "Development and function of trophoblast giant cells in the rodent placenta." International Journal of Developmental Biology 54.2-3 (2009): 341-354.

Hu, Ze-Lan, et al. "The role of the transcription factor Rbpj in the development of dorsal root ganglia." Neural Development 6 (2011): 1-14.

Huang, Da Wei, Brad T. Sherman, and Richard A. Lempicki. "Systematic and integrative analysis of large gene lists using David bioinformatics resources." Nature protocols 4.1 (2009): 44-57.

International Search Report and Written Opinion dated Apr. 17, 2023 in PCT Patent Application No. PCT/US2022/081424.

Io, Shingo, et al. "Capturing human trophoblast development with naive pluripotent stem cells in vitro." Cell stem cell 28.6 (2021): 1023-1039.

Jo, Kyoung, et al. "Efficient differentiation of human primordial germ cells through geometric control reveals a key role for Nodal signaling." Elife 11 (2022): e72811.

José-Edwards, Diana S., et al. "Brachyury, Foxa2 and the cis-Regulatory Origins of the Notochord." PLoS genetics 11.12 (2015): e1005730.

Kagawa, Harunobu, et al. "Human blastoids model blastocyst development and implantation." Nature 601.7894 (2022): 600-605.

Kahane, Nitza, and Chaya Kalcheim. "Neural tube development depends on notochord-derived sonic hedgehog released into the sclerotome." Development 147.10 (2020): dev183996.

Kaufman, M. H., H. H. Chang, and J. P. Shaw. "Craniofacial abnormalities in homozygous Small eye (Sey/Sey) embryos and newborn mice." Journal of anatomy 186.Pt 3 (1995): 607.

Keller, Patricia J., et al. "Mapping the cellular and molecular heterogeneity of normal and malignant breast tissues and cultured cell lines." Breast cancer research 12 (2010): 1-17.

Keren-Shaul, Hadas, et al. "MARS-seq2. 0: an experimental and analytical pipeline for indexed sorting combined with single-cell RNA sequencing." Nature protocols 14.6 (2019): 1841-1862.

Kiselev, Vladimir Yu, Andrew Yiu, and Martin Hemberg. "scmap: projection of single-cell RNA-seq data across data sets." Nature methods 15.5 (2018): 359-362.

Klein, A. M., et al. "Droplet Barcoding for Single-Cell Transcriptomics Applied to Embryonic Stem Cells." Cell 161.5 (2015): 1187-201.

Koch, F., et al. "Antagonistic Activities of Sox2 and Brachyury Control the Fate Choice of Neuro-Mesodermal Progenitors." Dev Cell 42.5 (2017): 514-26 e7.

Koot, Y. E. M., et al. "Molecular aspects of implantation failure." Biochimica et Biophysica Acta (BBA)-Molecular Basis of Disease 1822.12 (2012): 1943-1950.

Korsunsky, I., et al. "Fast, Sensitive and Accurate Integration of Single-Cell Data with Harmony." Nat Methods 16.12 (2019): 1289-96.

Kovács, Mihály, et al. "Mechanism of blebbistatin inhibition of myosin II." Journal of Biological Chemistry 279.34 (2004): 35557-35563.

Krendl, Christian, et al. "GATA2/3-TFAP2A/C transcription factor network couples human pluripotent stem cell differentiation to trophectoderm with repression of pluripotency." Proceedings of the National Academy of Sciences 114.45 (2017): E9579-E9588.

Krieg, Michael, et al. "Tensile forces govern germ-layer organization in zebrafish." Nature cell biology 10.4 (2008): 429-436.

Kwon, Gloria S et al. "The endoderm of the mouse embryo arises by dynamic widespread intercalation of embryonic and extraembryonic lineages." Developmental cell vol. 15,4 (2008): 509-20.

La Manno, Gioele, et al. "Molecular architecture of the developing mouse brain." Nature 596.7870 (2021): 92-96.

La Manno, Gioele, et al. "RNA velocity of single cells." Nature 560.7719 (2018): 494-498.

Lalit, P. A., et al. "Lineage Reprogramming of Fibroblasts into Proliferative Induced Cardiac Progenitor Cells by Defined Factors." Cell Stem Cell 18.3 (2016): 354-67.

Latos, Paulina Anna, and Myriam Hemberger. "From the stem of the placental tree: trophoblast stem cells and their progeny." Development 143.20 (2016): 3650-3660.

Lau, Kasey YC, et al. "Mouse embryo model derived exclusively from embryonic stem cells undergoes neurulation and heart development." Cell Stem Cell 29.10 (2022): 1445-1458.

Lawson, K. A., and W. J. Hage. "Clonal Analysis of the Origin of Primordial Germ Cells in the Mouse." Ciba Found Symp 182 (1994): 68-84; discussion 84-91.

Li, Chen, et al. "Multi-omic single-cell velocity models epigenome—transcriptome interactions and improves cell fate prediction." Nature Biotechnology 41.3 (2023): 387-398.

Linneberg-Agerholm, Madeleine, et al. "Naïve human pluripotent stem cells respond to Wnt, Nodal and LIF signalling to produce expandable naïve extra-embryonic endoderm." Development 146. 24 (2019): dev180620.

Liu, Xiaodong, et al. "Modelling human blastocysts by reprogramming fibroblasts into iBlastoids." Nature 591.7851 (2021): 627-632.

Luckett, W. Patrick. "Origin and differentiation of the yolk sac and extraembryonic mesoderm in presomite human and rhesus monkey embryos." American Journal of Anatomy 152.1 (1978): 59-97.

Ma, Huaixiao, et al. "In vitro culture of cynomolgus monkey embryos beyond early gastrulation." Science 366.6467 (2019): eaax7890.

Mackinlay, Kirsty ML, et al. "An in vitro stem cell model of human epiblast and yolk sac interaction." Elife 10 (2021): e63930.

Macklon, Nick S., Joep PM Geraedts, and Ban CJM Fauser. "Conception to ongoing pregnancy: the 'black box' of early pregnancy loss." Human reproduction update 8.4 (2002): 333-343.

Maître, Jean-Léon, et al. "Adhesion functions in cell sorting by mechanically coupling the cortices of adhering cells." science 338.6104 (2012): 253-256.

Manderfield, Lauren J., et al. "Pax3 and hippo signaling coordinate melanocyte gene expression in neural crest." Cell reports 9.5 (2014): 1885-1895.

Martin, Beth K., et al. "An optimized protocol for single cell transcriptional profiling by combinatorial indexing." arXiv preprint arXiv:2110.15400 (2021).

Melsted, Páll, et al. "Modular, efficient and constant-memory single-cell RNA-seq preprocessing." Nature biotechnology 39.7 (2021): 813-818.

Mesnard, D., et al. "The Anterior-Posterior Axis Emerges Respecting the Morphology of the Mouse Embryo That Changes and Aligns with the Uterus before Gastrulation." Curr Biol 14.3 (2004): 184-96.

Mi, Huaiyu, et al. "Panther version 14: more genomes, a new Panther GO-slim and improvements in enrichment analysis tools." Nucleic acids research 47.D1 (2019): D419-D426.

Mittnenzweig, Markus, et al. "A single-embryo, single-cell time-resolved model for mouse gastrulation." Cell 184.11 (2021): 2825-2842.

Molè Matteo A., Antonia Weberling, and Magdalena Zernicka-Goetz. "Comparative analysis of human and mouse development: From zygote to pre-gastrulation." Current topics in developmental biology 136 (2020): 113-138.

Molè Matteo A., et al. "A single cell characterisation of human embryogenesis identifies pluripotency transitions and putative anterior hypoblast centre." Nature communications 12.1 (2021): 3679.

(56) References Cited

OTHER PUBLICATIONS

Molè Matteo Amitaba, et al. "Integrin β1 coordinates survival and morphogenesis of the embryonic lineage upon implantation and pluripotency transition." Cell Reports 34.10 (2021).
Morris, Samantha A., et al. "Dynamics of anterior-posterior axis formation in the developing mouse embryo." Nature communications 3.1 (2012): 673.
Munger, Clara, et al. "Microgel culture and spatial identity mapping elucidate the signalling requirements for primate epiblast and amnion formation." Development 149.20 (2022): dev200263.
Muzumdar, Mandar Deepak, et al. "A global double-fluorescent Cre reporter mouse." genesis 45.9 (2007): 593-605.
Naiche, L. A., and Virginia E. Papaioannou. "Loss of Tbx4 blocks hindlimb development and affects vascularization and fusion of the allantois." (2003): 2681-2693.
Nakamura, Tomonori, et al. "A developmental coordinate of pluripotency among mice, monkeys and humans." Nature 537.7618 (2016): 57-62.
National Library of Medicine Gene ID: 1001, "CDH3 cadherin 3 [ *Homo sapiens* (human) ]." Available at: www.ncbi.nlm.nih.gov/gene/?term=1001 accessed on Sep. 19, 2023 in 8 Pages.
National Library of Medicine Gene ID: 1004, "CDH6 cadherin 6 [ *Homo sapiens* (human) ]." Available at: www.ncbi.nlm.nih.gov/gene/?term=1004 accessed on Sep. 19, 2023 in 6 Pages.
National Library of Medicine Gene ID: 999, "CDH1 cadherin 1 [ *Homo sapiens* (human) ]." Available at: www.ncbi.nlm.nih.gov/gene/?term=999 accessed on Sep. 19, 2023 in 12 Pages.
Nishikawa, Makiya, and Leaf Huang. "Nonviral vectors in the new millennium: delivery barriers in gene transfer." Human gene therapy 12.8 (2001): 861-870.
Niwa, Hitoshi, and Lusubilo Mwalilino. "Ensemble of old and new techniques escorts ESCs to bona fide embryo-like structures." Cell Stem Cell 29.10 (2022): 1423-1425.
Niwa, Hitoshi, et al. "Interaction between Oct3/4 and Cdx2 determines trophectoderm differentiation." Cell 123.5 (2005): 917-929.
Niwayama, Ritsuya, et al. "A tug-of-war between cell shape and polarity controls division orientation to ensure robust patterning in the mouse blastocyst." Developmental cell 51.5 (2019): 564-574.
Nose, Akinao, Akira Nagafuchi, and Masatoshi Takeichi. "Expressed recombinant cadherins mediate cell sorting in model systems." Cell 54.7 (1988): 993-1001.
Novitch, B. G., A. I. Chen, and T. M. Jessell. "Coordinate Regulation of Motor Neuron Subtype Identity and Pan-Neuronal Properties by the Bhlh Repressor Olig2." Neuron 31.5 (2001): 773-89.
Nowotschin, S., et al. "The Emergent Landscape of the Mouse Gut Endoderm at Single-Cell Resolution." Nature 569.7756 (2019): 361-67.
O'Rahilly R, Müller F. Developmental stages in human embryos: revised and new measurements. Cells Tissues Organs. 2010;192(2):73-84.
Palsson, Eirikur. "A 3-D model used to explore how cell adhesion and stiffness affect cell sorting and movement in multicellular systems." Journal of Theoretical Biology 254.1 (2008): 1-13.
Parekh, S., et al. "Zumis—a Fast and Flexible Pipeline to Process RNA Sequencing Data with Umis." Gigascience 7.6 (2018).
Petridou, Nicoletta I., et al. "Rigidity percolation uncovers a structural basis for embryonic tissue phase transitions." Cell 184.7 (2021): 1914-1928.
Petropoulos, Sophie, et al. "Single-cell RNA-seq reveals lineage and X chromosome dynamics in human preimplantation embryos." Cell 165.4 (2016): 1012-1026.
Pevny, L. H., et al. "A Role for Sox1 in Neural Determination." Development 125.10 (1998): 1967-78.
Pham, Thi Xuan Ai, et al. "Modeling human extraembryonic mesoderm cells using naive pluripotent stem cells." Cell stem cell 29.9 (2022): 1346-1365.
Pieters, Tim, and Roy, Frans Van. "Role of cell-cell adhesion complexes in embryonic stem cell biology." Journal of cell science 127.12 (2014): 2603-2613.

Pijuan-Sala, B., et al. "A Single-Cell Molecular Map of Mouse Gastrulation and Early Organogenesis." Nature 566.7745 (2019): 490-95.
Pourquie, O. "Segmentation of the Paraxial Mesoderm and Vertebrate Somitogenesis." Curr Top Dev Biol 47 (2000): 81-105.
Priya, Rashmi, et al. "Tension heterogeneity directs form and fate to pattern the myocardial wall." Nature 588.7836 (2020): 130-134.
Qiu, Chengxiang, et al. "Systematic reconstruction of cellular trajectories across mouse embryogenesis." Nature genetics 54.3 (2022): 328-341.
Renaud, Gabriel, et al. "deML: robust demultiplexing of Illumina sequences using a likelihood-based approach." Bioinformatics 31.5 (2015): 770-772.
Rhee, J. M., et al. "In Vivo Imaging and Differential Localization of Lipid-Modified Gfp-Variant Fusions in Embryonic Stem Cells and Mice." Genesis 44.4 (2006): 202-18.
Ribes, V., et al. "Distinct Sonic Hedgehog Signaling Dynamics Specify Floor Plate and Ventral Neuronal Progenitors in the Vertebrate Neural Tube." Genes Dev 24.11 (2010): 1186-200.
Rinkenberger, Julie, and Zena Werb. "The labyrinthine placenta." Nature genetics 25.3 (2000): 248-250.
Ross, Connor, and Thorsten E. Boroviak. "Origin and function of the yolk sac in primate embryogenesis." Nature communications 11.1 (2020): 3760.
Rossant, Janet, and Patrick PL Tam. "Early human embryonic development: blastocyst formation to gastrulation." Developmental cell 57.2 (2022): 152-165.
Rossi, Giuliana, et al. "Capturing cardiogenesis in gastruloids." Cell stem cell 28.2 (2021): 230-240.
Rostovskaya, Maria et al. "Capacitation of human naïve pluripotent stem cells for multi-lineage differentiation." Development (Cambridge, England) vol. 146,7 dev172916. Apr. 3, 2019.
Ruane, Peter T., et al. "Trophectoderm differentiation to invasive syncytiotrophoblast is promoted by endometrial epithelial cells during human embryo implantation." Human Reproduction 37.4 (2022): 777-792.
Saitou & Yamaji, "Primordial germ cells in mice," Cold Spring Harbor Perspectives in Biology 2012, 4(11), in 20 Pages.
Saitou, M., S. C. Barton, and M. A. Surani. "A Molecular Programme for the Specification of Germ Cell Fate in Mice." Nature 418.6895 (2002): 293-300.
Salbreux, Guillaume, Guillaume Charras, and Ewa Paluch. "Actin cortex mechanics and cellular morphogenesis." Trends in cell biology 22.10 (2012): 536-545.
Sansom, Stephen N., et al. "The level of the transcription factor Pax6 is essential for controlling the balance between neural stem cell self-renewal and neurogenesis." PLoS genetics 5.6 (2009): e1000511.
Sasaki, H., and Hogan, B. L .. "Hnf-3 Beta as a Regulator of Floor Plate Development." Cell 76.1 (1994): 103-15.
Sasaki, Kotaro, et al. "The germ cell fate of cynomolgus monkeys is specified in the nascent amnion." Developmental cell 39.2 (2016): 169-185.
Scheibner, Katharina, et al. "Epithelial cell plasticity drives endoderm formation during gastrulation." Nature cell biology 23.7 (2021): 692-703.
Schep, Alicia N et al. "chromVAR: inferring transcription-factor-associated accessibility from single-cell epigenomic data." Nature methods vol. 14,10 (2017): 975-978.
Schindelin, J., et al. "Fiji: An Open-Source Platform for Biological-Image Analysis." Nat Methods 9.7 (2012): 676-82.
Schliwa, Manfred. "Action of cytochalasin D on cytoskeletal networks." The Journal of cell biology 92.1 (1982): 79-91.
Scotti, Martina, and Marie Kmita. "Recruitment of 5' Hoxa genes in the allantois is essential for proper extra-embryonic function in placental mammals." Development 139.4 (2012): 731-739.
Séguin, Cheryle A., et al. "Establishment of endoderm progenitors by SOX transcription factor expression in human embryonic stem cells." Cell stem cell 3.2 (2008): 182-195.
Serbedzija, G. N., and A. P. McMahon. "Analysis of Neural Crest Cell Migration in Splotch Mice Using a Neural Crest-Specific Lacz Reporter." Dev Biol 185.2 (1997): 139-47.

(56) References Cited

OTHER PUBLICATIONS

Shahbazi, Marta N., Eric D. Siggia, and Magdalena Zernicka-Goetz. "Self-organization of stem cells into embryos: a window on early mammalian development." Science 364.6444 (2019): 948-951.

Shahbazi, Marta N., et al. "Pluripotent state transitions coordinate morphogenesis in mouse and human embryos." Nature 552.7684 (2017): 239-243.

Sherman, Brad T., et al. "David: a web server for functional enrichment analysis and functional annotation of gene lists (2021 update)." Nucleic acids research 50.W1 (2022): W216-W221.

Simmons, David G., and James C. Cross. "Determinants of trophoblast lineage and cell subtype specification in the mouse placenta." Developmental biology 284.1 (2005): 12-24.

Simunovic, Mijo, et al. "In vitro attachment and symmetry breaking of a human embryo model assembled from primed embryonic stem cells." Cell stem cell 29.6 (2022): 962-972.

Southard-Smith, E. M., L. Kos, and W. J. Pavan. "Sox10 Mutation Disrupts Neural Crest Development in Dom Hirschsprung Mouse Model." Nat Genet 18.1 (1998): 60-4.

Sozen, Berna, et al. "Reconstructing aspects of human embryogenesis with pluripotent stem cells." Nature communications 12.1 (2021): 5550.

Steinberg, Malcolm S. "Does differential adhesion govern self-assembly processes in histogenesis? Equilibrium configurations and the emergence of a hierarchy among populations of embryonic cells." Journal of Experimental Zoology 173.4 (1970): 395-433.

Steinberg, Malcolm S. "Reconstruction of tissues by dissociated cells: some morphogenetic tissue movements and the sorting out of embryonic cells may have a common explanation." Science 141. 3579 (1963): 401-408.

Stower, Matthew J., and Shankar Srinivas. "The head's tale: anterior-posterior axis formation in the mouse embryo." Current topics in developmental biology 128 (2018): 365-390.

Stuart, Tim, et al. "Comprehensive integration of single-cell data." Cell 177.7 (2019): 1888-1902.

Stuart, Tim, et al. "Single-cell chromatin state analysis with Signac." Nature methods 18.11 (2021): 1333-1341.

Tadeu, A. M., and V. Horsley. "Notch Signaling Represses P63 Expression in the Developing Surface Ectoderm." Development 140.18 (2013): 3777-86.

Takei, Yodai, et al. "Integrated spatial genomics reveals global architecture of single nuclei." Nature 590.7845 (2021): 344-350.

Tam, P. P., and M. H. Snow. "Proliferation and Migration of Primordial Germ Cells During Compensatory Growth in Mouse Embryos." J Embryol Exp Morphol 64 (1981): 133-47.

Tanaka, Y., et al. "Circulation-Independent Differentiation Pathway from Extraembryonic Mesoderm toward Hematopoietic Stem Cells Via Hemogenic Angioblasts." Cell Rep 8.1 (2014): 31-9.

Tarazi, Shadi, et al. "Post-gastrulation synthetic embryos generated ex utero from mouse naive ESCs." Cell 185.18 (2022): 3290-3306.

Ten Berge, Derk, et al. "Wnt signaling mediates self-organization and axis formation in embryoid bodies." Cell stem cell 3.5 (2008): 508-518.

Tepass, Ulrich, et al. "Cadherins in embryonic and neural morphogenesis." Nature reviews Molecular cell biology 1.2 (2000): 91-100.

Thomas, Paul, and Beddington, Rosa. "Anterior primitive endoderm may be responsible for patterning the anterior neural plate in the mouse embryo." Current Biology 6.11 (1996): 1487-1496.

Toda, Satoshi, et al. "Programming self-organizing multicellular structures with synthetic cell-cell signaling." Science 361.6398 (2018): 156-162.

Townes, F. William, and Rafael A. Irizarry. "Quantile normalization of single-cell RNA-seq read counts without unique molecular identifiers." Genome biology 21.1 (2020): 1-17.

Tsai, Tony Y-C., et al. "An adhesion code ensures robust pattern formation during tissue morphogenesis." Science 370.6512 (2020): 113-116.

Turner, D. A., et al. "Anteroposterior Polarity and Elongation in the Absence of Extra-Embryonic Tissues and of Spatially Localised Signalling in Gastruloids: Mammalian Embryonic Organoids." Development 144.21 (2017): 3894-906.

Tyser, Richard CV, et al. "Characterization of a common progenitor pool of the epicardium and myocardium." Science 371.6533 (2021): eabb2986.

Tyser, Richard CV, et al. "Single-cell transcriptomic characterization of a gastrulating human embryo." Nature 600.7888 (2021): 285-289.

Tzouanacou, E., et al. "Redefining the Progression of Lineage Segregations During Mammalian Embryogenesis by Clonal Analysis." Dev Cell 17.3 (2009): 365-76.

UniProt "P12830 . CADH1_HUMAN" Available at: https://www.uniprot.org/uniprotkb/P12830 last accessed on Sep. 19, 2023 in 13 Pages.

UniProt "P22223 .CADH3_HUMAN" Available at: https://www.uniprot.org/uniprotkb/P22223 last accessed on Sep. 19, 2023 in 14 Pages.

UniProt "P55285 • CADH6_HUMAN" Available at: https://www.uniprot.org/uniprotkb/P55285 last accessed on Sep. 19, 2023 in 12 Pages.

Van Den Brink et al., "Symmetry breaking, germ layer specification and axial organisation in aggregates of mouse embryonic stem cells," Development 2014, 141(22), 4231-4242.

Viotti, Manuel, Sonja Nowotschin, and Anna-Katerina Hadjantonakis. "SOX17 links gut endoderm morphogenesis and germ layer segregation." Nature cell biology 16.12 (2014): 1146-1156.

Viukov, Sergey, et al. "Human primed and naïve PSCs are both able to differentiate into trophoblast stem cells." Stem cell reports 17.11 (2022): 2484-2500.

Wamaitha, Sissy E., et al. "Gata6 potently initiates reprograming of pluripotent and differentiated cells to extraembryonic endoderm stem cells." Genes & development 29.12 (2015): 1239.

Wang, X., and M. Fenech. "A Comparison of Folic Acid and 5-Methyltetrahydrofolate for Prevention of DNA Damage and Cell Death in Human Lymphocytes in Vitro." Mutagenesis 18.1 (2003): 81-6.

Wang, Xue, Xianjun Chen, and Yi Yang. "Spatiotemporal control of gene expression by a light-switchable transgene system." Nature methods 9.3 (2012): 266-269.

Wang, Xuepeng, and Qiang Wu. "The divergent pluripotent states in mouse and human cells." Genes 13.8 (2022): 1459.

Weatherbee, Bailey AT, et al. "Modeling human embryo development with embryonic and extra-embryonic stem cells." Developmental biology 474 (2021): 91-99.

Weatherbee, Bailey AT, et al. "Pluripotent stem cell-derived model of the post-implantation human embryo." Nature (Jun. 27, 2023): 1-10.

Weatherbee, Bailey AT, et al. "Transgene directed induction of a stem cell-derived human embryo model." bioRxiv (Jun. 15, 2023): 2023-06.

West, Rachel C., et al. "Dynamics of trophoblast differentiation in peri-implantation—stage human embryos." Proceedings of the National Academy of Sciences 116.45 (2019): 22635-22644.

Wickstroem, Sara A., and Carien M. Niessen. "Cell adhesion and mechanics as drivers of tissue organization and differentiation: local cues for large scale organization." Current opinion in cell biology 54 (2018): 89-97.

Wolf, F. A., P. Angerer, and F. J. Theis. "Scanpy: Large-Scale Single-Cell Gene Expression Data Analysis." Genome Biol 19.1 (2018): 15.

Wolock, S. L., R. Lopez, and A. M. Klein. "Scrublet: Computational Identification of Cell Doublets in Single-Cell Transcriptomic Data." Cell Syst 8.4 (2019): 281-91 e9.

Xu, P. F., et al. "Construction of a Mammalian Embryo Model from Stem Cells Organized by a Morphogen Signalling Centre." Nat Commun 12.1 (2021): 3277.

Yagi, Shinomi, and Nobuyoshi Shiojiri. "Identification of novel genetic markers for mouse yolk sac cells by using microarray analyses." Placenta 49 (2017): 68-71.

Yan, Liying, et al. "Single-cell RNA-Seq profiling of human preimplantation embryos and embryonic stem cells." Nature structural & molecular biology 20.9 (2013): 1131-1139.

(56) References Cited

OTHER PUBLICATIONS

Yanagida, Ayaka, et al. "Cell surface fluctuations regulate early embryonic lineage sorting." Cell 185.5 (2022): 777-793.
Yanagida, Ayaka, et al. "Naive stem cell blastocyst model captures human embryo lineage segregation." Cell stem cell 28.6 (2021): 1016-1022.
Yang, Ran, et al. "Amnion signals are essential for mesoderm formation in primates." Nature communications 12.1 (2021): 5126.
Young, Matthew D., et al. "Single-cell transcriptomes from human kidneys reveal the cellular identity of renal tumors." science 361.6402 (2018): 594-599.
Yu, Leqian, et al. "Blastocyst-like structures generated from human pluripotent stem cells." Nature 591.7851 (2021): 620-626.
Zeevaert, Kira, et al. "Cell mechanics in embryoid bodies." Cells 9.10 (2020): 2270.
Zernicka-Goetz, M et al. "Following cell fate in the living mouse embryo." Development (Cambridge, England) vol. 124,6 (1997): 1133-7.
Zhang, Shaopeng, et al. "Implantation initiation of self-assembled embryo-like structures generated using three types of mouse blastocyst-derived stem cells." Nature communications 10.1 (2019): 496.
Zhang, Ying, et al. "Computer simulations of cell sorting due to differential adhesion." PloS one 6.10 (2011): e24999.
Zhao, Hui-Fen, et al. "A coumermycin/novobiocin-regulated gene expression system." Human gene therapy 14.17 (2003): 1619-1629.
Zheng, Yi, et al. "Single-cell analysis of embryoids reveals lineage diversification roadmaps of early human development." Cell Stem Cell 29.9 (2022): 1402-1419.
Zhou, Fan, et al. "Reconstituting the transcriptome and DNA methylome landscapes of human implantation." Nature 572.7771 (2019): 660-664.
Zilionis, R., et al. "Single-Cell Barcoding and Sequencing Using Droplet Microfluidics." Nat Protocols 12.1 (2017): 44-73.
Beccari et al., "Multi-axial self-organization properties of mouse embryonic stem cells into gastruloids," Nature 2018, 562(7726), 272-276.
Blakeley et al., "Defining the three cell lineages of the human blastocyst by single-cell RNA-seq," Development 2015, 142(18), 3151-3165.
Cockburn et al., "Making the blastocyst: lessons from the mouse," The Journal of Clinical Investigation 2010, 120(4), 995-1003.
Compton, "Nucleic acid sequence-based amplification," Nature 1991, 350(6313), 91-92.
Deglincerti et al., "Self-organization of the in vitro attached human embryo," Nature 2016, 533(7602), 251-254.
Gao et al., "Establishment of porcine and human expanded potential stem cells," Nature Cell Biology 2019, 21(6), 687-699.
Genbank, "FGF10, partial [Homo sapiens]," National Library of Medicine 2023, in 2 pages.
Genbank, "FGF21 [Homo sapiens]," National Library of Medicine 2023, in 2 pages.
Genbank, "fibroblast growth factor 2 isoform 34 kDa [Homo sapiens]," National Library of Medicine 2023, in 4 pages.
Genbank, "fibroblast growth factor 8 isoform b [Homo sapiens]," National Library of Medicine 2023, in 2 pages.
Genbank, "growth differentiation factor 8 [Homo sapiens]," National Library of Medicine 2023, in 2 pages.
Genbank, "growth/differentiation factor-11, partial [Homo sapiens]," National Library of Medicine 2023, in 2 pages.
Genbank, "Keratinocyte growth factor [Homo sapiens]," National Library of Medicine 2023, in 1 page.
Gerri et al., "Initiation of a conserved trophectoderm program in human, cow and mouse embryos," Nature 2020, 587(7834), 443-447.
Guatelli et al., "Isothermal, in vitro amplification of nucleic acids by a multienzyme reaction modeled after retroviral replication," Proceedings of the National Academy of Sciences 1990, 87(5), 1874-1878.
Harrison et al., "Assembly of embryonic and extraembryonic stem cells to mimic embryogenesis in vitro," Science 2017, 356(6334), in 13 pages.
Harrison et al., "In vitro generation of mouse polarized embryo-like structures from embryonic and trophoblast stem cells," Nature Protocols 2018, 13(7), 1586-1602.
Hendrickson et al., "Conserved roles of mouse DUX and human DUX4 in activating cleavage-stage genes and MERVL/HERVL retrotransposons," Nature Genetics 2017, 49(6), 925-934.
Kemp et al., "Expression of all Wnt genes and their secreted antagonists during mouse blastocyst and postimplantation development," Developmental Dynamics 2005, 233(3), 1064-1075.
Kime et al., "Induced 2C expression and implantation-competent blastocyst-like cysts from primed pluripotent stem cells," Stem Cell Reports 2019, 13(3), 485-498.
Kwoh et al., "Transcription-based amplification system and detection of amplified human immunodeficiency virus type 1 with a bead-based sandwich hybridization format," Proceedings of the National Academy of Sciences 1989, 86(4), 1173-1177.
Landegren et al., "A ligase-mediated gene detection technique," Science 1988, 241(4869), 1077-1080.
Li et al., "Generation of blastocyst-like structures from mouse embryonic and adult cell cultures," Cell 2019, 179(3), 687-702.
Marshall et al., "Detection of HCV RNA by the asymmetric gap ligase chain reaction," PCR Methods and Applications 1994, 4(2), 80-84.
Martyn et al., "Self-organization of a human organizer by combined Wnt and Nodal signalling," Nature 2018, 558(7708), 132-135.
Massey et al., "Synergy with TGFβ ligands switches WNT pathway dynamics from transient to sustained during human pluripotent cell differentiation," Proceedings of the National Academy of Sciences 2019, 116(11), 4989-4998.
Mischler et al., "Two distinct trophectoderm lineage stem cells from human pluripotent stem cells," bioRxiv 2019, in 38 pages.
Moris et al., "An in vitro model of early anteroposterior organization during human development," Nature 2020, 582(7812), 410-415.
Nastri et al., "Low versus atmospheric oxygen tension for embryo culture in assisted reproduction: a systematic review and meta-analysis," Fertility and Sterility 2016, 106(1), 95-104.
Okae et al., "Derivation of human trophoblast stem cells," Cell Stem Cell 2018, 22(1), 50-63.
Papaioannou et al., "Development and phenotypic variability of genetically identical half mouse embryos," Development 1989, 106(4), 817-827.
Pera, "Human embryo research and the 14-day rule," Development 2017, 144(11), 1923-1925.
Richter et al., "Quantitative grading of a human blastocyst: optimal inner cell mass size and shape," Fertility and Sterility 2001, 76(6), 1157-1167.
Rivron et al., "Blastocyst-like structures generated solely from stem cells," Nature 2018, 557(7703), 106-111.
Rossant & Tam, "Blastocyst lineage formation, early embryonic asymmetries and axis patterning in the mouse," Development 2009, 136(5), 701-713.
Shahbazi et al., "Self-organization of the human embryo in the absence of maternal tissues," Nature Cell Biology 2016, 18(6), 700-708.
Simunovic et al., "A 3D model of a human epiblast reveals BMP4-driven symmetry breaking," Nature Cell Biology 2019, 21(7), 900-910.
Sozen et al., "Reconstructing aspects of human embryogenesis with pluripotent stem cells," Nature Communications 2021, 12(1), in 13 pages.
Sozen et al., "Self-assembly of embryonic and two extra-embryonic stem cell types into gastrulating embryo-like structures," Nature Cell Biology 2018, 20(8), 979-989.
Sozen et al., "Self-organization of mouse stem cells into an extended potential blastoid," Developmental Cell 2019, 51(6), 698-712.
Tarkowski, "Experiments on the development of isolated blastomeres of mouse eggs," Nature 1959, 184, 1286-1287.

(56) References Cited

OTHER PUBLICATIONS

Towbin et al., "Electrophoretic transfer of proteins from polyacrylamide gels to nitrocellulose sheets: procedure and some applications," Proceedings of the National Academy of Sciences 1979, 76(9), 4350-4354.
Van Den Brink et al., "Single-cell and spatial transcriptomics reveal somitogenesis in gastruloids," Nature 2020, 582(7812), 405-409.
Veenvliet et al., "Mouse embryonic stem cells self-organize into trunk-like structures with neural tube and somites," Science 2020, 370(6522), in 9 pages.
Walker et al., "Strand displacement amplification (SDA) and transient-state fluorescence polarization detection of *Mycobacterium tuberculosis* DNA," Clinical Chemistry 1996, 42(1), 9-13.
Warmflash et al., "A method to recapitulate early embryonic spatial patterning in human embryonic stem cells," Nature Methods 2014, 11(8), 847-854.
Wu & Wallace, "The ligation amplification reaction (LAR)—amplification of specific DNA sequences using sequential rounds of template-dependent ligation," Genomics 1989, 4(4), 560-569.
Xiang et al., "A developmental landscape of 3D-cultured human pre-gastrulation embryos," Nature 2020, 577(7791), 537-542.
Yang et al., "Derivation of pluripotent stem cells with in vivo embryonic and extraembryonic potency," Cell 2017, 169(2), 243-257.
Yang et al., "Establishment of mouse expanded potential stem cells," Nature 2017, 550(7676), 393-397.
Zheng et al., "Controlled modelling of human epiblast and amnion development using stem cells," Nature 2019, 573(7774), 421-425.
Zhu et al., "Actomyosin polarisation through PLC-PKC triggers symmetry breaking of the mouse embryo," Nature Communications 2017, 8(1), in 16 pages.
Zhu et al., "Mechanism of cell polarisation and first lineage segregation in the human embryo," bioRxiv 2020, in 26 pages.

* cited by examiner hEPSCs in 2D

+Chiron
+hLif
+DM
+MH
+Y-27632 cystic structures
from hEPSCs (D6)

human blastocysts (D6)

FIG. 7A

Legend:
- ☑ High frequency / reproducible
- ☑ Low frequency / low reproducibility
- ☒ Compromised
- N/A Not available screening of GFs and inhibitors

| | BMP4 | CHIR | Y2 | FGF2 | A83 |
|---|---|---|---|---|---|
| C1 | X | V | V | V | V |
| C2 | V | X | V | V | V |
| C3 | V | V | X | V | V |
| C4 | V | V | V | X | V |
| C5 | V | V | V | V | X |
| C6 | V | V | V | V | V | features observed

| | CELL SURVIVAL | CAVITATION | SOX2+ INNER COMPARTMENT | KRT18+ OUTER COMPARTMENT |
|---|---|---|---|---|
| C1 | V | X | N/A | N/A |
| C2 | X | N/A | N/A | N/A |
| C3 | X | N/A | N/A | N/A |
| C4 | V | X | N/A | N/A |
| C5 | V | V | N/A | X |
| C6 | V | V | V | V |

RECONSTRUCTING HUMAN EARLY EMBRYOGENESIS IN VITRO WITH PLURIPOTENT STEM CELLS

RELATED APPLICATIONS

This application claims the benefit under 35 U.S.C. § 119(e) of U.S. Provisional Patent Application Ser. No. 63/161,935, filed Mar. 16, 2021, the content of this related application is incorporated herein by reference in its entirety for all purposes.

REFERENCE TO SEQUENCE LISTING

The present application is being filed along with a Sequence Listing in electronic format. The Sequence Listing is provided as a file entitled 30KJ_302429_US_Sequence_Listing, created Mar. 11, 2022, which is 5 kilobytes in size. The information in the electronic format of the Sequence Listing is incorporated herein by reference in its entirety.

BACKGROUND

Field

The present disclosure relates generally to the field of cell culture (e.g., of pluripotent stem cells).

Description of the Related Art

Human life starts at fertilisation with the union of the sperm and the egg to form the zygote. This unique totipotent cell undergoes continuous cleavage divisions without any increase in size, resulting in a sphere known as the morula four days after fertilisation. Further division and cell differentiation results in a hollowed structure known as the blastocyst on the fifth day of development (FIG. 1A). By the blastocyst stage, two main groups of cells become defined: the inner cell mass (ICM), which will form the embryo proper and the first extra-embryonic tissue, and the trophectoderm (TE), an epithelium that gives rise to the cells of the placenta. Just before embryo implantation on the sixth day, the inner cell mass starts to differentiate into the epiblast (EPI) and hypoblast (HYPO), which will give rise to all embryonic cells and the extra-embryonic yolk-sac, respectively. Following implantation, the EPI undergoes a series of morphological changes leading to the formation of a 3-dimensional (3D) rosette, which then forms a flattened disc-shaped structure that will initiate gastrulation on day fourteen.

Naturally, the development of the human embryo occurs within the body of the mother, making it hard to study. Although existing in vitro culture methods have advanced our abilities to study aspects of human embryo development ex-utero, surplus human embryos donated to research are rare and their use is subject to considerable ethical and legal restrictions. Due to these reasons, knowledge of the critical developmental steps allowing formation of the blastocyst stage embryo and its remodelling to initiate gastrulation remain largely unknown. There is a need for stem cell-derived models that recapitulate unique stages of mammalian (e.g., mouse or human) development in vitro.

SUMMARY

Disclosed herein include in vitro methods of generating an expanded pluripotency (EP) structure in three dimensions. In some embodiments, the method comprises: a) contacting pluripotent stem cells (PSCs) with EP media to generate expanded pluripotent stem cells (EPSCs); b) contacting at least 5 EPSCs with a first substrate and a composition capable of supporting generation of an EP structure, wherein the composition comprises about 25% EP media, about 25% trophoblast stem cell (TSC) media, and about 50% in vitro fertilization (IVF) media; and c) culturing the EPSCs in the composition for at least about 4 days, wherein the EPSCs self-organize to generate an EP structure.

In some embodiments, the composition further comprises a TGFβ ligand, a WNT agonist, a fibroblast growth factor family (FGF) member, a ROCK inhibitor, an ALK5 kinase inhibitor, or any combination thereof. In some embodiments, the composition comprises BMP4 or any analogue thereof, CHIR99021 or any analogue thereof, FGF2 or any analogue thereof, and Y-27632 or any analogue thereof. In some embodiments, the composition comprises about 20 ng/ml BMP4, about 2 μM CHIR99021, about 40 ng/ml FGF2, and about 5 μM Y-27632. In some embodiments, the composition does not comprise WNT3A. In some embodiments, the composition further comprises about 2 μM A83-01. In some embodiments, step (c) comprises removing the A83-01 after at least about 48 hours of culturing in the composition. The method can comprise reducing the concentration of FGF2 in the composition by about half.

In some embodiments, the PSCs are induced pluripotent stem cells (iPSCs). In some embodiments, the iPSCs are human iPSCs. In some embodiments, the PSCs are mammalian embryonic stem cells (ESCs). In some embodiments, the mammalian ESCs are human ESCs. In some embodiments, the PSCs, iPSCs, or ESCs are genetically modified.

In some embodiments, step (a) comprises culturing the PSCs in the EP media. In some embodiments, step (a) comprises passaging the PSCs in EP media at least five times. In some embodiments, the levels of ZCSAN4, THAP11, and/or NR52A are increased by at least about 2-fold in the EPSCs relative to the EP structure. In some embodiments, the EPSCs form dome-shaped colonies. In some embodiments, step (b) comprises isolating single EPSCs by contacting the dome-shaped colonies with a cell detachment enzyme. In some embodiments, the cell detachment enzyme is selected from the group comprising accutase, collagenase, elastase, hyaluronidase, papain, protease type XIV, and trypsin. The method can comprise resuspending the isolated single EPSCs in EP media.

In some embodiments, the first substrate comprises a dish, a U-plate, a flask, or a microwell plate. In some embodiments, the microwell plate comprises inverted pyramidal microwells. In some embodiments, each of the inverted-pyramidal microwells is about 400 μm or about 800 μm in size. In some embodiments, each of the inverted-pyramidal microwells is about 400 μm or about 800 μm diameter.

In some embodiments, the EP media and the TSC media comprise a basal culture medium. In some embodiments, the basal culture medium comprises media and/or supplements for supporting neuronal culture (e.g., Neurobasal®, Neurobasal® A, B27™ supplement). In some embodiments, the basal culture medium comprises a glutamine alternative (e.g., GlutaMax™ comprising L-alanyl-L-glutamine dipeptide). In some embodiments, the basal culture medium comprises a non-serum replacement (e.g., KnockOut™ Serum Replacement). In some embodiments, the basal culture medium comprises Dulbecco's Modified Eagle Medium (DMEM), DMEM Nutrient Mixture 12 (DMEM/F12), Roswell Park Memorial Institute (RPMI) medium 1640, Neurobasal®, Neurobasal® A, Connaught Medical Research Laboratory 1066 (CMRL-1066), or any combination thereof. In some embodiments, the basal culture medium comprises a non-human serum or serum substitute thereof, a reducing agent, and an antibiotic. In some embodiments, the non-human serum or serum substitute comprises fetal bovine serum, bovine serum albumin, KnockOut™ Serum Replacement, or any combination thereof. In some embodiments, the reducing agent comprises beta-mercaptoethanol (BME), N-acetyl-L-cysteine, dithiothreitol (DTT), or any combination thereof. In some embodiments, the antibiotic comprises Penicillin-streptomycin, Amphotericin B, Ampicillin, Erythromycin, Gentamycin, Kanamycin, Neomycin, Nystatin, Polymyxin B, Tetracycline, Thiabendazole, Tylosin, or any combination thereof. In some embodiments, the basal culture medium comprises N2 supplement, B27™ supplement, Insulin-Transferrin-Selenium-Ethanolamine (ITS-X), GlutaMax™, non-essential amino acids, ascorbic acid, or any combination thereof.

In some embodiments, the EP media comprises a cytokine, a WNT agonist, a cholinergic antagonist, an antibiotic, or any combination thereof. In some embodiments, the EP media comprises about 10 ng/ml leukemia inhibitory factor (LIF) or any analogue thereof, about 1 mM CHIR99021 or any analogue thereof, about 1 mM S-(+)-Dimethindenemaleate or any analogue thereof, and about 2 mM Minocycline HCl or any analogue thereof. In some embodiments, the EP media comprises DMEM/F12, Neurobasal® A, N2 supplement, B27 supplement, about 1% GlutaMax™, about 1% non-essential amino acids, about 0.1 mM BME, Penicillin-streptomycin, about 5% KO serum replacement, about 10 ng/ml leukemia inhibitory factor (LIF), about 1 mM CHIR99021, about 1 mM S-(+)-Dimethindenemaleate, and/or about 2 mM Minocycline HCl.

In some embodiments, the TSC media comprises an epidermal growth factor family member, a WNT agonist, an ALK5 kinase inhibitor, a histone deacetylase (HDAC) inhibitor, a ROCK inhibitor, or any combination thereof. In some embodiments, the TSC media comprises about 50 ng/ml epidermal growth factor (EGF) or any analogue thereof, about 2 mM CHIR99021 or any analogue thereof, about 0.5 mM A83-01 or any analogue thereof, about 1 mM SB431542 or any analogue thereof, about 0.8 mM VPA or any analogue thereof, and about 5 mM Y-27632 or any analogue thereof. In some embodiments, the TSC media comprises DMEM/F12, about 0.1 mM BME, about 0.2% FBS, about 0.5% Penicillin-streptomycin, about 0.3% BSA, about 1% ITS-X, about 1.5 ng/ml ascorbic acid, about 50 ng/ml EGF, about 2 mM CHIR99021, about 0.5 mM A83-01, about 1 mM SB431542, about 0.8 mM VPA, and about 5 mM Y-27632. In some embodiments, the IVF media comprises a continuous culture media.

In some embodiments, the continuous culture media comprises Continuous Single Culture-NX Complete (CSCM-NXC), LifeGlobal Global Total Media (LGGT), GM501, or any combination thereof.

In some embodiments, step (c), comprises culturing the EPSCs in hypoxic conditions. In some embodiments, the hypoxic conditions comprise about 5% oxygen.

In some embodiments, the EPSCs form aggregates following at least about 24 hours of culture in the composition. In some embodiments, the aggregates exhibit basolateral enrichment of E-cadherin relative to the apical surface. In some embodiments, F-actin, PARD6, or both, are enriched at the apical surface relative to the basolateral surface of the aggregates. In some embodiments, GATA3 is enriched in the nuclei relative to the cytosol of the EPSCs in the aggregates. In some embodiments, the enrichment of PARD6 at the apical surface of the aggregates, the enrichment of GATA3 in the cell nuclei of the aggregates, or both, is reduced following administration of an agent that reduces PLC-Protein Kinase C (PKC) pathway signaling to the aggregates.

In some embodiments, the EP structure comprises a single outside layer, an enlarged cavity, and an internal acentric compartment. In some embodiments, the single outside layer comprises trophectoderm-like cells. In some embodiments, the internal acentric compartment comprises hypoblast-like cells, epiblast-like cells, or both. In some embodiments, the single outside layer of the EP structure comprises one or more cells expressing KRT18, GATA3, or both. In some embodiments, each of the inverted-pyramidal microwells is about the single outside layer exhibits nuclear GATA3 expression with a frequency of at least about 50%. In some embodiments, the internal acentric compartment of the EP structure comprises one or more cells expressing SOX2, SOX17, OCT4, FOXA2, or any combination thereof. In some embodiments, the EP structure comprises about 60 to about 260 cells. In some embodiments, the EP structure is about 100 µm to about 200 µm in diameter.

In some embodiments, expression of one or more trophectoderm marker genes, one or more epiblast marker genes, one or more hypoblast marker genes, or any combination thereof, are increased in the EP structure by at least about 2-fold following at least four days of culture in the composition relative to the EPSCs generated in step (a). In some embodiments, the one or more trophectoderm marker genes comprise GATA3, PLAC8, CDX2, KRT8, KRT18, or any combination thereof. In some embodiments, the one or more epiblast marker genes comprise KLF4. In some embodiments, the one or more hypoblast marker genes comprise PDGFRA, GATA6, or both.

The method can comprise: (d) contacting the EP structure with a second substrate and IVC media. The method can comprise: (e) culturing the EP structure in the IVC media for at least about 24 hours, wherein the EP structure reorganizes to form a reorganized EP structure comprising an outer compartment, an inner compartment, and an internal lumen.

In some embodiments, the second substrate comprises a dish, a U-plate, a flask, or a microwell plate. In some embodiments, the second substrate comprises a U-plate.

In some embodiments, the IVC media comprises: a) insulin, an insulin analogue, or an insulin receptor agonist; b) estrogen, an estrogen analogue, or an estrogen receptor agonist; and c) progesterone, a progesterone analogue, or a progesterone receptor agonist.

In some embodiments, the IVC media further comprises an albumin. In some embodiments, the IVC media comprises a serum replacement. In some embodiments, the IVC media comprises 30% serum replacement. In some embodiments, the insulin receptor agonist is selected from the group comprising IGF-I, IGF-II, analogues thereof, or any combination thereof. In some embodiments, the estrogen receptor agonist is selected from the group comprising β-estradiol, estrone, estriol and estetrol, or any analogue thereof.

In some embodiments, the IVC media comprises transferrin, sodium selenium, ethanolamine, or any analogue thereof. In some embodiments, the IVC media comprises L-glutamine. In some embodiments, the IVC media comprises sodium pyruvate. In some embodiments, the IVC media comprises an amino acid selected from the group comprising L-glycine, L-alanine, L-asparagine, L-aspartic acid, L-glutamic acid, L-proline and L-serine. In some embodiments, the IVC media further comprises an agonist of the activin type 1 or type 2 receptors. In some embodiments, the IVC media comprises a reducing agent. In some embodiments, the reducing agent comprises N-acetyl-L-cysteine, dithiothreitol (DTT), β-mercaptoethanol (BME), or any combination thereof. In some embodiments, the IVC media does not comprise a conditioned medium.

In some embodiments, the outer compartment comprises one or more cells expressing one or more extra-embryonic markers, and the inner compartment comprises one or more cells expressing one or more embryonic markers. In some embodiments, the one or more extra-embryonic-markers comprise GATA3, KRT18, FOXA2, TFAP2, or any combination thereof. In some embodiments, the one or more embryonic markers comprise SOX2. In some embodiments, the inner compartment comprises one or more cells expressing the luminogenesis factor PODXL. In some embodiments, the inner compartment comprises cells expressing SOX2 with a frequency of at least about 50%.

The method can comprise: removing one or more cells from the EP structure or the reorganized EP structure; and culturing the one or more cells to produce differentiated cells. In some embodiments, the differentiated cells are selected from the group comprising exocrine secretory epithelial cells, hormone secreting cells, cells of the integumentary system, cells of the nervous system, metabolism and storage cells, barrier function cells, extracellular matrix cells, contractile cells, blood and immune system cells, germ cells, nurse cells and interstitial cells.

There are provided, in some embodiments, differentiated cells obtainable by the in vitro methods described herein. There are provided expanded pluripotency structures generated by the in vitro methods disclosed herein. Disclosed herein are compositions for generating an EP structure. There are also provided, in some embodiments, EP structures generated by the in vitro methods described herein. Disclosed herein are compositions for generating a reorganized EP structure.

Disclosed herein include methods for investigating the effect of a test agent on embryonic development. In some embodiments, the method comprises: a) generating an EP structure or a reorganized EP structure; b) contacting the EP structure or the reorganized EP structure with a test agent; and c) determining the effect of the test agent on the EP structure or reorganized EP structure. In some embodiments, the determining comprises comparing a phenotype or a genotype of the EP structure or reorganized EP structure in the presence of the test agent with the phenotype or genotype of the EP structure or reorganized EP structure in the absence of the test agent.

The method can comprise contacting the PSCs and/or EPSCs with the test agent prior to step (b). The method can comprise determining the subsequent effect on formation of the EP structure or the reorganized EP structure. The method can comprise recording one or more images of the EP structure or the reorganized EP structure.

Disclosed herein include methods for investigating mechanisms involved in embryogenesis. In some embodiments, the method comprises any of the in vitro methods for generating an EP structure, a reorganized EP structure, or a differentiated cell(s) described herein.

Disclosed herein include methods for identifying a compound useful for treating a disease. In some embodiments, the method comprises contacting an EP structure, a reorganized EP structure, or a differentiated cell(s) obtainable by the in vitro methods described herein with the compound.

Disclosed herein include methods for diagnosing or treating a disease or disorder in a subject. In some embodiments, the method comprises use of an EP structure, a reorganized EP structure, or a differentiated cell(s) obtainable by the in vitro methods described herein, or any combination thereof. In some embodiments, the EP structure, the reorganized EP structure, or the differentiated cell is for transplantation into the subject. In some embodiments, the PSCs are obtained from the subject.

Disclosed herein include methods for elucidating the role of a gene in embryo development. In some embodiments, the method comprises obtaining a pluripotent cell where the gene has been modified or knocked out and culturing the cell using the in vitro methods described herein.

BRIEF DESCRIPTION OF THE DRAWINGS

The patent or application file contains at least one drawing executed in color. Copies of this patent or patent application publication with drawing(s) will be provided by the Office upon request and payment of the necessary fee.

FIG. 1A shows an exemplary scheme for natural human pre/peri-implantation embryo development. FIG. 1B depicts a representative dome-shaped naïve pluripotent hEPSC colony in 2D culture. The image is representative of at least 10 independent experiments. FIG. 1C shows a non-limiting schematic of an AggreWell and aggregation protocol to mimic early human development solely with hEPSCs (Left). Also shown are representative examples of cystic structures generated from a typical experiment after 4 days that demonstrate three lineages, resembling blastocyst stage natural embryo (Right). Image is representative of at least 3 independent experiments. Lineage markers: SOX2, yellow; GATA3, magenta, and SOX17, cyan. n=10 experiments. FIG. 1D depicts representative phase-contrast images of hEPSC multicellular aggregates in AggreWell at the indicated time points during 3D culture. FIG. 1E depicts non-limiting exemplary phase-contrast images of human blastocyst-like structures at D6 (Top) and human blastocysts at D6 (Bottom). Images are representative of at least 3 independent experiments. FIG. 1F depicts a representative cystic structure generated from RUES2 hEPSC line with SOX2-flourescent reporter. Images are representative of at least 2 independent experiments. FIG. 1G depicts a representative structure immunostained for SOX2 in magenta and KRT18 in yellow to label inner compartment and outside epithelium, respectively. DAPI is shown in blue. Maximum projection image is shown on the right. n=50 structures, 3 experiments. FIG. 1H shows non-limiting exemplary data related to the efficiency quantification showing the number of structures with a cavity and identifiable lineage segregation. Present EPI-like and HYPO-like lineages were determined by positive expression of SOX2 and SOX17, respectively, within inner compartment as seen by immunofluorescence staining. Present TE lineages were determined by positive expression of GATA3 or KRT18 in outer cells observed by IF staining. n=186 structures, 2 experiments. FIG. 1I depicts non-limiting exemplary data related to quantification of cell numbers in individual cystic structures generated from two established hEPSC lines, ESI017 (n=11), RUES2 (n=18). FIG. 1J shows exemplary data related to measurements of axial diameters in cystic structures from ESI0017 (n=11), RUES2 (n=18) and H9 (n=13) cell lines. Illustration on right shows the two axes measured. All scale bars in the figure indicate 20 um.

FIG. 2A shows exemplary immunostaining of hEPSC aggregates at 22h for PARD6 (grey), F-ACTIN (red) and E-CADHERIN (cyan). n=300 aggregates, 3 experiments. FIG. 2B depicts non-limiting exemplary data related to quantification of GATA3 expression in cells with or without PARD6 apical enrichment observed in cells within Day 2 and Day 3 of multicellular aggregates. All measurements normalized to DAPI. Two-sided Student's t-test; p=0.0033 for Day 2; p=0.0433 for Day 3; 3 experiments. Error bars represent S.E.M. FIG. 2C shows non-limiting exemplary immunostaining of control and U73122-treated hEPSC aggregates at 48h for PARD6 (green) and GATA3 (magenta). n=300 aggregates, 3 experiments. FIG. 2D shows a representative natural human embryo at morula stage (D4) stained for PARD6 (green), F-ACTIN (red), GATA3 (magenta). White arrowheads indicate apical PARD6 enrichment in the polarised cells with nuclear GATA3 expression. DAPI is shown in blue. FIG. 2E shows exemplary data related to apical enrichment quantification of F-ACTIN and PARD6b at 48h in multicellular structures with or without addition of PLC inhibitor (U73122). Control groups received no inhibitor, while the two experimental groups were treated with either 2 µM or 3 µM U73122. Each dot represents one analysed cell. p=0.0333, Kruskal-Wallis test with Dunn's multiple comparisons test. Data is shown as mean S.E.M. n=3 experiments. Also see FIG. 8B. FIG. 2F depicts non-limiting exemplary data related to quantification of Pard6b apical enrichment at 48h (p=0.006) and 72h (p=0.0227) in structures treated with either control siRNA or PLCB1 siRNA (Top). Each dot represents one analysed cell. Two-sided Mann-Whitney test. Data is shown as mean S.E.M. n=3 experiments. Bottom panel depicts immunostaining of GATA3 (magenta) and PARD6 (green) in structures treated with either control siRNA or PLCB1 siRNA. DAPI is shown in blue. All scale bars in the figure indicate 20 um. FIG. 2G depicts exemplary bulk qRT-PCR analysis of genes ZCSAN4, THAP11, NR52A in EPSCs in 2D, and multicellular aggregates at day 4, 5, 6 formed in 3D represented as a heatmap of global ΔΔCt to GAPDH. 20 multicellular cystic structures were pooled per group from 3D culture and a minimum of 10K hEPSCs were collected from the 2D culture.

FIG. 3A shows exemplary bulk qRT-PCR analysis of blastocyst lineage marker genes in EPSCs in 2D, and multicellular aggregates and/or EP structures at day 4, 5, 6 formed in 3D represented as a heatmap of global ΔΔCt (fold-change) to GAPDH. 20 cystic structures were pooled per group from 3D culture and a minimum of 10K hEPSCs were collected from the 2D culture. FIG. 3B depicts exemplary immunofluorescence staining of blastocyst-like structures generated from hEPSCs at day 5 for OCT4 (green), KRT18 (white) and SOX17 (red). Zoom image on the right shows TE-like cells with KRT18 expression. DAPI is shown in blue. n=30 structures, 3 experiments. FIG. 3C depicts representative blastocyst-like structures generated from hEPSCs at day 5 stained for SOX2 (green) and FOXA2 (red) to suggest Epi/Hypo-like inner compartment (zoom on the right). Image presented as maximum projection. n=20 structures, 2 experiments. FIG. 3D depicts exemplary immunofluorescence staining of blastocyst-like structures generated from hEPSCs at day 4 for OCT4 (green) and GATA3 (red). DAPI is shown in blue. n=10/23 structures, 2 experiments. FIG. 3E shows exemplary immunofluorescence staining of GATA3 (green) and E-CADHERIN (magenta) in a representative blastocyst-like structure at day 6. Quantification is shown on the right and depicts the frequency of structures at day 6 of 3D culture showing Gata3 nuclear expression (57.03%, 77/135 structures scored); Gata3 cytoplasmic expression (39.25%, 53/135 structures scored); no detectable Gata3 expression (3.70%, 5/135 structures scored). FIG. 3F depicts exemplary quantification showing frequency of cavitated structures in control and WNT3A-supplemented culture. WNT3A is applied at either at 25 or 50 ng/mL concentration. One-way ANOVA with multiple comparisons, p=0.8473. ns, not significant. 3 independent experiments. Error bars show S.E.M. All scale bars in the figure indicate 20 um.

FIG. 4A shows an exemplary illustration detailing the process of in vitro structure formation in three steps: hEPSC aggregation, self-organisation into blastocyst-like cystic structures, and post-implantation-like remodelling in IVC media (See, Example 1). Also shown are phase-contrast images showing a representative structure at each of these steps. FIG. 4B top panel depicts an exemplary maximum projection of a representative post-implantation-like structure immunostained for GATA3 (cyan) to reveal extra-embryonic-like and SOX2 (yellow) for embryonic-like compartments. Quantification shown on the bottom depicts frequency of structures cultured in IVC media for 24h that showed SOX2+ inner compartment (60.4%, light grey), no inner compartment (38.4%, dark grey), or no development (1.2%, black). n=260 structures scored in 3 experiments. FIG. 4C depicts exemplary immunostaining showing the expression of TFAP2C (red, an extra-embryonic marker), and FOXA2 (yellow, a Hypo marker) in a post-implantation-like structure cultured in IVC for 24h. Zoomed image on the right shows FOXA2 expressing Hypo-like cells (arrowheads). Yellow dashed-lines demarcates embryonic inner compartment. Representative of at least 3 independent experiments. FIG. 4D depicts exemplary immunostaining of post-implantation-like structure cultured in IVC media for 24 h. The top panels show a mid-plane (Left) and maximum projection (Right) view of a representative structure with the pluripotent compartment marked by SOX2 expression (green), surrounded by cells marked by KRT18 (white). DAPI for nuclear staining is in blue. The bottom panels show inverted images for better clarity of DAPI signal for cell nucleus on the left and F-ACTIN+SOX2 double-staining on the right. The opening of a cavity within the Epi-like compartment (nuclear SOX2 expression) is marked by F-ACTIN. n=20 structures, 3 experiments. FIG. 4E depicts exemplary immunostaining showing the formation of a central cavity, as marked by PODXL (magenta), within the ICM, marked by SOX2 (green), of an hEPSC-derived structure after 24h culture in IVC. n=20 structures, 3 experiments. DAPI staining is in blue. All scale bars in the figure indicate 20 um.

FIG. 5A depicts a uniform manifold approximation and projection (UMAP) grouped by cell group: natural human embryos at D5/D6 (n=542 cells), hEPSCs grown in 2D (n=228 cells, 2 replicates), D5 cyst structures (n=2013 cells, 3 replicates), and D6 cyst structures grown in IVC for 24 hrs (n=2057 cells, 3 replicates). FIG. 5B depicts an exemplary UMAP showing lineage scoring of all cell groups into EPI-like cells (ELCs, teal) and EPI (dark teal), HYPO-like cells (HLCs, yellow) and Hypoblast (dark yellow), TE-like cells (TLCs, magenta) and TE (dark magenta). Undefined cells appear in grey. FIG. 5C depicts non-limiting pie charts showing the distribution of lineage assignments for natural embryo, D5 structures, and D6 structures. FIG. 5D depicts heat maps showing the expression of canonical TE markers enriched in natural cluster, as well as a subset of D5 TLCs (Top row), and genes shown to be enriched exclusively in D5 TLC cluster (Bottom row). A circle with a dotted line denotes D5 TLC cluster. FIG. 5E depicts collections of violin plots showing the relative expression of certain key lineage markers in ELCs, HLCs, and TLCs. For EPI-related genes: SOX2, NANOG, POU5F1. For HYPO-related genes: GATA4, PDGFRA, and GATA6. For TE-related genes: GATA3, GATA2, and KRT18. FIG. 5F depicts exemplary Violin plots showing the expression of canonical markers for HYPO-related genes (yellow), EPI-related genes (teal) and TE-related genes (magenta) in Day 5 hEP-structures, D6 hEP-structures, and the natural embryo. (*p<0.05, p<0.01, *p<0.001; (two-sided ad-hoc Dunn's multiple comparison test applied to an ANOVA)). For D5 structures: HLCs, n=445 cells; ELCs, n=235 cells; TLCs, n=50 cells. For D6 structures: HLCs, n=586 cells; ELCs, n=144 cells; TLCs, n=73 cells. For natural blastocyst, HYPO, n=11 cells; EPI, n=32 cells; TE, n=484 cells. All genes were taken from Liu et al. 2021.

FIG. 6A depicts exemplary DIC images showing varied colony morphology of hPSCs under EP culture conditions. The top image shows dome-shaped morphology, characteristic of pluripotent cells at the naïve state, while the bottom images show flat colonies, characteristic of cells in the primed state. Representative of at least 10 independent experiments. FIG. 6B shows exemplary DIC images of hEP-structures grown for 5 days with (top) and without (bottom) IVF media. Quantification shows the frequency of cystic structure formation in each condition (+/−IVF). Two-sided Student's t-test; ****p<0.001; 3 experiments. Error bars show S.E.M. FIG. 6C depicts exemplary comparisons of hEP-structures at day 6 (D6) of 3D culture to the natural human blastocyst at the same developmental time point. Quantification on the right shows the frequency of cystic structure formation under 20% $O_2$ (Normoxia; grey circle) and 5% $O_2$ (Hypoxia; white square) conditions. Two-sided Student's t-test; p=0.005; 3 experiments. Error bars show S.E.M. All scale bars in the figure indicate 20 um.

FIG. 7A-FIG. 7F depict non-limiting exemplary embodiments of screening of growth factors and inhibitors on hEP-derived structures. FIG. 7A outlines tested media conditions with and without specific growth factors and inhibitors (left), and observed features from each of these conditions (right). FIG. 7B-FIG. 7C show exemplary images of failure of cell survival grown for 5 days without CHIR99021 (Chiron, condition 2, C2) or Y-27632 (Y2; condition 3, C3), respectively. FIG. 7D shows exemplary immunostaining of expression of TFAP2C (white), and GATA6 (magenta) in structures grown under condition 4 (C4) for 5 days. DAPI shows nuclear staining in blue. Representative of at least 2 independent experiments. FIG. 7E depicts exemplary immunostaining showing expression of GATA3 (red), and SOX2 (green) in structures grown under condition 5 (C5) for 5 days. DAPI shows nuclear staining in blue. Representative of at least 2 independent experiments. FIG. 7F shows exemplary immunostaining for SOX2 (magenta), and KRT18 (yellow) in representative structure grown under condition 6 (C6) until Day 6. Images are shown in a single plane view (Top left), maximum projection (Top right), and as a montage panel of Z-stack slice 1-20. All scale bars in the figure indicate 20 um. Representative of at least 2 independent experiments.

FIG. 8A shows quantification of nuclear GATA3 signal intensity in control and experimental groups treated with either 2 μM or 3 μM of selective PKC inhibitor, U73122. All measurements normalized to DAPI. Each dot represents one analyzed cell. p=0.0173, ANOVA with a multiple comparisons test. Data is shown as mean S.E.M. n=6 aggregates, 3 experiments. FIG. 8B depicts non-limiting exemplary data related to apical enrichment quantification of F-ACTIN and PARD6b at 24, 48h and 72h in multicellular structures with or without addition of PLC inhibitor (U73122). Control groups received no inhibitor, while the two experimental groups were treated with either 2 μM or 3 μM U73122. Each dot represents one analyzed cell. p=0.0033 for Pard6b 48h; p=0.0267 for Pard6b 72h, Kruskal-Wallis test with Dunn's multiple comparisons test. Error bars show S.E.M. n=300 aggregates, 3 experiments. FIG. 8C Quantification of PLCB1 knock-down efficiency in groups treated with either control siRNA or PLCB1 siRNA as determined by RT-PCR is depicted on the left. Values were normalized against GAPDH. **p<0.001, Two-sided Student's t-test. Approximately 800 structures were pooled for RT-PCR per group from 3D culture. n=3 replicates. Error bars show S.E.M. Quantification of nuclear GATA3 signal intensity in groups treated with either Control siRNA or PLCB1 siRNA is shown on the right. All measurements normalized to DAPI. Each dot represents one analyzed cell. **p<0.001, Two-sided Student's t-test. n=6 aggregates, 3 experiments. Error bars show S.E.M.

FIG. 9A depicts Violin plots showing the expression of key pluripotency markers in 2D hEPSCs, lineages from hEP-derived structures, and lineages from natural embryos. FIG. 9B depicts Violin plots showing the expression of all genes corresponding to antibodies used herein in 2D hEPSCs, lineages from hEP-structures, and lineages from natural embryos. FIG. 9C depicts Violin plots showing the expression of genes used in FIG. 5A-FIG. 5F in 2D hEPSCs, lineages from hEP-structures, lineages from natural embryos. FIG. 9D shows an exemplary heatmap of UMAP projection including cells from 2D hEPSCs and natural embryos showing relative "EPSC scores" (See, Example 1). Cells from natural embryo are surrounded by the circle with a grey dotted line. FIG. 9E shows Violin plots comparing the "EPSC score" in 2D hEPSCs, D5 hEP-structures, D6 hEP-structures, and natural embryo. For 2D hEPSCs: n=228 cells, 2 replicates. For natural embryos: n=542 cells, 6 embryos.

FIG. 10A depicts Violin plots showing the expression of HYPO-related genes in Day 5 HLCs, Day 6 HLCs, and natural blastocyst HYPO lineage. FIG. 10B depicts Violin plots showing the expression of EPI-related genes in Day 5 ELCs, Day 6 ELCs, and natural blastocyst EPI lineage. FIG. 10C depicts Violin plots showing the expression of TE-related genes in Day 5 ELCs, Day 6 ELCs, and natural blastocyst TE. FIG. 10D depicts Violin plots showing the expression of extra-cellular matrix genes in defined lineages of D5/D6 structures and lineages of natural embryos. Statistical analysis (two-sided ad-hoc Dunn's multiple comparison test applied to an ANOVA) was performed on 96 genes for each lineage, and the fraction of downregulated, upregulated, and not significant genes in comparison to the natural embryo are shown to the right of violin plots. (*p<0.05, p<0.01, *p<0.001). For Day 5 structures, n=2013 cell, 3 replicates. For Day 6 structures, n=2057 cell, 3 replicates. For natural blastocyst, n=542 cell, 6 embryos.

FIG. 11A depicts Heat maps showing global gene expression patterns in Day 5 hEP-structures, Day 6 hEP-structures, natural blastocyst, iBlastoids (Liu et al., 2021), StemBlastoids (Yu et al, 2021), and 2D hEPSCs. An identical list of genes is denoted to the left of each heatmap, with a color block corresponding to related gene groups. Color bars below each heatmap denotes lineage assignments, as reported in their original publications. FIG. 11B shows exemplary gene set enrichment analysis based on the hypergeometric test on Day 5 hEP-structures, Day 6 hEP-structures, and natural embryos was performed using Reactome-signaling gene sets to identify specific signaling pathways that are up-regulated in each.

FIG. 12A depicts an exemplary 2-step protocol for generating blastocyst-like structures from EPSCs combined with hTSCs. FIG. 12B shows exemplary aggregates co-expressing endogenous SOX2 (green) and SOX17 (red) after the first step (24h) of aggregation. SOX2 indicates naive pluripotent EPI-like cells; SOX17 indicates extra-embryonic HYPO-like cell formation. Quantification shows structures scored as positive for hypoblast-like cell in conventional naïve Rset condition and EP condition. n=3 experiments, 100 aggregates per group. Error bars show S.D. FIG. 12C shows a representative structure generated from EPSCs combined with hTSCs stained for GATA3, SOX2 and SOX17. DIC image reveals the failure for cavitation. Representative of at least 10 independent experiments. All scale bars in the figure indicate 20 um.

DETAILED DESCRIPTION

Figure 1A:
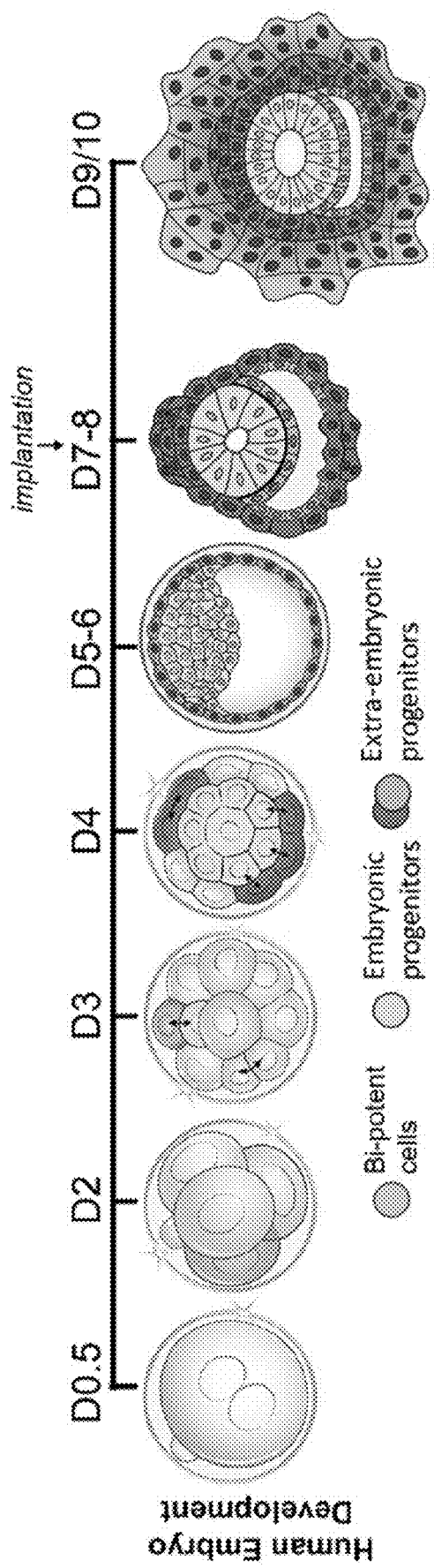
FIG. 1A-FIG. 1J depict non-limiting exemplary data related to a 3D system from hEPSCs to mimic embryo-like events.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

All patents, published patent applications, other publications, and sequences from GenBank, and other databases referred to herein are incorporated by reference in their entirety with respect to the related technology.

Disclosed herein include methods and compositions for generating expanded pluripotency (EP) structures, reorganized EP structures, and differentiated cells derived from said structures. Also provided are methods for using said structures for, e.g., studying mechanisms of embryogenesis or treating a disease or disorder in a subject.

Disclosed herein include in vitro methods of generating an expanded pluripotency (EP) structure in three dimensions. In some embodiments, the method comprises: a) contacting pluripotent stem cells (PSCs) with EP media to generate expanded pluripotent stem cells (EPSCs); b) contacting at least 5 EPSCs with a first substrate and a composition capable of supporting generation of an EP structure, wherein the composition comprises about 25% EP media, about 25% trophoblast stem cell (TSC) media, and about 50% in vitro fertilization (IVF) media; and c) culturing the EPSCs in the composition for at least about 4 days, wherein the EPSCs self-organize to generate an EP structure.

The method can comprise: (d) contacting the EP structure with a second substrate and IVC media. The method can comprise: (e) culturing the EP structure in the IVC media for at least about 24 hours, wherein the EP structure reorganizes to form a reorganized EP structure comprising an outer compartment, an inner compartment, and an internal lumen. The method can comprise: removing one or more cells from the EP structure or the reorganized EP structure; and culturing the one or more cells to produce differentiated cells.

There are provided, in some embodiments, differentiated cells obtainable by the in vitro methods described herein. There are provided expanded pluripotency structures generated by the in vitro methods disclosed herein. Disclosed herein are compositions for generating an EP structure. There are also provided, in some embodiments, EP structures generated by the in vitro methods described herein. Disclosed herein are compositions for generating a reorganized EP structure.

Disclosed herein include methods for investigating the effect of a test agent on embryonic development. In some embodiments, the method comprises: a) generating an EP structure or a reorganized EP structure; b) contacting the EP structure or the reorganized EP structure with a test agent; and c) determining the effect of the test agent on the EP structure or reorganized EP structure. Disclosed herein include methods for investigating mechanisms involved in embryogenesis. In some embodiments, the method comprises any of the in vitro methods for generating an EP structure, a reorganized EP structure, or a differentiated cell(s) described herein.

Disclosed herein include methods for identifying a compound useful for treating a disease. In some embodiments, the method comprises contacting an EP structure, a reorganized EP structure, or a differentiated cell(s) obtainable by the in vitro methods described herein with the compound. Disclosed herein include methods for diagnosing or treating a disease or disorder in a subject.

Disclosed herein include methods for elucidating the role of a gene in embryo development. In some embodiments, the method comprises obtaining a pluripotent cell where the gene has been modified or knocked out and culturing the cell using the in vitro methods described herein.

Definitions

Unless defined otherwise, technical and scientific terms used herein have the same meaning as commonly understood by one of ordinary skill in the art to which the present disclosure belongs. See, e.g. Singleton et al., Dictionary of Microbiology and Molecular Biology 2nd ed., J. Wiley & Sons (New York, NY 1994); Sambrook et al., Molecular Cloning, A Laboratory Manual, Cold Spring Harbor Press (Cold Spring Harbor, NY 1989). For purposes of the present disclosure, the following terms are defined below.

As used herein, the term "differentiation" can refer to the process by which an unspecialized ("uncommitted") or less specialized cell acquires the features of a specialized cell such as, for example, a neuronal cell. A differentiated cell is one that has taken on a more specialized ("committed") position within the lineage of a cell. The term "committed", when applied to the process of differentiation, refers to a cell that has proceeded in the differentiation pathway to a point where, under normal circumstances, it will continue to differentiate into a specific cell type or subset of cell types, and cannot, under normal circumstances, differentiate into a different cell type or revert to a less differentiated cell type. As used herein, the lineage of a cell defines the heredity of the cell, i.e., which cells it came from and to what cells it can give rise. The lineage of a cell places the cell within a hereditary scheme of development and differentiation. As used herein, a "lineage-specific marker" can refer to a characteristic specifically associated with the phenotype of cells of a lineage of interest and can be used to assess the differentiation of an uncommitted cell to the lineage of interest.

As used herein, "markers", "lineage markers" or, "lineage-specific markers" can refer to nucleic acid or polypeptide molecules that are differentially expressed in a cell of interest. Differential expression can mean an increased level for a positive marker and a decreased level for a negative marker as compared to an undifferentiated cell. The detectable level of the marker nucleic acid or polypeptide is sufficiently higher or lower in the cells of interest compared to other cells, such that the cell of interest can be identified and distinguished from other cells using any of a variety of methods known in the art. In some embodiments, a marker can be enriched. The term "enriched", as used herein, shall have its ordinary meaning, and can also refer to a statistically significant increase in levels of a gene product (e.g., mRNA and/or protein) in one condition as compared to another condition (e.g., in one cell layer as compared to another cell layer).

The term, "concentration" as used herein shall have its ordinary meaning, and can also refer to (a) mass concentration, molar concentration, volume concentration, mass fraction, molar fraction or volume fraction, or (b) a ratio of the mass or volume of one component in a mixture or solution to the mass or volume of another component in the mixture or solution.

Methods and Compositions for Generating an EP Structure

Understanding human development is of fundamental biological and clinical importance. Despite its significance, mechanisms behind human embryogenesis remain largely unknown. Disclosed herein are methods and compositions for modeling human early embryo development with expanded pluripotent stem cells (EPSCs) in 3-dimensions. A protocol is defined that allows for generation of self-organizing cystic structures from human EPSCs that display some hallmarks of human early embryogenesis. These structures mimic polarization and cavitation characteristic of pre-implantation development leading to blastocyst morphology formation and the transition to post-implantation-like organization upon extended culture. Single-cell RNA sequencing of these structures reveals subsets of cells bearing resemblance to epiblast, hypoblast and trophectoderm lineages. This stem cell platform provides, for example, insights into the design of stem cell models of embryogenesis. Some of the methods and compositions disclosed herein are also described in "Sozen, B., Jorgensen, V., Weatherbee, B. A. T. et al. Reconstructing aspects of human embryogenesis with pluripotent stem cells. Nat Commun 12, 5550 (2021).", which is hereby incorporated by reference in its entirety.

Disclosed herein include in vitro methods of generating an expanded pluripotency (EP) structure in three dimensions. In some embodiments, the method comprises: a) contacting pluripotent stem cells (PSCs) with EP media to generate expanded pluripotent stem cells (EPSCs); b) contacting at least 5 EPSCs with a first substrate and a composition capable of supporting generation of an EP structure, wherein the composition comprises about 25% EP media, about 25% trophoblast stem cell (TSC) media, and about 50% in vitro fertilization (IVF) media; and c) culturing the EPSCs in the composition for at least about 4 days, wherein the EPSCs self-organize to generate an EP structure.

Compositions Capable of Supporting Generation of an EP Structure

The amount of the EP media, the TSC media, and the IVF media in the composition can vary. In some embodiments, the composition comprises about 1% to about 50% EP media (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50% or a number or a range between any two of these values). In some embodiments, the composition comprises about 25% EP media. In some embodiments, the composition comprises about 1% to about 50% TSC media (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50% or a number or a range between any two of these values). In some embodiments, the composition comprises about 25% TSC media. In some embodiments, the composition comprises about 25% to about 75% IVF media (e.g., 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75% or a number or a range between any two of these values). In some embodiments, the composition comprises about 50% IVF media.

In some embodiments, the composition further comprises a TGFβ ligand, a WNT agonist, a fibroblast growth factor family (FGF) member, a ROCK inhibitor, an ALK5 kinase inhibitor, or any combination thereof. The composition can comprise BMP4 or any analogue thereof, CHIR99021 or any analogue thereof, FGF2 or any analogue thereof, and Y-27632 or any analogue thereof. In some embodiments, the composition comprises about 20 ng/ml BMP4, about 2 μM CHIR99021, about 40 ng/ml FGF2, and about 5 μM Y-27632. In some embodiments, the composition does not comprise WNT3A. In some embodiments, the composition further comprises about 2 μM A83-01.

Transforming Growth Factor β/Bone Morphogenic Protein (BMP) Signaling Pathway

In some embodiments, the composition can comprise one or more of a TGFβ superfamily member. The "TGF-β superfamily" means proteins having structural and functional characteristics of known TGFβ family members. The TGFβ family of proteins is well characterized, both from structural and functional aspects. It includes the TGFβ series of proteins, the Inhibins (including Inhibin A and Inhibin B), the Activins (including Activin A, Activin B, and Activin AB), MIS (Müllerian inhibiting substance), BMP (bone morphogenetic proteins), dpp (decapentaplegic), Vg-1, MNSF (monoclonal nonspecific suppressor factor), and others. Activity of this family of proteins is based on specific binding to certain receptors on various cell types. Members of this family share regions of sequence identity, particularly at the C-terminus, that correlate to their function. The TGFβ family includes more than one hundred distinct proteins, all sharing at least one region of amino acid sequence identity.

The TGF-β superfamily member (e.g., BMP4) can be naturally obtained or recombinant.

Exemplary TGFβ superfamily members include, without limitation, growth differentiation factor 8 (GDF8) (GenBank Accession EAX10880), growth differentiation factor 11 (GDF11) (GenBank Accession AAF21630), Activin A, Nodal, Activin A, Activin B, bone morphogenic protein-2 (BMP2), bone morphogenic protein-4 (BMP4), and functional fragments of any thereof. In some aspects, the TGFβ superfamily member can be replaced with an agent that mimics growth factors from the TGF-β superfamily, such as IDE1 and IDE2

In some embodiments, the composition can comprise a BMP signaling pathway agonist (e.g., a ligand for a BMP-receptor). The BMP signaling family is a diverse subset of the TGF-β superfamily. Over twenty known BMP ligands are recognized by three distinct type II (BMPRII, ActRIIa, and ActRIIb) and at least three type I (ALK2, ALK3, and ALK6) receptors. Dimeric ligands facilitate assembly of receptor heteromers, allowing the constitutively-active type II receptor serine/threonine kinases to phosphorylate type I receptor serine/threonine kinases. Activated type I receptors phosphorylate BMP-responsive (BR−) SMAD effectors (SMADs 1, 5, and 8) to facilitate nuclear translocation in complex with SMAD4, a co-SMAD that also facilitates TGF signaling. In addition, BMP signals can activate intracellular effectors such as MAPK p38 in a SMAD-independent manner. In some embodiments, the BMP agonist or activator comprises BMP4.

The composition can comprise an effective amount of TGFβ ligand, such as, for example, a concentration of between about 1 ng/ml and 100 ng/ml (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 ng/ml or a number or a range between any two of these values). The composition comprises an effective amount of a TGFβ signaling pathway inhibitor. In some embodiments, the effective amount of TGFβ signaling pathway inhibitor comprises a concentration of about 20 ng/ml. In some embodiments, the composition comprises BMP4 at a concentration of about 1 ng/ml to about 100 ng/ml (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 ng/ml or a number or a range between any two of these values). In some embodiments, the composition comprises about 20 ng/ml BMP4.

WNT Signaling Pathway Activator

The composition can comprise an effective amount of a WNT signaling pathway activator (e.g., a WNT agonist or WNT signaling agonist). Exemplary WNT signaling pathway agonists include, without limitation, CHIR99021, derivatives of CHIR99021, e.g., a salt of CHIR99021, e.g., trihydrochloride, a hydrochloride salt of CHIR99021, Wnt3a recombinant protein, a glycogen synthase kinase 3 (GSK3) inhibitor, such as 3F8, A 1070722, AR-A 014418, BIO, BIO-acetoxime, FRATide, 10Z-Hymenialdisine, Indirubin-3'oxime, kenpaullone, L803, L803-mts, lithium carbonate, NSC 693868, SB 216763, SB 415286, TC-G 24, TCS 2002, TCS 21311, TWS 119, and analogs or derivatives of any of these. In some embodiments, the WNT agonist is CHIR99021.

The composition can comprise an effective amount of a WNT signaling pathway activator, such as, for example, at a concentration of between about 0.1 μM to about 100 μM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 μM or a number or a range between any two of these values). In some embodiments, the effective amount of the WNT signaling pathway activator comprises a concentration of about 2 μM. In some embodiments, the effective amount of CHIR99021 comprises a concentration of between about 0.1 μM and about 100 μM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 μM or a number or a range between any two of these values). In some embodiments, the effective amount of CHIR99021 comprises a concentration of 2 μM.

Rock Inhibitors

In some embodiments, the composition comprises an effective amount of an inhibitor of rho-associated protein kinase (ROCK) (also referred to herein as ROCK inhibitor). Exemplary ROCK inhibitors include, but are not limited to N-[(1S)-2-Hydroxy-1-phenylethyl]-N'-[4-(4-pyridinyl)phenyl]-urea (AS1892802), fasudil hydrochloride (also known as HA 1077), -[3-[[2-(4-Amino-1,2,5-oxadiazol-3-yl)-1-ethyl-1H-imidazo[4,5-c]pyridin-6-yl]oxy]phenyl]-4-[2-(4-morpholinyl)ethoxy]benzamide (GSK269962), 4-[4-(Trifluoromethyl)phenyl]-N-(6-Fluoro-1H-indazol-5-yl)-2-methyl-6-oxo-1,4,5,6-tetrahydro-3-pyridinecarboxamide (GSK 429286), (S)-(+)-2-Methyl-1-[(4-methyl-5-isoquinolinyl)sulfonyl]-hexahydro-1H-1,4-diazepine dihydrochloride (H 1152 dihydrochloride), (S)-(+)-4-Glycyl-2-methyl-1-[(4-methyl-5-isoquinolinyl)sulfonyl]-hexahydro-1H-1,4-diazepine dihydrochloride (glycyl-H 1152 dihydrochloride), N-[(3-Hydroxyphenyl)methyl]-N'-[4-(4-pyridinyl)-2-thiazolyl]urea dihydrochloride (RKI 1447 dihydrochloride), (3S)-1-[[2-(4-Amino-1,2,5-oxadiazol-3-yl)-1-ethyl-1H-imidazo[4,5-c]pyridin-7-yl]carbonyl]-3-pyrrolidinamine dihydrochloride (SB772077B dihydrochloride), N-[2-[2-(Dimethylamino)ethoxy]-4-(1H-pyrazol-4-yl)phenyl-2,3-dihydro-1,4-benzodioxin-2-carboxamide dihydrochloride (SR 3677 dihydrochloride), and trans-4-[(R)-1-Aminoethyl]-N-4-pyridinylcyclohexanecarboxamide dihydrochloride (Y-27632 dihydrochloride), N-Benzyl-[2-(pyrimidin-4-yl)amino]thiazole-4-carboxamide (Thiazovivin), Rock Inhibitor, a isoquinolinesulfonamide compound (Rho Kinase Inhibitor), N-(4-Pyridyl)-N'-(2,4,6-trichlorophenyl) urea (Rho Kinase Inhibitor II), 3-(4-Pyridyl)-1H-indole (Rho Kinase Inhibitor III, Rockout), and 4-pyrazoleboronic acid pinacol ester; a Rock antibody commercially available from Santa Cruz Biotechnology selected from the group consisting of Rock-1 (B 1), Rock-1 (C-19), Rock-1 (H-11), Rock-1 (G-6), Rock-1 (H-85), Rock-1 (K-18), Rock-2 (C-20), Rock-2 (D-2), Rock-2 (D-11), Rock-2 (N-19), Rock-2 (H-85), Rock-2 (30-J); a ROCK CRISPR/Cas9 knockout plasmid selected from the group consisting of Rock-1 CRISPR/Cas9 KO plasmid (h), Rock-2 CRISPR/Cas9 KO plasmid (h), Rock-1 CRISPR/Cas9 KO plasmid (m), Rock-2 CRISPR/Cas9 KO plasmid (m); a ROCK siRNA, shRNA plasmid and/or shRNA lentiviral particle gene silencer selected from the group consisting of Rock-1 siRNA (h): sc-29473, Rock-1 siRNA (m): sc-36432, Rock-1 siRNA (r): sc-72179, Rock-2 siRNA (h): sc-29474, Rock-2 siRNA (m): sc-36433, Rock-2 siRNA (r): sc-108088. In some embodiments, the ROCK inhibitor comprises Y-27632.

The composition can comprise an effective amount of ROCK inhibitor, such as, for example, at a concentration of about 0.1 μM to about 100 μM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 μM or a number or a range between any two of these values). In some embodiments, the composition comprises an effective amount of Y-27632. In some embodiments, the composition comprises a ROCK inhibitor at a concentration of about 5 μM. In some embodiments, an effective amount of Y-27632 can comprise a concentration of between 0.1 μM and 100 μM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 μM or a number or a range between any two of these values). In some embodiments, the composition comprises about 5 μM Y-27632.

Fibroblast Growth Factor (FGF) Family Growth Factor

In some embodiments, the composition comprises a FGF family growth factor. Exemplary FGF family growth factors include, without limitation, keratinocyte growth factor (KGF) (GenBank Accession AAB21431), FGF2 (GenBank Accession NP_001997), FGF8B (GenBank Accession AAB40954), FGF10 (GenBank Accession CAG46489), FGF21 (GenBank Accession AAQ89444.1), and functional fragments of any thereof. In some embodiments, the FGF family growth factor comprises FGF2.

In some embodiments, the composition comprises an effective amount of a FGF family growth factor, such as, for example, at a concentration of between 1 ng/ml and 100 ng/ml (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 ng/ml or a number or a range between any two of these values). In some embodiments, an effective amount of FGF family growth factor comprises a concentration of about 40 ng/ml. In some embodiments, the composition comprises FGF2 at a concentration of between 1 ng/ml and 100 ng/ml (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 ng/ml or a number or a range between any two of these values). In some embodiments, the composition comprises about 40 ng/ml of FGF2.

ALK5 Kinase Inhibitors

In some embodiments, the composition comprises an effective amount of an ALK5 kinase inhibitor. ALK5 inhibitors may include, for example, A83-01 (3-(6-Methyl-2-pyridinyl)-N-phenyl-4-(4-quinolinyl)-1H-pyrazole-1-carbothioamide), GW788388 (4-[4-[3-(2-Pyridinyl)-1H-pyrazol-4-yl]-2-pyridinyl]-N-(tetrahydro-2H-pyran-4-yl)-benzamide), RepSox (2-(3-(6-Methylpyridine-2-yl)-1H-pyrazol-4-yl)-1,5-naphthyridine), and SB 431542 (4-[4-(1,3-benzodioxol-5-yl)-5-(2-pyridinyl)-1H-imidazol-2-yl]benzamide). In some embodiments, the ALK5 inhibitor is A83-01.

In some embodiments, the composition comprises an ALK5 kinase inhibitor at a effective concentration of between about 0.1 μM to about 100 μM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 UM or a number or a range between any two of these values). In some embodiments, an effective amount of ALK5 kinase inhibitor comprises a concentration of about 2 μM. In some embodiments, the composition comprises A83-01 at a concentration of between about 0.1 μM to about 100 μM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 μM or a number or a range between any two of these values). In some embodiments, the composition comprises about 2 μM of A83-01.

As used herein, an "effective amount" of an agent when used in the composition can refer to the amount of the agent that can be present in the composition to support organization of EPSCs into EP structures. To support said organization, step (c) can comprise removing the A83-01 after at least about 48 hours of culturing in the composition. The method can comprise reducing the concentration of FGF2 in the composition by about half.

Stem Cells and Mammalian Development

Disclosed herein are methods and compositions for, e.g., modeling human early embryo development, by culturing expanded pluripotent stem cells (EPSCs) in 3-dimensions. In some embodiments, the method comprises: a) contacting pluripotent stem cells (PSCs) with EP media to generate expanded pluripotent stem cells (EPSCs). While mammalian embryogenesis has some common features across all species, it will be appreciated that different mammalian species develop in different ways and at different rates. In general, though, the fertilized egg undergoes a number of cleavage steps (passing through two cell, four cell and eight cell stages) before undergoing compaction to form a solid ball of cells called a morula, in which the cells continue to divide. Ultimately the internal cells of the morula give rise to the inner cell mass and the outer cells to the trophectoderm. The morula in turn develops into the blastocyst, which is surrounded by trophectoderm and contains a fluid-filled vesicle, with the inner cell mass at one end.

So-called "Carnegie stages" have been established to describe stages of human development. Each stage is defined by the development of specific structures, and can be used to define equivalent stages in development of other species. The earliest Carnegie stages are as follows in Table 1:

TABLE 1

CARNEGIE STAGES OF DEVELOPMENT

| Carnegie stage | Days since ovulation (approx.) | Characteristic events/structures |
| --- | --- | --- |
| 1 | 1 | fertilization; polar bodies |
| 2 | 2-3 | cleavage; morula; compaction |
| 3 | 4-5 | blastocyst and blastocoele; trophoblast and embryoblast |
| 4 | 6 | syncytiotrophoblast; cytotrophoblast; anchoring to endometrium |
| 5(a) | 7-8 | implantation; embryonic disc; bilaminar germ disc; primary yolk sac; |
| 5(b) | 9-10 | formation of trophoblast lacunae; complete penetration into endometrium; amniotic cavity; primary umbilical vesicle |
| 5(c) | 11-16 | pre-chordal plate; extra- embryonic mesoblast; secondary yolk sac |
| 6 | 17 | primitive streak, primitive node, primitive groove; secondary umbilical vesicle; primordial germ cells; body stalk |

The term "pre-implantation stage" can be used herein to refer to a stage of development earlier than the stage corresponding to Carnegie stage 5(a), and corresponding stages in other species. As used herein, the term "post-implantation stage" can refer to a stage of development later than the stage corresponding to, Carnegie stage 5(a), and corresponding stages in other species. A "post-implantation stage" may be determined by detecting the up-regulation of one or more genes by the embryo (or, e.g., an EP structure). For example, such a stage may be determined by detecting one or more of the following changes: the epiblast up-regulates Fgf5; the primitive endoderm differentiates into visceral endoderm that up-regulates Cer1 in a subpopulation of cells (the anterior visceral endoderm); the visceral endoderm up-regulates Eomes; and the trophectoderm up-regulate Handl.

The term "stem cell" as used herein can refer to a cell capable of retaining a constant potential for differentiation even after cell division. Examples of stem cells include: embryonic (ES) stem cells with pluripotency derived from a fertilized egg or clone embryo; epiblast stem cells; trophoblast stem cells; extraembryonic endoderm (XEN) stem cells; somatic stem cells and pluripotent stem cells that are present in tissues in a living organism e.g. hepatic stem cells, dermal stem cells, and reproductive stem cells that serve as the bases for respective tissues; pluripotent stem cells derived from reproductive stem cells; pluripotent stem cells obtained by nuclear reprogrammed somatic cells; totipotent stem cells and non-totipotent stem cells and the like. Also, partially committed stem cells e.g. progenitor cells may be cultured using the media and according to the methods described herein.

"A pluripotent stem cell" (PSC), as used herein, can refer to a stem cell permitting in vitro culture, and having the potential for differentiating into all cells, but the placenta, constituting the body [tissues derived from the three primary germ layers of the embryo (ectoderm, mesoderm, endoderm)] (pluripotency); embryonic stem cells are also included. A PSC may be obtained from a fertilized egg, clone embryo, reproductive stem cell, or stem cell in tissue. Also included are cells having differentiation pluripotency similar to that of embryonic stem cells, conferred artificially by transferring several different genes to a somatic cell (also referred to as induced pluripotent stem cells or iPS cells). Induced pluripotent stem cells may be derived from any suitable source (e.g. hair follicles, skin cells, fibroblasts, etc.). Pluripotent stem cells can be prepared by known methods in the art. Any of the stem cells as defined herein may be derived from diseased or non-diseased tissue. Stem cells can be from any suitable mammalian species, such as: primates, including humans, great apes (e.g. gorillas, chimpanzees, orangutans), old world monkeys, new world monkeys; rodents (e.g. mice, rats, guinea pigs, hamsters); cats; dogs; lagomorphs (including rabbits); cows; sheep; goats; horses; pigs; and any other livestock, agricultural, laboratory or domestic mammals. The presently disclosed methods may be applied to stem cells from any non-human mammal, including but not limited to those described above. Non-limiting examples of said stem cells include embryonic stem cells of a mammal or the like established by culturing a pre-implantation early embryo, embryonic stem cells established by culturing an early embryo prepared by nuclear-transplanting the nucleus of a somatic cell, induced pluripotent stem cells (iPS cells) established by transferring several different transcriptional factors to a somatic cell, and pluripotent stem cells prepared by modifying a gene on a chromosome of embryonic stem cells or iPS cells using a gene engineering technique. More specifically, embryonic stem cells include embryonic stem cells established from an inner cell mass that constitutes an early embryo, ES cells established from a primordial germ cell, cells isolated from a cell population possessing the pluripotency of pre-implantation early embryos (for example, primordial ectoderm), and cells obtained by culturing these cells.

In some embodiments, step (a) can comprise culturing the PSCs in the EP media. In some embodiments, step (a) can comprise passaging the PSCs in EP media at least five times. The PSCs can be induced pluripotent stem cells (iPSCs). The iPSCs can be human iPSCs. The PSCs can be mammalian embryonic stem cells (ESCs). The mammalian ESCs can be human ESCs. The PSCs, iPSCs, or ESCs can be genetically modified.

Extended Pluripotent Stem Cells (EPSCs)

In some embodiments, the method comprises: a) contacting pluripotent stem cells (PSCs) with EP media to generate expanded pluripotent stem cells (EPSCs) that are capable of differentiating into embryonic and extra-embryonic lineages. Expanded pluripotent stem cells (EPSC) have, in some embodiments, the capacity to develop into extra-embryonic lineages, e.g., TE. The EPSCs can form dome-shaped colonies. Step (b) can comprise isolating single EPSCs by contacting the dome-shaped colonies with a cell detachment enzyme. The cell detachment enzyme can be selected from the group comprising accutase, collagenase, elastase, hyaluronidase, papain, protease type XIV, and trypsin. The method can comprise resuspending the isolated single EPSCs in EP media.

Enrichment of one or more marker genes can be used to identify EPSCs generated by the disclosed methods. The levels of ZCSAN4, THAP11, and/or NR52A can be increased by at least about 2-fold (e.g., 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold, or a number or a range between any of these values) in the EPSCs relative to the EP structure. In some embodiments, at least 5%, at least 10%, at least 15%, at least 20%, at least 25%, at least 30%, at least 35%, at least 40%, at least 45%, at least 50%, at least 55%, at least 60%, at least 65%, at least 70%, or at least 75%, at least 80%, at least 85%, at least 90%, or at least 95% or greater of the cells in the population comprise EPSC cells.

Substrates and Compositions for Culture of EP Structures

In some embodiments, the method comprises: b) contacting at least 5 EPSCs with a first substrate and a composition capable of supporting generation of an EP structure, wherein the composition comprises about 25% EP media, about 25% trophoblast stem cell (TSC) media, and about 50% in vitro fertilization (IVF) media.

The first substrate can comprise a dish, a U-plate, a flask, or a microwell plate. The microwell plate can comprise inverted pyramidal microwells. The size (e.g., depth and/or diameter) of each of the inverted microwells can vary. Each of the inverted-pyramidal microwells can be about 400 µm or about 800 µm in size. Each of the inverted-pyramidal microwells can be about 400 µm or about 800 µm in diameter. In some embodiments, each of the inverted pyramidal microwells can be about 100, 200, 300, 400, 500, 600, 700, 800, 900 µm, 1 mM in size and/or diameter, or a number or a range between any two of these values. Each microwell (e.g., receptacle) may have a depth of about 250 µm to about 400 µm, e.g. about 300 µm to about 350 µm. Additionally or alternatively, said plurality of receptacles may have a mean depth of about 250 µm to about 400 µm, e.g. about 300 µm to about 350 µm. Especially when the receptacles are wells, they may be ordered on the substrate in an array, i.e. in a grid pattern having regular spacing in substantially orthogonal directions. Whatever the topography of the substrate, the substrate may carry one or more EP structures. Where the substrate comprises one or more receptacles, each said receptacle may independently contain one or more EP structures, e.g. 2, 3, 4 or 5 EP structures, or more. In some embodiments, each EP structure is located in a different respective well. In alternative embodiments, each receptacle comprises a plurality EP structures, e.g. 2, 3, 4 or 5 EP structures, or more.

The methods disclosed herein may be applied in culture volumes of any appropriate size. For example, the culture volume per EP structure may be about 1 µl to about 50 µl, optionally about 2 µl to about 40 µl, optionally about 5 µl to about 30 µl, optionally about 10 µl to about 25 µl, optionally about 12.5 µl to about 22.5 µl or about 15 µl to about 20 µl. The culture volume per EP structure may be about 100, 150, 200, 250, 300, 350, 400, 450, 500, 550, 600, 650, 700, 750, 800, 850, 900, 950, 1000 µl or more.

The EP media and the TSC media can comprise a basal culture medium. The basal medium may comprise water, salts, amino acids, a carbon source, vitamins, lipids and a buffer. Suitable carbon sources may be assessed by one of skill in the art from compounds such as glucose, sucrose, sorbitol, galactose, mannose, fructose, mannitol, maltodextrin, trehalose dihydrate, and cyclodextrin. The basal culture medium can comprise Dulbecco's Modified Eagle Medium (DMEM), DMEM Nutrient Mixture 12 (DMEM/F12), Roswell Park Memorial Institute (RPMI) medium 1640, Neurobasal®, Neurobasal® A, Connaught Medical Research Laboratory 1066 (CMRL-1066), or any combination thereof.

The basal culture medium can comprise a non-human serum or serum substitute thereof, a reducing agent, and an antibiotic. In some embodiments, the basal culture medium comprises media and/or supplements for supporting neuronal culture (e.g., Neurobasal®, Neurobasal® A, B27™ supplement). In some embodiments, the basal culture medium comprises a glutamine alternative (e.g., GlutaMax™ comprising L-alanyl-L-glutamine dipeptide). In some embodiments, the basal culture medium comprises a non-serum replacement (e.g., KnockOut™ Serum Replacement). The non-human serum or serum substitute can comprise fetal bovine serum, bovine serum albumin, KnockOut™ Serum Replacement, or any combination thereof. The reducing agent can comprise beta-mercaptoethanol (BME), N-acetyl-L-cysteine, dithiothreitol (DTT), or any combination thereof. The antibiotic can comprise Penicillin-streptomycin, Amphotericin B, Ampicillin, Erythromycin, Gentamycin, Kanamycin, Neomycin, Nystatin, Polymyxin B, Tetracycline, Thiabendazole, Tylosin, or any combination thereof. The basal culture medium can comprise N2 supplement, B27™ supplement, Insulin-Transferrin-Selenium-Ethanolamine (ITS-X), GlutaMax™, non-essential amino acids, ascorbic acid, or any combination thereof. Exemplary non-essential amino acids can include L-glycine, L-alanine, L-asparagine, L-aspartic acid, L-glutamic acid, L-proline and L-serine.

The term, "concentration" as used herein shall have its ordinary meaning, and can also refer to (a) mass concentration, molar concentration, volume concentration, mass fraction, molar fraction or volume fraction, or (b) a ratio of the mass or volume of one component in a mixture or solution to the mass or volume of another component in the mixture or solution (e.g., ng/ml). In some embodiments, the concentration can refer to fraction of activity units per volume (e.g., U/ml).

The concentration or amount of one or more of the components in a solution or media (e.g., EP media, TSC media) can vary. The amount of, e.g., the non-human serum or serum substitute thereof and/or antibiotic, N2 supplement, B27™ supplement, Insulin-Transferrin-Selenium-Ethanolamine (ITS-X), GlutaMax™, non-essential amino acids, and ascorbic acid can vary, and, in some embodiments, can be adjusted as needed by one of skill in the art. In some embodiments, the amount of, e.g., the non-human serum or serum substitute thereof and/or antibiotic can comprise about 0.01% to about 10% (e.g., about 0.01%, 0.1%, 1%, 2%, 3%, 4%, 5%, 6%, 7%, 8%, 9%, 10% or a number or a range between any two of these values) volume per volume (% v/v), weight per volume (% w/v) or weight per weight (% w/w) of the medium. The amount of e.g., the reducing agent can vary. For example, in some embodiments, the concentration of the reducing agent in the composition can be about 0.1 µM to about 1 mM (e.g., about 0.1, 0.2, 0.3, 0.4, 0.5, 0.6, 0.7, 0.8, 0.9, 1, 10, 100, 200, 300, 400, 500, 600, 700, 800, 900 µM, 1 mM, or a number or a range between any two of these values). In some embodiments, the amount of e.g., ascorbic acid can comprise about 1 ng/ml to about 100 ng/ml (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 ng/ml or a number or a range between any two of these values). Where percentages are provided for agents, ingredients and compounds, they can be % w/w, % w/v or % v/v with respect to the formulation as a whole, unless otherwise indicated. In some embodiments, the culture medium comprises media and/or supplements for supporting neuronal culture (e.g., Neurobasal®, Neurobasal® A, B27™ supplement). In some embodiments, the culture medium comprises a glutamine alternative (e.g., GlutaMax™ comprising L-alanyl-L-glutamine dipeptide). In some embodiments, the culture medium comprises a non-serum replacement (e.g., KnockOut™ Serum Replacement).

Ep Media

The culture medium may contain other components, or analogues thereof. As used herein, the term "analogue" can refer to a biologically active analogue of any of the components of the culture medium. Such an analogue may be natural or synthetic.

The specific biologically active ligands and compounds used in the media defined herein, such as leukemia inhibitory factor, a WNT agonist (e.g., CHIR99021), etc. are used for illustrative purposes. However, one of skill in the art will readily recognize that analogues of such ligands and compounds may equally be used as alternatives, provided that they retain the relevant biological activity. One of skill in the art will be able to identify, in a routine manner, other biologically active compounds that are suitable for use as substitutes. For instance, these may be naturally occurring compounds or compounds which can be made by synthetic or semi-synthetic methods.

The term "analogue" may refer to a compound which may be structurally related to the relevant molecule. The term "agonist" or "antagonist" may refer to a compound which might not be structurally related to the relevant molecule. For example, an agonist may activate or inhibit, respectively, the relevant receptor by altering the conformation of the receptor. Nevertheless, in both cases the terms are used in this specification to refer to compounds or molecules which can mimic, reproduce or otherwise generally substitute for the specific biological activity of the relevant molecule.

The EP media can comprise a cytokine, a WNT agonist, a cholinergic antagonist, an antibiotic, or any combination thereof. The amount of the compounds and ligands disclosed herein that are present in the EP media can vary. For example, in some embodiments, the EP media can comprise about 1 ng/ml to about 1 mg/ml (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 ng/ml, 0.5 µg/ml, 1 µg/ml, 0.5 mg/ml, 1 mg/ml, or a number or a range between any two of these values) of a cytokine, a WNT agonist, a cholinergic antagonist, an antibiotic, or any combination thereof. In some embodiments, the EP media can comprise about 0.1 mM to about 1 M (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM, 0.5 M, 1 M or a number or a range between any two of these values) of a cytokine, a WNT agonist, a cholinergic antagonist, an antibiotic, or any combination thereof.

As used herein, the term "cytokine" can refer to a molecule that mediates and/or regulates a biological or cellular function or process (e.g. immunity, inflammation, and differentiation). The term "cytokine" as used herein can include "lymphokines," "chemokines," "monokines," and "interleukins". In some embodiments, the cytokine is Leukemia Inhibitory Factor (LIF).

In some embodiments, the EP media comprises about 1 ng/ml to about 100 ng/ml of a cytokine (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 ng/ml or a number or a range between any two of these values). In some embodiments, the EP media comprises an effective amount of LIF. In some embodiments, the EP media comprises an effective amount of a cytokine comprising a concentration of about 10 ng/ml. In some embodiments, the effective amount of LIF comprises a concentration of between about 1 ng/ml and about 100 ng/ml (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 ng/ml or a number or a range between any two of these values). In some embodiments, the effective amount of LIF comprises a concentration of 10 ng/ml.

In some embodiments, the EP media comprises an effective amount of a WNT signaling pathway activator (e.g., a WNT agonist). Exemplary WNT signaling pathway activators include, without limitation, CHIR99021, derivatives of CHIR99021, e.g., a salt of CHIR99021, trihydrochloride, a hydrochloride salt of CHIR99021, Wnt3a recombinant protein, a glycogen synthase kinase 3 (GSK3) inhibitor, such as 3F8, A 1070722, AR-A 014418, BIO, BIO-acetoxime, FRATide, 10Z-Hymenialdisine, Indirubin-3'oxime, kenpaullone, L803, L803-mts, lithium carbonate, NSC 693868, SB 216763, SB 415286, TC-G 24, TCS 2002, TCS 21311, TWS 119, and analogs or derivatives of any of these. In some embodiments, the WNT agonist comprises CHIR99021.

An effective amount of the WNT signaling pathway activator can comprise a concentration of between about 0.1 mM and about 100 mM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM, or a number or a range between any two of these values). In some embodiments, the effective amount of the WNT signaling pathway activator comprises a concentration of 1 mM. In some embodiments, the effective amount of CHIR99021 comprises a concentration of between about 0.1 mM and about 100 mM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM, or a number or a range between any two of these values). In some embodiments, the effective amount of CHIR99021 comprises a concentration of 1 mM.

Media (e.g., EP media) described herein can comprise an effective amount of cholinergic antagonist, S-(+)-Dimethindenemaleate, antibiotic, and/or Minocycline HCl. An effective amount of the cholinergic antagonist (e.g., S-(+)-Dimethindenemaleate) can comprise a concentration of between about 0.1 mM and about 100 mM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM, or a number or a range between any two of these values). In some embodiments, the effective amount of S-(+)-Dimethindenemaleate comprises a concentration of 1 mM. An effective amount of the antibiotic (e.g., Minocycline HCl) can comprise a concentration of between about 0.1 mM and about 100 mM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM, or a number or a range between any two of these values). In some embodiments, the effective amount of Minocycline HCl comprises a concentration of 2 mM.

The EP media can comprise about 10 ng/ml leukemia inhibitory factor (LIF) or any analogue thereof, about 1 mM CHIR99021 or any analogue thereof, about 1 mM S-(+)-Dimethindenemaleate or any analogue thereof, and about 2 mM Minocycline HCl or any analogue thereof. The EP media can comprise DMEM/F12, Neurobasal® A, N2 supplement, B27 Supplement™, about 1% GlutaMax™, about 1% non-essential amino acids, about 0.1 mM BME, Penicillin-streptomycin, about 5% KnockOut™ serum replacement, about 10 ng/ml leukemia inhibitory factor (LIF), about 1 mM CHIR99021, about 1 mM S-(+)-Dimethindenemaleate, and/or about 2 mM Minocycline HCl. In some embodiments, the EP medium comprises media and/or supplements for supporting neuronal culture (e.g., Neurobasal®, Neurobasal® A, B27™ supplement). In some embodiments, the culture medium comprises a glutamine alternative (e.g., GlutaMax™ comprising L-alanyl-L-glutamine dipeptide). In some embodiments, the culture medium comprises a non-serum replacement (e.g., KnockOut™ Serum Replacement).

TSC Media

The TSC media can comprise an epidermal growth factor family member, a WNT agonist, an ALK5 kinase inhibitor, a histone deacetylase (HDAC) inhibitor, a ROCK inhibitor, or any combination thereof.

The amount of the compounds and ligands disclosed herein present in the TSC media can vary. For example, in some embodiments, the TSC media can comprise about 1 ng/ml to about 1 mg/ml (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 ng/ml, 0.5 µg/ml, 1 µg/ml, 0.5 mg/ml, 1 mg/ml, or a number or a range between any two of these values) of epidermal growth factor family member, a WNT agonist, an ALK5 kinase inhibitor, a histone deacetylase (HDAC) inhibitor, a ROCK inhibitor. In some embodiments, the TSC media can comprise about 0.1 mM to about 1 M (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM, 0.5 M, 1 M or a number or a range between any two of these values) of epidermal growth factor family member, a WNT agonist, an ALK5 kinase inhibitor, a histone deacetylase (HDAC) inhibitor, a ROCK inhibitor.

The TSC media can comprise an effective amount of an epidermal growth factor family growth factor. Exemplary EGF family growth factors include, without limitation, betacellulin, EGF or a functional variant or fragment thereof, such as an isolated epidermal growth factor polypeptide having at least 90% amino acid identity to the human wild-type EGF polypeptide sequence, as disclosed in U.S. Pat. No. 7,084,246, an engineered EGF mutant that binds to and agonizes the EGF receptor, as is disclosed in U.S. Pat. No. 8,247,531. In some embodiments, the epidermal growth factor family member is EGF.

An effective amount of epidermal growth factor family growth factor can comprise a concentration of between about 1 ng/ml and about 100 ng/ml (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 ng/ml, or a number or a range between any two of these values). In some embodiments, the TSC media comprises epidermal growth factor family growth factor at a concentration of about 50 ng/ml. In some embodiments, an effective amount of EGF comprises a concentration of between about 1 ng/ml and about 100 ng/ml (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 ng/ml, or a number or a range between any two of these values). In some embodiments, the TSC media comprises about 50 ng/ml EGF.

The TSC media can comprise effective amounts of a WNT signaling pathway activator (e.g., a WNT agonist). Exemplary WNT signaling pathway activators include, without limitation, CHIR99021, derivatives of CHIR99021, e.g., a salt of CHIR99021, e.g., trihydrochloride, a hydrochloride salt of CHIR99021, Wnt3a recombinant protein, a glycogen synthase kinase 3 (GSK3) inhibitor, such as 3F8, A 1070722, AR-A 014418, BIO, BIO-acetoxime, FRATide, 10Z-Hymenialdisine, Indirubin-3'oxime, kenpaullone, L803, L803-mts, lithium carbonate, NSC 693868, SB 216763, SB 415286, TC-G 24, TCS 2002, TCS 21311, TWS 119, and analogs or derivatives of any of these. In some embodiments, the WNT agonist is CHIR99021.

An effective amount of the WNT signaling pathway activator can comprise a concentration of between about 0.1 mM to about 100 mM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM or a number or a range between any two of these values). In some embodiments, WNT agonist is present in the composition at a concentration of about 2 mM. In some embodiments, the effective amount of CHIR99021 comprises a concentration of between about 0.1 mM to 100 mM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM or a number or a range between any two of these values). In some embodiments, the effective amount of CHIR99021 comprises a concentration of about 2 mM.

ALK5 kinase inhibitors may include, for example, A83-01 (3-(6-Methyl-2-pyridinyl)-N-phenyl-4-(4-quinolinyl)-1H-pyrazole-1-carbothioamide), GW788388 (4-[4-[3-(2-Pyridinyl)-1H-pyrazol-4-yl]-2-pyridinyl]-N-(tetrahydro-2H-pyran-4-yl)-benzamide), RepSox (2-(3-(6-Methylpyridine-2-yl)-1H-pyrazol-4-yl)-1,5-naphthyridine), and SB 431542 (4-[4-(1,3-benzodioxol-5-yl)-5-(2-pyridinyl)-1H-imidazol-2-yl]benzamide). In some embodiments, the ALK5 inhibitor is A83-01. In some embodiments, the ALK5 kinase inhibitor is SB431542.

The TSC media can comprise an effective amount of a ALK5 kinase inhibitor. An effective amount of the ALK5 kinase inhibitor can comprise a concentration of between about 0.1 mM to about 100 mM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM or a number or a range between any two of these values). In some embodiments, ALK5 kinase inhibitor is present in the composition at a concentration of about 0.5 mM. In some embodiments, ALK5 kinase inhibitor is present in the composition at a concentration of about 1 mM. In some embodiments, the effective amount of A83-01 comprises a concentration of between about 0.1 mM and 100 mM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM or a number or a range between any two of these values). In some embodiments, the effective amount of SB431542 comprises a concentration of between about 0.1 mM and 100 mM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM or a number or a range between any two of these values). In some embodiments, the TSC media comprises about 0.5 mM A83-01. In some embodiments, the TSC media comprises about 1 mM SB431542.

In some embodiments, the TSC media comprises an effective amount of an inhibitor of rho-associated protein kinase (ROCK) (also referred to herein as ROCK inhibitor). Exemplary ROCK inhibitors include, but are not limited to N-[(1S)-2-Hydroxy-1-phenylethyl]-N'-[4-(4-pyridinyl)phenyl]-urea (AS1892802), fasudil hydrochloride (also known as HA 1077), -[3-[[2-(4-Amino-1,2,5-oxadiazol-3-yl)-1-ethyl-1H-imidazo[4,5-c]pyridin-6-yl]oxy]phenyl]-4-[2-(4-morpholinyl)ethoxy]benzamide (GSK269962), 4-[4-(Trifluoromethyl)phenyl]-N-(6-Fluoro-1H-indazol-5-yl)-2-methyl-6-oxo-1,4,5,6-tetrahydro-3-pyridinecarboxamide (GSK 429286), (S)-(+)-2-Methyl-1-[(4-methyl-5-isoquinolinyl)sulfonyl]-hexahydro-1H-1,4-diazepine dihydrochloride (H 1152 dihydrochloride), (S)-(+)-4-Glycyl-2-methyl-1-[(4-methyl-5-isoquinolinyl)sulfonyl]-hexahydro-1H-1,4-diazepine dihydrochloride (glycyl-H 1152 dihydrochloride), N-[(3-Hydroxyphenyl)methyl]-N'-[4-(4-pyridinyl)-2-thiazolyl]urea dihydrochloride (RKI 1447 dihydrochloride), (3S)-1-[[2-(4-Amino-1,2,5-oxadiazol-3-yl)-1-ethyl-1H-imidazo[4,5-c]pyridin-7-yl]carbonyl]-3-pyrrolidinamine dihydrochloride (SB772077B dihydrochloride), N-[2-[2-(Dimethylamino)ethoxy]-4-(1H-pyrazol-4-yl)phenyl-2,3-dihydro-1,4-benzodioxin-2-carboxamide dihydrochloride (SR 3677 dihydrochloride), and trans-4-[(R)-1-Aminoethyl]-N-4-pyridinylcyclohexanecarboxamide dihydrochloride (Y-27632 dihydrochloride), N-Benzyl-[2-(pyrimidin-4-yl)amino]thiazole-4-carboxamide (Thiazovivin), Rock Inhibitor, a isoquinolinesulfonamide compound (Rho Kinase Inhibitor), N-(4-Pyridyl)-N'-(2,4,6-trichlorophenyl) urea (Rho Kinase Inhibitor II), 3-(4-Pyridyl)-1H-indole (Rho Kinase Inhibitor III, Rockout), and 4-pyrazoleboronic acid pinacol ester; a Rock antibody commercially available from Santa Cruz Biotechnology selected from the group consisting of Rock-1 (B 1), Rock-1 (C-19), Rock-1 (H-11), Rock-1 (G-6), Rock-1 (H-85), Rock-1 (K-18), Rock-2 (C-20), Rock-2 (D-2), Rock-2 (D-11), Rock-2 (N-19), Rock-2 (H-85), Rock-2 (30-J); a ROCK CRISPR/Cas9 knockout plasmid selected from the group consisting of Rock-1 CRISPR/Cas9 KO plasmid (h), Rock-2 CRISPR/Cas9 KO plasmid (h), Rock-1 CRISPR/Cas9 KO plasmid (m), Rock-2 CRISPR/Cas9 KO plasmid (m); a ROCK siRNA, shRNA plasmid and/or shRNA lentiviral particle gene silencer selected from the group consisting of Rock-1 siRNA (h): sc-29473, Rock-1 siRNA (m): sc-36432, Rock-1 siRNA (r): sc-72179, Rock-2 siRNA (h): sc-29474, Rock-2 siRNA (m): sc-36433, Rock-2 siRNA (r): sc-108088. In some embodiments, the ROCK inhibitor comprises Y-27632.

The TSC media can comprise an effective amount of ROCK inhibitor, such as, for example, at a concentration of about 0.1 mM to about 100 mM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM or a number or a range between any two of these values). In some embodiments, the TSC media comprises a ROCK inhibitor at a concentration of about 5 mM. In some embodiments, the TSC media comprises about 0.1 mM to about 100 mM Y-27632 (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM or a number or a range between any two of these values). In some embodiments, the TSC media comprises about 5 mM Y-27632.

In some embodiments, the TSC media comprises an HDAC Inhibitor (Histone deacetylase inhibitor). HDAC inhibitor can include Tubastatin A, ACY1215, Valproic acid (VPA), SAHA, Trichostatin A, SHBA, CBHA, LAQ-824, PDX-101, LBH-589, ITF2357, PCI-24781, Compound 7 (ChemieTek), JNK-24681585 (Quisinostat) SB939 (Pracinostat), 4SC-201 (Resminostat), Tefinostat (CHR-2845), CHR-3996, CG200745, Depsipeptide (Romidepsin), Butyrate, MS-275, MGCD0103 and CI994, among others. In some embodiments, the TSC media comprises VPA.

The TSC media can comprise an effective amount of HDAC inhibitor, such as, for example, at a concentration of about 0.1 mM to about 100 mM (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM or a number or a range between any two of these values). In some embodiments, the TSC media comprises an HDAC inhibitor at a concentration of about 0.8 mM. In some embodiments, the TSC media comprises about 0.1 mM to about 100 mM VPA (e.g., about 0.1, 0.2, 0.3, 0.4, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mM or a number or a range between any two of these values). In some embodiments, the TSC media comprises about 0.8 mM VPA.

The TSC media can comprise about 50 ng/ml epidermal growth factor (EGF) or any analogue thereof, about 2 mM CHIR99021 or any analogue thereof, about 0.5 mM A83-01 or any analogue thereof, about 1 mM SB431542 or any analogue thereof, about 0.8 mM VPA or any analogue thereof, and about 5 mM Y-27632 or any analogue thereof.

The TSC media can comprise DMEM/F12, about 0.1 mM BME, about 0.2% FBS, about 0.5% Penicillin-streptomycin, about 0.3% BSA, about 1% ITS-X, about 1.5 ng/ml ascorbic acid, about 50 ng/ml EGF, about 2 mM CHIR99021, about 0.5 mM A83-01, about 1 mM SB431542, about 0.8 mM VPA, and about 5 mM Y-27632.

In some embodiments, the composition comprises about 25% to about 75% IVF media (e.g., 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75% or a number or a range between any two of these values). IVF media is available from a number of commercial sources. The IVF media can comprise a continuous culture media. The continuous culture media can comprise Continuous Single Culture-NX Complete (CSCM-NXC), LifeGlobal Global Total Media (LGGT), GM501, or any combination thereof.

Additional embodiments can include, e.g., hypoxic culture conditions. In some embodiments, step (c), comprises culturing the EPSCs in hypoxic conditions. The hypoxic conditions can comprise about 5% oxygen.

EPSCS Aggregates and EP Structures

In some embodiments, the method comprises culturing the EPSCs in the composition for at least about 4 days (e.g., 4, 5, 6 days, or more), wherein the EPSCs self-organize to generate an EP structure.

In some embodiments, the EPSCs form aggregates following at least about 24 hours (e.g., about 24, 48, 72 hours or more) of culturing in the composition. These aggregates can resemble, e.g., morula stage natural embryos. In some embodiments, the aggregates exhibit basolateral enrichment of E-cadherin relative to the apical surface. In some embodiments, F-actin, PARD6, or both, are enriched at the apical surface relative to the basolateral surface of the aggregates. In some embodiments, GATA3 is enriched in the nuclei relative to the cytosol of the EPSCs in the aggregates. In some embodiments, the enrichment of PARD6 at the apical surface of the aggregates, the enrichment of GATA3 in the cell nuclei of the aggregates, or both, is reduced following administration of an agent that reduces PLC-Protein Kinase C (PKC) pathway signaling to the aggregates. The agent can comprise any agent known in the art for inhibiting PKC signaling, e.g., siRNA and/or a small molecule (e.g., U73122)

The EP structure can comprise a single outside layer, an enlarged cavity, and an internal acentric compartment. The EP structure can comprise about 60 to about 260 cells (e.g., about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 250, or 260 cells). The EP structure can be about 100 μm to about 200 μm in diameter (e.g., about 100, 110, 120, 128, 130, 140, 150, 160, 170, 180, 190, 200 μm or a number or a range between any two of these values).

The single outside layer can comprise trophectoderm-like cells. The internal acentric compartment can comprise hypoblast-like cells, epiblast-like cells, or both. The single outside layer of the EP structure can comprise one or more cells expressing KRT18, GATA3, or both. In some embodiments, the single outside layer exhibits nuclear GATA3 expression with a frequency of at least about 50% (e.g., about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 100%, or a number or a range between any two of these values). The internal acentric compartment of the EP structure can comprise one or more cells expressing SOX2, SOX17, OCT4, FOXA2, or any combination thereof. In some embodiments, expression of one or more trophectoderm marker genes, one or more epiblast marker genes, one or more hypoblast marker genes, or any combination thereof, are increased in the EP structure by at least about 2-fold (e.g., 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold, or a number or a range between any of these values) following at least four days of culture in the composition relative to the EPSCs generated in step (a). The one or more trophectoderm marker genes can comprise GATA3, PLAC8, CDX2, KRT8, KRT18, or any combination thereof. The one or more epiblast marker genes can comprise KLF4. The one or more hypoblast marker genes can comprise PDGFRA, GATA6, or both.

In some embodiments, one or more lineage-specific markers as described above can be used to assess the formation of a lineage of interest. Numerous methods exist in the art for detecting the presence, absence, or amount of a marker gene product (e.g., mRNA and/or protein), as well as its localization in the EP structure or subcellular localization (e.g., nucleus and/or cytoplasm).

Marker expression may be assessed by any of a wide variety of well-known methods for detecting expression of a transcribed molecule or a protein. Non-limiting examples of such methods include immunological methods for detection of secreted, cell-surface, cytoplasmic, or nuclear proteins, protein purification methods, protein function or activity assays, nucleic acid hybridization methods, nucleic acid reverse transcription methods, and nucleic acid amplification and sequencing methods.

In some embodiments, activity of a particular gene is characterized by a measure of gene transcript (e.g., mRNA), by a measure of the quantity of translated protein, or by a measure of gene product activity. Marker expression can be monitored in a variety of ways, including by detecting mRNA levels, protein levels, or protein activity, any of which can be measured using standard techniques. Detection can involve quantification of the level of gene expression (e.g., genomic DNA, cDNA, mRNA, protein, or enzyme activity), or, alternatively, can be a qualitative assessment of the level of gene expression, in particular in comparison with a control level. The type of level being detected will be clear from the context.

In another embodiment, detecting or determining expression levels of a marker and functionally similar homologs thereof, including a fragment or genetic alteration thereof (e.g., in regulatory or promoter regions thereof) comprises detecting or determining RNA levels for the marker of interest. In some embodiments, one or more cells from the EP structure or reorganized EP structure can be obtained and RNA is isolated from the cells. In some embodiments, RNA is obtained from a single cell. For example, a cell can be isolated from a tissue sample by laser capture microdissection (LCM). Using this technique, a cell can be isolated from a tissue section, including a stained tissue section, thereby assuring that the desired cell is isolated. It is also be possible to obtain cells from, e.g., an EP structure and culture the cells in vitro, such as to obtain a larger population of cells from which RNA can be extracted. Methods for establishing cultures of non-transformed cells, i.e., primary cell cultures, are known in the art. In some embodiments, cells can be dissociated (e.g., by enzymatic or mechanical means), and isolated by methods known in the art (e.g., Fluorescence-Activated Cell Sorting, Microfluidics, etc.)

When isolating RNA from, e.g., EP structures and/or cells comprising said EP structures, it may be important to prevent any further changes in gene expression after the tissue or cells has been removed from the subject. Changes in expression levels are known to change rapidly following perturbations, e.g., heat shock or activation with lipopolysaccharide (LPS) or other reagents. In addition, the RNA in the tissue and cells may quickly become degraded. Accordingly, in a preferred embodiment, the tissue or cells obtained from a subject is snap frozen as soon as possible.

RNA can be extracted from cells by a variety of methods, e.g., the guanidium thiocyanate lysis followed by CsCl centrifugation. Methods for obtaining RNA from single-cells are also known in the art. The RNA sample can then be enriched in particular species. In some embodiments, poly (A)+RNA is isolated from the RNA sample. In general, such purification takes advantage of the poly-A tails on mRNA. In particular and as noted above, poly-T oligonucleotides may be immobilized within on a solid support to serve as affinity ligands for mRNA. Kits for this purpose are commercially available, e.g., the MessageMaker kit (Life Technologies, Grand Island, N.Y.). In some embodiments, the RNA population is enriched in marker sequences. Enrichment can be undertaken, e.g., by primer-specific cDNA synthesis, or multiple rounds of linear amplification based on cDNA synthesis and template-directed in vitro transcription.

The population of RNA, enriched or not in particular species or sequences, can further be amplified. As defined herein, an "amplification process" increases the number of copies of a polynucleotide (e.g., RNA). For example, where RNA is mRNA, an amplification process such as RT-PCR can be utilized to amplify the mRNA, such that a signal is detectable or detection is enhanced. Such an amplification process is beneficial particularly when the biological, tissue, or tumor sample is of a small size or volume.

Various amplification and detection methods can be used. For example, it is within the scope of the disclosed methods to reverse transcribe mRNA into cDNA followed by polymerase chain reaction (RT-PCR); or, to use a single enzyme for both steps as described in U.S. Pat. No. 5,322,770, or reverse transcribe mRNA into cDNA followed by symmetric gap ligase chain reaction (RT-AGLCR) as described by R. L. Marshall, et al., PCR Methods and Applications 4:80-84 (1994). Real time PCR may also be used. Other known amplification methods which can be utilized herein include but are not limited to the so-called "NASBA" or "3SR" technique described in PNAS USA 87:1874-1878 (1990) and also described in Nature 350 (No. 6313): 91-92 (1991); Q-beta amplification as described in published European Patent Application (EPA) No. 4544610; strand displacement amplification (as described in G. T. Walker et al., Clin. Chem. 42:9-13 (1996) and European Patent Application No. 684315; target mediated amplification, as described by PCT Publication WO9322461; PCR; ligase chain reaction (LCR) (see, e.g., Wu and Wallace, Genomics 4, 560 (1989), Landegren et al., Science 241, 1077 (1988)); self-sustained sequence replication (SSR) (see, e.g., Guatelli et al., Proc. Nat. Acad. Sci. USA, 87, 1874 (1990)); and transcription amplification (see, e.g., Kwoh et al., Proc. Natl. Acad. Sci. USA 86, 1173 (1989)). Many techniques are known in the state of the art for determining absolute and relative levels of gene expression, commonly used techniques suitable for use in the disclosed methods include Northern analysis, RNase protection assays (RPA), microarrays and PCR-based techniques, such as quantitative PCR and differential display PCR. For example, Northern blotting involves running a preparation of RNA on a denaturing agarose gel, and transferring it to a suitable support, such as activated cellulose, nitrocellulose or glass or nylon membranes. Radiolabeled cDNA or RNA is then hybridized to the preparation, washed and analyzed by autoradiography.

In situ hybridization visualization may also be employed, wherein a radioactively labeled antisense RNA probe is hybridized with a thin section of a sample, washed, cleaved with RNase and exposed to a sensitive emulsion for autoradiography. The samples may be stained with hematoxylin to demonstrate the histological composition of the sample, and dark field imaging with a suitable light filter shows the developed emulsion. Non-radioactive labels such as digoxigenin may also be used. In some embodiments, the probe is labeled with a fluorescence moiety.

Alternatively, mRNA expression can be detected on a DNA array, chip or a microarray. Labeled nucleic acids of a test sample obtained from a subject may be hybridized to a solid surface comprising marker DNA. Positive hybridization signal is obtained with the sample containing marker transcripts. Methods of preparing DNA arrays and their use are well known in the art (see, e.g., U.S. Pat. Nos. 66,186, 796; 6,379,897; 6,664,377; 6,451,536; 548,257; U.S. 20030157485). Serial Analysis of Gene Expression (SAGE) can also be performed (See for example U.S. patent application No. 20030215858). In some embodiments, next generation sequencing (e.g., RNA-seq) can be used to analyze total mRNA expression from one (e.g., single-cell RNA-seq) or more cells. A nucleic acid target molecule labeled with a barcode (for example, an origin-specific barcode) can be sequenced with the barcode to produce a single read and/or contig containing the sequence, or portions thereof, of both the target molecule and the barcode. Exemplary next generation sequencing technologies include, for example, Illumina sequencing, Ion Torrent sequencing, 454 sequencing, SOLID sequencing, and nanopore sequencing amongst others. Methods for constructing sequencing libraries are known in the art.

In some aspects of the disclosure the single cell sequencing is high-throughput single cell RNA sequencing. In certain embodiments, the single cell sequencing is a low cost high-throughput single cell RNA sequencing. Not being bound by any particular theory, the single cell RNA sequencing is capable of efficiently and cost effectively sequencing thousands to tens of thousands of single cells. In certain embodiments, single cell RNA sequencing comprises pairing single cells in droplets with oligonucleotides for reverse transcription, wherein the oligonucleotides are configured to provide cell-of-origin specific barcodes uniquely identifying transcripts from each cell and a unique molecular identifier (UMI) uniquely identifying each transcript. In certain embodiments, single cell RNA sequencing comprises pairing single cells in droplets with single microparticle beads coated with oligonucleotides for reverse transcription, wherein the oligonucleotides contain a bead-specific barcode uniquely identifying each bead and a unique molecular identifier (UMI) uniquely identifying each primer. In some aspects of the disclosure, unbiased classifying of cells in a biological sample comprises sequencing the transcriptomes of thousands of cells, preferably tens of thousands of cells (e.g., greater than 1000 cells, or greater than 10,000 cells).

Methods for Detection of Lineage Marker Protein Expression

The activity or level of a lineage marker protein can be detected and/or quantified by detecting or quantifying the expressed polypeptide. The polypeptide can be detected and quantified by any of a number of means well known to those of skill in the art. Any method known in the art for detecting polypeptides can be used. Such methods include, but are not limited to, immunodiffusion, immunoelectrophoresis, radio-immunoassay (RIA), enzyme-linked immunosorbent assays (ELISAs), immunofluorescent assays, Western blotting, binder-ligand assays, immunohistochemical techniques, agglutination, complement assays, high performance liquid chromatography (HPLC), thin layer chromatography (TLC), hyperdiffusion chromatography, and the like.

Described below are non-limiting examples of techniques that may be used to detect marker protein according to a practitioner's preference based upon the present disclosure. One such technique is Western blotting (Towbin et at., Proc. Nat. Acad. Sci. 76:4350 (1979)), wherein a suitably treated sample is run on an SDS-PAGE gel before being transferred to a solid support, such as a nitrocellulose filter. Anti-marker protein antibodies (unlabeled) are then brought into contact with the support and assayed by a secondary immunological reagent, such as labeled protein A or anti-immunoglobulin (suitable labels including $^{125}$I, horseradish peroxidase, alkaline phosphatase, fluorophore). Chromatographic detection may also be used.

Immunohistochemistry may be used to detect expression of marker protein. A suitable antibody is brought into contact with, for example, a thin layer of cells, washed, and then contacted with a second, labeled antibody. Labeling may be by fluorescent markers, enzymes, such as peroxidase, avidin, or radiolabelling. The assay is scored visually, using microscopy.

Anti-marker protein antibodies, such as intrabodies, may also be used for imaging purposes, for example, to detect the presence of marker protein in cells or, e.g., an EP structure. Suitable labels include radioisotopes, iodine ($^{125}$I, $^{121}$I), carbon ($^{14}$C), sulphur ($^{35}$S), tritium ($^{3}$H), indium ($^{112}$In), and technetium ($^{99m}$Tc), fluorescent labels, such as fluorescein and rhodamine, and biotin.

Antibodies that may be used to detect marker protein include any antibody, whether natural or synthetic, full length or a fragment thereof, monoclonal or polyclonal, that binds sufficiently strongly and specifically to the marker protein to be detected. An antibody may have a $K_d$ of at most about $10^{-6}$ M, $10^{-7}$M, $10^{-8}$M, $10^{-9}$M, $10^{-10}$M, $10^{-11}$M, $10^{-12}$M. The phrase "specifically binds" refers to binding of, for example, an antibody to an epitope or antigen or antigenic determinant in such a manner that binding can be displaced or competed with a second preparation of identical or similar epitope, antigen or antigenic determinant. An antibody may bind preferentially to the marker protein relative to other proteins, such as related proteins.

Antibodies are commercially available or may be prepared according to methods known in the art. A list of antibodies that can be used to assay the presence, absence, level, and localization of one or more of the linage markers described herein are listed in Table 2.

Antibodies and derivatives thereof that may be used encompass polyclonal or monoclonal antibodies, chimeric, human, humanized, primatized (CDR-grafted), veneered or single-chain antibodies as well as functional fragments, i.e., marker protein binding fragments, of antibodies. For example, antibody fragments capable of binding to a marker protein or portions thereof, including, but not limited to, Fv, Fab, Fab' and F(ab') 2 fragments can be used. Such fragments can be produced by enzymatic cleavage or by recombinant techniques. For example, papain or pepsin cleavage can generate Fab or F (ab') 2 fragments, respectively. Other proteases with the requisite substrate specificity can also be used to generate Fab or F (ab') 2 fragments. Antibodies can also be produced in a variety of truncated forms using antibody genes in which one or more stop codons have been introduced upstream of the natural stop site. For example, a chimeric gene encoding a F (ab') 2 heavy chain portion can be designed to include DNA sequences encoding the CH, domain and hinge region of the heavy chain. In some embodiments, agents that specifically bind to a marker protein other than antibodies are used, such as peptides. Peptides that specifically bind to a marker protein can be identified by any means known in the art. For example, specific peptide binders of a marker protein can be screened for using peptide phage display libraries.

Reorganized EP Structures

Provided herein are methods for generating a reorganized EP structure that can, in some embodiments, exhibit one or more features of a peri- and/or post-implantation blastocyst.

The method can comprise: (d) contacting the EP structure with a second substrate and IVC media. The method can comprise: (e) culturing the EP structure in the IVC media for at least about 24 hours, wherein the EP structure reorganizes to form a reorganized EP structure comprising an outer compartment, an inner compartment, and an internal lumen. The second substrate can comprise a dish, a U-plate, a flask, or a microwell plate. The second substrate can comprise a U-plate.

IVC Media

There is provided, in some embodiments, culture media (e.g., IVC media) to support reorganization of EP structures. The IVC media can comprise: a) insulin, an insulin analogue, or an insulin receptor agonist; b) estrogen, an estrogen analogue, or an estrogen receptor agonist; and c) progesterone, a progesterone analogue, or a progesterone receptor agonist.

In some embodiments, IVC media further comprises an albumin. The IVC media can comprise a serum replacement. The IVC media can comprise 30% serum replacement. In some embodiments, the insulin receptor agonist is selected from the group comprising IGF-I, IGF-II, analogues thereof, or any combination thereof. The estrogen receptor agonist can be selected from the group comprising β-estradiol, estrone, estriol and estetrol, or any analogue thereof. The IVC media can comprise transferrin, sodium selenium, ethanolamine, or any analogue thereof. In some embodiments, the IVC media further comprises an agonist of the activin type 1 or type 2 receptors. The IVC media can comprise a reducing agent. In some embodiments, the reducing agent can comprise N-acetyl-L-cysteine, dithiothreitol (DTT), β-mercaptoethanol (BME), or any combination thereof. In some embodiments, the IVC media does not comprise a conditioned medium.

As described above, the culture medium may contain other components, or analogues thereof. The term "analogue" is used in this specification to refer to a biologically active analogue of any of the components of the culture medium. Such an analogue may be natural or synthetic.

The specific biologically active ligands and compounds used in the media defined herein, such as insulin, progesterone, activin etc. are used for illustrative purposes. However, one of skill in the art will readily recognize that analogues of such ligands and compounds may equally be used as alternatives, provided that they retain the relevant biological activity. One of skill in the art will be able to identify, in a routine manner, other biologically active compounds that are suitable for use as substitutes. For instance, these may be naturally occurring compounds or compounds which can be made by synthetic or semi-synthetic methods.

The term "analogue" as used herein can refer to a compound which may be structurally related to the relevant molecule. The term "agonist" as used herein can refer to a compound which might not be structurally related to the relevant molecule. For example, an agonist may activate the relevant receptor by altering the conformation of the receptor. Nevertheless, in both cases the terms are used in this specification to refer to compounds or molecules which can mimic, reproduce or otherwise generally substitute for the specific biological activity of the relevant molecule.

In addition, the culture medium may contain a basal medium. The basal medium may comprise water, salts, amino acids, a carbon source, vitamins, lipids and a buffer. Suitable carbon sources may be assessed by one of skill in the art from compounds such as glucose, sucrose, sorbitol, galactose, mannose, fructose, mannitol, maltodextrin, trehalose dihydrate, and cyclodextrin. Basal media are commercially available, for example, under the trade names Advanced DMEM/F12 (Gibco, 12634-010) and CMRL-1066 (Invitrogen or Sigma). The basal culture medium can comprise Dulbecco's Modified Eagle Medium (DMEM), DMEM Nutrient Mixture 12 (DMEM/F12), Roswell Park Memorial Institute (RPMI) medium 1640, Neurobasal®, Neurobasal® A, Connaught Medical Research Laboratory 1066 (CMRL-1066), or any combination thereof.

The IVC media can comprise L-glutamine. L-glutamine may be included in the culture medium at a concentration of about 0.1 mM to about 40 mM, about 0.2 mM to about 20 mM, about 0.5 mM to about 10 mM, about 1 mM to about 5 mM or about 1.5 mM to about 2.5 mM e.g., about 2 mM. In some embodiments, L-glutamine is included in the culture medium at a concentration of about 2 mM.

The IVC media can comprise sodium pyruvate. Sodium pyruvate may be included in the culture medium at a concentration of about 0.05 mM to about 20 mM, about 0.1 mM to about 10 mM, about 0.25 mM about 5 mM, or about 0.5 mM to about 2.5 mM e.g., about 1 mM.

The IVC media can comprise an amino acid selected from the group comprising L-glycine, L-alanine, L-asparagine, L-aspartic acid, L-glutamic acid, L-proline and L-serine. Non-essential amino acids may be included in the culture medium, for example, comprising glycine (about 1 mg/ml to about 25 mg/ml or about 5 mg/ml to about 10 mg/ml e.g., about 7.5 mg/ml), L-alanine (about 1 mg/ml to about 25 mg/ml or about 5 mg/ml to about 10 mg/ml e.g., about 9 mg/ml), L-asparagine (about 5 mg/ml to about 30 mg/ml or about 10 mg/ml to about 15 mg/ml e.g., about 13.2 mg/ml), L-aspartic acid (about 5 mg/ml to about 30 mg/ml or about 10 mg/ml to about 15 mg/ml e.g., about 13 mg/ml), L-glutamic acid (about 5 mg/ml to about 50 mg/ml or about 10 mg/ml to about 20 mg/ml e.g., about 15 mg/ml), L-proline (about 5 mg/ml to about 30 mg/ml or about 10 mg/ml to about 15 mg/ml e.g., about 11 mg/ml) and/or L-serine (about 5 mg/ml to about 30 mg/ml or about 10 mg/ml to about 15 mg/ml e.g., about 11 mg/ml). In some embodiments, culture medium may comprise L-glycine at a concentration of about 7.5 mg/ml, L-alanine at a concentration of about 9 mg/ml, L-asparagine at a concentration of about 13 mg/ml, L-aspartic acid at a concentration of about 13 mg/ml, L-glutamic acid at a concentration of about 14.5 mg/ml, L-proline at a concentration of about 11.5 mg/ml and L-serine at a concentration of about 10.5 mg/ml. Penicillin may be included in the culture medium at a concentration of about 1 unit/ml to about 500 units/ml, about 2 units/ml to about 250 units/ml, about 5 units/ml to about 100 units/ml, about 10 units/ml to about 50 units/ml, or about 20 units/ml to about 30 units/ml e.g., about 25 units/ml. Streptomycin may be included in the culture medium at a concentration of about 1 μg/ml to about 500 μg/ml, about 2 μg/ml to about 250 μg/ml, about 5 μg/ml to about 100 μg/ml, about 10 μg/ml to about 50 μg/ml, 25 or about 20 μg/ml to about 30 μg/ml e.g., about 25 μg/ml. The culture medium can comprise penicillin at a concentration of about 25 units/ml and/or streptomycin at a concentration of about 25 μg/ml.

The culture medium may be free of serum or substantially free of serum or essentially free of serum. The culture medium may comprise a serum replacement medium. Such serum replacement media are commercially available under the trade names KSR (KnockOut™ Serum Replacement, Invitrogen, 10828-010) and N2B27 (e.g., Invitrogen, ME100137L1). The serum replacement medium may be included in the culture medium at about 5% to about 60%, about 10% to about 50%, about 15% to about 45%, or about 20% to about 40%, e.g., about 30%. In some embodiments, the in vitro culture medium is free of serum or substantially free of serum and comprises 30% serum replacement.

The culture medium may comprise a basal medium, as defined above, (e.g., Advanced DMEM/F12) supplemented with, an insulin receptor agonist, e.g., Insulin (e.g., about 2 mg/ml to about 25 mg/ml), Transferrin (e.g., about 1 mg/ml to about 10 mg/ml), Selenium e.g., sodium selenite (e.g., about 0.001 mg/ml to about 0.01 mg/ml), Ethanolamine (e.g., about 0.5 mg/ml to about 10 mg/ml), an estrogen receptor agonist e.g., estradiol (e.g., about 5 nM to about 10 nM), a progesterone receptor agonist e.g., Progesterone (e.g., about 50 ng/ml to about 500 ng/ml) and a reducing agent e.g., N-acetyl-L-cysteine (e.g., about 17.5 μM to about 40 µM). The culture medium may further comprise one or more of L-glutamine (e.g., about 1 mM to about 5 mM), Sodium pyruvate (e.g., about 0.25 mM to about 5 mM), non-essential amino acids (e.g., comprising glycine (e.g., about 5 mg/ml to about 10 mg/ml), L-alanine (e.g., about 5 mg/ml to about 10 mg/ml), L-asparagine (e.g., about 10 mg/ml to about 15 mg/ml), L-aspartic acid (e.g., about 10 mg/ml to about 15 mg/ml), L-glutamic acid (e.g., about 10 mg/ml to about 20 mg/ml), L-proline (e.g., about 10 mg/ml to about 15 mg/ml) and/or L-serine (e.g., about 10 mg/ml to about 15 mg/ml)), Penicillin (e.g., about 10 units/ml to about 50 units/ml) and/or Streptomycin (e.g., about 10 µg/ml to about 50 µg/ml).

The culture medium may comprise 15 to 45% KSR (KnockOut Serum Replacement). The culture medium may be serum-free, or substantially serum free. Alternatively, the culture medium may comprise KSR and FCS, optionally about 5 to 15% KSR and 5-15% FCS. The culture medium may comprise about 10% to about 30% FCS. The culture medium may consist of, or consist essentially of, a basal medium, an insulin receptor agonist, an estrogen receptor agonist, a progesterone receptor agonist, a reducing agent, transferrin, selenium, ethanolamine and an albumin. The albumin may be provided by a non-human mammalian serum (e.g., FCS) and/or serum-replacement. The culture medium may be serum-free, or substantially serum free. Each component of the culture medium may be present in an amount such that the culture medium is suitable for supporting the development of a reorganized EP structure. In some embodiment, there is provided a defined in vitro culture medium that is free or substantially free of serum comprising a basal medium comprising water, salts, amino acids, a carbon source, vitamins, lipids and a buffer; and further comprising the components insulin, an insulin analogue, or an insulin receptor agonist; estrogen, an estrogen analogue, or an estrogen receptor agonist; progesterone, a progesterone analogue, or a progesterone receptor agonist; transferrin, or analogue thereof, sodium selenite, or analogue or substitute thereof; ethanolamine, or analogue thereof; sodium pyruvate; L-glutamine; L-glycine; L-alanine; L-asparagine; L-aspartic acid; L-glutamic acid; L-proline; L-serine; N-acetyl-L-cysteine; a serum substitute, optionally wherein the defined in vitro culture medium comprises 30% serum substitute; and wherein said components are provided in amounts such that the medium is capable of supporting development of a reorganized EP structure on a substrate; and wherein the medium further comprises penicillin and streptomycin.

Components of the medium may be provided in any of the amounts defined herein, provided that the medium is capable of supporting generation of a reorganized EP structure. In all of the in vitro culture medium embodiments defined herein the culture medium further may be free, substantially free or essentially free of one or more of an EGF receptor agonist or an analogue thereof, such as EGF or an EGF substitute; an FGF receptor agonist or an analogue thereof, such as FGF or an FGF substitute; a LIF receptor agonist or an analogue thereof, such as LIF or a LIF substitute; a BMP receptor agonist or an analogue thereof, such as a BMP, or a BMP substitute; a WNT receptor agonist or an analogue thereof, such as WNT or a WNT substitute. The culture medium further may be free, substantially free or essentially free of a TGFβ receptor agonist or an analogue thereof. Unless otherwise indicated, the culture medium further may be free, substantially free or essentially free of nodal, activin, stem cell factor or members of the hedgehog family of proteins.

The amount of the compounds and ligands disclosed herein present in the IVC media can vary. For example, in some embodiments, the IVC media can comprise about 1 ng/ml to about 100 mg/ml (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900 ng/ml, 1 µg/ml, 10, 20, 30, 40, 50, 60, 70, 80, 90, 100 µg/ml, 1 mg/ml, 10, 20, 30, 40, 50, 60, 70, 80, 90, 100 mg/ml or a number or a range between any two of these values) of one or more hormones (e.g., progesterone) and/or one or more growth factors (e.g., insulin or an insulin-like growth factor). In some embodiments, the IVC media can comprise about 0.5 nM to about 1 mM (e.g., about 0.5, 1, 1.5, 2, 2.5, 3, 3.5, 4, 4.5 5 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900 nM, 0.5 mM, 1 mM, or a number or a range between any two of these values) of a hormone and/or insulin or an insulin-like growth factor.

In some embodiments, the IVC media comprises: Advanced DMEM/F12 (12634-010; Thermo Fischer Scientific; Waltham, US) supplemented with 20% (vol/vol) heat-inactivated FBS (16141079, Thermo Fisher Scientific), 2 mM GlutaMAX™, penicillin (25 units/ml)/Streptomycin (25 µg/ml), 1×ITS-X (10 mg/L insulin, 5.5 mg/L transferrin, 0.0067 mg/L sodium selenite, 2 mg/L etholamine; 51500-056; Thermo Fisher Scientific; Waltham, US), 8 nM β-estradiol (E8875; Sigma-Aldrich; St. Louis, US), 200 ng/ml progesterone (P0130; Sigma-Aldrich; St. Louis, US), 25 µM N-acetyl-L-cysteine (A7250; Sigma-Aldrich; St. Louis, US), 17 nm IGF1, 20 ng/mL FGF2 (Gibco), FGF4 (25 ng/ml; R&D Systems, 5846-F4) and heparin (1 mg ml-1; Sigma, H3149). In some embodiments, the IVC media comprises a glutamine alternative (e.g., GlutaMax™ comprising L-alanyl-L-glutamine dipeptide).

The outer compartment of the reorganized EP structure can comprise one or more cells expressing one or more extra-embryonic markers, and the inner compartment can comprise one or more cells expressing one or more embryonic markers. The one or more extra-embryonic-markers can comprise GATA3, KRT18, FOXA2, TFAP2, or any combination thereof.

The one or more embryonic markers can comprise SOX2. The inner compartment can comprise one or more cells expressing the luminogenesis factor PODXL. The inner compartment can comprise cells expressing SOX2 with a frequency of at least about 50% (e.g., about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 100%, or a number or a range between any two of these values.

Applications of the EP and Reorganized EP Structures Provided Herein

The EP structure and reorganized EP structures provided herein can be used, e.g., to produce one or more differentiated cells. The method can comprise: removing one or more cells from the EP structure or the reorganized EP structure; and culturing the one or more cells to produce differentiated cells.

In some embodiments, the differentiated cells are selected from the group comprising exocrine secretory epithelial cells, hormone secreting cells, cells of the integumentary system, cells of the nervous system, metabolism and storage cells, barrier function cells, extracellular matrix cells, contractile cells, blood and immune system cells, germ cells, nurse cells and interstitial cells.

Differentiated cells may be produced the compositions and methods of the disclosure. Examples of differentiated cells include cells that are derived primarily from the endoderm, cells that are derived primarily from the ectoderm and cells that are derived primarily from the mesoderm and cells that are derived primarily from the germ line. Cells that are derived primarily from endoderm include exocrine secretory epithelial cells and hormone secretory cells. Exocrine secretory epithelial cells include salivary gland cell, von Ebner's gland cell in tongue, mammary gland cell, lacrimal gland cell, ceruminous gland cell in ear, eccrine sweat gland dark cell, eccrine sweat gland clear cell, apocrine sweat gland cell, gland of Moll cell in eyelid, sebaceous gland cell, Bowman's gland cell in nose, Brunner's gland cell in duodenum, seminal vesicle cell, prostate gland cell, bulbourethral gland cell, Bartholin's gland cell, gland of Littre cell, uterus endometrium cell, isolated goblet cell of respiratory and digestive tracts, stomach lining mucous cell, gastric gland zymogenic cell, gastric gland oxyntic cell, pancreatic acinar cell, paneth cell of small intestine, type II pneumocyte of lung and Clara cell of lung. Hormone secreting cells include anterior pituitary cells, intermediate pituitary cell, magnocellular neurosecretory cells, gut and respiratory tract cells, thyroid gland cells, parathyroid gland cells, adrenal gland cells, Leydig cell of testes, Theca interna cell of ovarian follicle, corpus luteum cell, juxtaglomerular cell, macula densa cell of kidney, peripolar cell of kidney and Mesangial cell of kidney.

Cells that are derived primarily from ectoderm include cells of the integumentary system and nervous system. Cells of the integumentary system include keratinizing epithelial cells (such as epidermal keratinocyte, epidermal basal cell, keratinocyte of fingernails and toenails, nail bed basal cell, medullary hair shaft cell, cortical hair shaft cell, cuticular hair shaft cell, cuticular hair root sheath cell, hair root sheath cell of Huxley's layer, hair root sheath cell of Henle's layer, external hair root sheath cell, hair matrix cell), wet stratified barrier epithelial cells (such as surface epithelial cell of stratified squamous epithelium of cornea, tongue, oral cavity, esophagus, anal canal, distal urethra and vagina, basal cell of epithelia of cornea, tongue, oral cavity, esophagus, anal canal, distal urethra and vagina and urinary epithelium cell). Cells of the nervous system include sensory transducer cells (such as auditory inner hair cell of organ of Corti, auditory outer hair cell of organ of Corti, basal cell of olfactory epithelium, cold-sensitive primary sensory neurons, heat-sensitive primary sensory neurons, Merkel cell of epidermis, olfactory receptor neuron, pain-sensitive primary sensory neurons, photoreceptor cells of retina in eye, proprioceptive primary sensory neurons, touch-sensitive primary sensory neurons, type I carotid body cell, type II carotid body cell, type I hair cell of vestibular system of ear, type II hair cell of vestibular system of ear and type I taste bud cell), autonomic neuron cells (such as cholinergic neural cell, adrenergic neural cell and peptidergic neural cell), sense organ and peripheral neuron supporting cells (such as inner pillar cell of organ of Corti, outer pillar cell of organ of Corti, inner phalangeal cell of organ of Corti, outer phalangeal cell of organ of Corti, border cell of organ of Corti, Hensen cell of organ of Corti, vestibular apparatus supporting cell, taste bud supporting cell, 5 olfactory epithelium supporting cell, Schwann cell, satellite glial cell and enteric glial cell), central nervous system neurons and glial cells (such as astrocyte, neuron cells, oligodendrocyte and spindle neuron) and lens cells (such as anterior lens epithelial cell and crystallin-containing lens fiber cell).

Cells that are derived primarily from mesoderm include metabolism and storage cells, barrier function cells, extracellular matrix cells, contractile cells, blood and immune system cells, germ cells, nurse cells and interstitial cells. Metabolism and storage cells include hepatocyte, adipocytes and liver lipocyte. Barrier function cells (lung, gut, exocrine glands and urogenital tract) include kidney cells (such as kidney parietal cell, kidney glomerulus podocyte, kidney proximal tubule brush border cell, loop of Henle thin segment cell, kidney distal tubule cell, kidney collecting duct cell, type I pneumocyte, pancreatic duct cell, nonstriated duct cell, duct cell, intestinal brush border cell, exocrine gland striated duct cell, gall bladder epithelial cell, ductulus efferens nonciliated cell, epididymal principal cell and epididymal basal cell). Extracellular matrix cells include ameloblast epithelial cell, planum semilunatum epithelial cell of vestibular system of ear, organ of Corti interdental epithelial cell, loose connective tissue fibroblasts, corneal fibroblasts, tendon fibroblasts, bone marrow reticular tissue fibroblasts, other nonepithelial fibroblasts, pericyte, nucleus pulposus cell of intervertebral disc, cementoblast/cementocyte, Odontoblast/odontocyte, hyaline cartilage chondrocyte, fibrocartilage chondrocyte, elastic cartilage chondrocyte, osteoblast/osteocyte, osteoprogenitor cell, hyalocyte of vitreous body of eye, stellate cell of perilymphatic space of ear, hepatic stellate cell and pancreatic stelle cell. Contractile cells include skeletal muscle cells including red skeletal muscle cell, white skeletal muscle cell, intermediate skeletal muscle cell, nuclear bag cell of muscle spindle and nuclear chain cell of muscle spindle, satellite cells, heart muscle cells including ordinary heart muscle cell, nodal heart muscle cell and Purkinje fiber cell, smooth muscle cell, myoepithelial cell of iris and myoepithelial cell of exocrine glands. Blood and immune system cells include erythrocyte, megakaryocyte, monocyte, connective tissue macrophage, Langerhans cell, osteoclast, dendritic cell, microglial cell, neutrophil granulocyte, eosinophil granulocyte, basophil granulocyte, hybridoma cell, mast cell, helper T cell, suppressor T cell, cytotoxic T cell, natural Killer T cell, B cell, natural killer cell, reticulocyte and committed progenitors for the blood and immune system. Germ cells include oogonium/Oocyte, spermatid, spermatocyte, spermatogonium cell and spermatozoon. Nurse cells include ovarian follicle cell, sertoli cell and thymus epithelial cell, and interstitial cells include interstitial kidney cells.

The disclosed compositions and methods may be used to produce differentiated cells from any suitable mammalian species, such as: primates, including humans, great apes (e.g., gorillas, chimpanzees, orangutans), old world monkeys, new world monkeys; rodents (e.g., mice, rats, guinea pigs, hamsters); cats; dogs; lagomorphs (including rabbits); cows; sheep; goats; horses; pigs; and any other livestock, agricultural, laboratory or domestic mammals. The presently disclosed compositions and methods may be used to produce differentiated cells from any non-human mammal, including but not limited to those described above.

There are provided, in some embodiments, differentiated cells obtainable by the in vitro methods described herein.

There are provided expanded pluripotency structures generated by the in vitro methods disclosed herein. Disclosed herein are compositions for generating an EP structure. There are also provided, in some embodiments, EP structures generated by the in vitro methods described herein. Disclosed herein are compositions for generating a reorganized EP structure comprising.

The EP structures, recognized EP structures, and differentiated cells disclosed herein can have a variety of applications including, e.g., investigating mechanisms of embryonic development and for use in treating a subject for a disease or disorder.

Disclosed herein include methods for investigating the effect of a test agent on embryonic development. In some embodiments, the method comprises: a) generating an EP structure or a reorganized EP structure; b) contacting the EP structure or the reorganized EP structure with a test agent; and c) determining the effect of the test agent on the EP structure or reorganized EP structure. In some embodiments, the determining comprises comparing a phenotype or a genotype of the EP structure or reorganized EP structure in the presence of the test agent with the phenotype or genotype of the EP structure or reorganized EP structure in the absence of the test agent. The method can comprise contacting the PSCs and/or EPSCs with the test agent prior to step (b).

The method can comprise determining the subsequent effect on formation of the EP structure or the reorganized EP structure. The determining can be performed using any method known in the art. For example, the method can comprise recording one or more images of the EP structure or the reorganized EP structure.

Disclosed herein include methods for investigating mechanisms involved in embryogenesis. In some embodiments, the method comprises any of the in vitro methods for generating an EP structure, a reorganized EP structure, or a differentiated cell(s) described herein. Investigating mechanism involved in embryogenesis can comprise any method known in the art. For example, said investigating can comprise investigating the effect of a test agent on embryonic development as described above. In some embodiments, investigating mechanisms involved in embryogenesis can comprise determining the effect of genetic perturbation(s) in the EP structure or reorganized EP structure.

The method may comprise recording a plurality of images of the same the EP structure or reorganized EP structure. The plurality of images may be recorded over a pre-determined period of time, thus illustrating the development from the EP structure or reorganized EP structure over time. The imaging apparatus may comprise microscopy apparatus, suitable recording apparatus, and optionally image processing apparatus.

Typically, fluorescent markers, such as fluorescent dyes or fluorescent marker proteins, are used in the imaging of embryonic development. Such markers may be added to the culture system. For example, fluorescent dyes may be added to visualize particular molecules or cellular structures. For example, DAPI may be used to stain DNA or MitoTracker (Invitrogen) may be used to stain the mitochondria. Additionally or alternatively, the EP structure or reorganized EP structure may produce such fluorescent markers endogenously, e.g., it may contain one or more cells which express a fluorescent marker protein. Such cells may have been genetically modified in order to confer the ability to express such a marker protein. Thus, fluorescence imaging apparatus may be particularly suitable for the methods described. The imaging apparatus may thus comprise a fluorescence microscope, such as a confocal microscope, that can include but is not limited to wide field, scanning and spinning disc confocal, and light sheet microscope.

Confocal microscopes image a single point of a specimen at any given time but allow generation of two dimensional or three dimensional images by scanning different points in a specimen in a regular raster to provide image data which can be assembled into a two or three dimensional image. For example, scanning a specimen in a single plane enables generation of a two dimensional image of a slice through the specimen. A plurality or "stack" of such two dimensional images can be combined to yield a three dimensional image. Spinning disc confocal microscopy provides added advantages over confocal laser scanning microscopy. Additionally, light sheet microscopy can also provide good imaging of embryonic development.

Disclosed herein include methods for identifying a compound useful for treating a disease. In some embodiments, the method comprises contacting an EP structure, a reorganized EP structure, or a differentiated cell(s) obtainable by the in vitro methods described herein with the compound. Disclosed herein include methods for diagnosing or treating a disease or disorder in a subject. In some embodiments, the method comprises use of an EP structure, a reorganized EP structure, or a differentiated cell(s) obtainable by the in vitro methods described herein, or any combination thereof. The EP structure, the reorganized EP structure, or the differentiated cell can be for transplantation into the subject. The PSCs can be obtained from the subject.

Disclosed herein include methods for elucidating the role of a gene in embryo development. In some embodiments, the method comprises obtaining a pluripotent cell where the gene has been modified or knocked out and culturing the cell using the in vitro methods described herein. For example, random and/or targeted mutagenesis can be performed in a pluripotent stem cell and the role of mutated genes in development can be elucidated by using said pluripotent stem cell for generating an EP structure, reorganized EP structure, or differentiated cell using the in vitro methods described herein and observing any effects my methods known to those of skill in the art.

Herein are disclosed method and compositions for promoting pluripotent stem cells (e.g., human pluripotent stem cells) self-organisation into 3D embryo-like structures. PSCs can be reprogrammed to a molecular state, termed extended or expanded pluripotency (EP), that has developmental potency for both embryonic and extra-embryonic cell lineages. It is surprisingly described herein that hPSCs that are grown under EP conditions (termed hEPSCs) and cultured with a combination of appropriate growth factors and/or inhibitors can capture aspects of early embryonic lineage development in 3D culture. The resulting structures recapitulate some of the morphological and gene expression features of embryonic day 3 to day 9/10 of natural human embryogenesis. Single-cell RNA sequencing (scRNA-seq) further confirms that these structures recapitulate some aspects of blastocyst gene expression. Applications of this system can give insight into regulatory processes of cellular differentiation in human embryo.

EXAMPLES

Some aspects of the embodiments discussed above are disclosed in further detail in the following examples, which are not in any way intended to limit the scope of the present disclosure.

Example 1

Reconstructing Aspects of Human Embryogenesis with Pluripotent Stem Cells Self-Organization of Human EPSCs

Figure 1B:
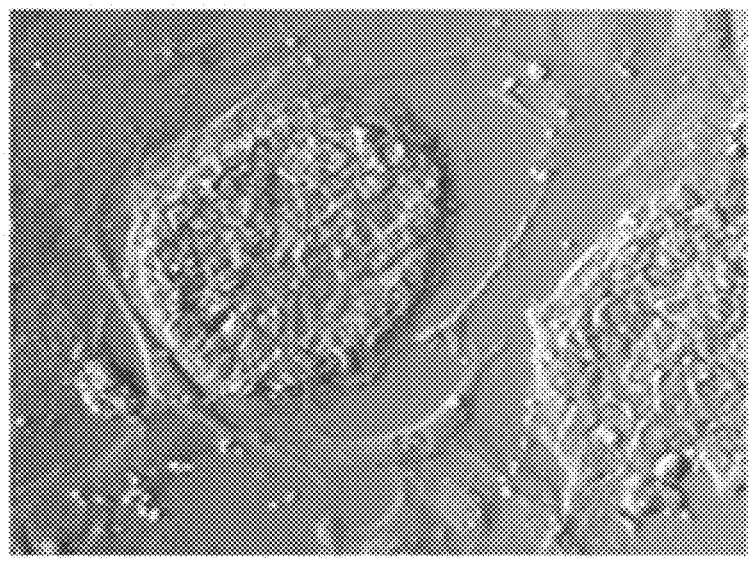
Figure 1C:
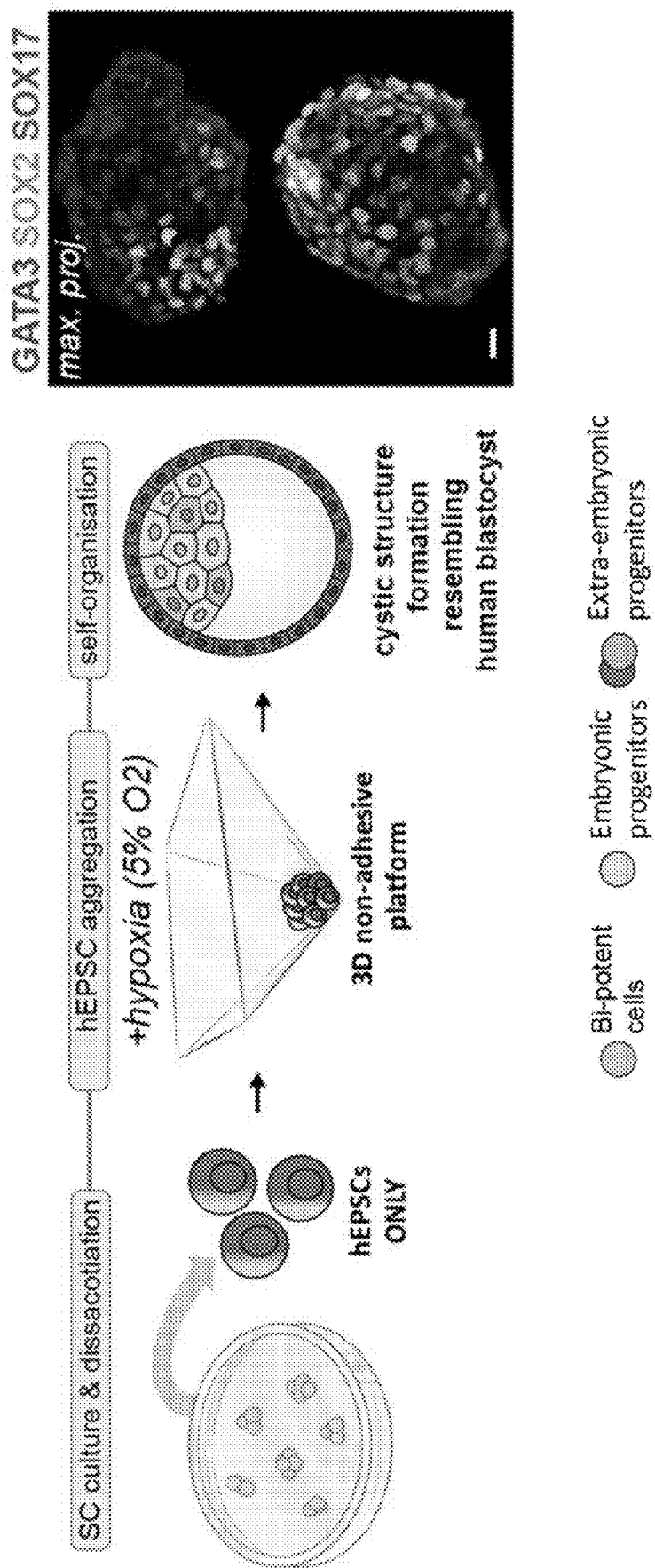
Figure 6A:
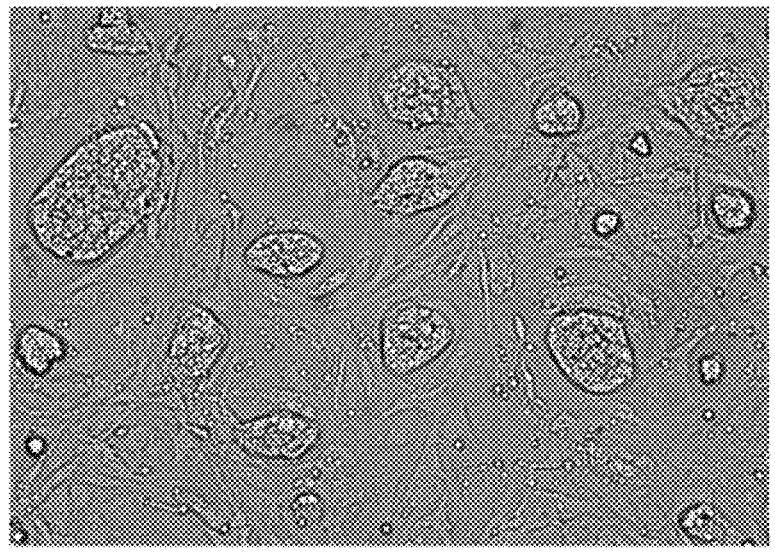
FIG. 6A-FIG. 6C depict exemplary data related to the characterization of cellular and structural morphologies under 2D and 3D culture conditions.
Figure 6A:
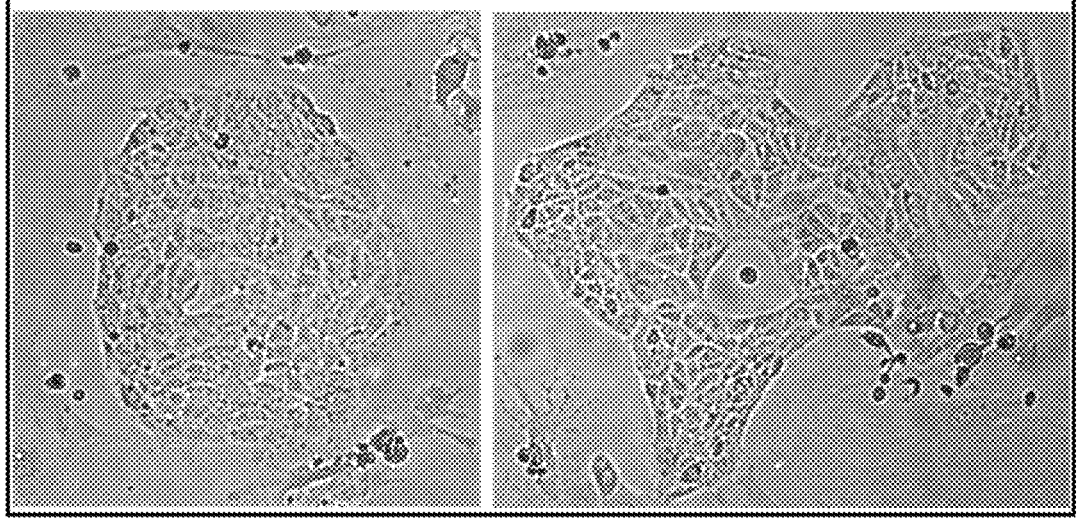
Figure 6B:
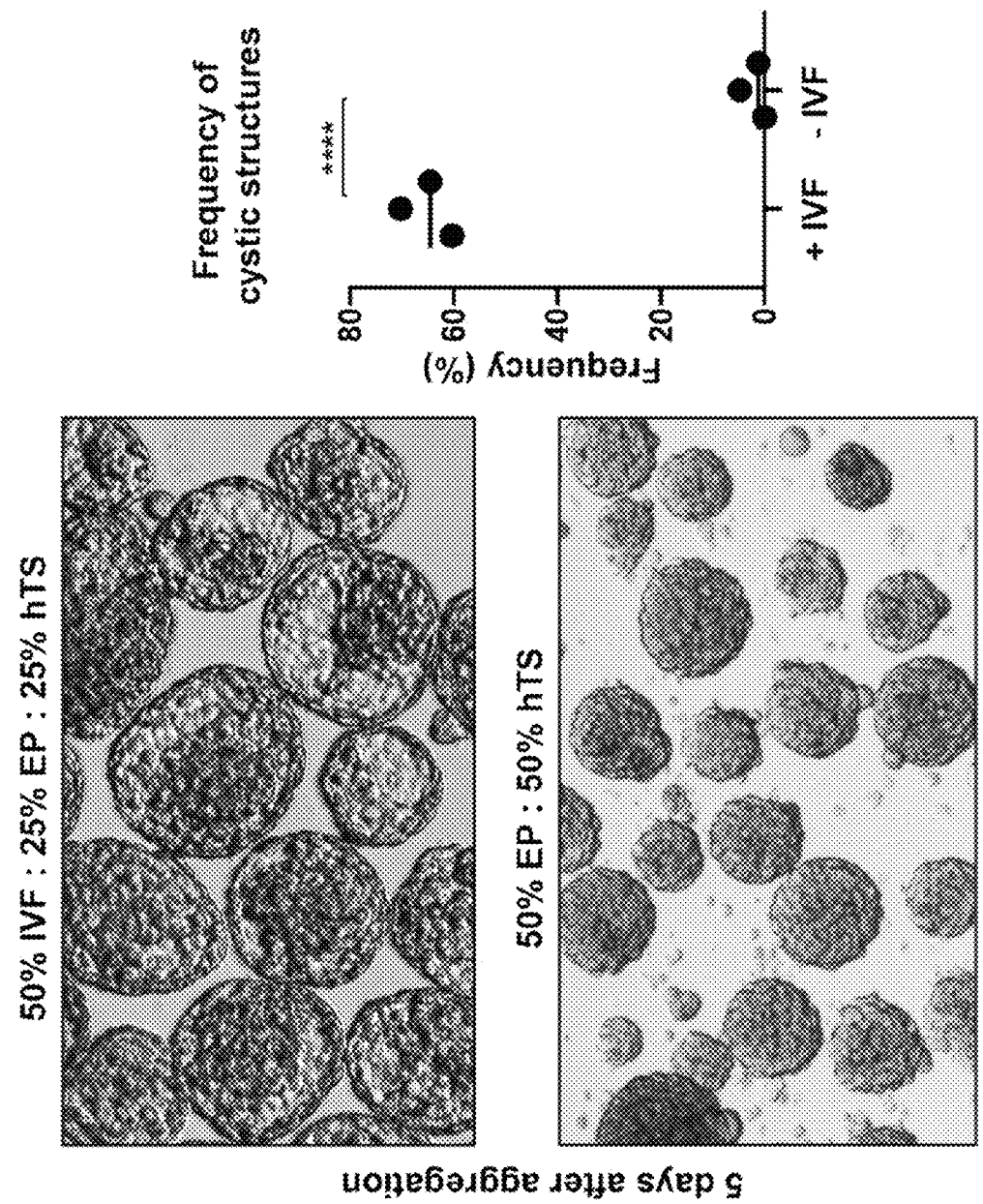
Figure 6C:
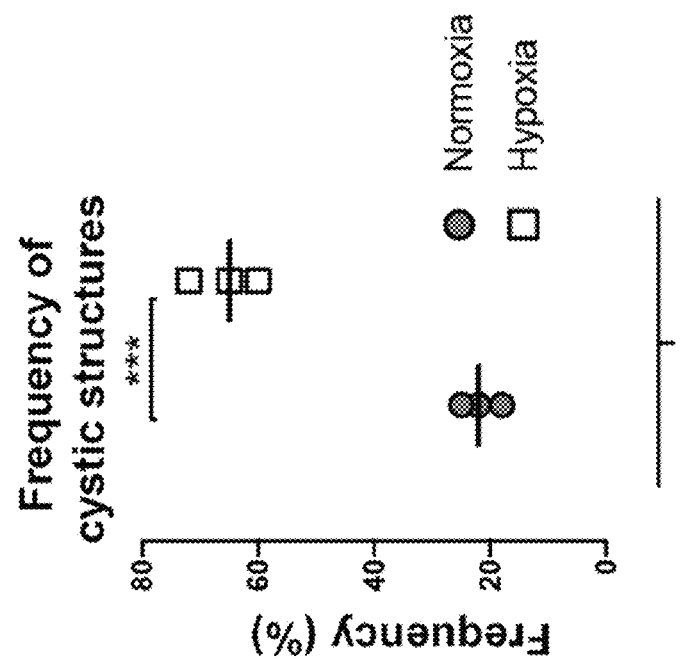
Figure 6C:
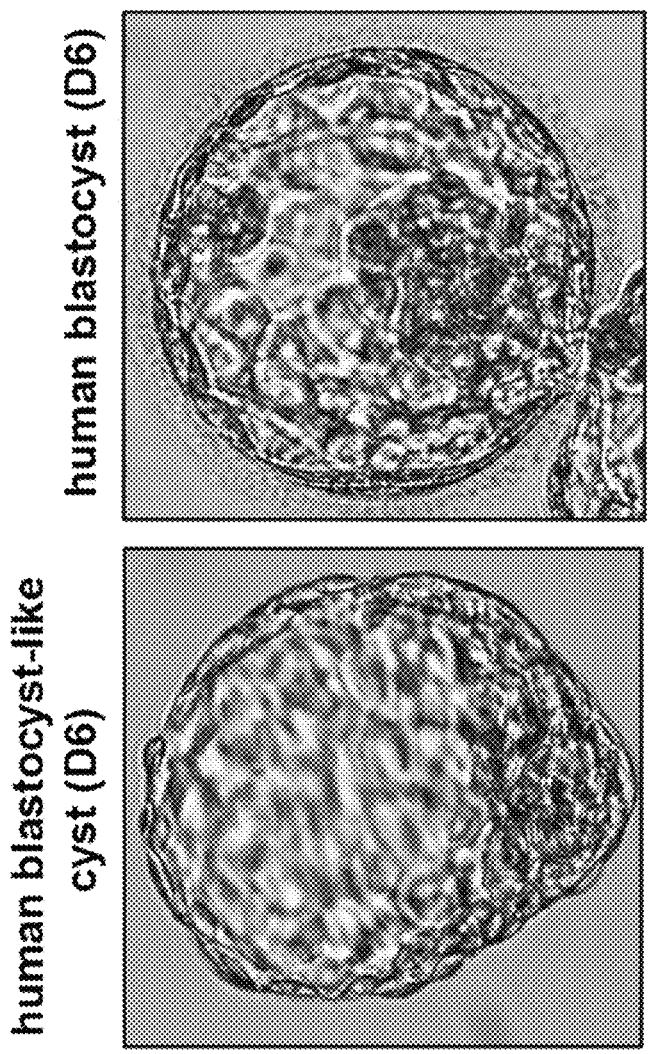
Figure 7B:
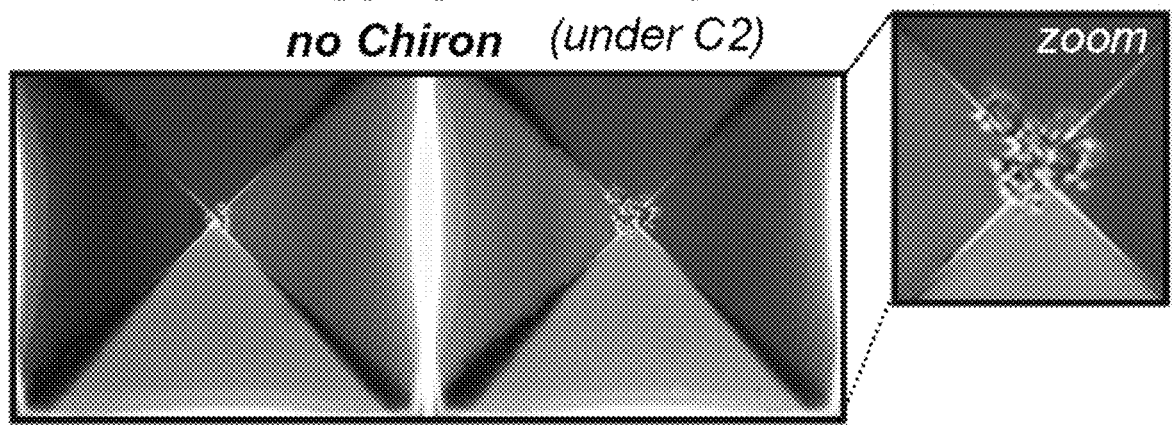
Figure 7C:
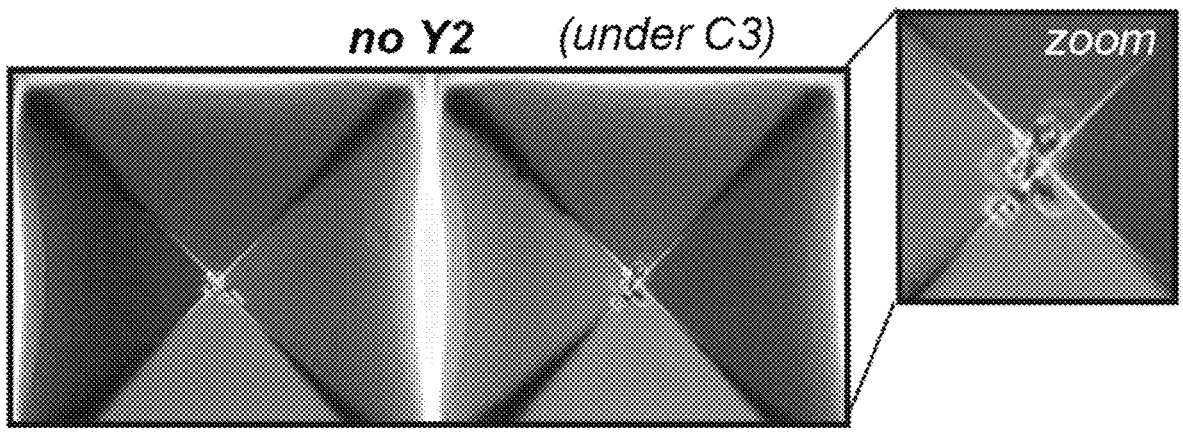
Figure 7D:
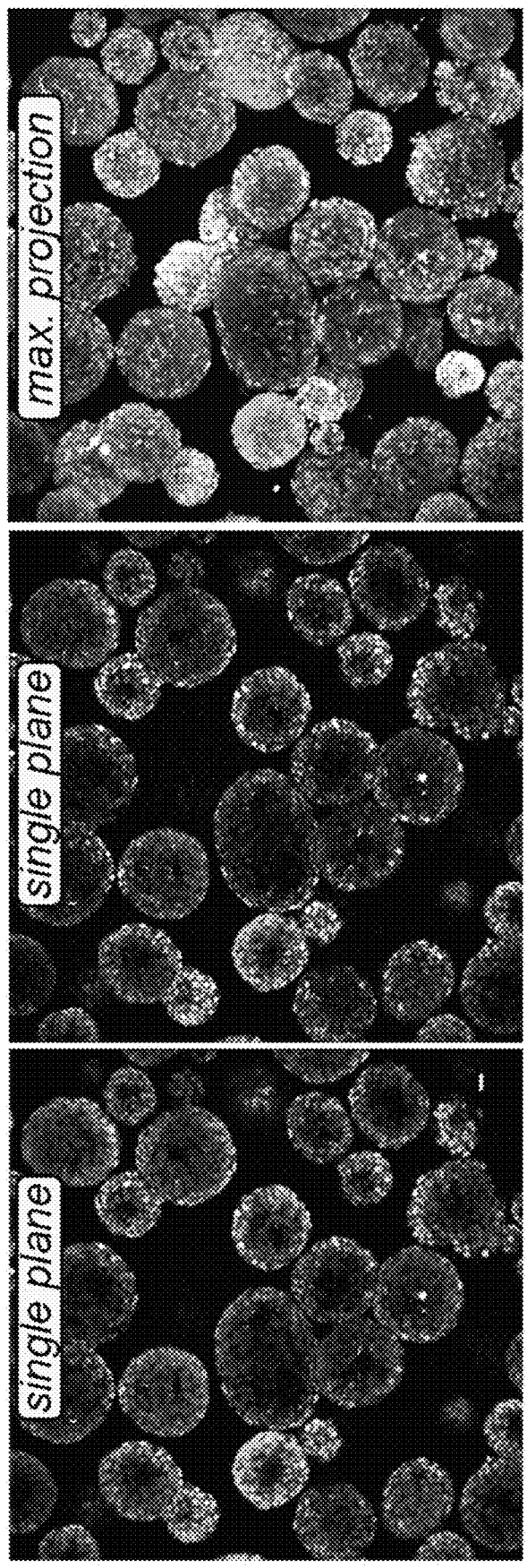
Figure 7E:
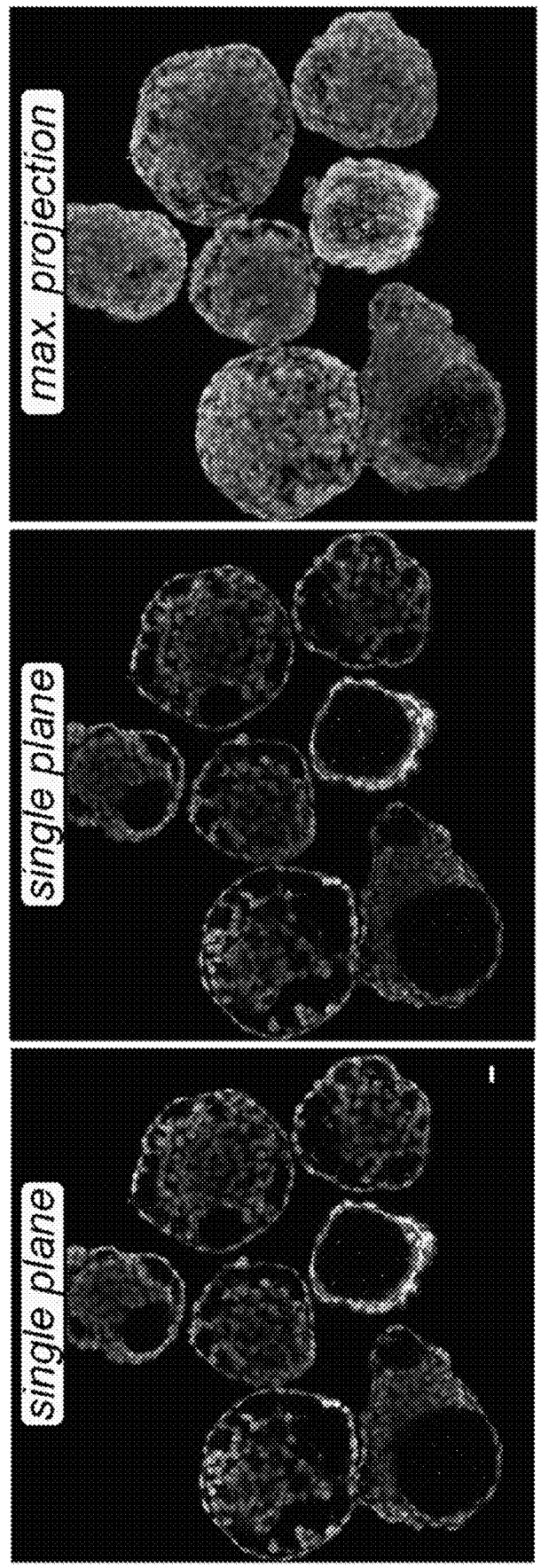
Figure 7F:
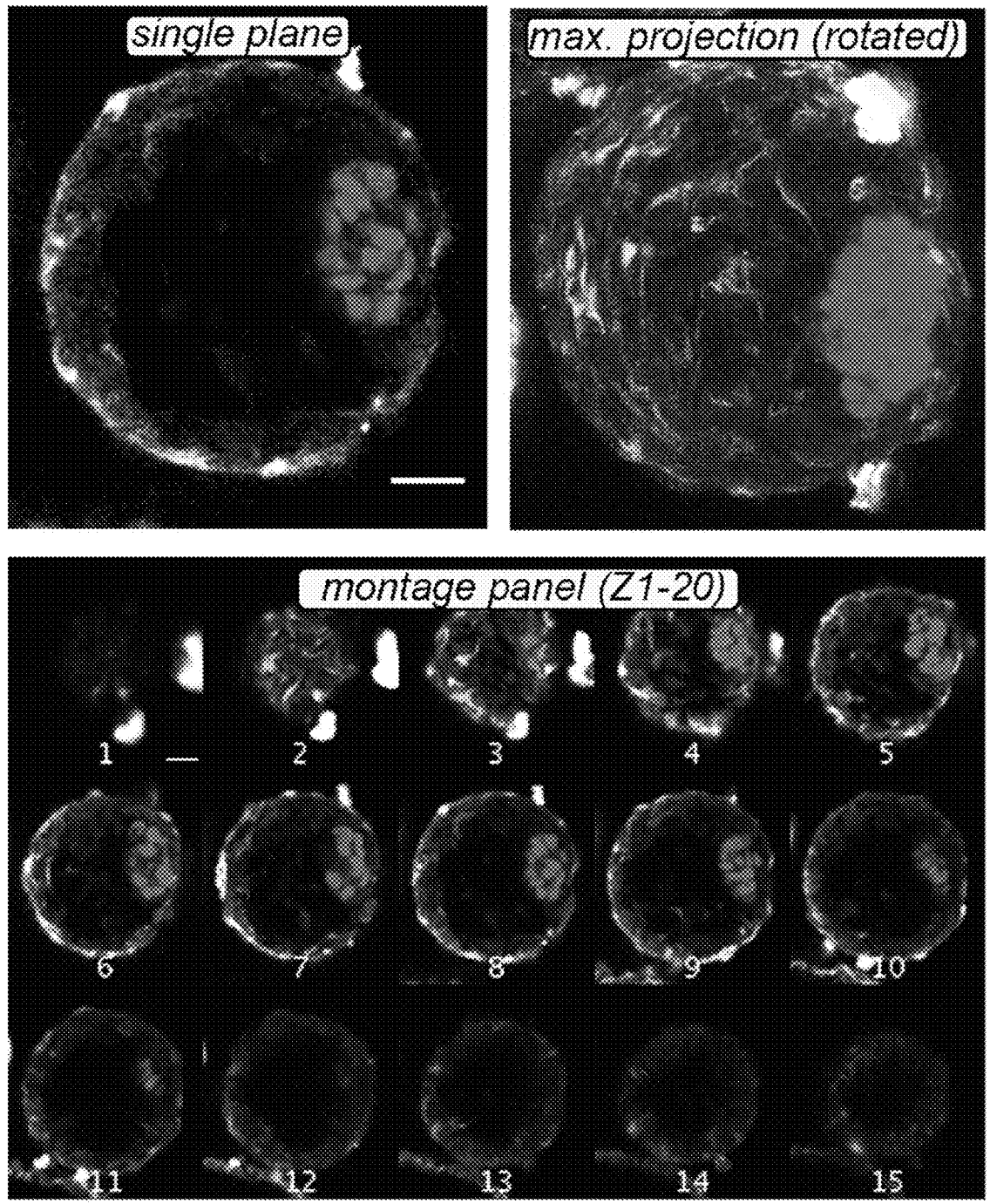

Human pluripotent stem cells (hPSCs) were first converted to hEPSCs through a minimum of 5 passages. The resulting cells acquired morphological features characteristic of pluripotent cells in the naïve state of pluripotency, including dome-shaped colony formation (FIG. 1B). However, flat cell colonies were also observed, a morphological feature characteristic of pluripotent cells in the primed state, present in different ratios after each passage, suggesting the presence of a mixed population of cells in different pluripotent states under EP culture conditions (FIG. 6A). Using a multi-inverted-pyramidal microwell-based 3D culture system, small numbers of hEPSCs (5-6 cells per microwell) were seeded to enable their aggregation and subsequent self-organisation (FIG. 1C). It was first observed that the in vitro culture media normally used for the culture of natural human pre-implantation embryos promoted the formation of cavitated cystic structures (FIG. 6B). Aiming to support the maintenance of pluripotency and to promote TE differentiation, 2 parts of this medium was mixed with 1 part of EP and 1 part of hTSC, two different stem cell base media (without the addition of any growth factors or inhibitors). It was observed that conditions of low oxygen tension (5% $O_2$, similar to conditions for mouse blastoid formation and for the development of natural human blastocysts) facilitated efficient formation of cavitated structures (FIG. 6C).

Figure 1D:
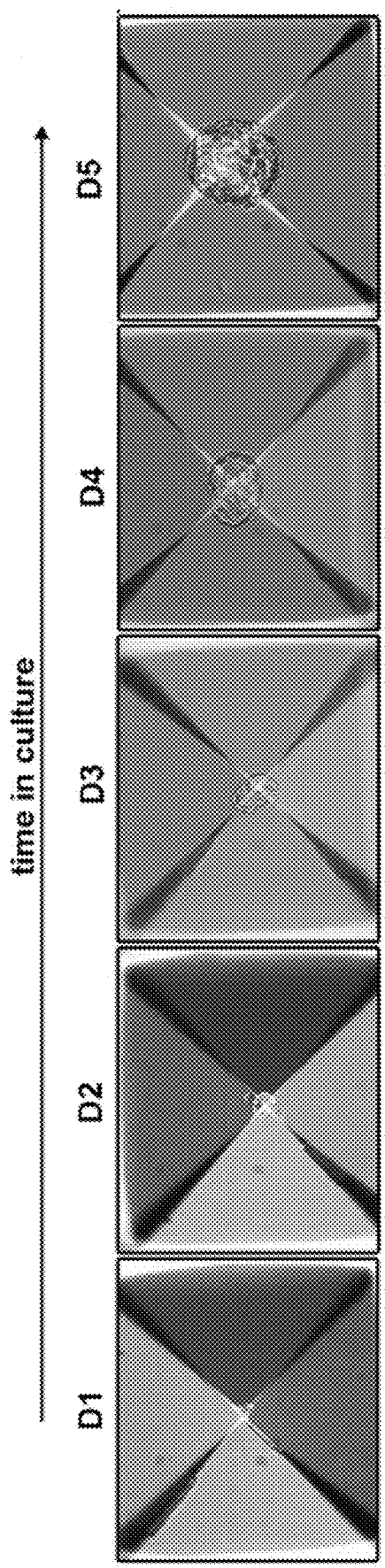
Figure 1E:
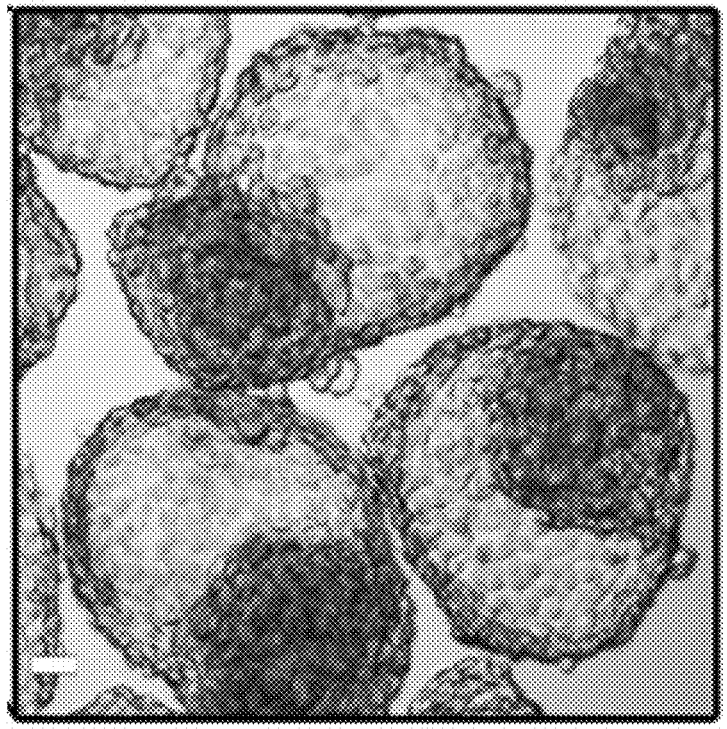
Figure 1E:
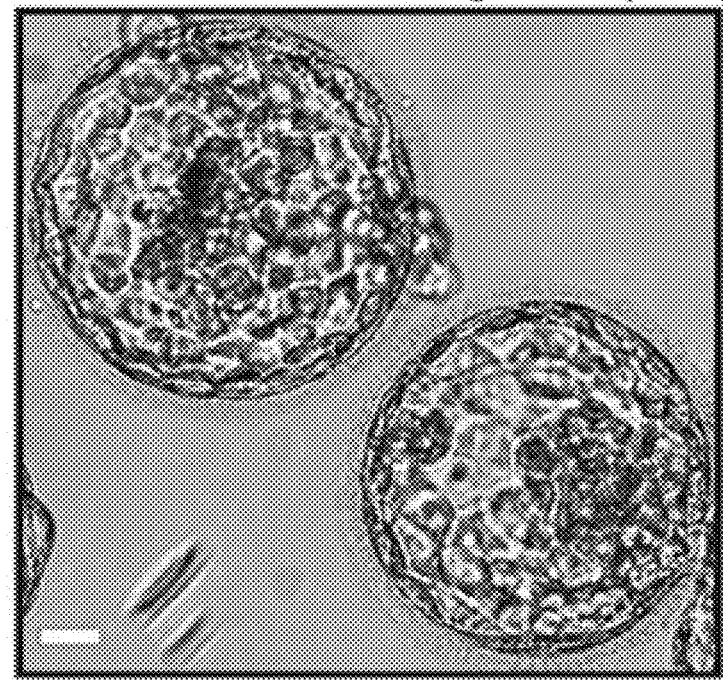
Figure 1F:
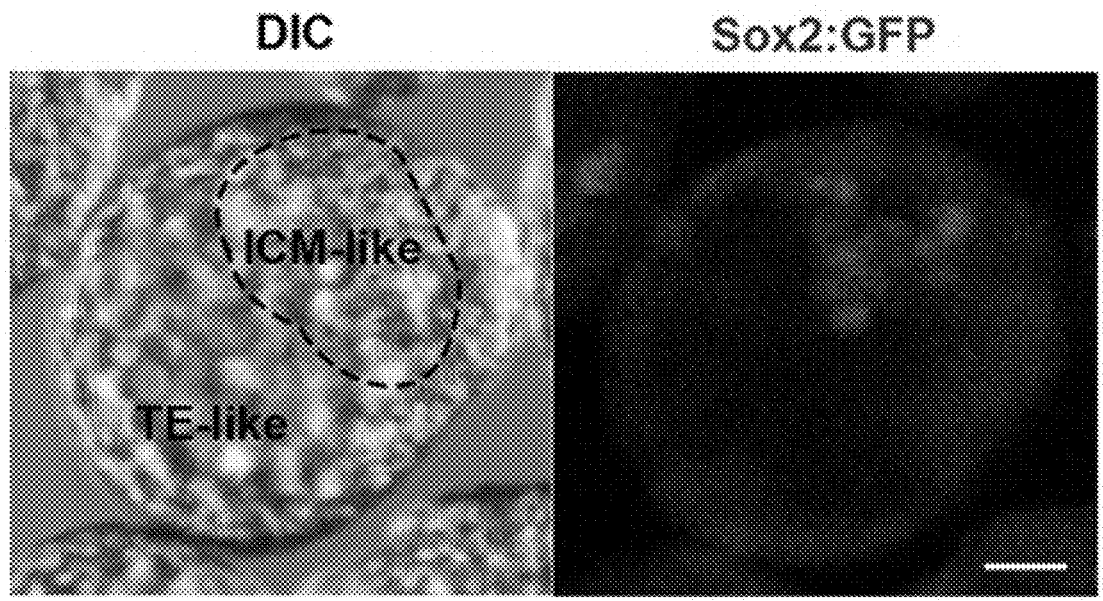
Figure 1G:
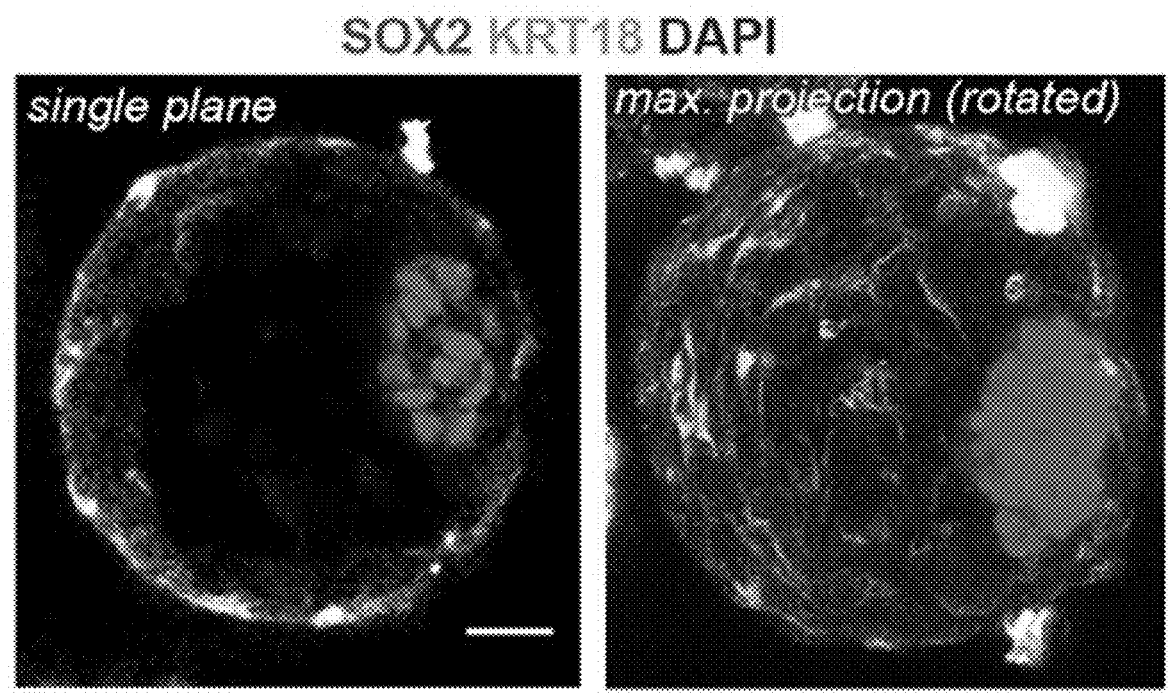
Figure 1H:
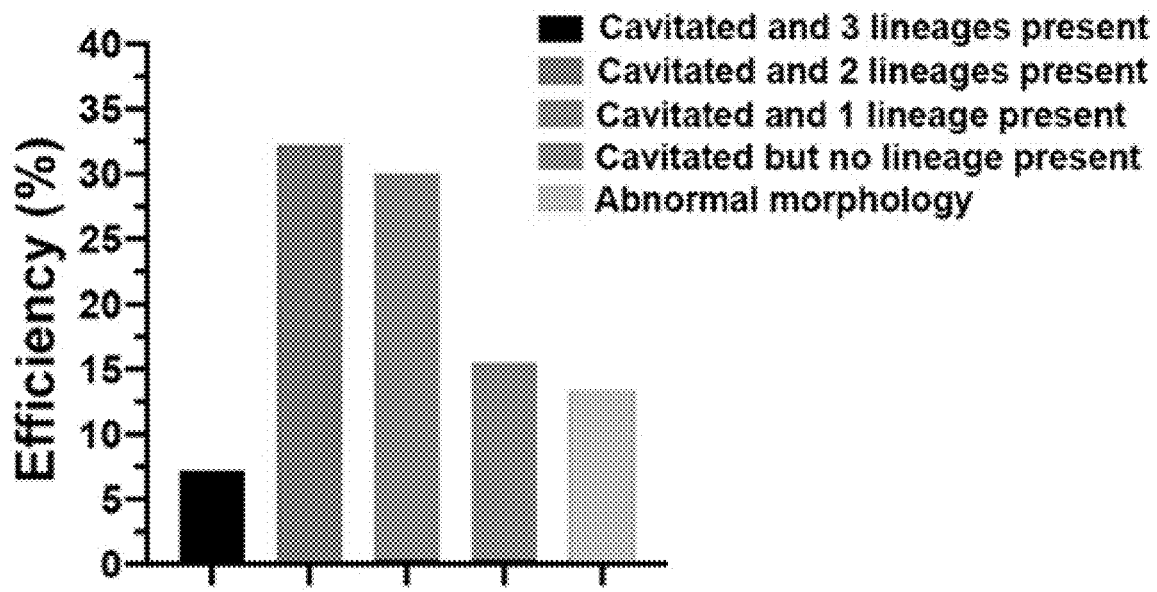
Figure 1I:
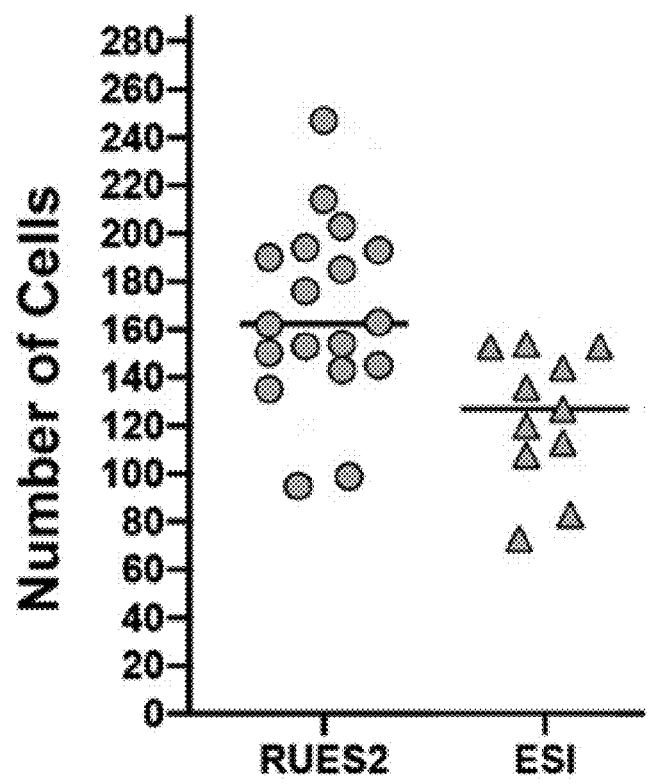
Figure 1J:
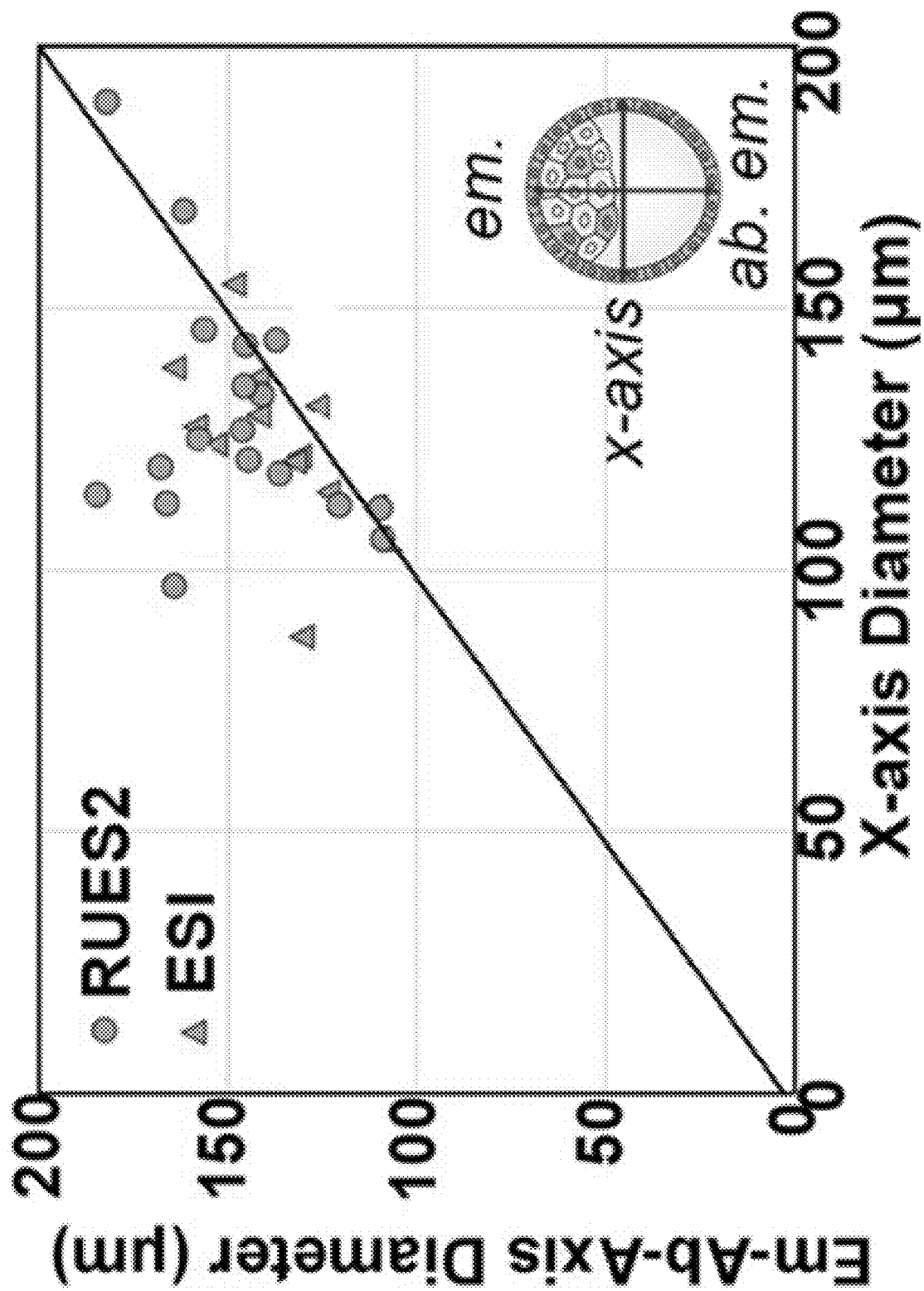

Next, various growth factors, cytokines, and small molecules were screened at widely adopted concentrations, to identify conditions facilitating cavity and early-lineage formation in these structures (FIG. 7A-FIG. 7E). A combination of BMP4 (20 ng/ml), the WNT agonist CHIR99021 (2 µM), FGF2 (40 ng/ml) and ROCK inhibitor Y-27632 (5 uM) during the first 48h of 3D culture was found to enhance cell survival and promote formation of compact cellular aggregates (FIG. 7A-FIG. 7F). Additionally, the cells were pulsed with the ALK5 kinase inhibitor A83-01 (2 µM) to promote TE differentiation for the first 48h of 3D culture, and this inhibitor was removed after this time to avoid a complete loss in pluripotency. Concomitantly, the concentration of FGF2 was decreased by half (20 ng/ml) for the same purpose. Using this optimized condition, the emergence of cavitated structures was observed, 3 to 4 days after cell seeding (FIG. 1D). By day 6 of 3D culture, the structures exhibited a blastocyst-like morphology, forming a cohesive single outside layer, with an enlarged cavity, and an internal acentric compartment (FIG. 1E), of which 7.2% expressed the markers of the three blastocyst lineages, as judged by immunofluorescence analysis of selected markers (FIG. 1F-FIG. 1H). The average cell number and diameter of these hEP-structures were comparable to those of human blastocysts (FIG. 1I-FIG. 1J).

EPSC Aggregates Bear Similarities to Early Human Embryo

Figure 2A:
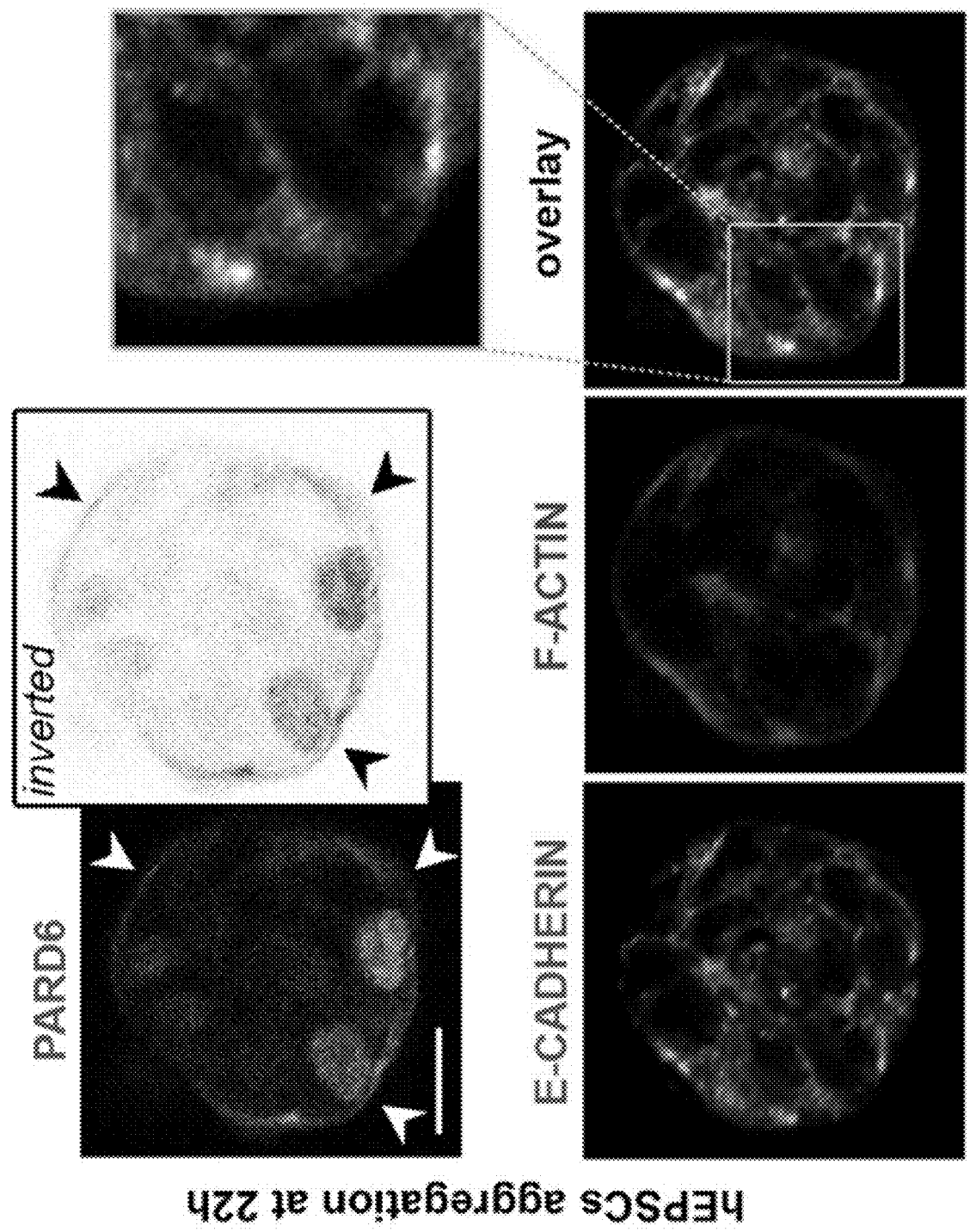
FIG. 2A-FIG. 2G depict exemplary data showing that hEPSC aggregates show similarities to pre-Implantation embryo development.
Figure 2B:
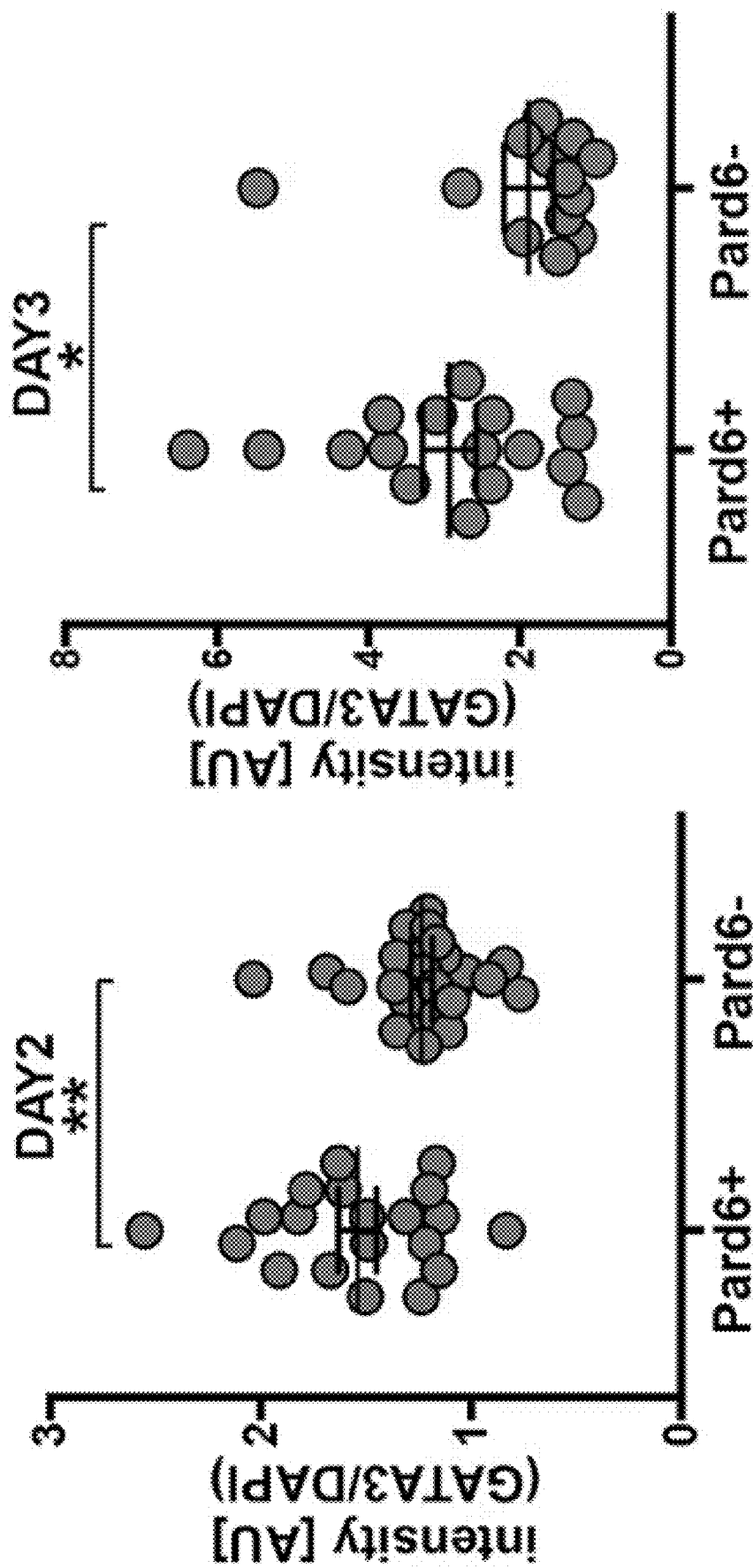
Figure 2C:
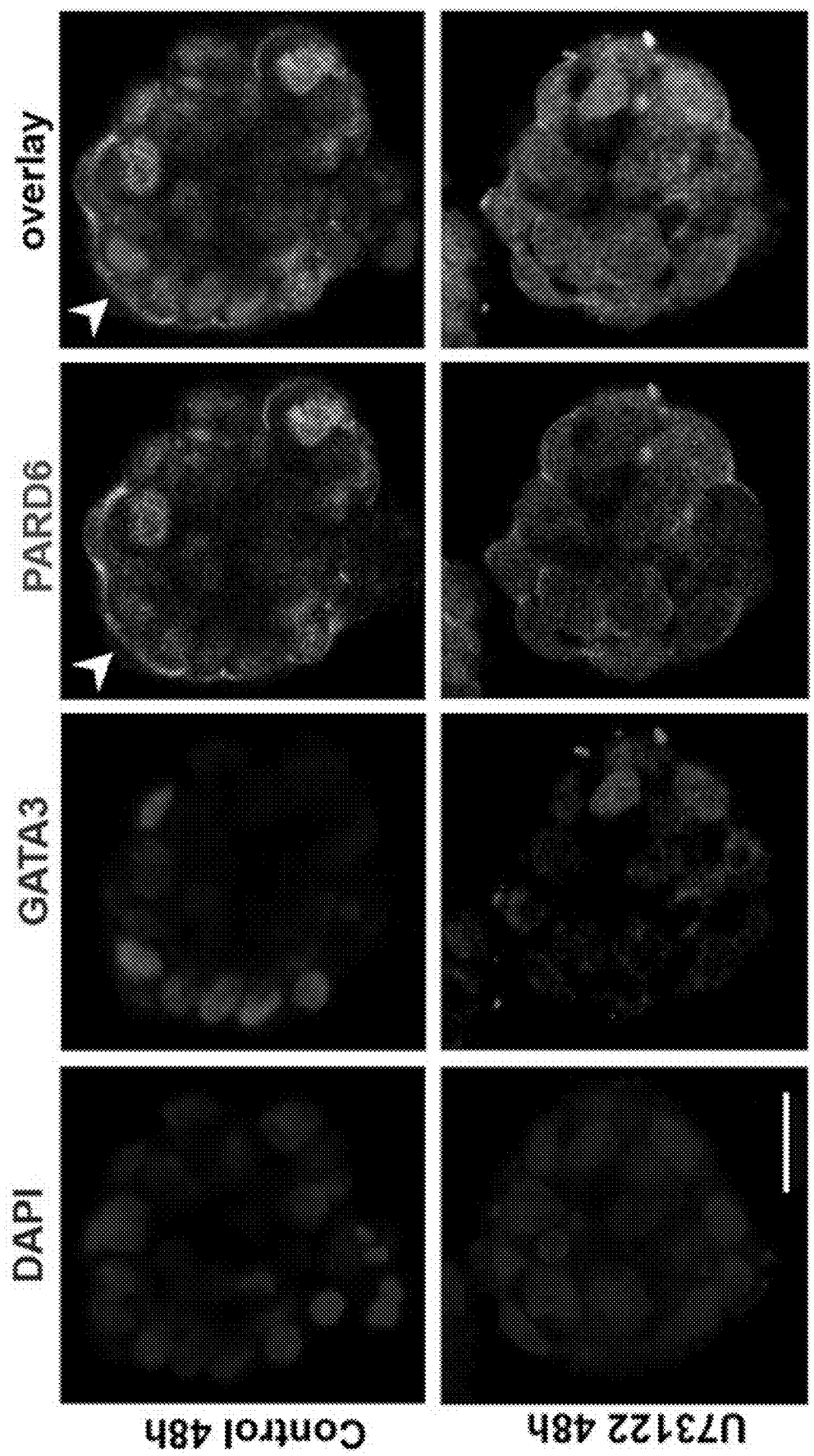

The first lineage segregation event begins with compaction and cell polarisation in the mouse embryo at the 8-cell stage. Only recently have studies begun to shed light on these events in human embryogenesis. Hence, the establishment and dynamics of cell polarisation at the early timepoints of multicellular aggregate formation were analyzed using the presently disclosed methods. The assembly of intercellular junctions was observed, characterised by basolateral localization of E-CADHERIN (FIG. 2A). At the apical surface, distinct enrichment of F-ACTIN and PARD6 was found within the first 48h of cell aggregation (FIG. 2A), indicative of cell polarisation in hEP-structures. Next, the spatiotemporal expression of the transcription factor GATA3 was analyzed, as a marker of TE specification in human embryogenesis. GATA3 was present in the nucleus within both polarised and non-polarised cells at day 2 and day 3 of 3D culture, although its intensity was significantly higher in polarised cells showing apical enrichment of PARD6 (FIG. 2A-FIG. 2B). These findings correlate with observations on natural human embryos at the morula stage (FIG. 2C).

Figure 2D:
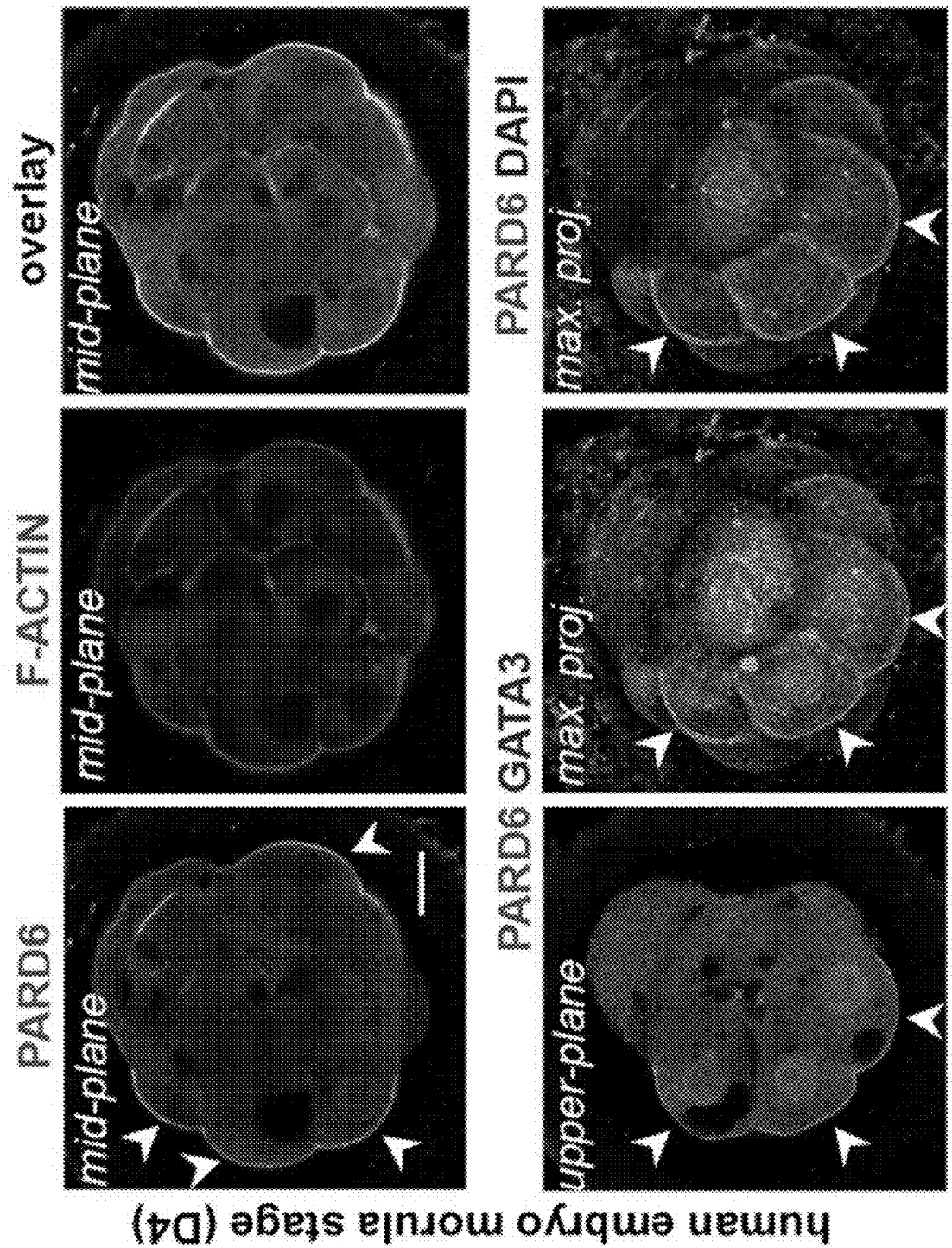
Figure 2E:
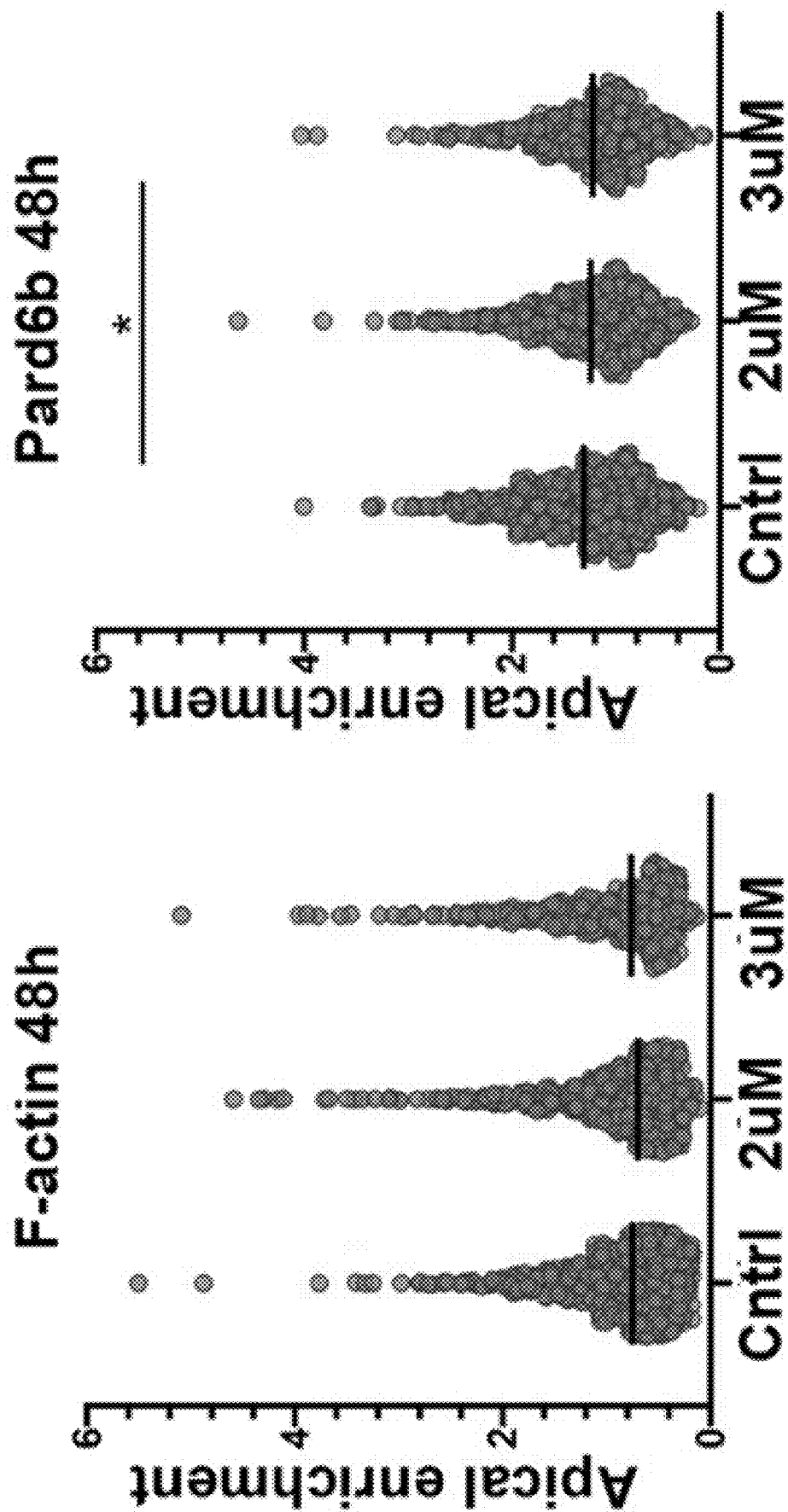
Figure 2F:
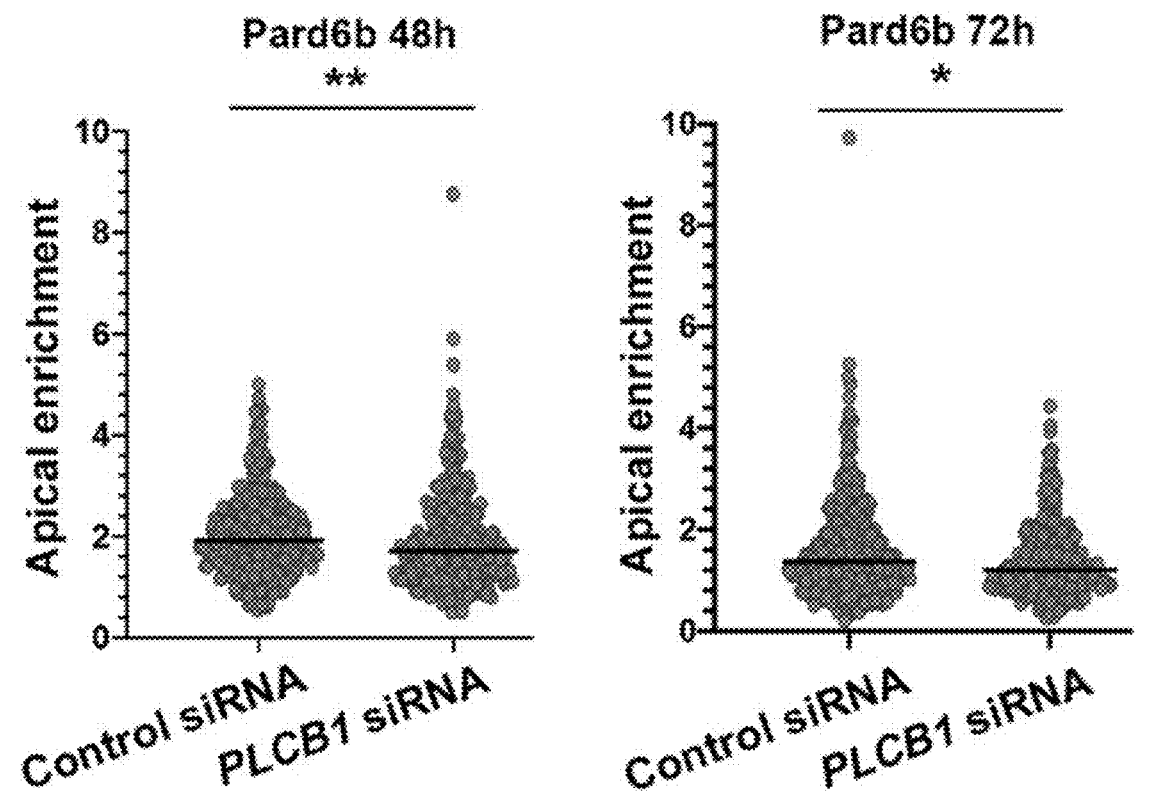
Figure 2F:
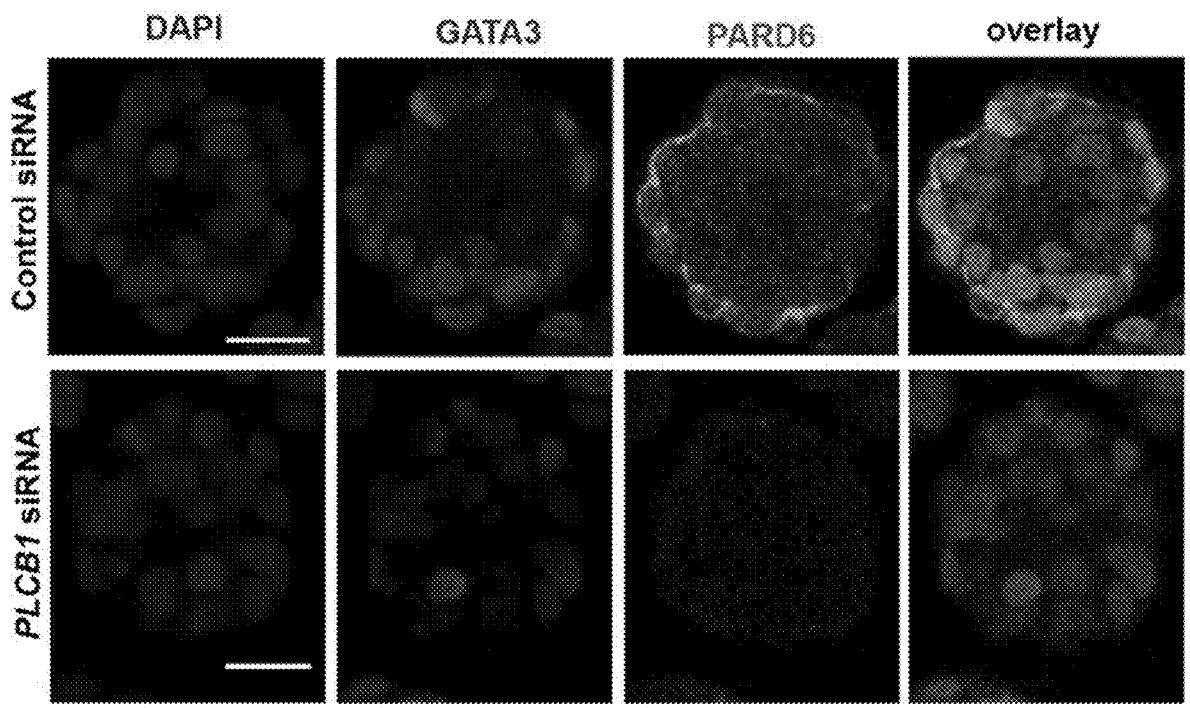
Figure 2G:
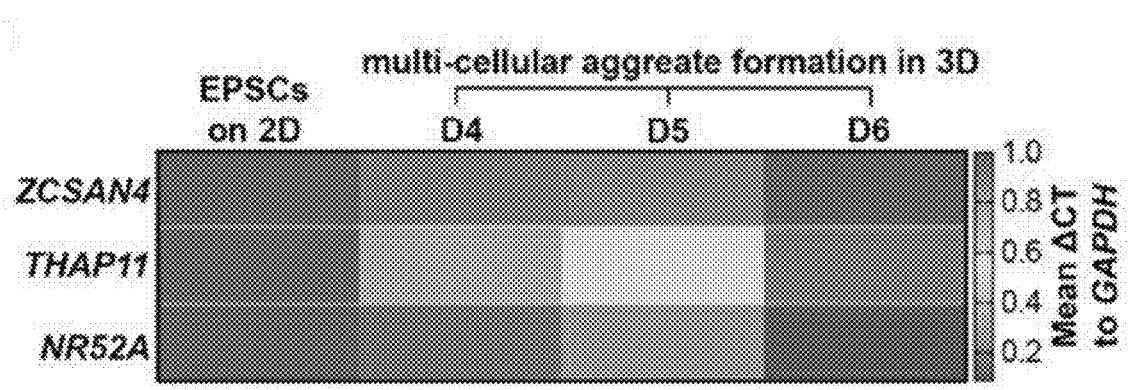
Figure 8A:
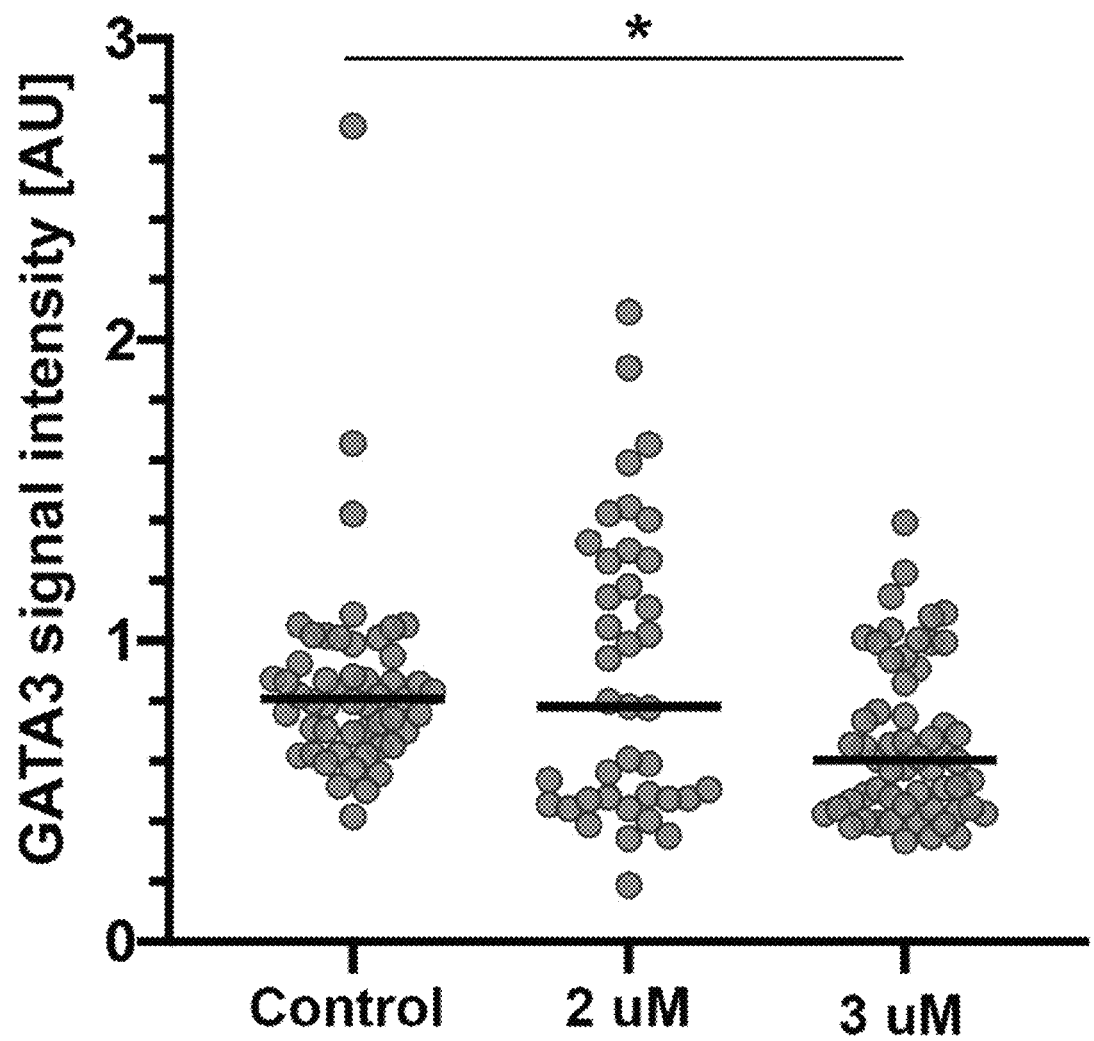
FIG. 8A-FIG. 8C depict exemplary data showing that PLC-Protein Kinase C (PKC) pathway suppression affects polarity establishment.
Figure 8B:
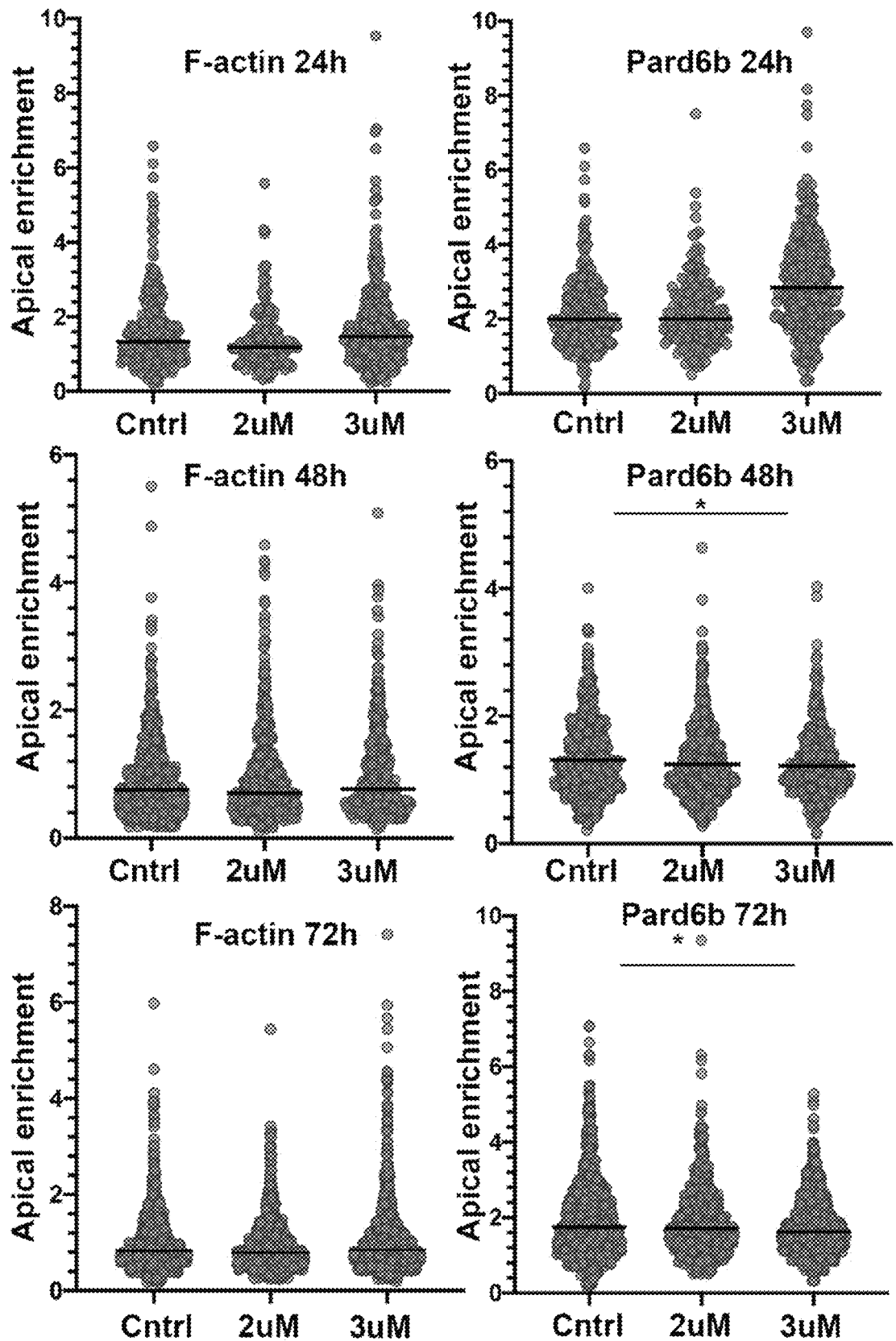
Figure 8C:
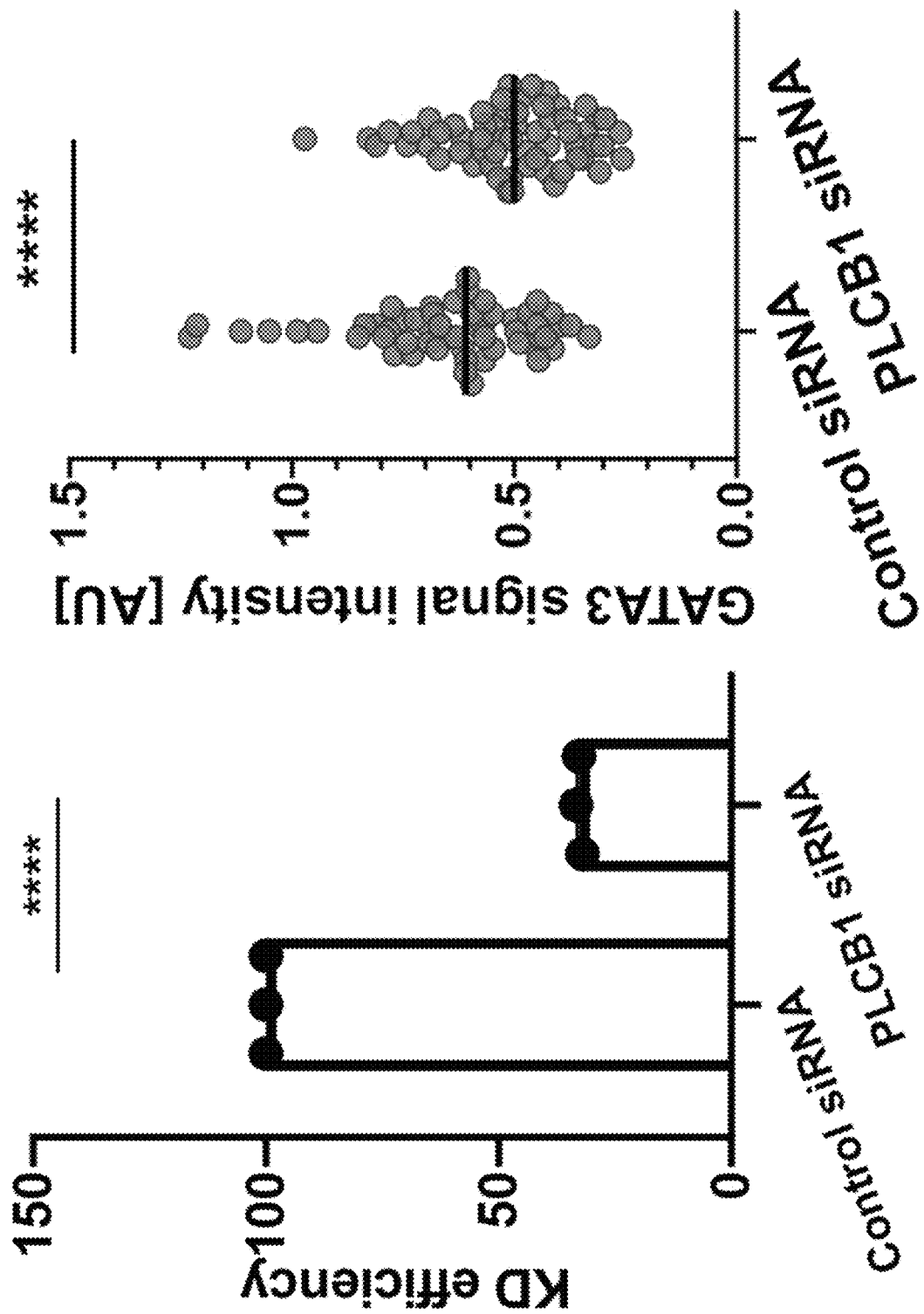

The PLC-Protein Kinase C (PKC) pathway controls cellular polarisation at early stages of mouse embryo development. hEPSC 3D cultures were treated with 2 µM and 3 µM of the PLC inhibitor, U73122. PLC inhibition resulted in a reduction of the nuclear GATA3 signal intensity (FIG. 2D-FIG. 2E, FIG. 8A), which correlated with a decrease in the apical enrichment of PARD6 (FIG. 2D-FIG. 2E, FIG. 8B). To confirm the relationship between polarisation and outer cell commitment, siRNA transfection was used to knockdown (KD) PLCB1 in order to deplete PLC activity in cells during 3D aggregation (FIG. 2F). The depletion of PLC activity was confirmed by qRT-PCR to confirm that RNAi depletion of PLCB1 was effective (FIG. 8C). In agreement with the previous data, a significant reduction was found in both PARD6 and GATA3 expression in hEPSC aggregates at day 3 (FIG. 2F). These results suggest a role for the acquisition of apicobasal polarity in promoting the expression and nuclear localisation of GATA3 to drive TE specification during development of hEP-structures.

Differentiation into Embryonic and Extra-Embryonic Lineages

Figure 3A:
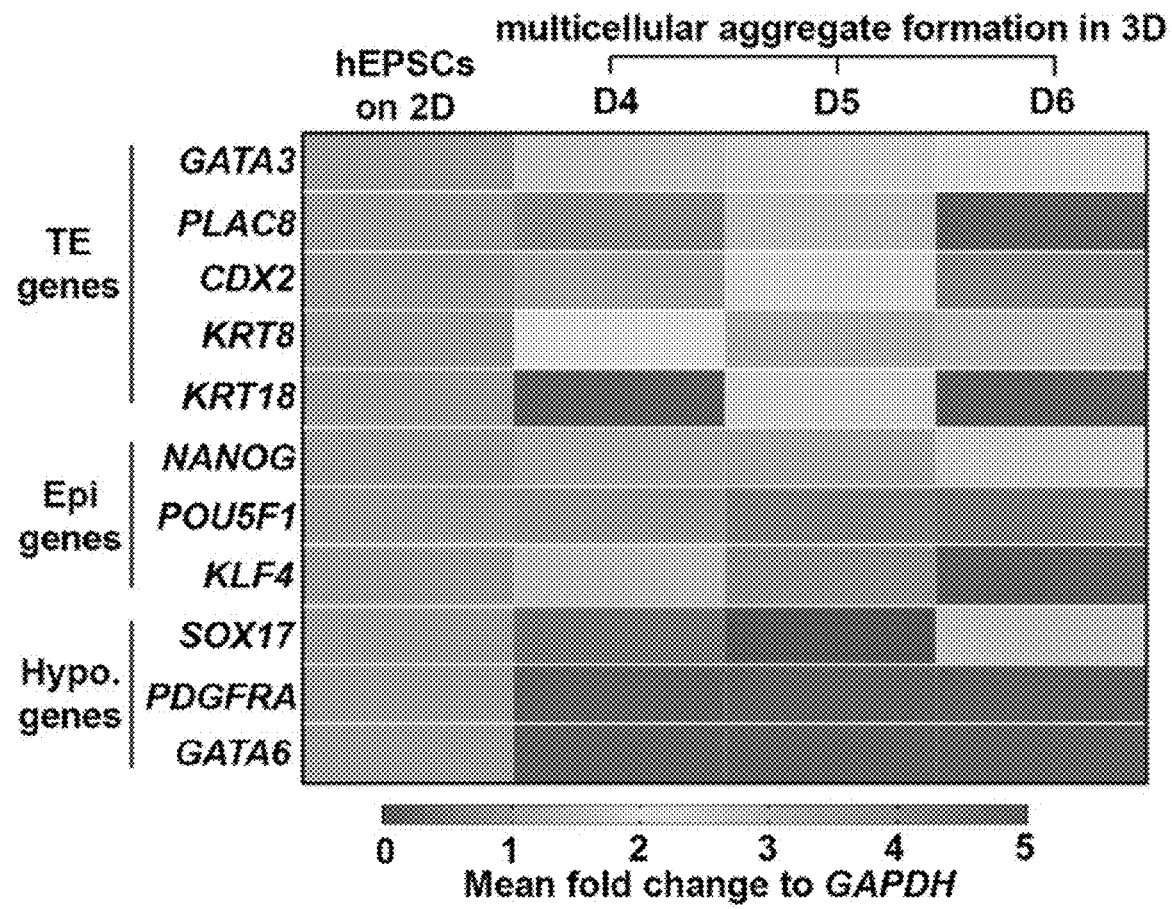
FIG. 3A-FIG. 3F depict non-limiting exemplary data related to specification of blastocyst lineages.

The formation of the blastocyst lineages upon cavitation of hEP-structures from day 4 onwards was investigated next. qRT-PCR was used to examine the expression level of core factors involved in establishing human blastocyst-like lineage identity (FIG. 3A). This analysis revealed that genes involved in TE specification, including PLAC8, CDX2, KRT8 and KTR18, were strongly induced upon formation of cystic structures although GATA3 showed only a marginal increase compared to other molecular determinants of TE identity (FIG. 3A). As expected, crucial transcription factors required for pluripotent EPI specification, including NANOG and POU5F1, showed similar levels of expression in cystic structures as in hEPSCs cultured in 2D, whereas KLF4 was significantly upregulated in the cystic structures (FIG. 3A). Finally, the expression of the core HYPO lineage determinant genes, PDGFRA and GATA6, were found to be highly enriched in cystic structures although SOX17 did not follow this trend (FIG. 3A).

Figure 3B:
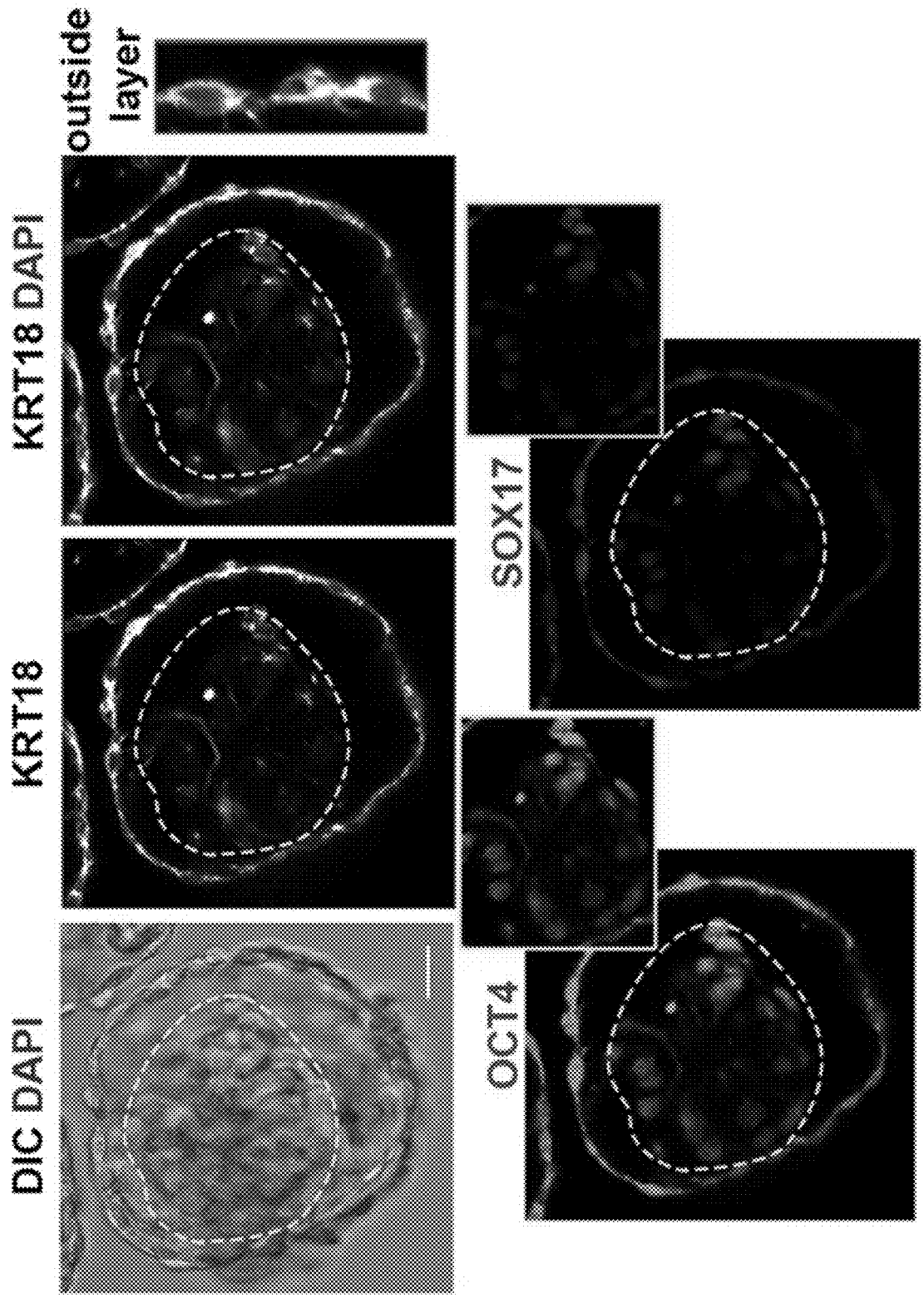
Figure 3C:
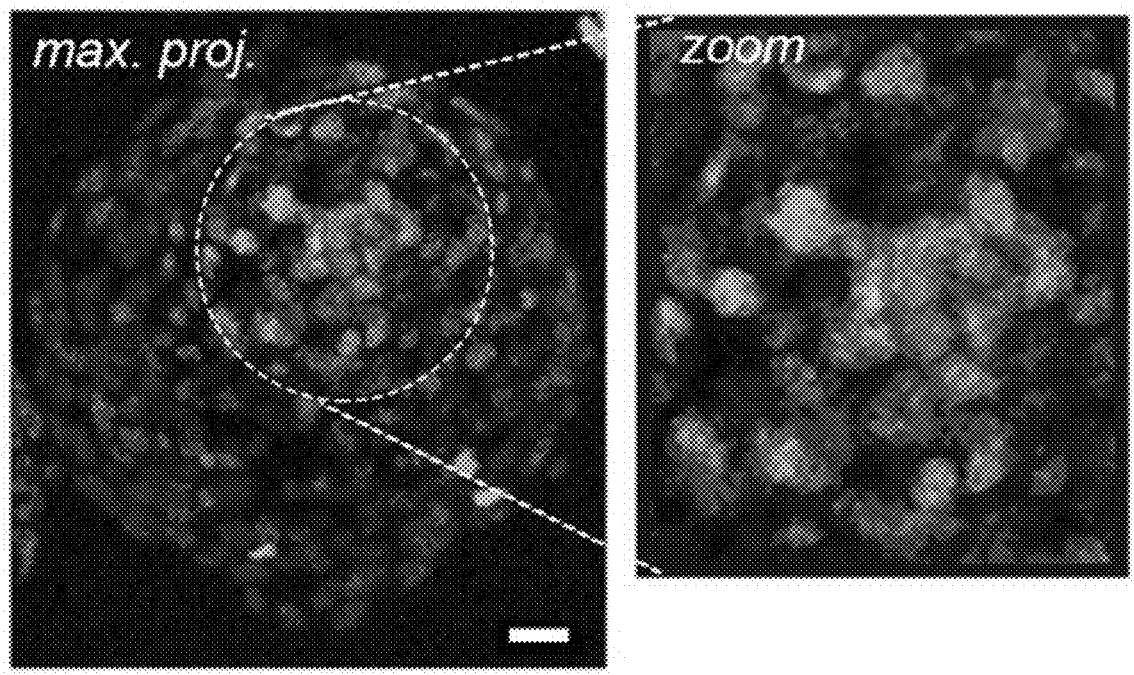
Figure 3D:
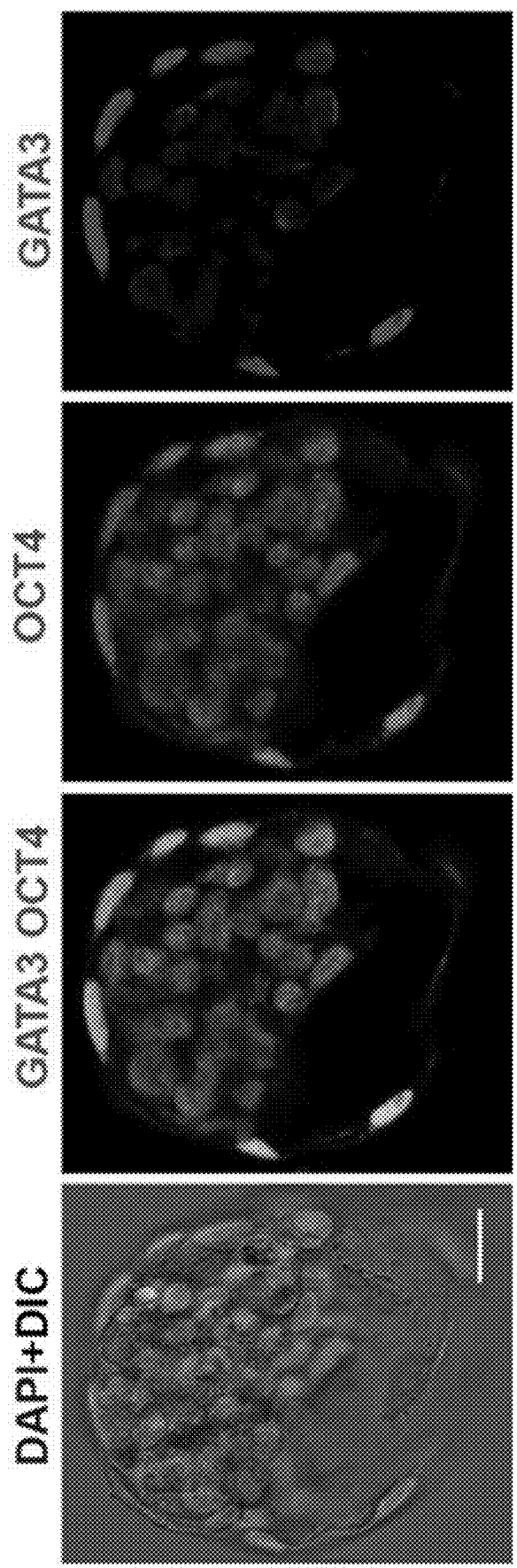
Figure 3E:
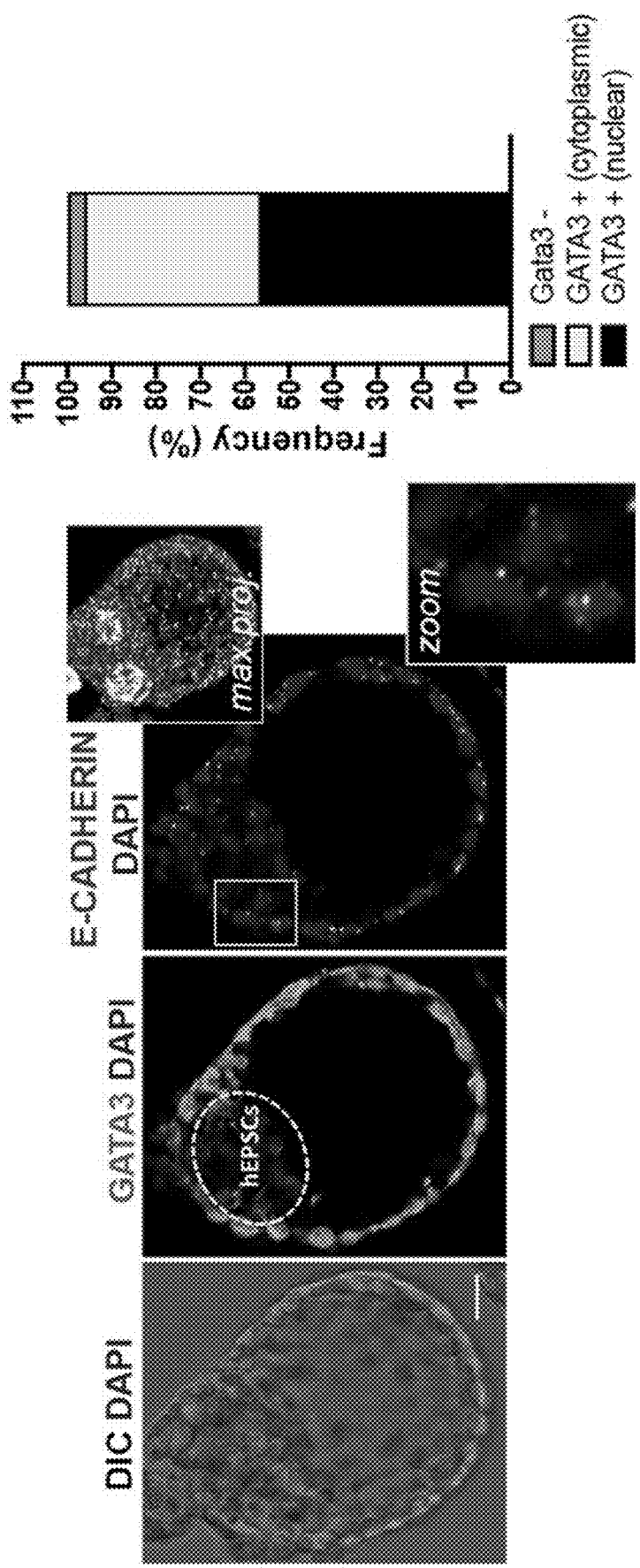

In order to confirm these results spatially and on a protein level, immunofluorescence analysis was performed with well-known lineage markers. In accordance with the findings from qRT-PCR, enrichment for KRT18 was observed in the outside, and expression of OCT4/SOX17 in the inner compartment (FIG. 3B). Specification of the EPI/HYPO-like lineage was confirmed with a second set of markers, SOX2/FOXA2 (FIG. 3C). At day 4, some structures displayed constitutive expression of GATA3 in the outer cell layer while maintaining expression of the hPSC/EPI marker OCT4 (10/23 structures scored) (FIG. 3D). At later timepoints in culture (Day 6, see Methods), some structures maintained GATA3 expression in the outside layer, although this enrichment became mostly cytosolic rather than nuclear (53/135 structures scored) (FIG. 3E). These late-timepoint structures also showed poor expression of E-CADHERIN at day 6 (FIG. 3E). Without being bound by any particular theory, this can indicate a deficiency in junction assembly during the late cavitation process and may, without being bound by any particular theory explain the compromised expression of some TE-specific markers as in vitro development progresses.

Figure 3F:
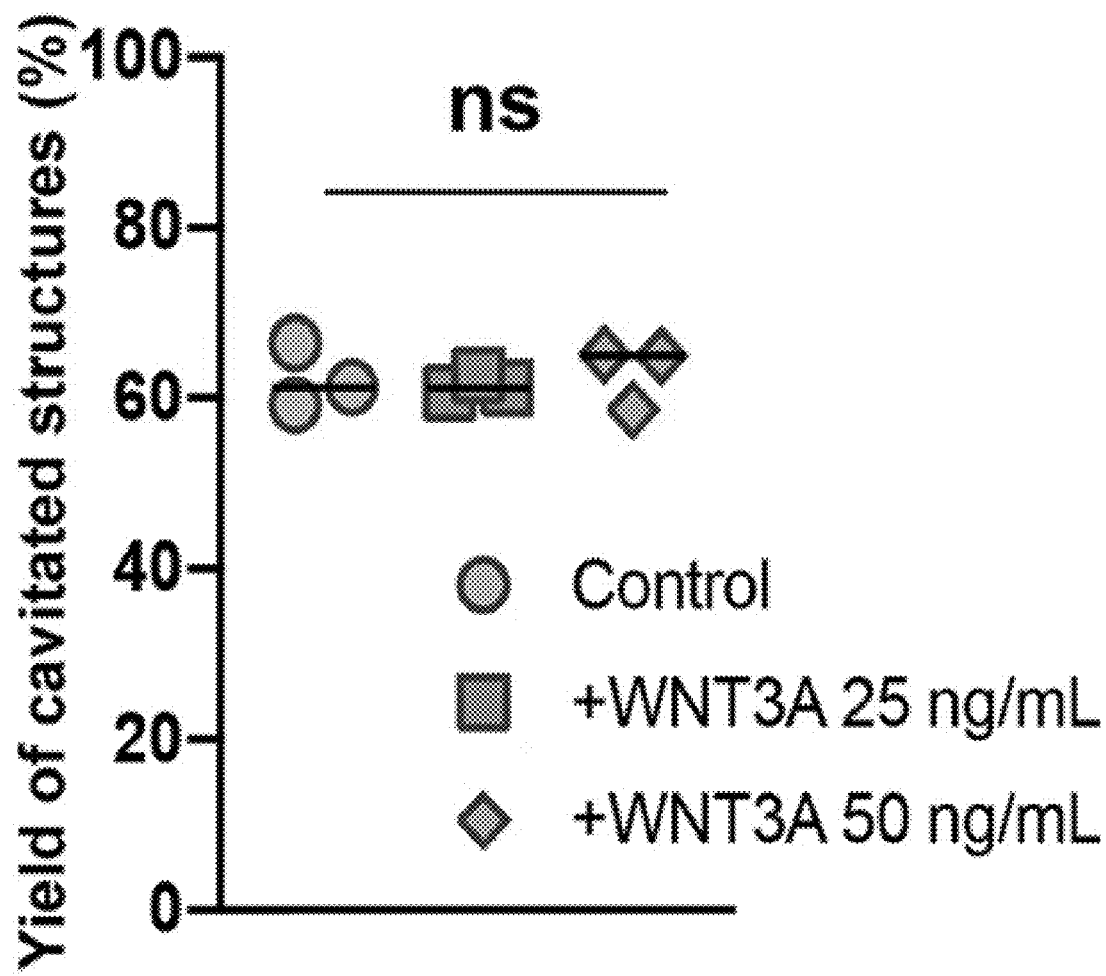

It has been suggested that WNT3A supplementation promotes the cavitation and thus TE-like lineage identity in in vitro mouse blastoid formation, which correlates with canonical WNT expression in the TE lineage during mouse blastocyst development. When this possibility was tested, it was found that addition of WNT3A to the culture media did not make any significant difference to the yield of cavitated structures at day 6 (FIG. 3F). This suggests that WNT3A functions differently in human development than in mouse.

Figure 4A:
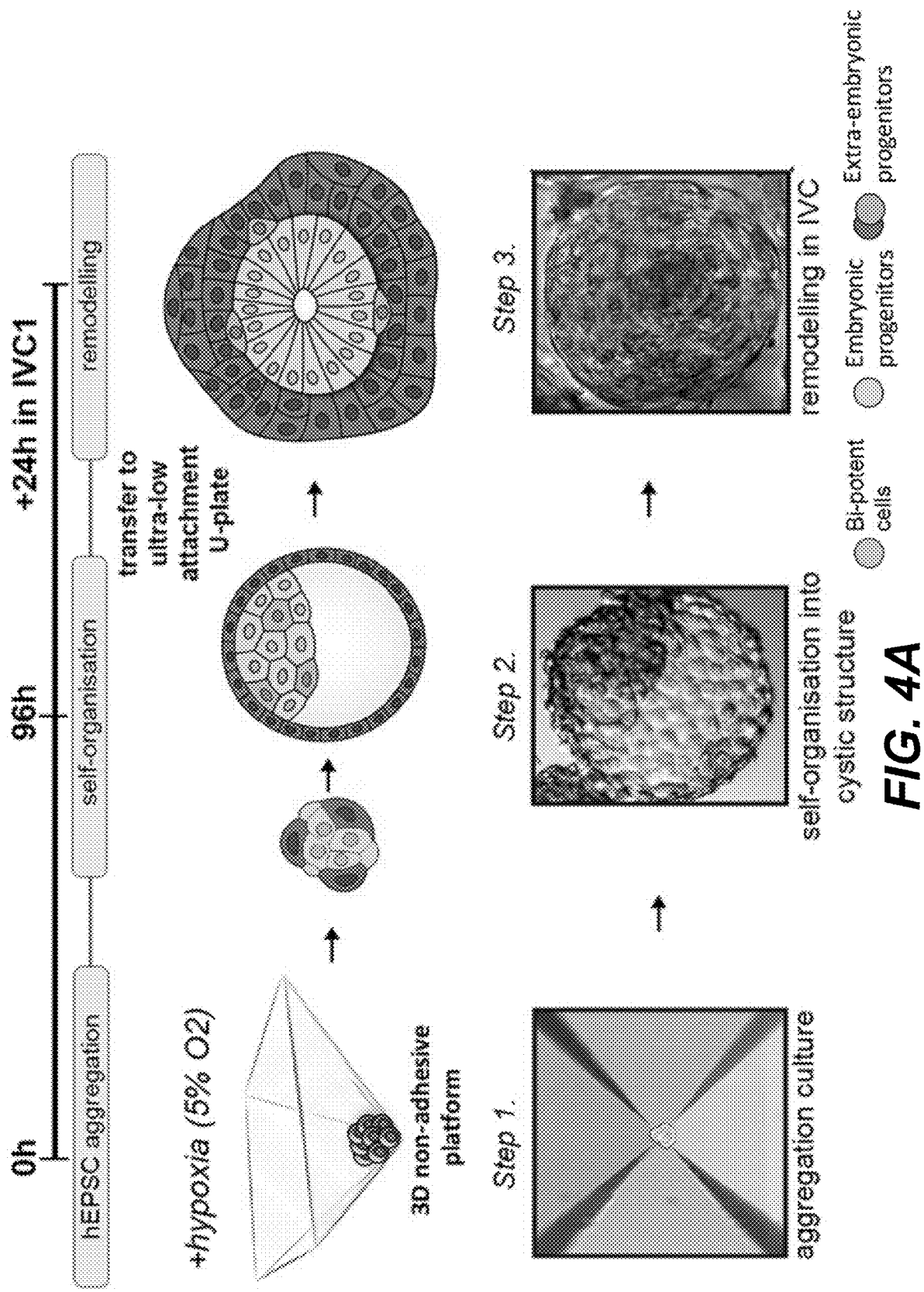
FIG. 4A-FIG. 4E depict non-limiting exemplary data showing that cultured hEPSC-derived cystic structures demonstrate implantation-like morphological remodeling.
Figure 4B:
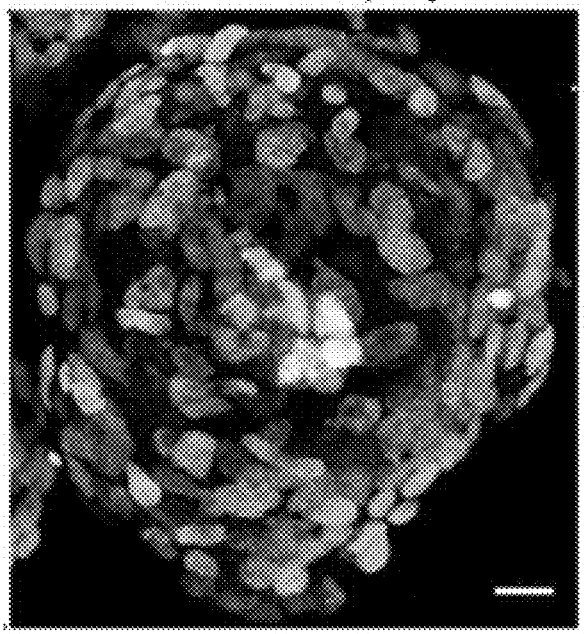
Figure 4B:
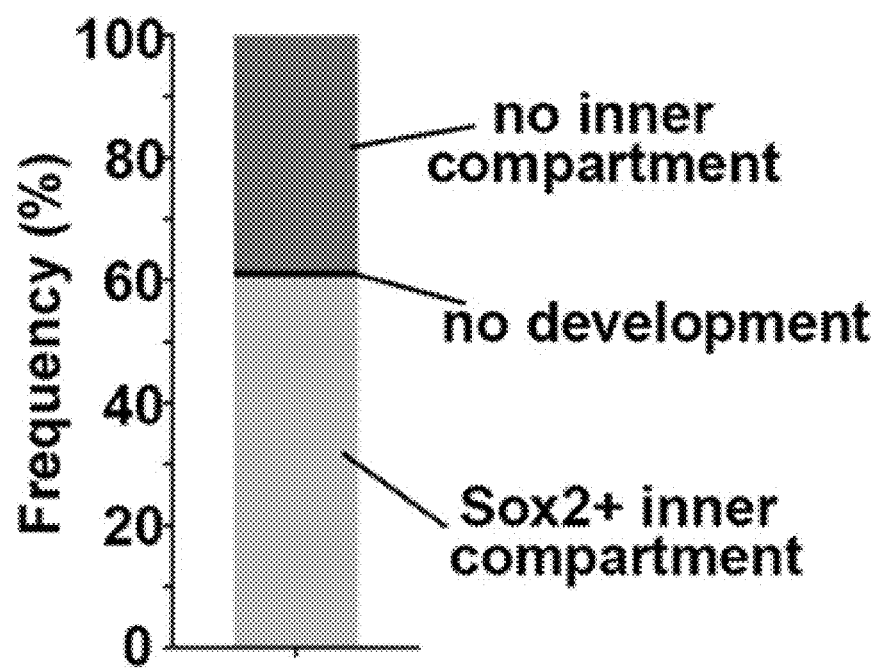
Figure 4C:
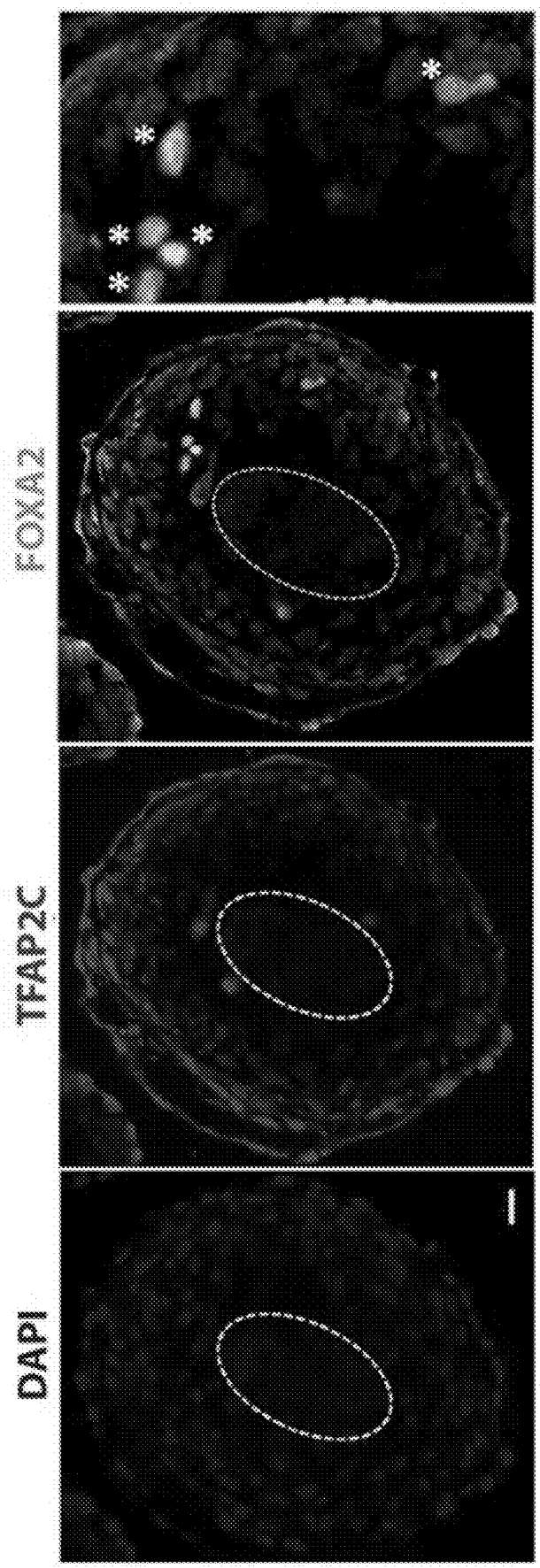
Figure 4D:
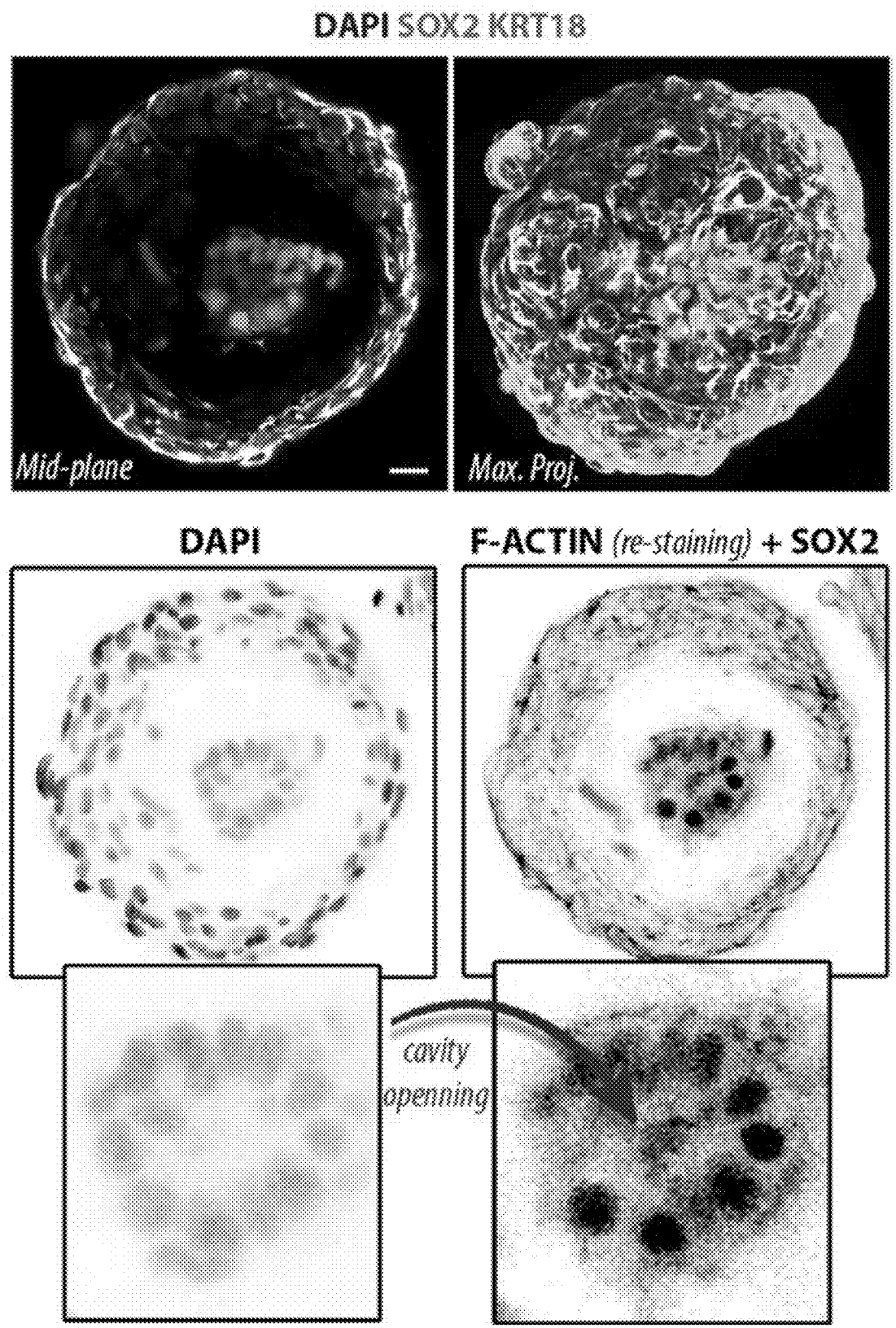
Figure 4E:
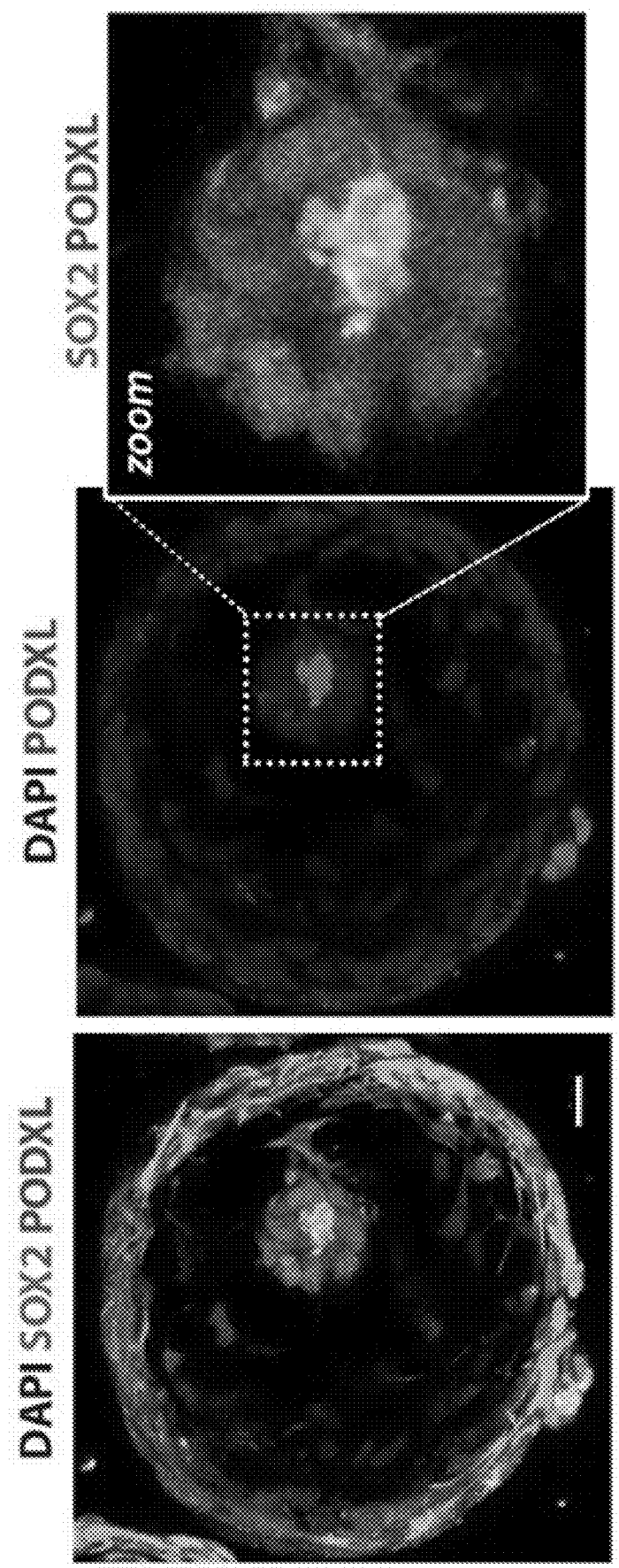

The developmental capacity of these hEP-structures was next tested to develop beyond implantation stages by culturing them in in vitro culture (IVC) platform (FIG. 4A). Within 24h in IVC, the EP-structures reorganised into post-implantation-like disk-shaped morphology, 60% of which had a SOX2 positive EPI-like inner compartment surrounded by a KRT18 and GATA3 positive extra-embryonic-like compartment (FIG. 4B-FIG. 4D) with some structures also specifying FOXA2-expressing cells suggesting a HYPO-like specification (FIG. 4C). Significantly, it was found that within 24h in IVC, SOX2 positive cells in the EPI-like inner compartment became radially organised around a small central lumen (FIG. 4D). The formation of a small lumen was confirmed by PODXL expression (FIG. 4E). This indicates that hEP-structures are able to undertake the cell rearrangements characteristic of early post-implantation human morphogenesis.

Figure 5A:
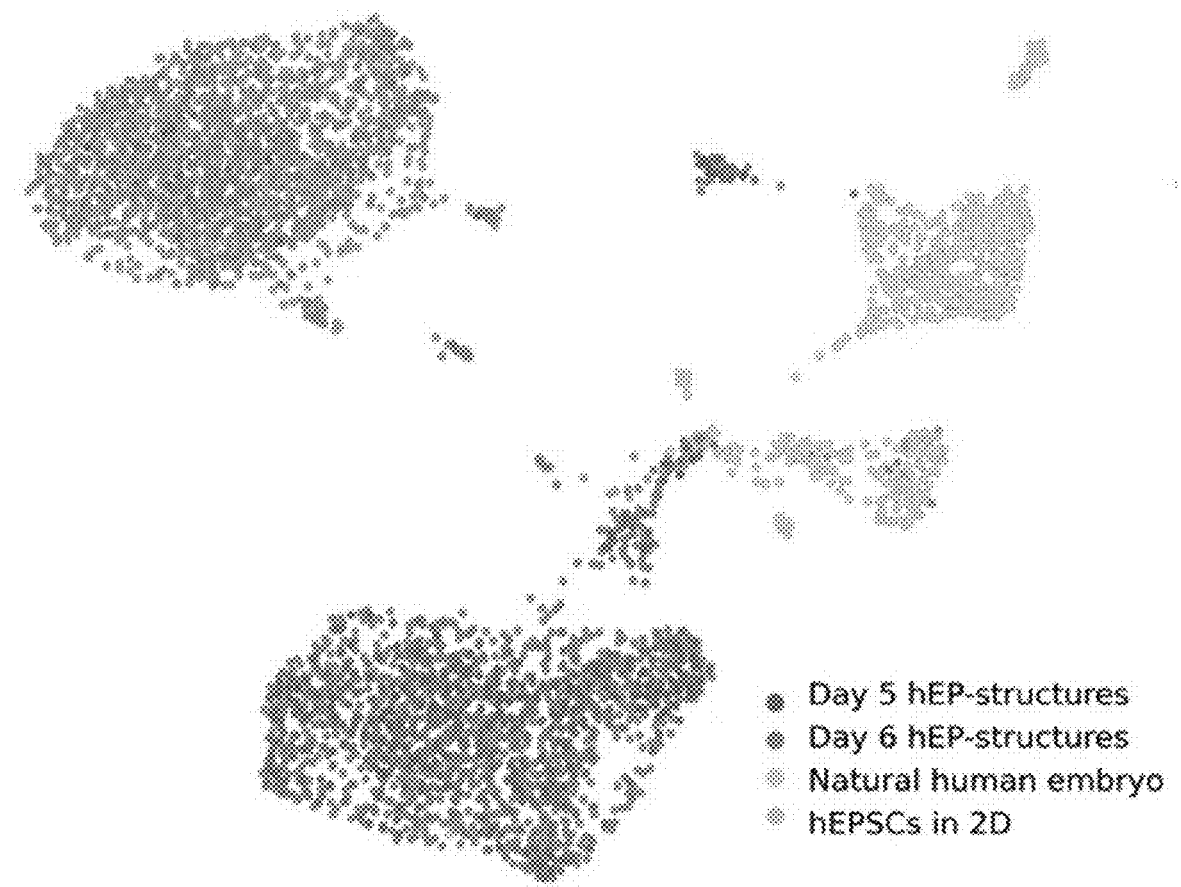
FIG. 5A-FIG. 5F show non-limiting exemplary scRNA-seq analysis of hEPSC-derived cystic structures.
Figure 5B:
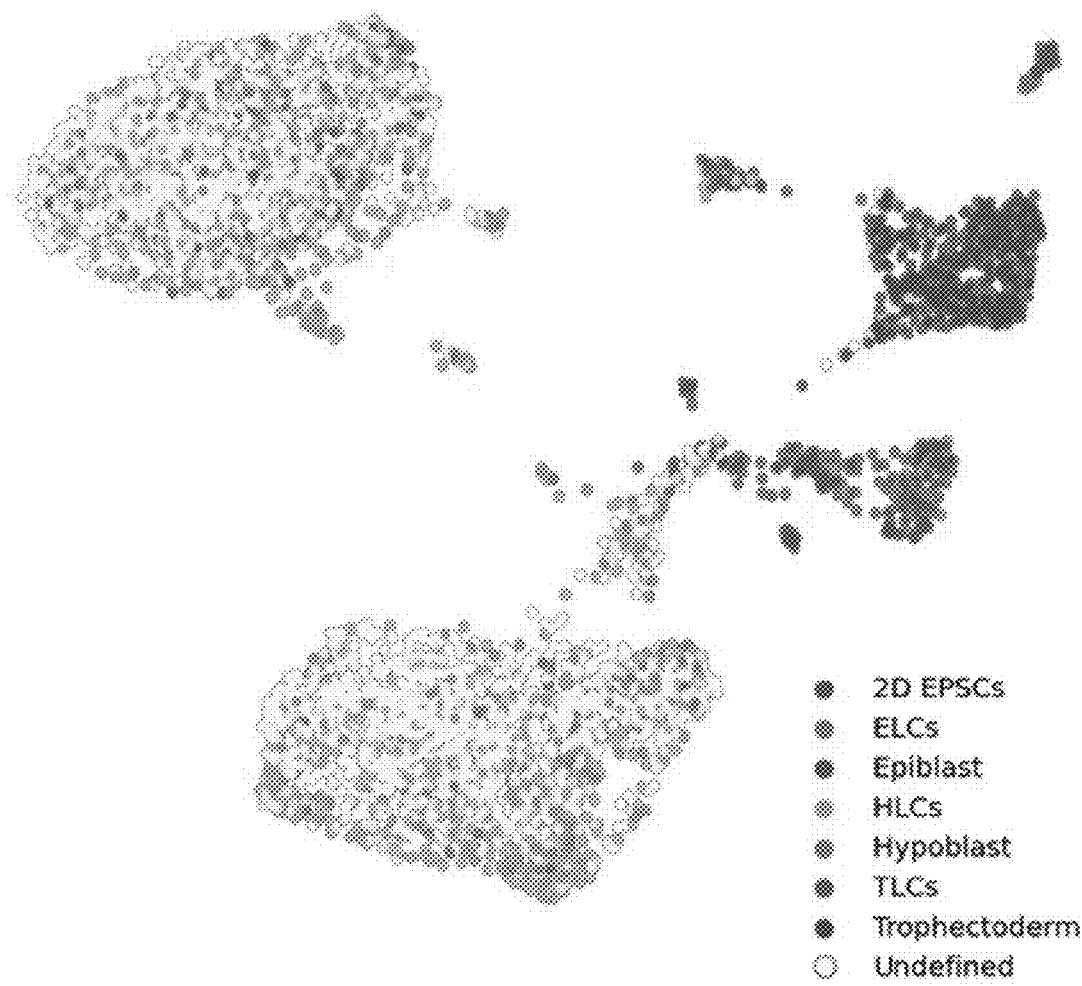
Figure 5C:
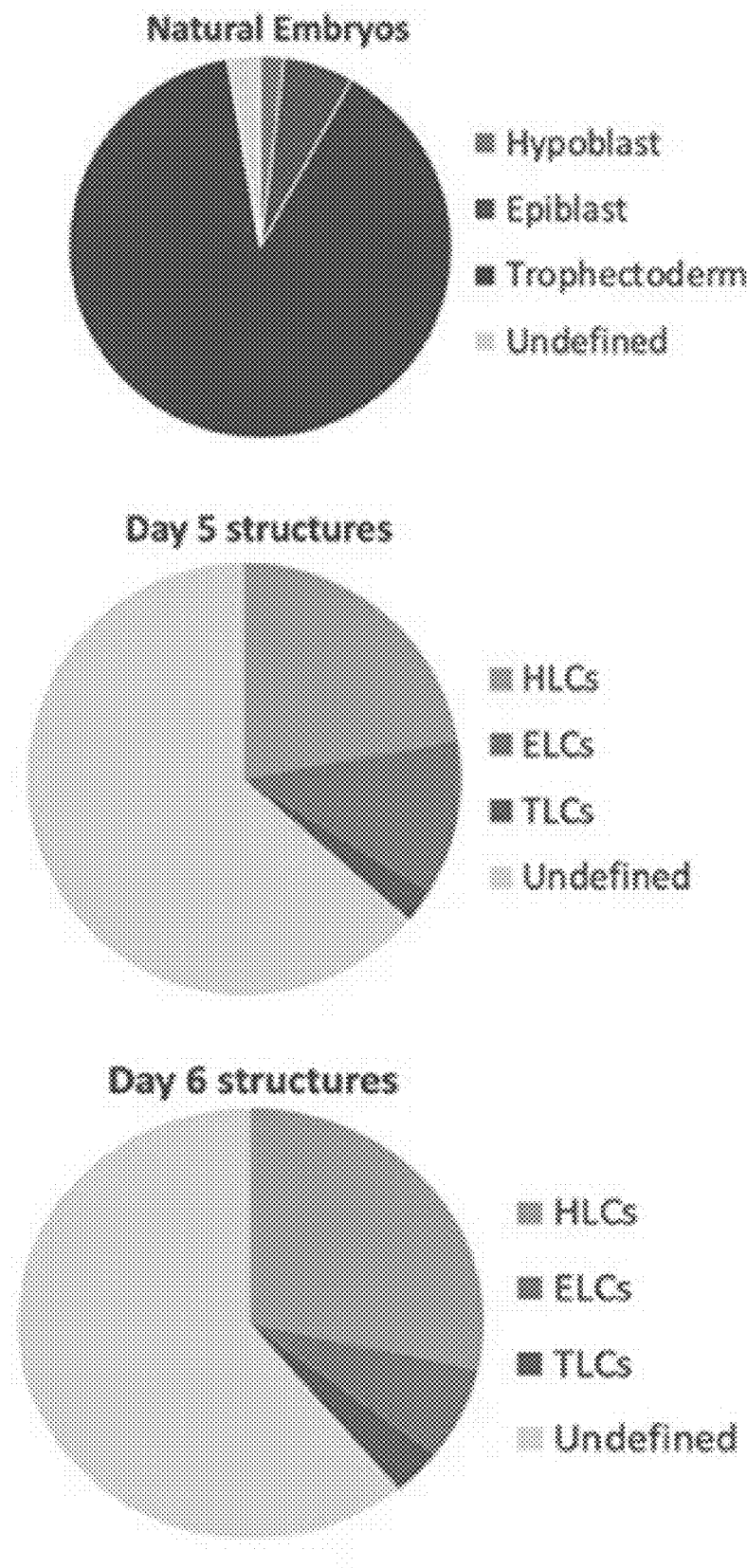
Figure 5D:
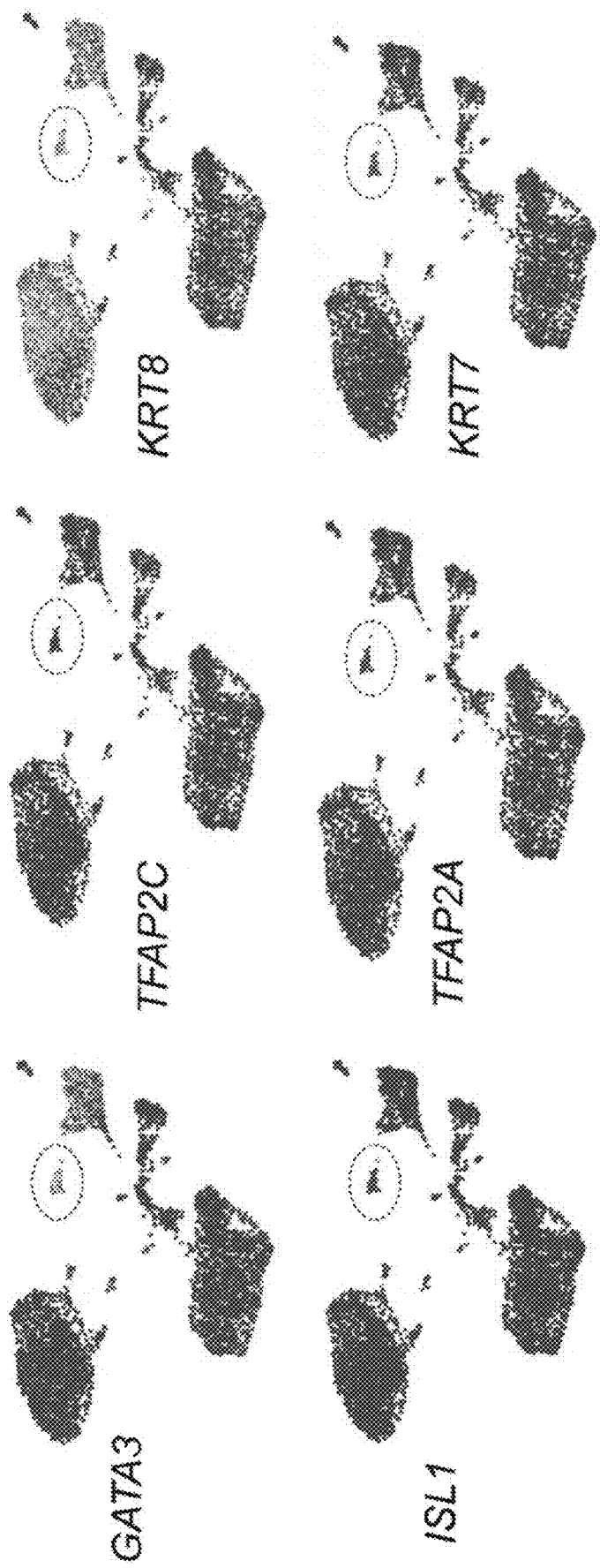
Figure 5E:
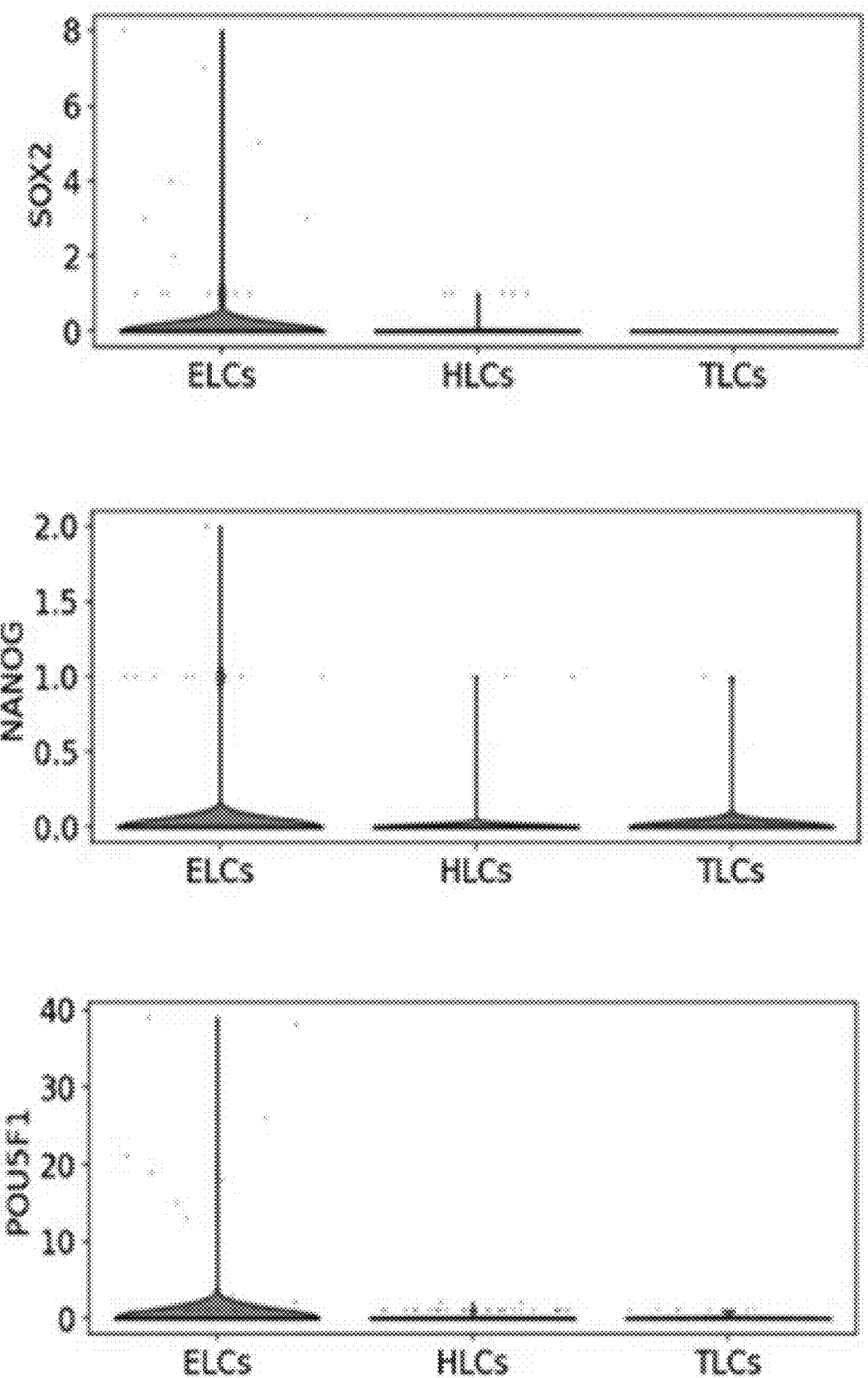
Figure 5E:
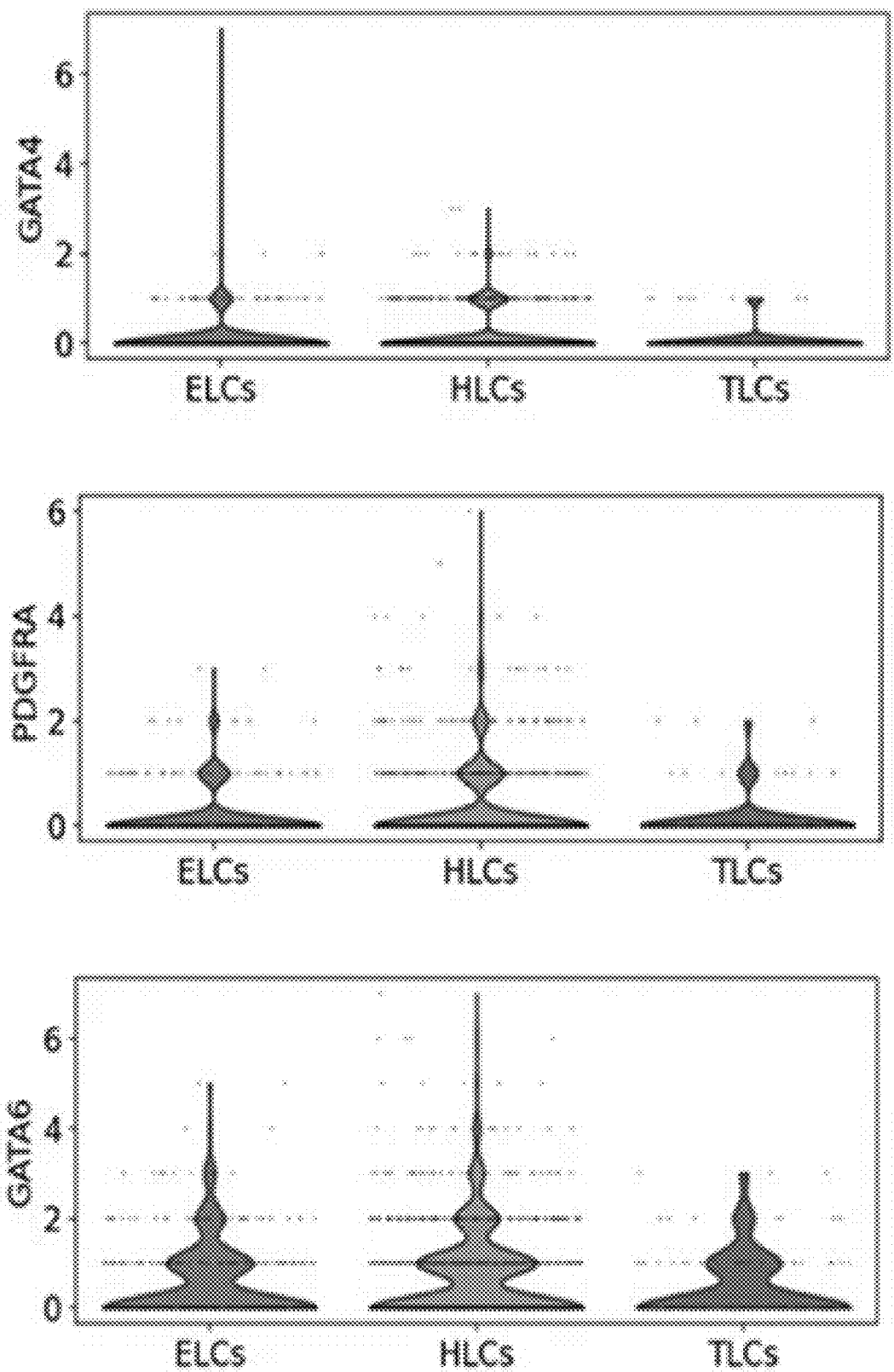
Figure 5E:
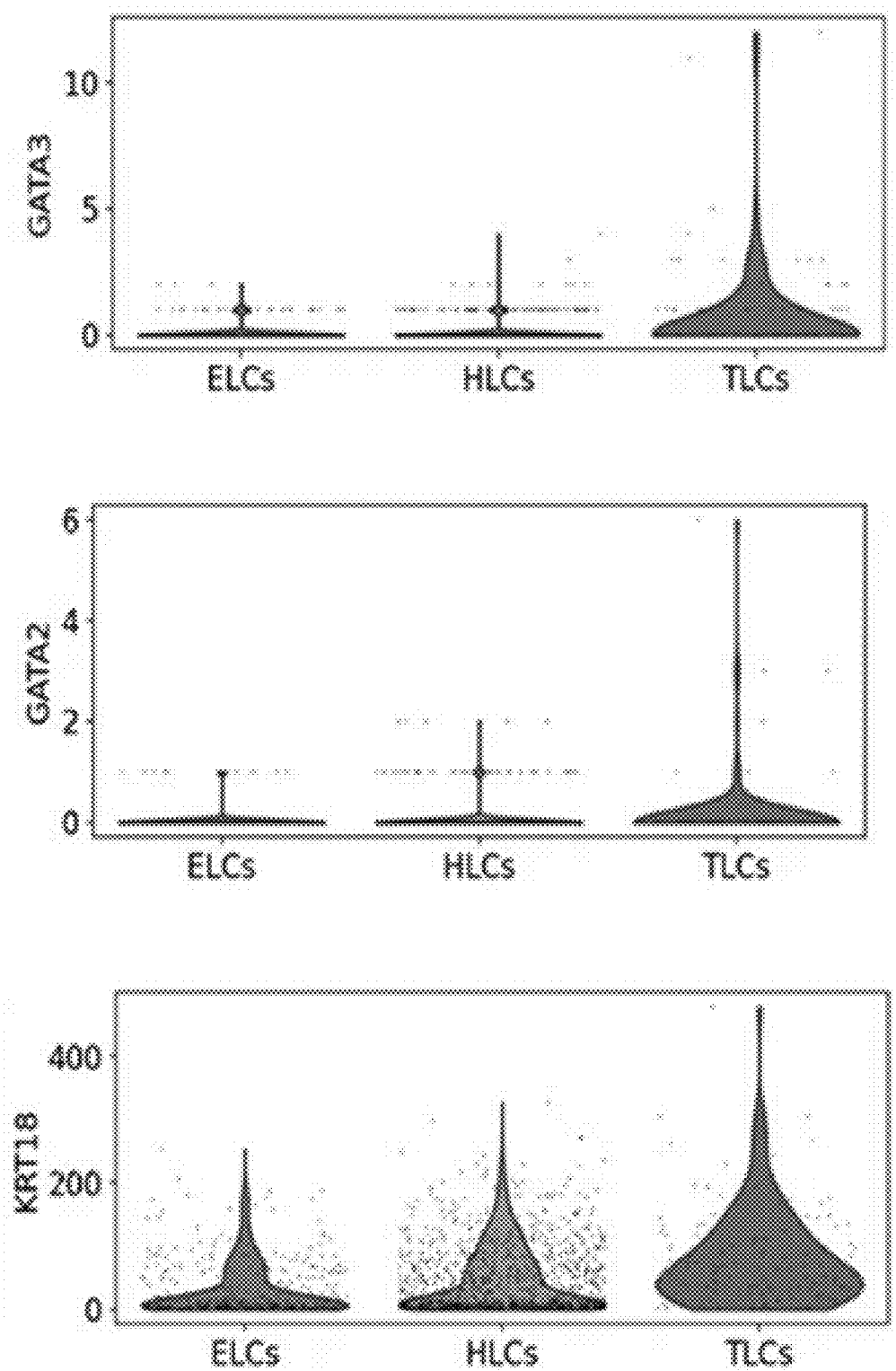
Figure 9A:
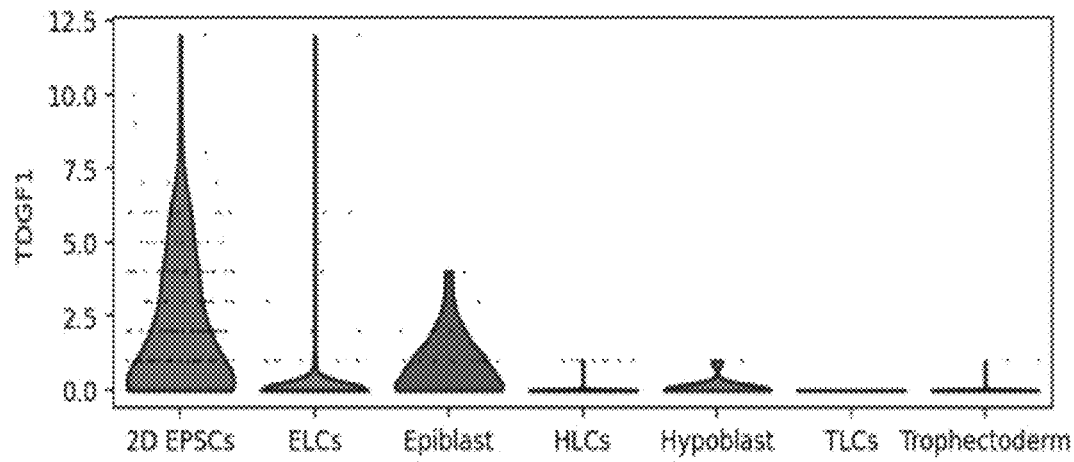
FIG. 9A-FIG. 9E depict non-limiting exemplary data related to characterization of hEPSCs in 2D culture with scRNA-seq analysis.
Figure 9A:
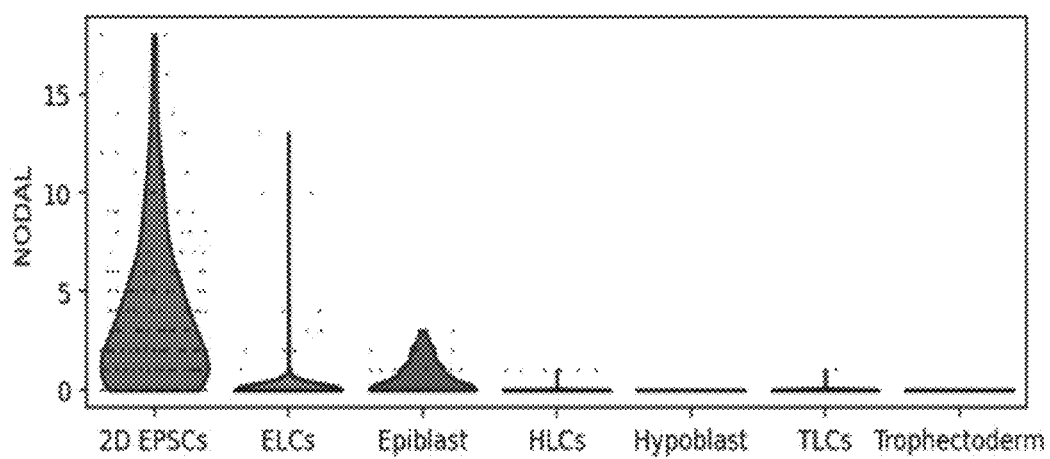
Figure 9A:
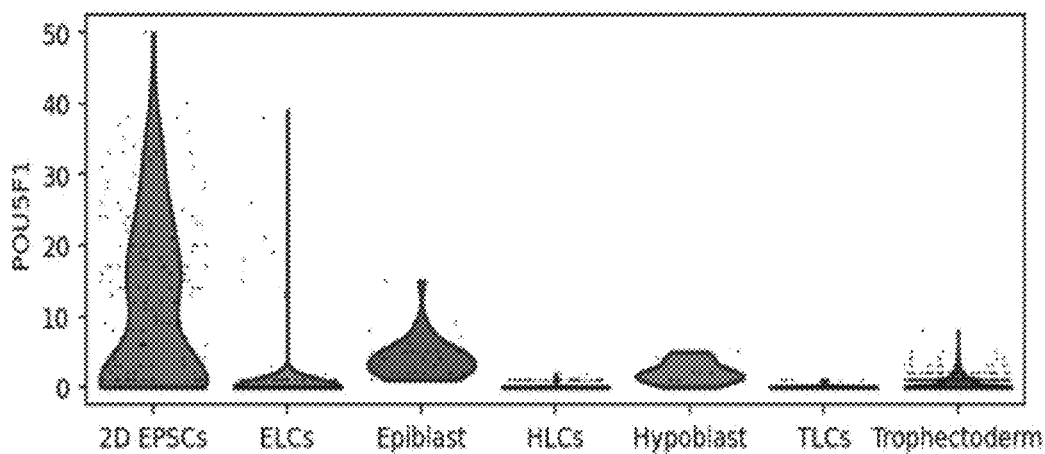
Figure 9B:
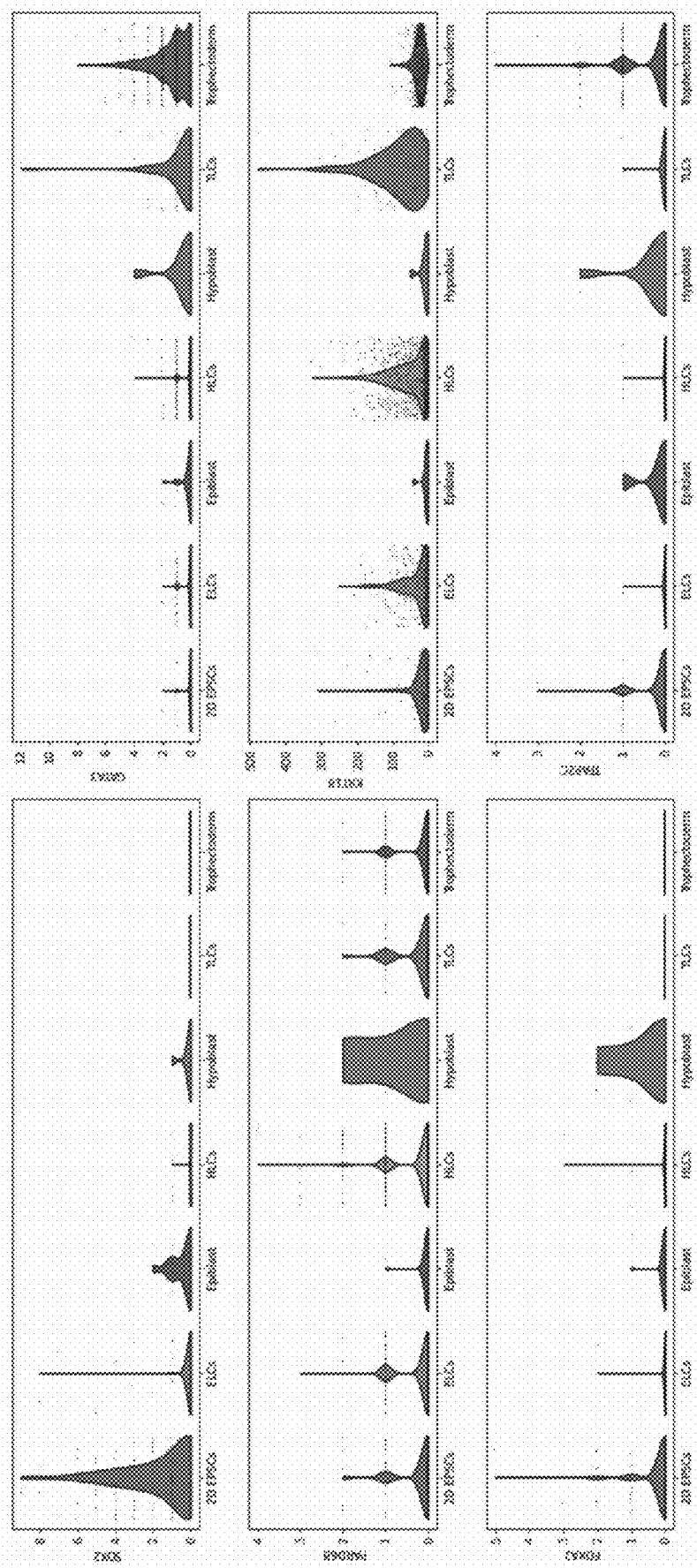
Figure 9B:
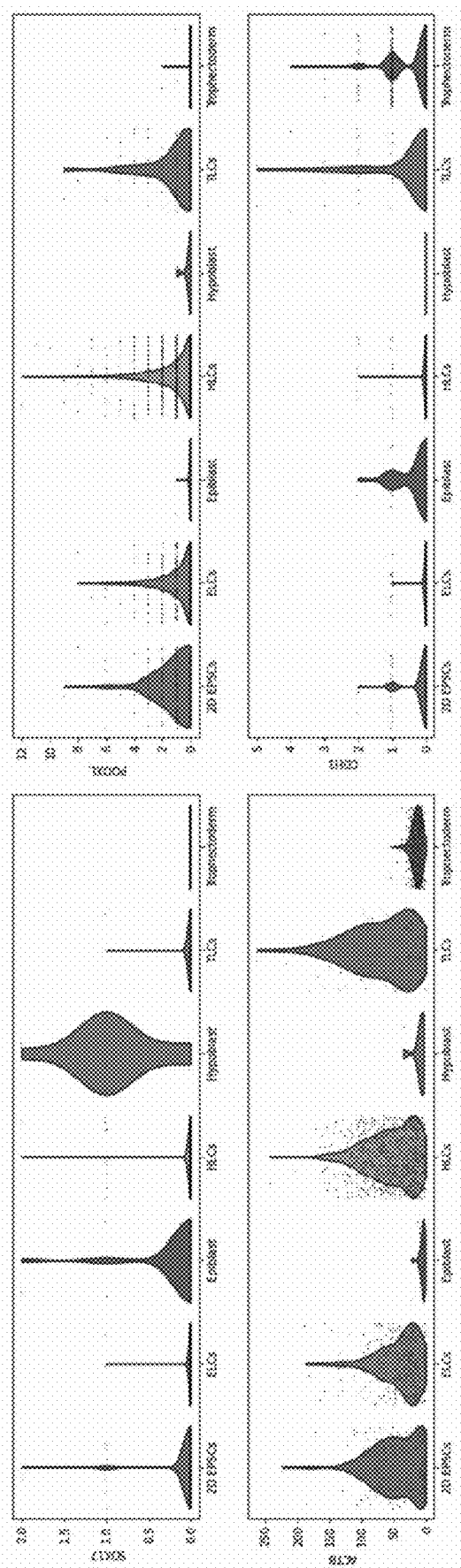
Figure 9C:
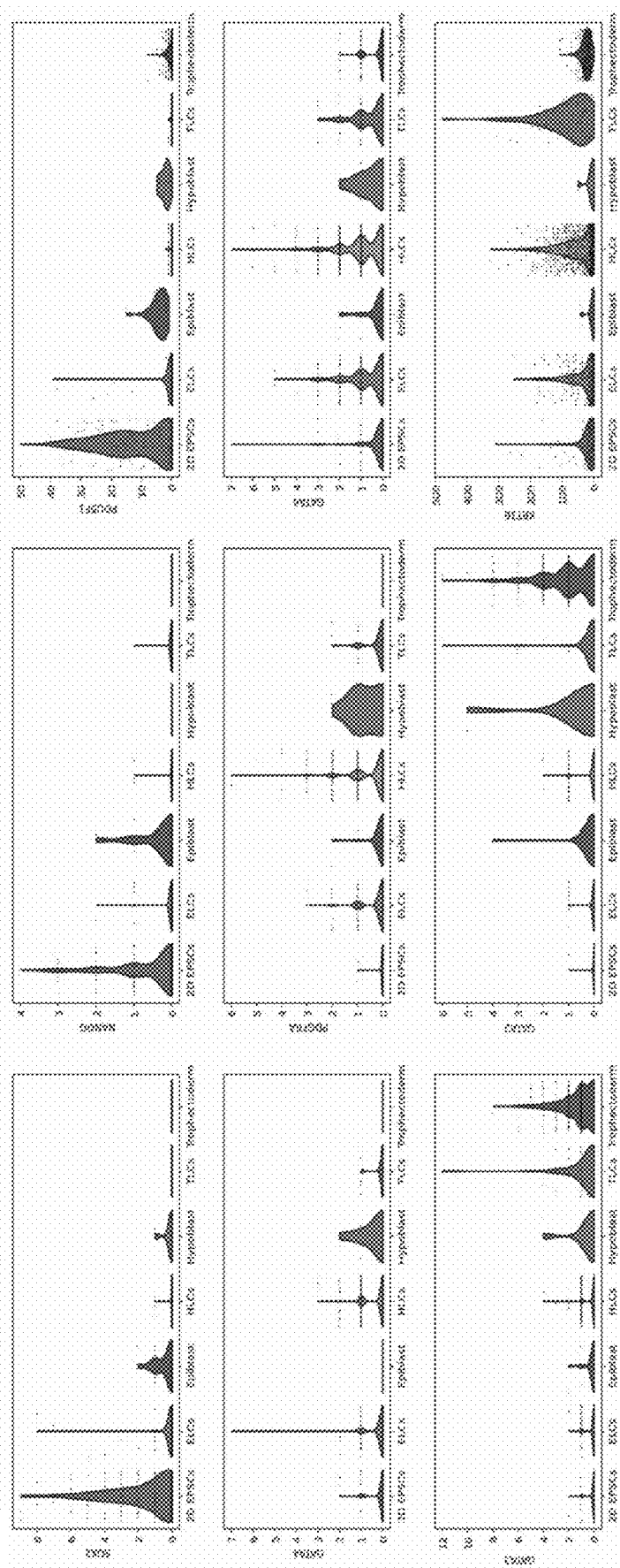
Figure 9D:
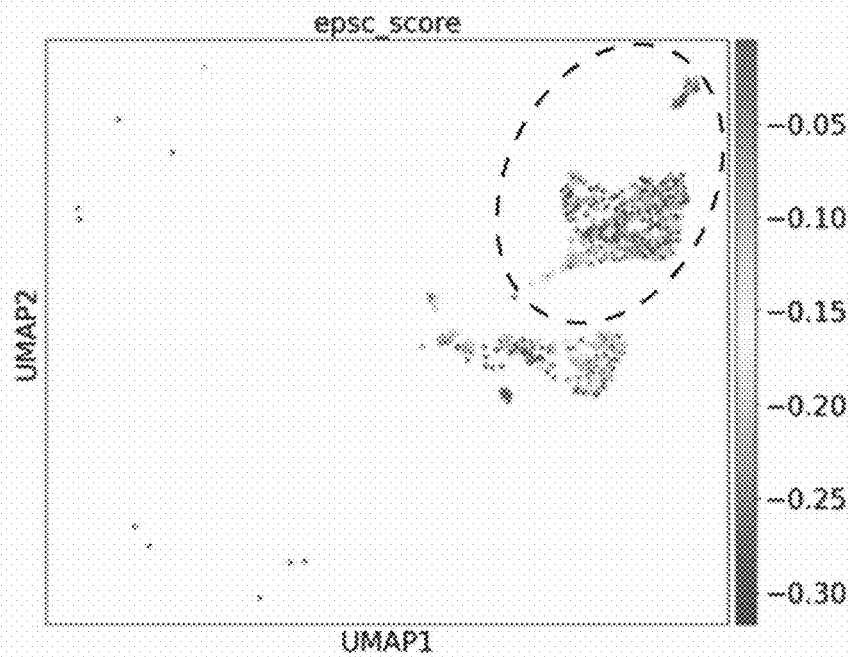
Figure 9E:
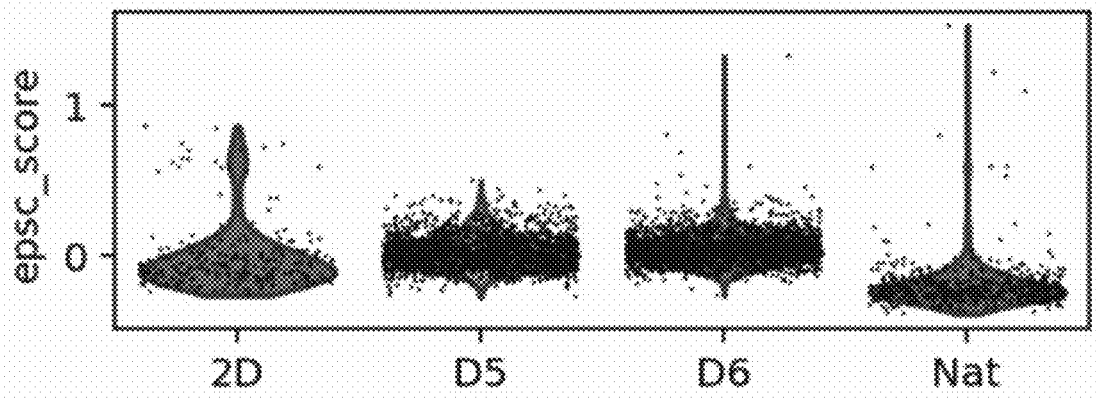

Finally, in order to further characterize the transcriptional programs of the hEP-structures, scRNA-seq on hEPSCs grown in 2D was performed (prior to aggregation), hEP-structures at day 5, hEP-structures grown in IVC for 24h, and natural human blastocysts at day 5/6. Cells clustered predominantly based on sample identity (FIG. 5A-FIG. 5B). A lineage score was assigned based on a list of well-defined lineage markers and signatures of EPI-Like Cells (ELCs), TE-Like Cells (TLCs) and HYPO-Like Cells (HLCs) were observed. However, these lineages fail to cluster in UMAP space. This analysis revealed that the hEP-structures were composed of a large portion of undefined cells (FIG. 5C), similar to two other 3D models of the human blastocyst. In addition, it was also found that there was an overrepresentation of HLCs compared to HYPO cells in the natural blastocyst (FIG. 5B-FIG. 5C). The hEPSCs grown in 2D showed high expression of pluripotency markers such as TDGF1, NODAL, and POU5F1, as expected (FIG. 9A) but there was considerable heterogeneity between cells. In day 5 hEP-structures a small subpopulation of GATA3-positive cells was found, which clustered close to the TE cluster of the natural embryo (FIG. 5D). This subcluster also expressed several amnion markers, such as ISL1, suggesting that it may share properties with the amnion rather than TE as has been reported in iBlastoids derived from reprogrammed hiPSCs (FIG. 5D). Overall, while expression of some key markers is seen in the hEP-structure derived ELCs, HLCs and TLCs (FIG. 5E), there was a disproportionate representation of lineages in hEP-structures as seen by the overrepresentation of HYPO-specific markers, with relatively little expression of TE-specific markers.

Figure 5F:
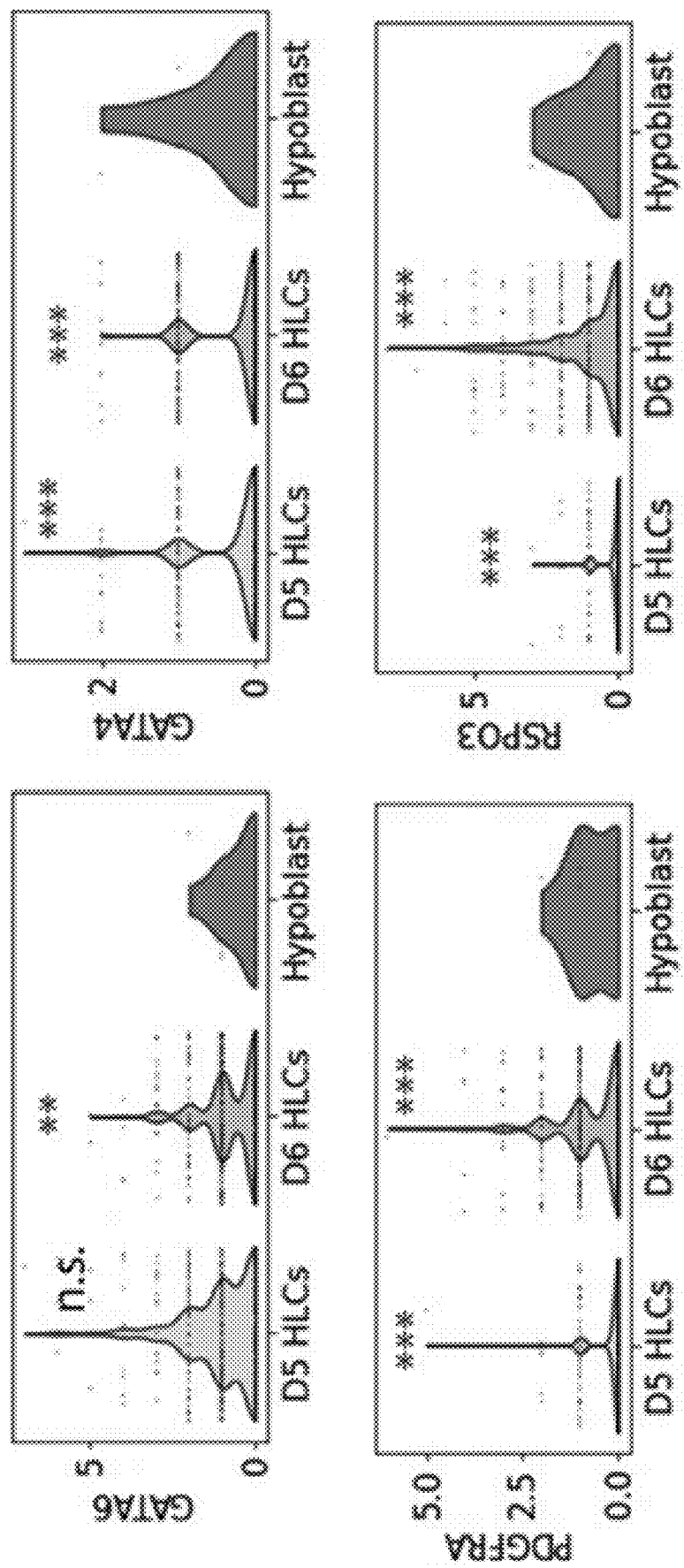
Figure 5F:
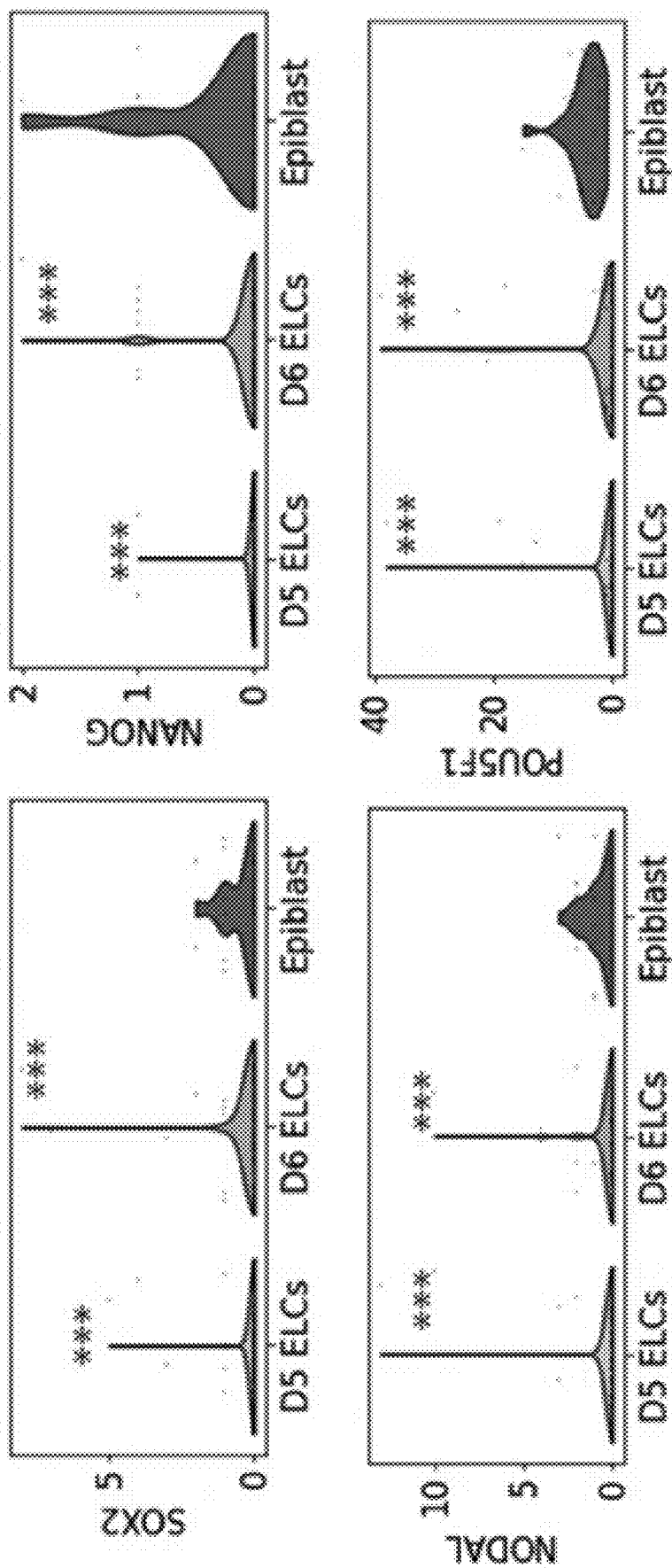
Figure 5F:
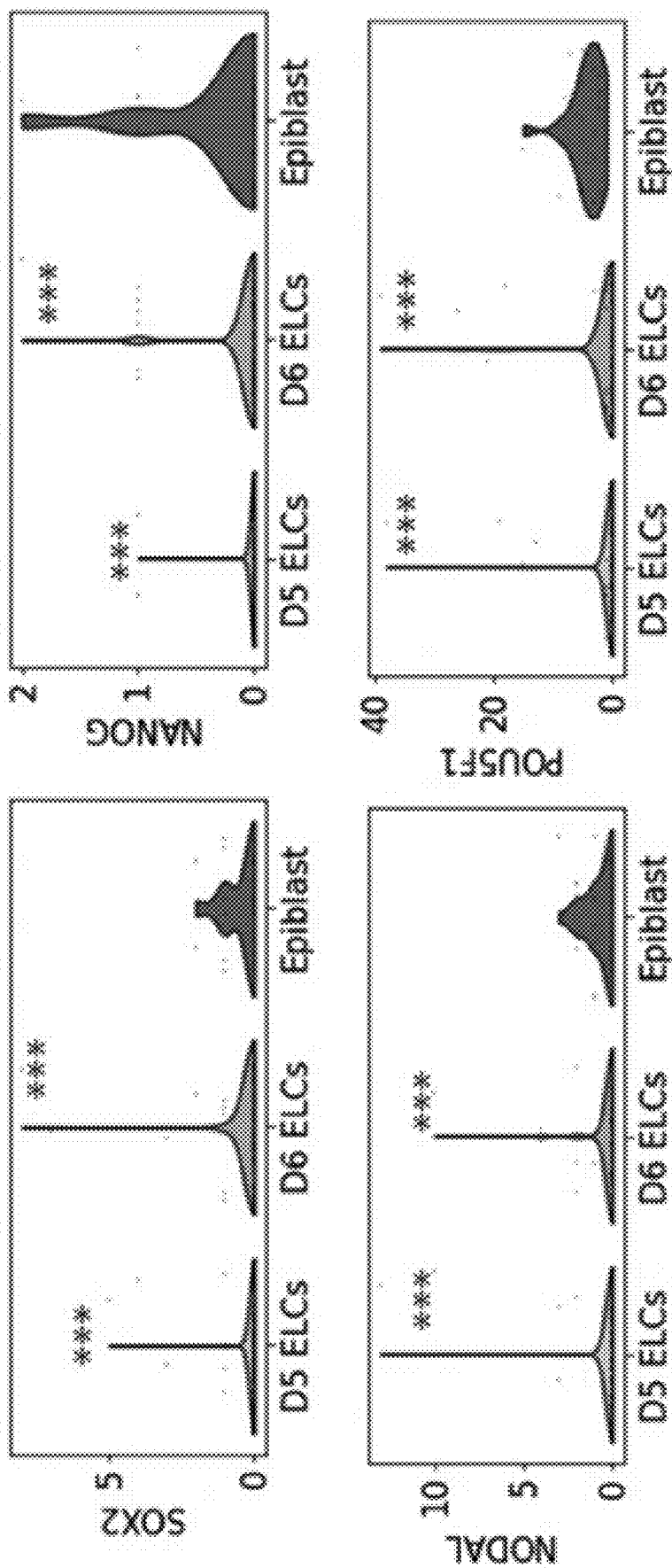
Figure 5F:
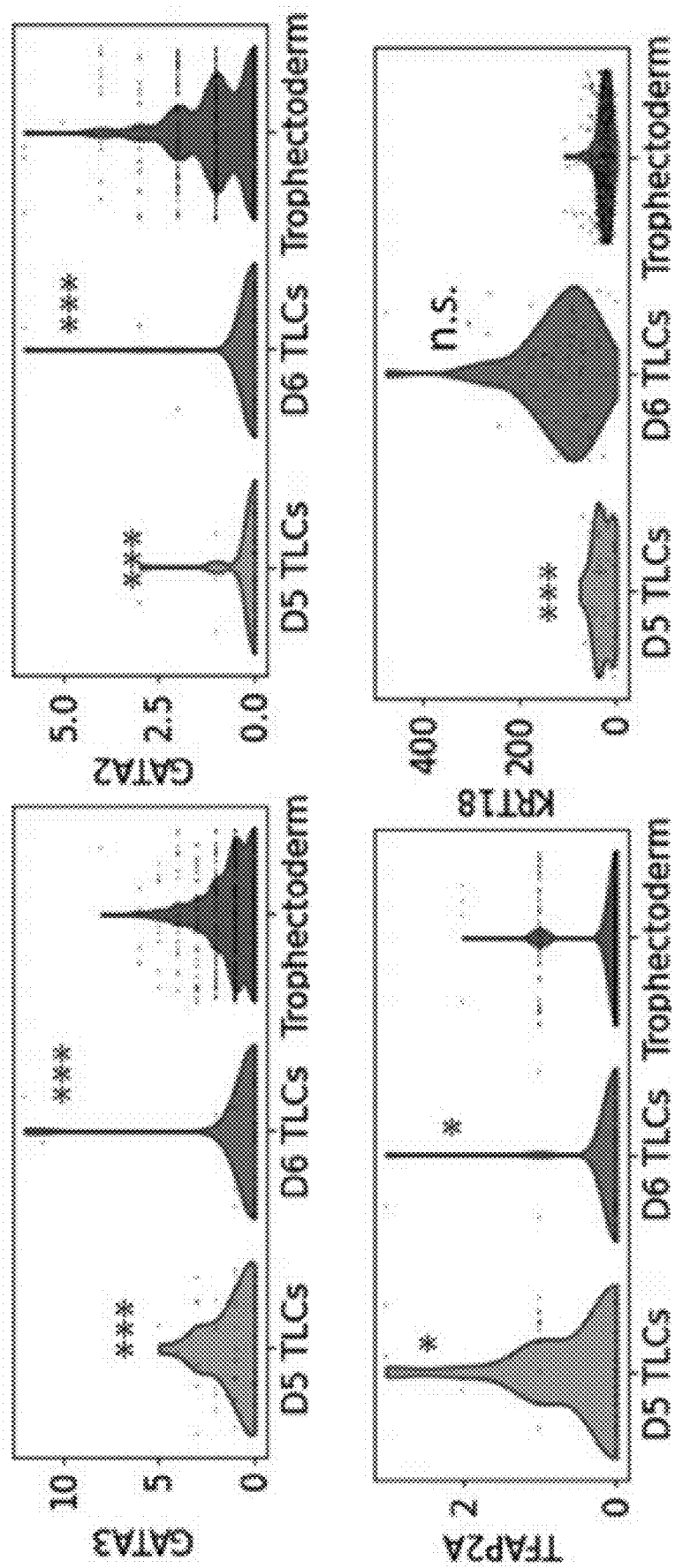
Figure 10A:
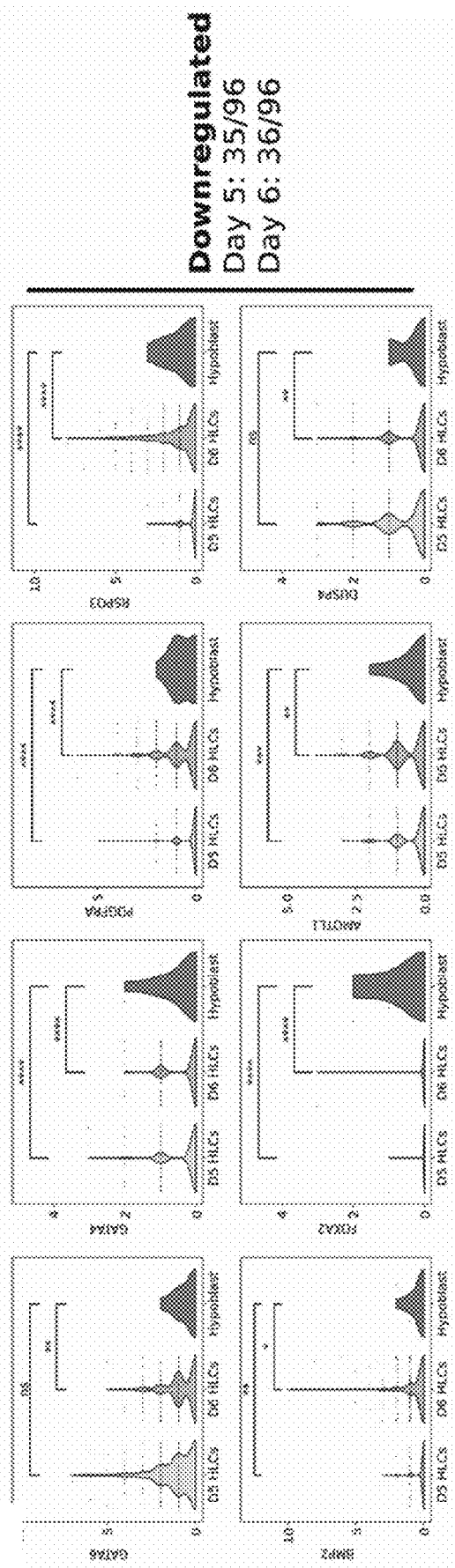
FIG. 10A-FIG. 10D depict non-limiting exemplary characterization and statistical significance of assigned lineage scores compared to natural embryo.
Figure 10A:
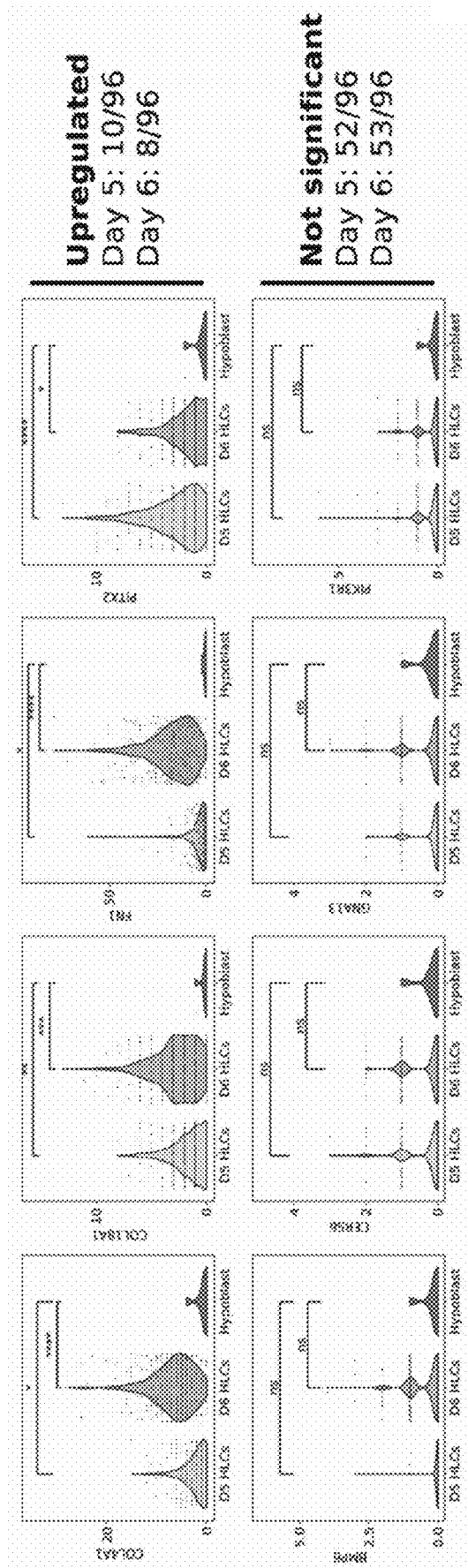
Figure 10B:
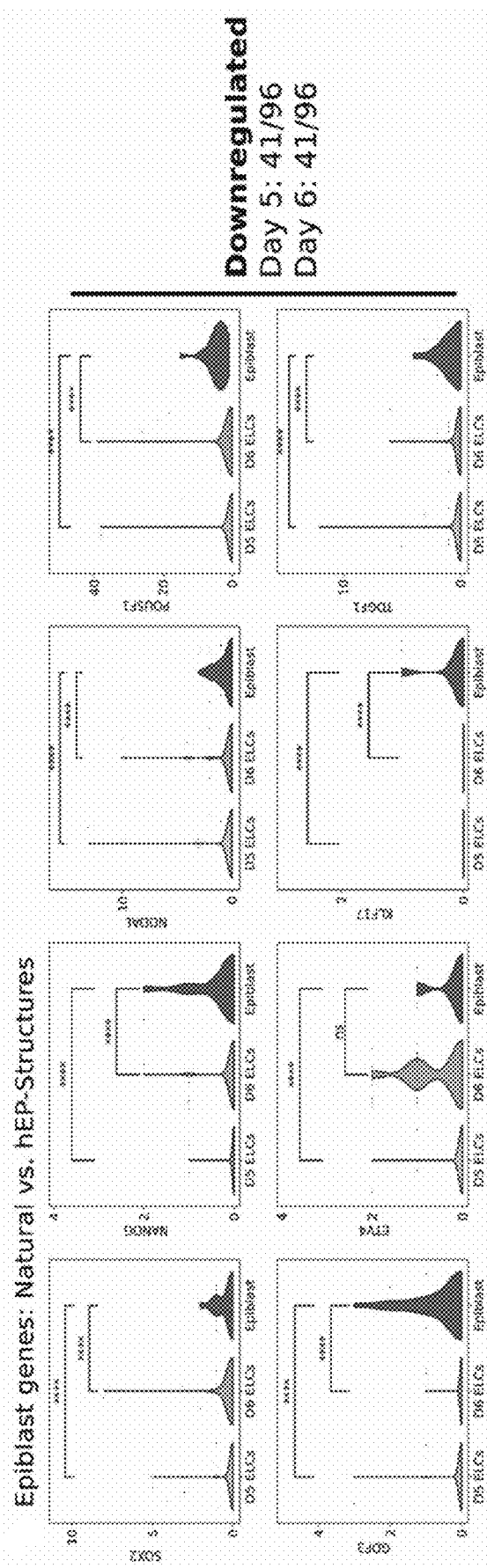
Figure 10B:
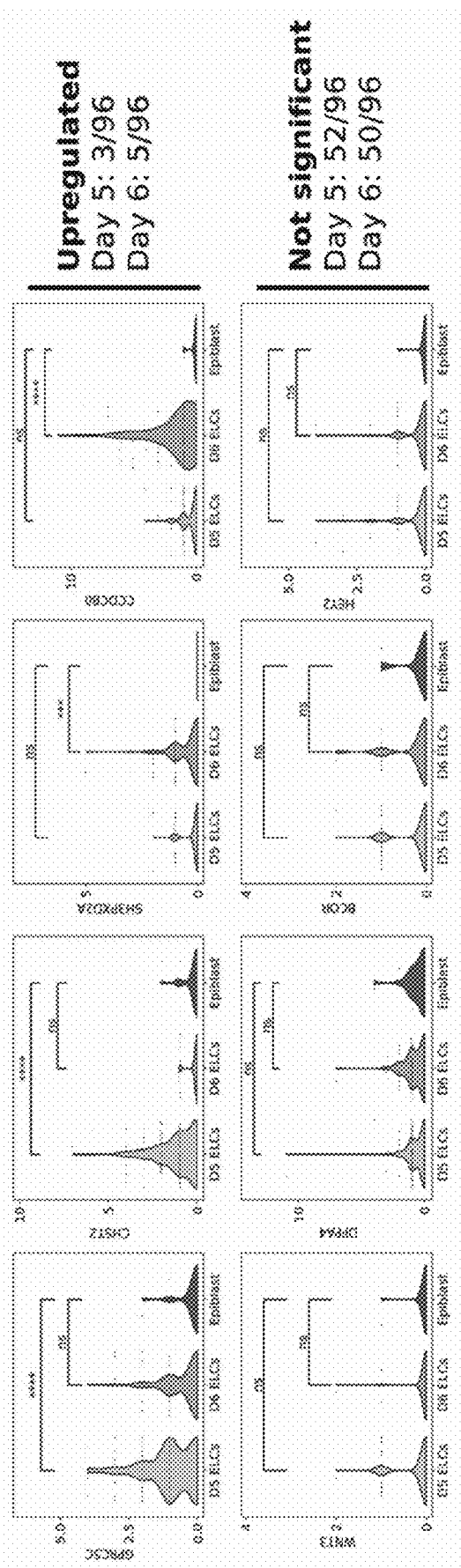
Figure 10C:
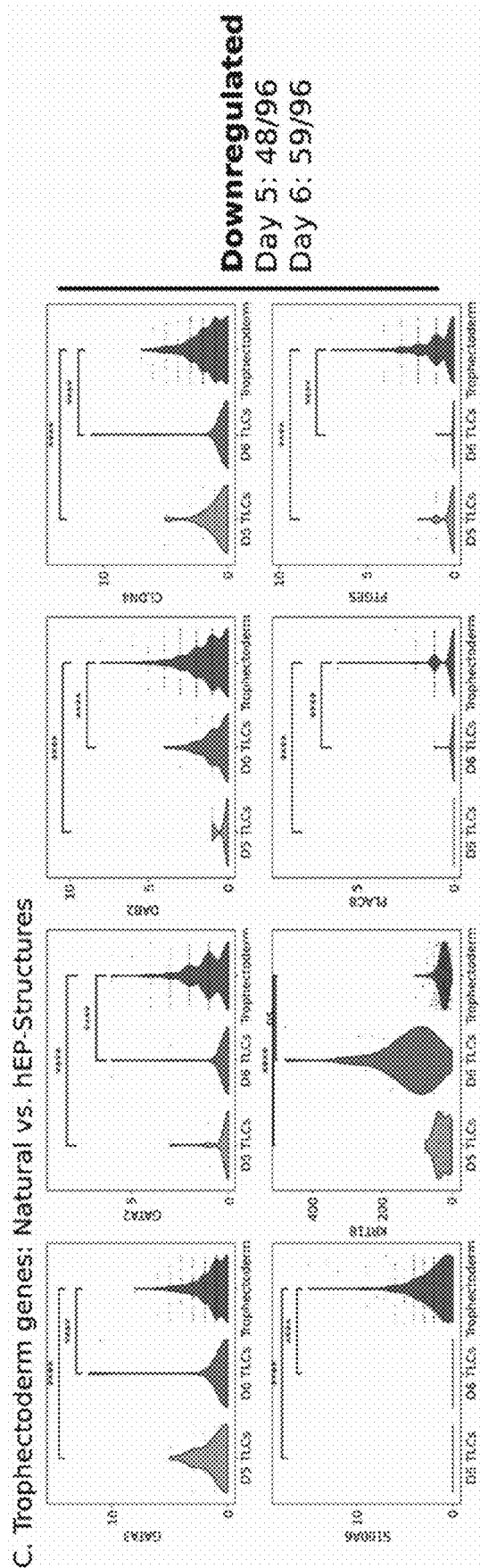
Figure 10C:
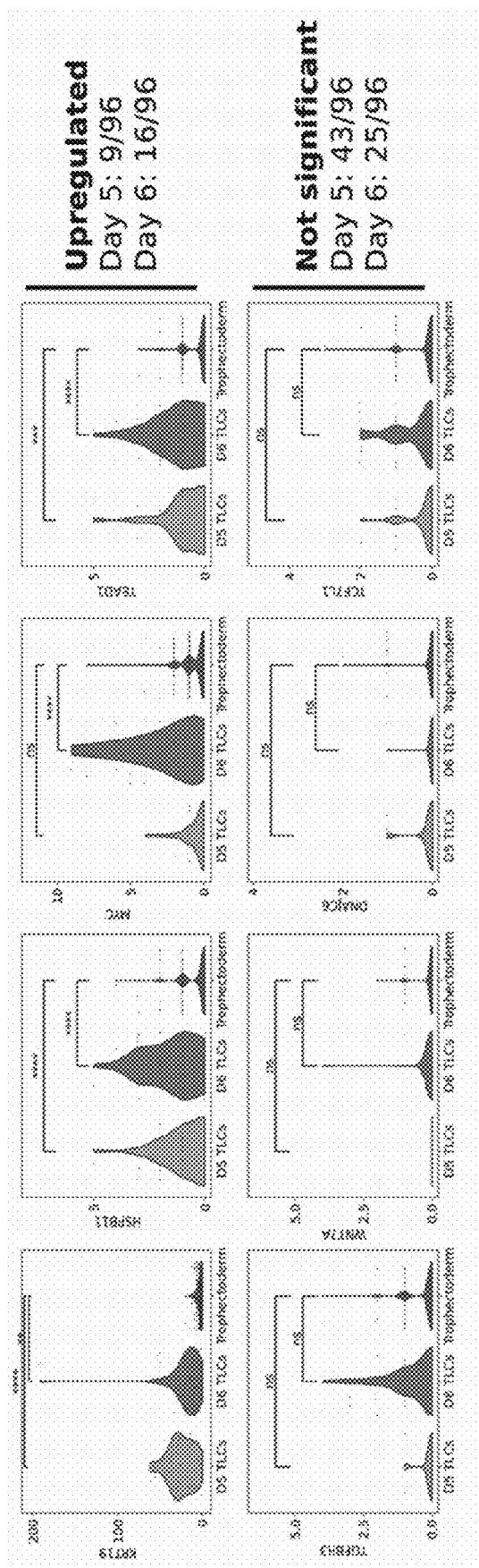
Figure 10D:
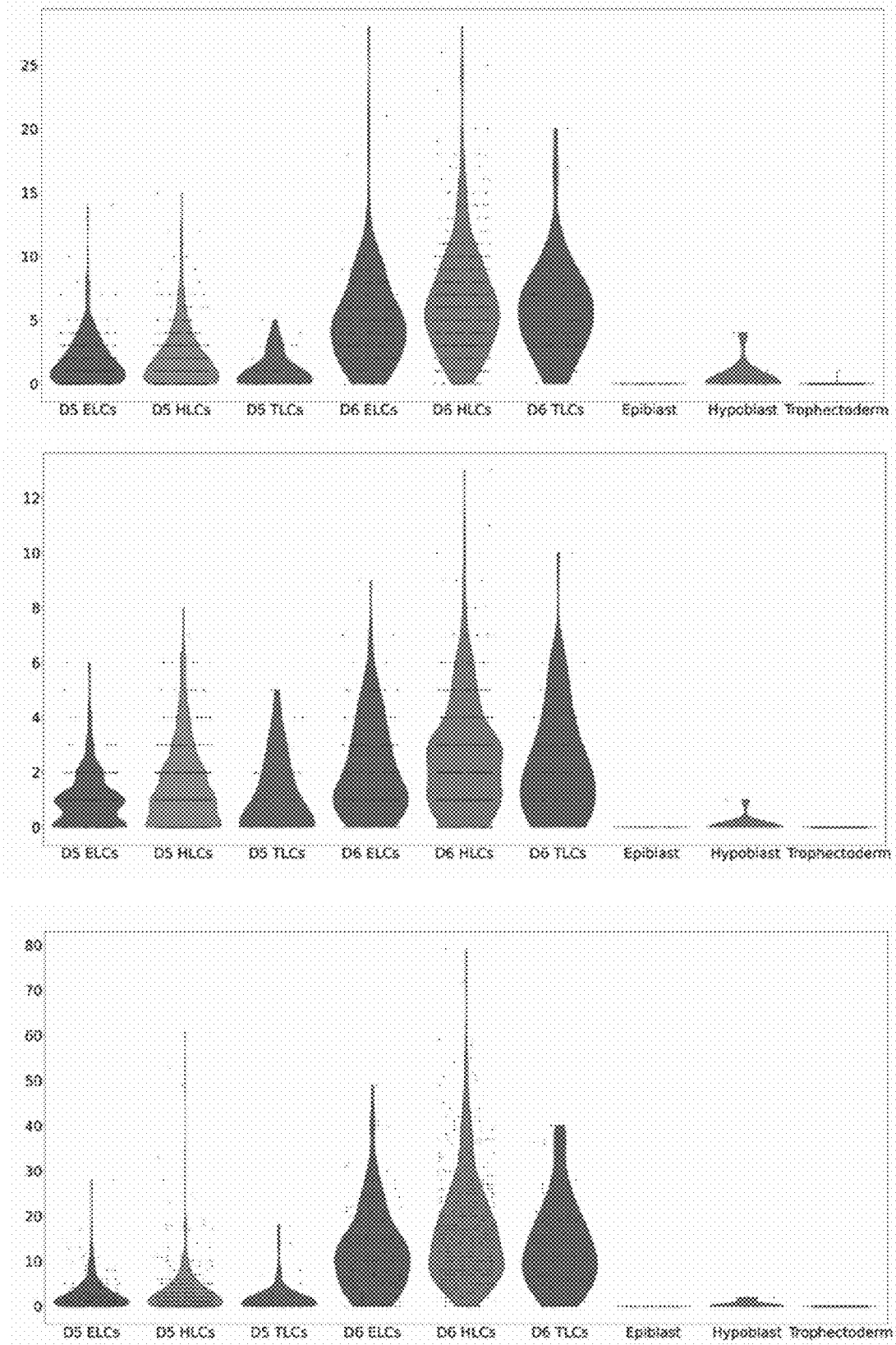
Figure 11A:
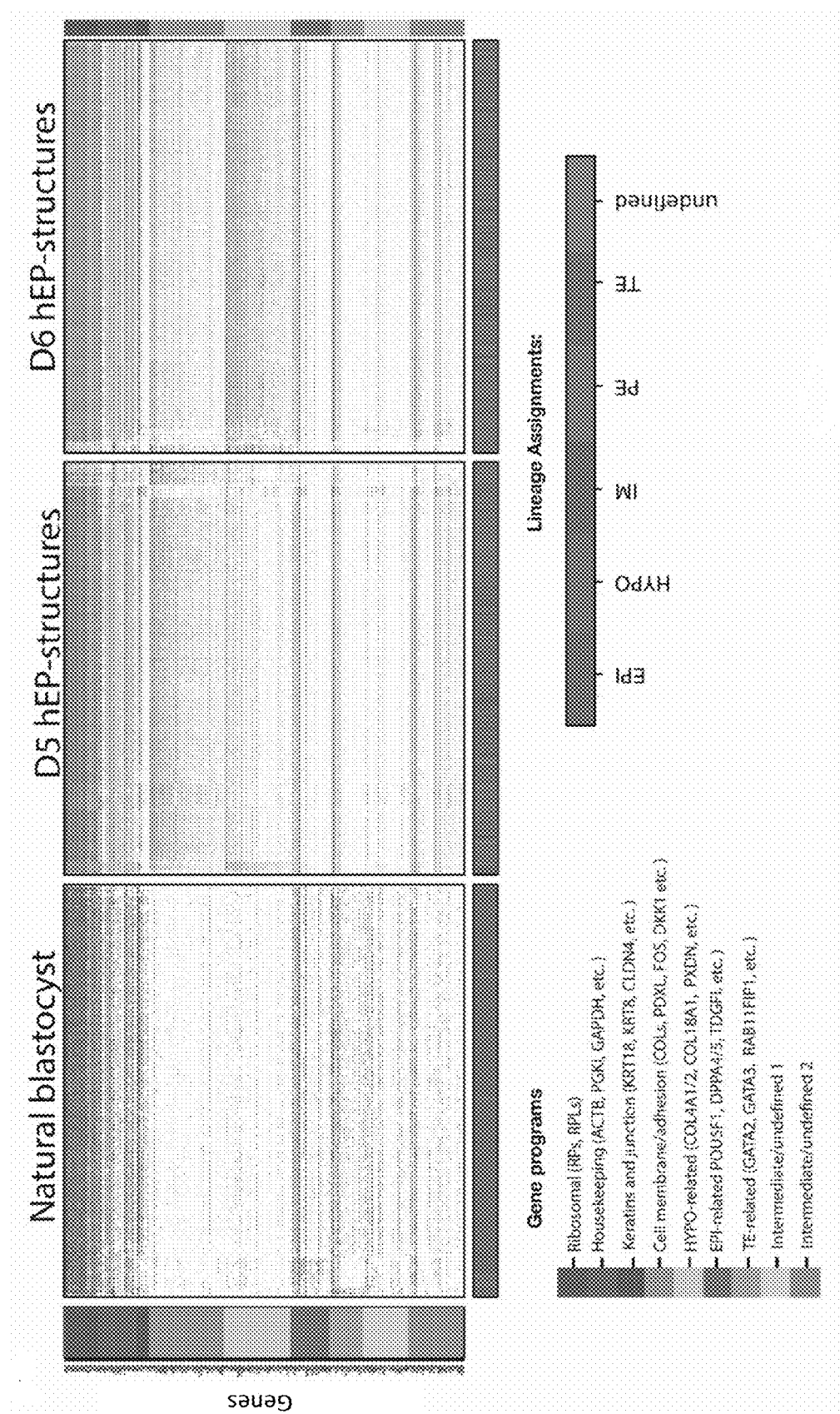
FIG. 11A-FIG. 11B depict exemplary global analysis and comparison of hEP-structures, natural embryo, and previously published blastocyst-like models.
Figure 11A:
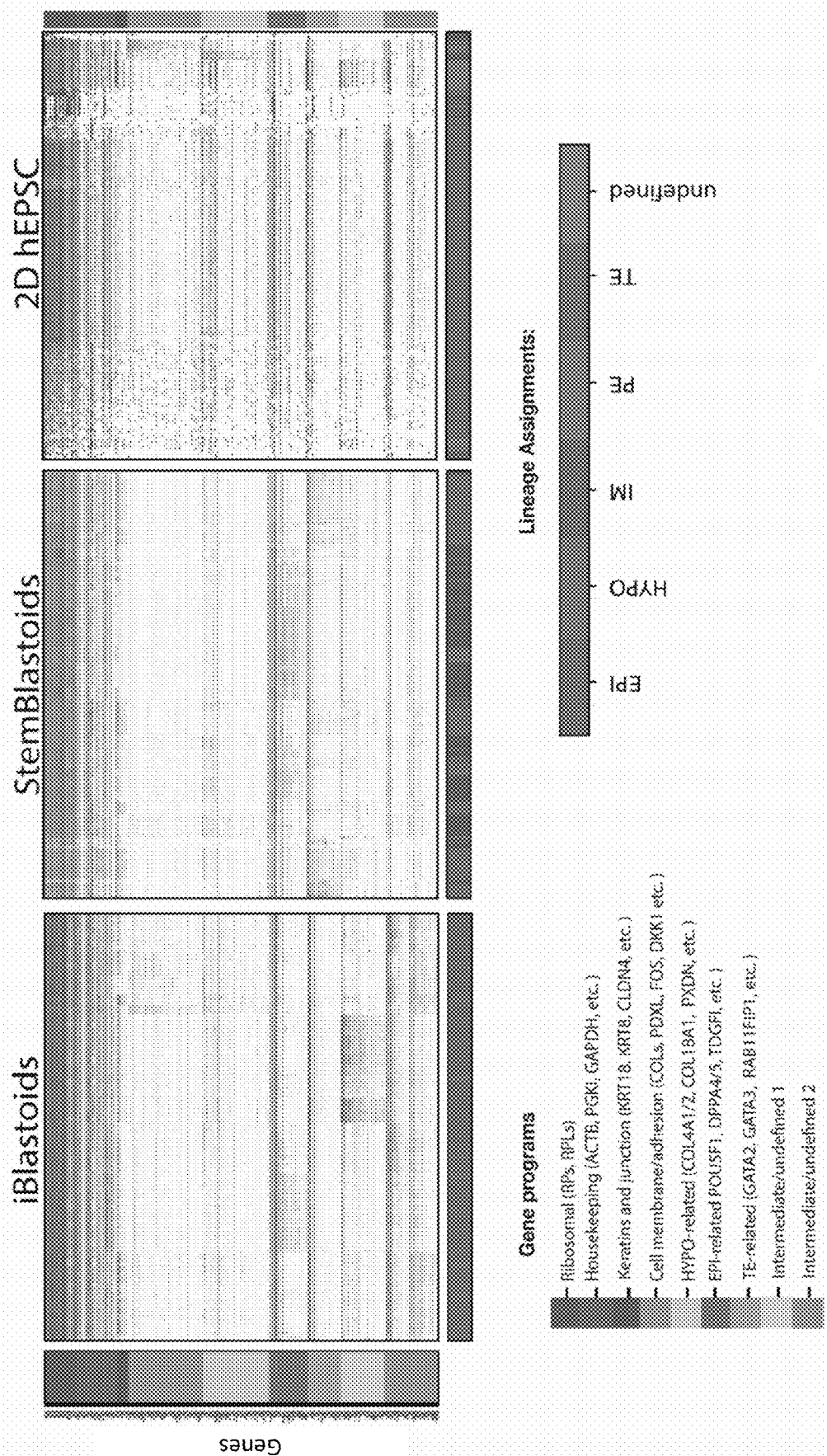
Figure 11B:
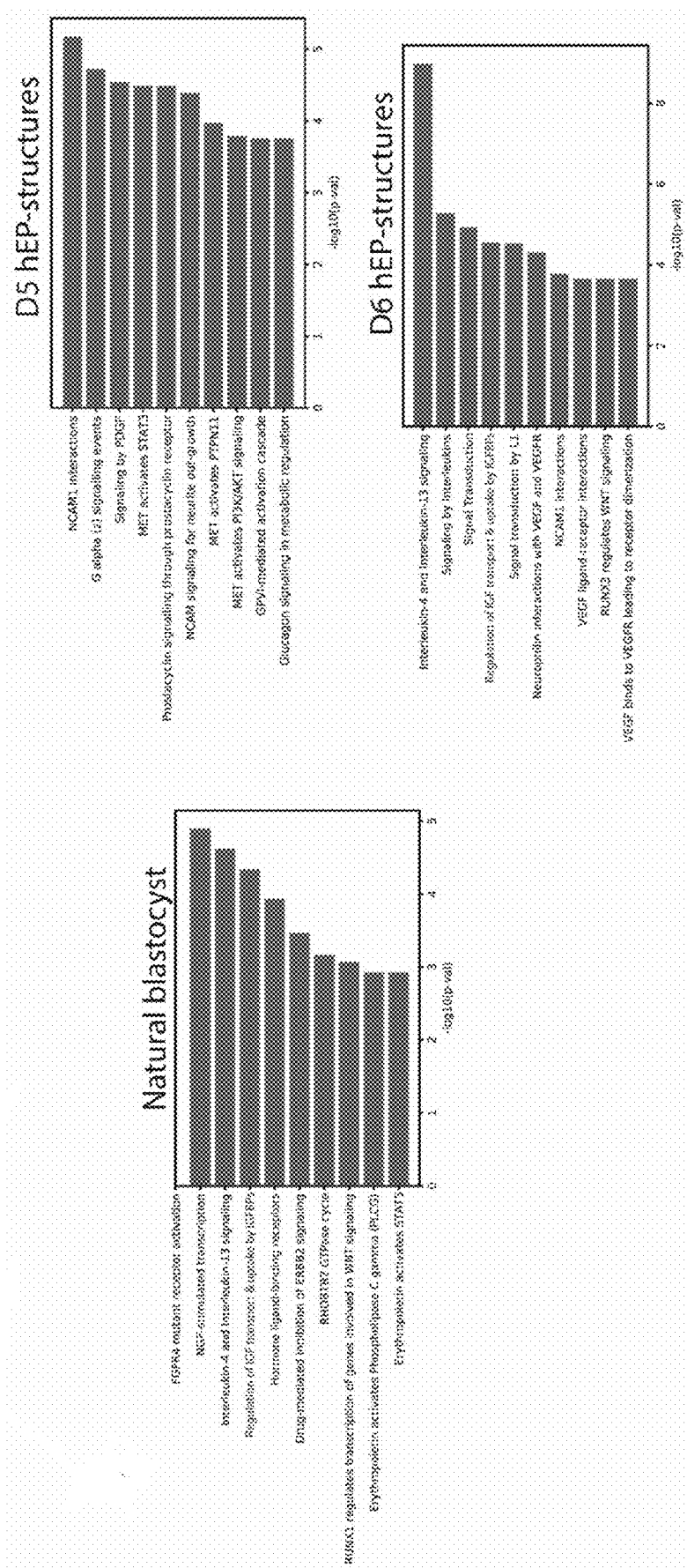

To better understand how the hEP-structures compared to natural human blastocysts at day 6, the expression patterns of the key marker genes used to define the ELC, HLC and TLC signatures were compared (FIG. 5F, FIG. 10A-FIG. 10C). This revealed that over half of the genes (52/96 at day 5, 50/96 at day 6) did not differ between ELCs and the human EPI, and a similar number of genes were expressed at comparable levels between the HLCs and HYPO (52/96 and 53/96). Interestingly, of those genes upregulated in HLCs compared to the HYPO, several were extracellular matrix (ECM) proteins including COL4A1, COL18A1, and FN1. These ECM genes were aberrantly expressed in ELCs and TLCs as well (FIG. 10D). In the TLCs, there was an observable shift between day 5 and day 6 in this signature where 43/96 genes were expressed at a similar level to the blastocyst TE at day 5, which decreased to 25/96 at day 6 (FIG. 5F, FIG. 10C). In order to take a more global view of the differences between the hEP-structures and the natural blastocysts, an unbiased comparative analysis of gene programs was performed. This aimed to identify clusters of cells which may upregulate blocks of gene programs. This revealed several gene programs upregulated in either the hEP-structures or natural blastocysts. These included ECM genes COL3A1, COL4A2, COL4A1, COL1A1, COL6A3, and FN1. Additionally, some genes purportedly related to the amnion-though also expressed in the TE-such as POSTN and TPM1 were enriched in hEP-structures (FIG. 11A). These hEP-structures and natural blastocyst enriched genes were subjected to a simple gene set enrichment analysis using Reactome gene sets broadly related to signalling activities. This revealed an enrichment of several terms, including those related to PDGF, Interleukin, VEGF, PI3K, STAT3, and WNT signalling for the hEP-structures (FIG. 11B).

Taken together, it was concluded that the transcriptional machinery for blastocyst lineage programming appears to be initiated at some level in hEP-structures in the protocol, however, in some embodiments, a continuum of cell fates then develops, indicating that, without being bound by any particular theory, complete trans-differentiation is not attained.

Co-Assembly of EPSCs and Human Trophoblast Stem Cells

Figure 12A:
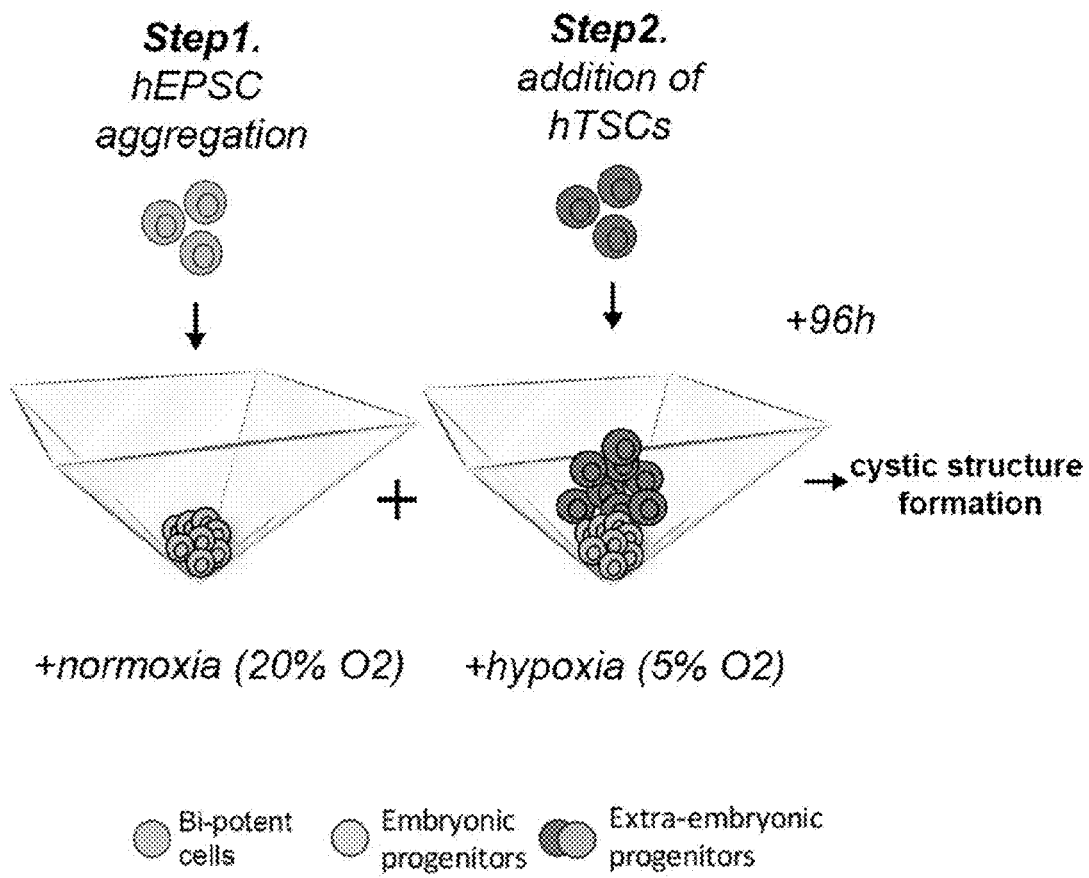
FIG. 12A-FIG. 12C depict non-limiting exemplary embodiments showing co-assembly of hEPSCs and hTSCs.
Figure 12B:
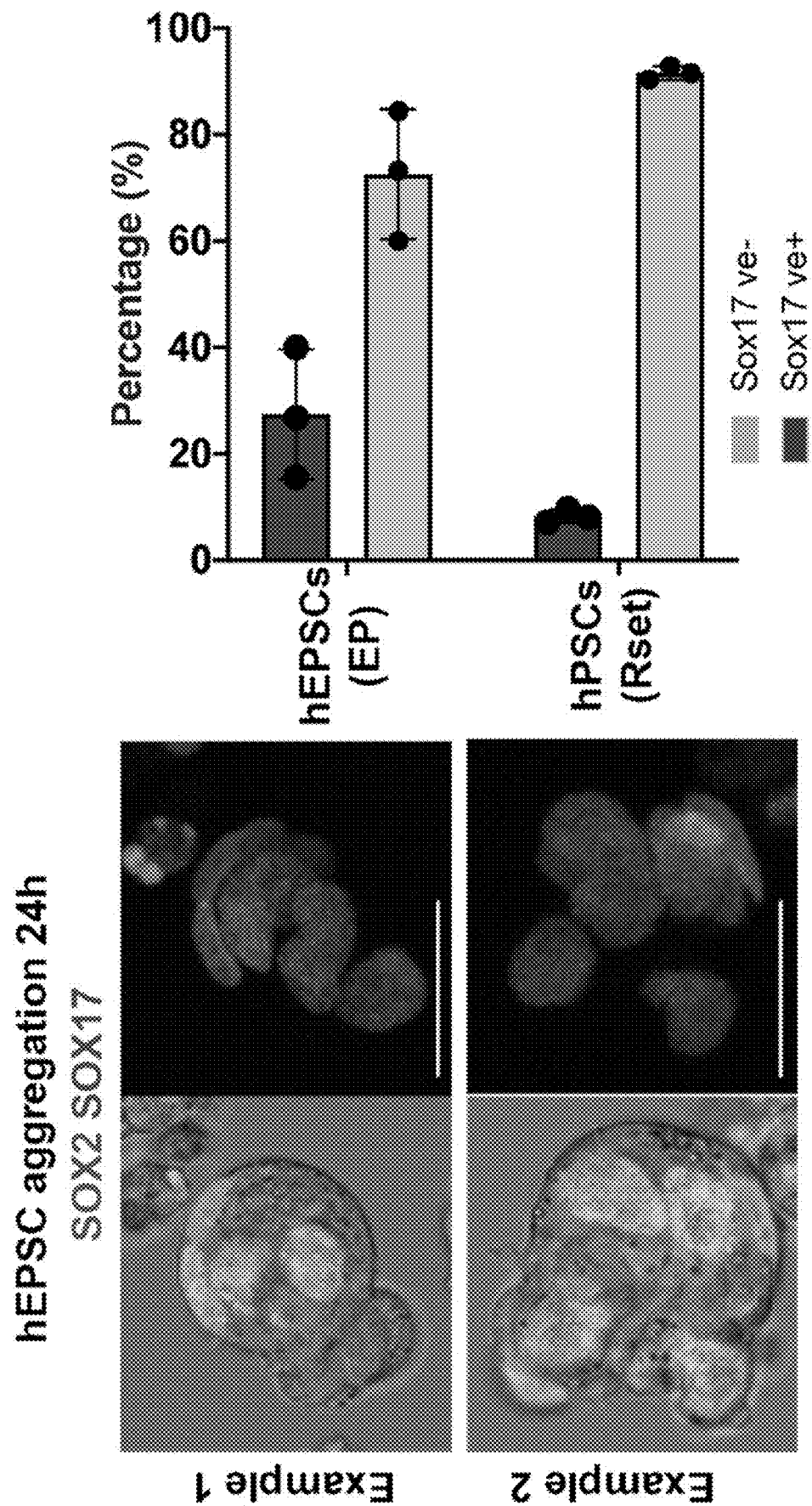
Figure 12C:
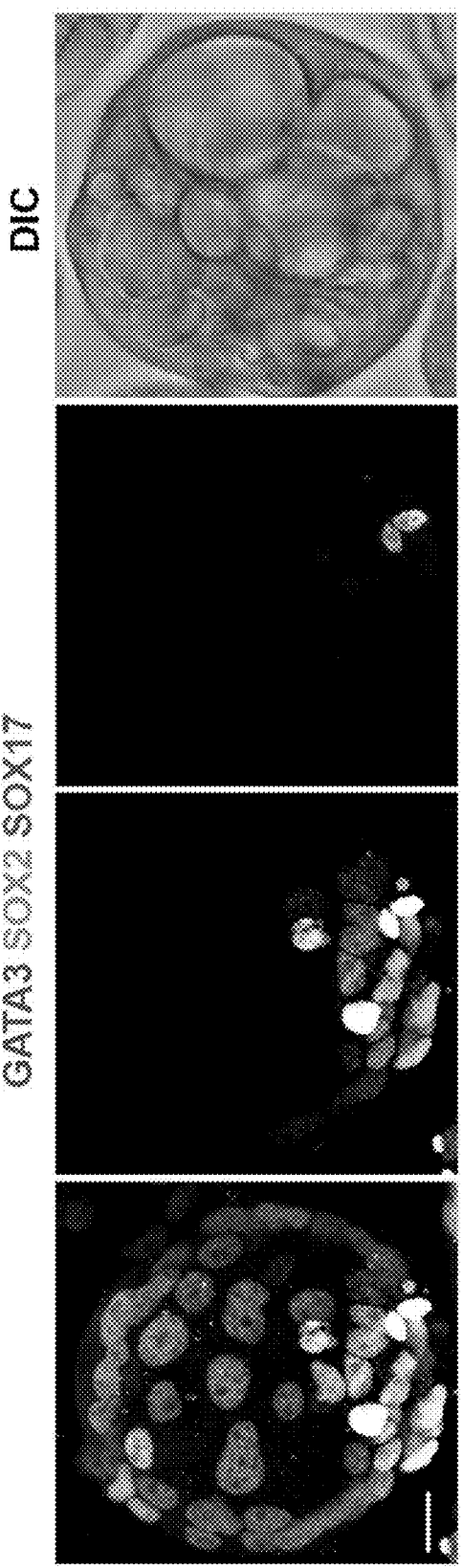

The restricted specification of the TE lineage and potential questions regarding the differentiation of TE versus amnion fate in these structures generated solely from hEP-SCs led to testing whether these cells possess the capacity to fully generate the TE lineage in addition to EPI and HYPO commitment. In mouse blastoids, combining EPSCs with mouse trophoblast stem cells (TSCs) has promoted TE lineage. As a recent study has shown it is possible to derive human TSCs from first trimester human placental samples and blastocysts, it was asked whether such TSCs could participate alongside hEPSCs in the assembly of human blastoids (FIG. 12A). To this end, hEPSCs were allowed to aggregate for 24 h after which hTSCs were added. The first 24h of hEPSC aggregation demonstrated the increased potential to generate both embryonic EPI-like and extra-embryonic HYPO-like lineages in the EP condition compared to the Rset condition that has been shown to promote naïve pluripotency (FIG. 12B). Within 4 days of co-culture, formation of cystic structures having internal acentric hEPSC compartments was observed, as well as robust expression of blastocyst lineage markers, including GATA3, SOX2 and SOX17 (FIG. 12C). Nevertheless, it appeared that these structures struggled, in some embodiments to form a cohesive TE-like epithelium and displayed not one but multiple cavities (FIG. 12C). Thus, in contrast to experience with mouse TSCs, this human TSC line appears unable to rescue the shortcomings of human ESPCs to generate the TE lineage.

Cultured pluripotent stem cells show a dynamic spectrum of pluripotency states, reflecting stages in pre-to-post-implantation development in vivo, principally the transition from the naïve to the primed state. This dynamic spectrum of pluripotency states exhibits distinct molecular and functional properties that affect the differentiation potential of cells and their ability to contribute to chimera formation. As provided herein, the bi-potency of hEPSCs was leveraged to reconstitute the spatiotemporal lineage differentiation and self-organisation of human early development. The multi-differentiation potential of hEPSCs to model early embryonic cell fate in a 3D culture platform was assessed. The results presented herein show that the EPSC-based system allows hEPSCs to self-organize into structures that resemble human blastocysts and peri-implantation stage embryos in morphology and, in some embodiments, also in lineage specification. In some embodiments, these cells mainly adopt an intermediate transcriptional state.

In some embodiments of the methods presented herein, hEPSCs mainly express genes that are specific to the late stage epiblast. However, in some embodiments, hEPSCs can adopt different morphologies under routine culture with some cells displaying features characteristic of pluripotent cells in the naïve state and others in the primed state, in different ratios after each passage. This can reflect the range of developmental potencies associated with the hEPSCs described herein. In some embodiments, while cells of the EP structures display many EPI-like and HYPO-like markers and some TE-like markers, in some embodiments, a full range of lineage markers is not expressed, and many of these markers are expressed at levels different from the bone fide blastocyst lineages. This is in line with recent findings emphasizing the restricted potency of mouse EPSCs.

In studies generating mouse blastoids, some of the deficiencies of mouse EPSCs were corrected by co-culturing them with TSCs. However, a human TSC-cell line were not similarly encouraging for the present EP structures. Given that these hTSCs are reported to be most similar to villous cytotrophoblasts, and without being bound by any particular theory, these hTSCs can be more conducive to post-rather than pre-implantation development.

The source of the PSC can vary. Alternative methods to generate human blastocyst-like structures have been described using naïve or induced pluripotent human stem cells. In these reports, the resulting structures recapitulate the overall morphology of the blastocyst, with an inner cell mass and blastocoel cavity, similar to the EP structures presented herein. Formation of structures with proper architecture, with a cavity and inner cell mass, can range from 9.4-12.8% for human naïve blastocyst-like structures and 5.8-18% for structures generated from iPSCs. Additionally, in some embodiments, the relationship between the efficiency for generation of proper structure morphology and correct segregation of all three lineages remains unclear and several gene programs do not appear to be shared between these models. The methods and compositions presented herein can inform efforts to enhance the efficiency of both correct morphogenesis and robust lineage segregation in human embryo models.

In some embodiments, hEPSCs are not the equivalent of totipotent blastomeres and they are only partially able to specify embryonic cell progeny. Without being bound by any particular theory, this may reflect distinct molecular trajectories and an intermediate state adopted by these cells that lead to the generation of the improperly differentiated cells observed in this study. Nevertheless, these cells are able to generate multicellular structures showing some of the key morphological features and aspects of patterning similar to natural early human embryos. Thus, the system presented herein may offer an advantageous route for generating a fully functional embryo-like platform in vitro. This system has the potential to lead to a variety of future applications that will be pivotal in unravelling many of the enigmas of human developmental regulation.

Methods

Data Reporting

No statistical methods were used to predetermine sample size. The experiments were not randomized and the investigators were not blinded to allocation during experiments and outcome assessment.

Ethics Statement

Stem cell-derived multicellular structures described in this study show no evidence of germ line patterning, thus they do not have human organismal form or potential. Additionally, all experiments were terminated by no later than day 8 in vitro. Our research was subject to review and approval from the Human Embryo and Stem Cell (HESC) Committee of California Institute of Technology, in compliance with the ISSCR 2016 guidelines. The human embryo work at California Institute of Technology was approved by the California Institute of Technology Committee for the Protection of Human Subjects (Institutional Review Board number 19-0948). Human embryos at the blastocyst stage were obtained from the University of Southern California (USC) through the preexisting USC Institutional Review Board-approved Biospecimen Repository for Reproductive Research (HS-15-00859) after appropriate approval was obtained unanimously from the Biorepository Ethics Committee.

Human Embryo Thawing

The human embryos at the blastocyst stage were warmed using Embryo Thaw Media Kit following the manufacturer's instructions (Fujifilm Irvine Scientific, Cat. No. 90124). The day before warming, Continuous Single Culture-NX Complete medium (Fujifilm Irvine Scientific, Catalog No: 90168) was equilibrated overnight at 37° C.+5% CO2. On the day of warming (day 1), the straw that contains the embryo was defrosted at room temperature for 30 sec and immersed in prewarmed (37° C.) water for 1 min until ice melted. The embryo was then transferred into T-1 (5 min), T-2 (5 min), T-3 (10 min) solutions for slow warming and finally into Multipurpose Handling Medium (MHM, Fujifilm Irvine Scientific, Cat. No. 90163) for recovery. All these incubation steps were done using 4 well plates (Nunc) and 1 ml per solution. Warmed embryos were finally incubated in drops of preequilibrated Continuous Single Culture-NX Complete medium under mineral oil (9305, Irvine Scientific). Culture conditions are the following: 37° C. 21% O2 and 5% CO2. Embryos were incubated for a total of 24h until used for further RNA-sequencing protocols.

Human Cell Lines

The hPSC lines utilized herein include: RUES2-RLG, and ESI017. Each of these cell lines (including TSCs) was tested negative for mycoplasma contamination, which was monitored on a bi-monthly basis (MycoScope™ PCR Mycoplasma Detection Kit, Genlantis).

Cell Culture

All hEPSC lines were maintained under 20% O2 and 5% CO2 at 37° C. conditions on irradiated CF1 mouse embryonic fibroblasts (MEF) feeder cells. hEPSCs were grown using 'human Expanded Potential' (hEP) medium consisting of DMEM/F12 (Thermo Fisher Scientific, 11320-033), Neurobasal-A® (Thermo Fisher Scientific, 21103-049), N2 supplement (Thermo Fisher Scientific, 17502-048), B27™ supplement (Thermo Fisher Scientific, 12587-010), 1% GlutaMAX™ (Thermo Fisher Scientific, 35050-061), 1% non-essential amino acids (Thermo Fisher Scientific, 11140-050), 0.1 mM b-mercaptoethanol (Thermo Fisher Scientific, 31350-010), penicillin-streptomycin (Thermo FisherScientific, 15140-122) and 5% KnockOut™ serum replacement (KSR, Thermo Fisher Scientific, A3181502). LCDMYI supplementation was added as indicated at the following concentrations: 10 ng ml-1 recombinant human LIF (L, 10 ng ml-1; Peprotech, 300-05), CHIR99021 (C, 1 mM; Stem Cell Technologies), (S)-(+)-Dimethindenemaleate (D, 1 mM; Tocris, 1425) and Minocycline hydrochloride (M, 2 mM; Santa Cruz Biotechnology, sc-203339), 1. All hEPSCs were used before reaching P70 and cell cultures were examined by eye to monitor for spontaneous differentiation of colonies into mesenchymal-like cells. In some embodiments, the culture medium comprises media and/or supplements for supporting neuronal culture (e.g., Neurobasal®, Neurobasal® A, B27™ supplement). In some embodiments, the culture medium comprises a glutamine alternative (e.g., GlutaMax™ comprising L-alanyl-L-glutamine dipeptide). In some embodiments, the culture medium comprises a non-serum replacement (e.g., KnockOut™ Serum Replacement).

hTSCs were cultured on 6-well plates pre-coated with 5 mg/ml Col IV at 37 C for at least one hour. Cells were grown in 'human Trophoblast stem cell' (hTS) medium consisting of DMEM/F12 supplemented with 0.1 mM b-mercaptoethanol, 0.2% FBS, 0.5% Penicillin-Streptomycin, 0.3% BSA (A8806-5G, Sigma-Aldrich), 1% ITS-X supplement (51500-056, Thermo Fisher Scientific), 1.5 mg/ml L-ascorbic acid (A4403, Sigma-Aldrich), 50 ng/ml EGF (62253-63-8, Sigma-Aldrich), 2 mM CHIR99021, 0.5 mM, A83-01 (72024, Stemcell Technologies), 1 mM SB431542 (Stem Cell Technologies), 0.8 mM VPA (Sigma-Aldrich) and 5 mM Y27632.

Preparing and Plating Cell Suspensions for "AggreWell" Aggregation Experiments

AggreWell 400 format plates were prepared following the manufacturer's protocol. Briefly, wells were rinsed with the rinsing solution (Stem Cell Technologies), centrifuged for 5 min at 2000 g and incubated at room temperature in the tissue culture hood for 20 min. The wells were then washed with 2 ml of 1xPBS. After PBS removal, 500 ml of final culture medium (IVF-hEP-hTS, see below) was added to each well and the plate placed at 37 C and 5% CO2 until ready to use.

Generation of Multicellular Aggregates in 3D

To begin, hEPSCs were dissociated to single cells by incubation with Accutase (07920, Stem Cell Technologies) at 37° C. for 3 min. Cells were collected and pelleted by centrifugation for 4 min at 300 g and resuspended in hEP-LCDMYI medium (described above). This cell suspension was pre-incubated at 37° C. in an atmosphere of 5% CO2 on gelatinized tissue-culture-grade plates for 30 min to remove inactive MEFs.

Post incubation on gelatin plates, cells were counted using a haemocytometer and a total of 7200 hEPSCs was added to 1 mL of media composed of 50% IVF media (Continuous Single Culture-NX Complete (CSCM-NXC)) (90168, FUJIFILM), 25% hEP media, and 25% hTS media. This media was also supplemented with CHIR99021 (2 μM), Y27632 (5 μM), BMP4 (20 ng/mL), FGF2 (40 ng/mL), and A83-01 (2 μM). Cell suspensions were added dropwise to the Aggrewells. All wells without cells were filled with 1 mL PBS to humidify the local atmosphere to minimize evaporation. The AggreWell plate (24-well, 1200 Aggrewell format) was then centrifuged for 3 min at 100 g, and placed at 37° C. under hypoxic conditions (5% $CO_2$ and 5% $O_2$). After 48h, media was removed from wells and replaced with fresh culture media as described above, although FGF2 concentration was lowered to 20 ng/ml and A83-01 was omitted. Cells were left to grow for an additional 48-72h until proper morphology was observed, at which point structures were fixed for immunostaining or transferred to IVC media (see below) for mimicking development beyond implantation stages.

Criteria for Selecting Multicellular Aggregates Structures

Following completion of any given aggregation experiment (from day 4 to 6), all cystic structures clearly displaying a cavity were included in further analyses. Non-cavitated structures were excluded from downstream analyses.

Co-Culture of hEPSCs with hTSCs

To perform two-step aggregation experiments, hEPSCs were first seeded as described above in hEP-LCDMYI media. After a 24 h period of aggregation, hTSC colonies were dissociated to single cells, and counted using a haemocytometer. For aggregation experiments, 50% hEP media and 50% hTS media is used as described above. A total of 16,800 hTSCs were added per well (24-well, 1200 Aggrewell format) and the plate was placed at 37° C., 5% CO2 and 5% 02.

In Vitro Culture (IVC) of hEPSC-Derived Structures

To prepare plate for in vitro culture, 150 μL of modified IVC1 (mIVC1) media was added to each well of a 96-well ultra-low attachment U-shaped plate (7007, Costar). mIVC1 media consisted of the following: Advanced DMEM/F12 (12634-010; Thermo Fischer Scientific; Waltham, US) supplemented with 20% (vol/vol) heat-inactivated FBS (16141079, Thermo Fisher Scientific), 2 mM GlutaMAX™, penicillin (25 units/ml)/Streptomycin (25 μg/ml), 1×ITS-X (10 mg/L insulin, 5.5 mg/L transferrin, 0.0067 mg/L sodium selenite, 2 mg/L etholamine; 51500-056; Thermo Fisher Scientific; Waltham, US), 8 nM β-estradiol (E8875; Sigma-Aldrich; St. Louis, US), 200 ng/ml progesterone (P0130; Sigma-Aldrich; St. Louis, US), 25 μM N-acetyl-L-cysteine (A7250; Sigma-Aldrich; St. Louis, US), 17 nm IGF1, 20 ng/ml FGF2 (Gibco), FGF4 (25 ng/ml; R&D Systems, 5846-F4) and heparin (1 mg ml-1; Sigma, H3149). In some embodiments, the medium comprises a glutamine alternative (e.g., GlutaMax™ comprising L-alanyl-L-glutamine dipeptide).

Immunofluorescence Staining

Stem cell-derived structures were fixed in 4% paraformaldehyde (Electron Microscopy Sciences, 15710) for 20 min at room temperature, and then washed twice in PBT (phosphate-buffered saline (PBS) plus 0.05% Tween-20). Structures were permeabilized for 30 min at room temperature in PBS containing 0.3% Triton-X-100 and 0.1% glycine. Primary antibody incubation was performed overnight at 4° C. in blocking buffer (PBS containing 10% fetal bovine serum (FBS), 1% Tween-20). The following day, embryos were washed twice in PBT, then incubated overnight at 4° C. with secondary antibody (1:500) in blocking buffer. Structures were washed twice in PBT buffer and then transferred to PBT drops in oil-filled optical plates before confocal imaging. The antibodies used are given in Table 2.

For human embryo images shown in FIG. 2E, embryos were fixed in IVIRMA Valencia, washed twice in a PBS solution containing 0.1% Tween-20 (Sigma, cat. no. P9416) and immediately placed into a 0.5 ml PCR tube within an oil-PBS-oil interphase. Tubes were stored at 4° C. were shipped to the University of Cambridge for immunofluorescence.

Image Data Acquisition, Processing, and Quantification

Fluorescence images were acquired with an inverted Leica SP8 confocal microscope (Leica Microsystems), using a Leica Fluotar VISIR 0.95 NA 25× objective. Fluorophores were excited with a 405-nm diode laser (DAPI), a 488-nm argon laser (GFP), a 543-nm HeNe laser (Alexa Fluor-543/555) and a 633-nm HeNe laser (Alexa Fluor-633/647). Images were acquired with 0.5-1.2 mm z-separation. Raw data were processed using open-source image analysis software Fiji Image J (version: 2.0.1) open access software and assembled in Photoshop CC 2019 (Adobe). Digital quantifications and immunofluorescence signal intensity graphs were obtained using Fiji software.

Apical enrichment analysis: F-actin and PARD6 polarisation were measured in a single focal plane, by taking the middle plane of the aggregate. A freehand line of the width of 0.5 μm was drawn along the cell-contact free surface (apical domain), or cell-contact (basal) area of the cell, signal intensity was obtained via the Region of Interest (ROI) function of Fiji. The apical/basal signal intensity ratio was calculated as: I (apical)/I (basal). A cell was defined as polarised when the ratio between the apical membrane and the cytoplasm signal intensity exceeds 1.5.

GATA3 expression analysis: the nucleus of each cells is masked using the Region of Interest (ROI) tool of Fiji. The average signal intensity of the ROI is calculated and a cell is defined as GATA3 positive when the nucleus to cytoplasm signal intensity exceeds 1.5.

Sirna-Mediated Knock-Down in hEPSC-Derived Aggregates

Transfections of siRNA were performed using Lipofectamine RNAi MAX (13778075, Thermo Fisher Scientific) according to the manufacturer's instructions. Upon seeding hEPSCs into AggreWells (as described above), Lipofectamine and siRNA (Qiagen, Hs_PLCB1_4, SI00115521; Qiagen, Hs_PLCB1_6, SI02781184; Qiagen, negative control siRNA, 1022076) against target genes with Opti-MEM (31985070, Gibco) is mixed and the mixture of either control siRNA or PLCB1 siRNA were evenly added into each well. Cell aggregates at 48h were collected to analyse the gene expression by qRT-PCR.

Bulk qRT-PCR Analysis

Total RNA was extracted with using Arcturus PicoPure™ RNA Isolation Kit (12204-01, Applied Biosystems) as per manufacturer's instructions. QRT-PCR was performed with the Power SYBR Green RNA-to-CT 1-Step Kit (Life Technologies) and a Step One Plus Real-time PCR machine (Applied Biosystems). The amounts of mRNA were measured with SYBR Green PCR Master Mix (Ambion). Relative levels of transcript expression were assessed by the ΔΔCt method, with Gapdh as an endogenous control. For qPCR primers used, see Table 3.

Single Cell Isolation of In Vitro Cultured Human Embryos and hEPSC-Derived Aggregates Human blastocysts (n=6) were exposed to Tryple Express Select×10 (ThermoFisher A1217701) for 15 mins in 37° C., and subsequently dissected with glass capillaries of different diameters.

hEPSC-derived structures were cultured until Day 5 (see Generation of multicellular aggregates in 3D) or Day 6 (see In Vitro Culture of hEP-structures beyond implantation). Structures were then selected based on the morphological criteria of having a cavity and acentric compact inner cell mass with glass capillaries. Roughly 50 structures were collected for Day 5 and Day 6 and each condition was performed in triplicate, for a total of ~150 structures per condition. hEP-structures were then first exposed to Tryple Express Select×10 (ThermoFisher A1217701) for 15 mins in 37° C., and subsequently dissected with glass capillaries of different diameters.

Single cell isolation of hEPSCs in 2D culture hEPSCs were washed once with PBS and dissociated with Accutase (07920, Stem Cell Technologies) at 37° C. for 3 min. Cells were collected and pelleted by centrifugation for 4 min at 300 g and resuspended in hEP-LCDMYI medium (described above). This cell suspension was pre-incubated at 37° C. in an atmosphere of 5% CO2 on gelatinized tissue-culture-grade plates for 30 min to remove inactive MEFs.

Single-Cell mRNA-Sequencing

For single-cell sequencing, lipid-modified oligonucleotides (LMOs) were used to multiplex multiple samples into a single droplet microfluidics run. Dissociated cells from Day 5 hEP-derived structures, Day 6 hEP-derived structures, and 2D hEPSCs were labeled with sample-specific lipid-modified oligos (LMOs). Samples were washed to remove any leftover LMOs and then pooled into a multiplexed cell suspension that was run on a single lane of a 10× Genomics chip, using v3.0 reagents. Cells from the natural embryo were not multiplexed but were run concurrently on a parallel lane within the chip. The single-cell sequencing library was prepared as per the manufacturer's instructions and sequenced on an Illumina Hiseq 4000 at a minimum coverage of 20,000 PE reads per cell (read 1: 28 bp, i7: 8 bp, read 2: 91 bp). Sample-specific LMO tags were separately amplified and sequenced at a read depth of 2,016 reads per cell. Sample demultiplexing was performed using a demultiplexing pipeline that discovers sample-specific thresholds, scores each cell as being positive or negative for a specific tag, and retains only singly-labeled cells.

Single Cell RNA-Seq Data Analysis

Single-cell RNA-sequencing was performed using the 10× Genomics Chromium system. Reads were aligned against GRCh38. Further downstream analyses were performed in Python using the Scanpy toolkit (version 1.7.2) and Anndata (version 0.7.5). No cells were filtered for mitochondrial or ribosomal content. Initial analysis including normalization, scaling, identification of highly variable genes, and clustering was performed as described in the kalisto bustools tutorial "Introduction to single-cell RNA-seq II: getting started with analysis". Single-cell data was further visualized using the UMAP dimensionality reduction, as determined by the sc.tl.umap function in Scanpy. Lineages were defined using sc.tl.score_genes function in scanpy and the gene list used for this function were taken from Supplementary Table 12 of Liu et al (type: ALL-TE, ALL-EPI, ALL-PE). A score for each lineage was given to every cell, and the "lineage" designation for each cell was determined by the highest score of the 3. Any cells with scores below 0.08 were denoted as "undefined". All violin plots were made using sc.pl.violin function in Scanpy.

Unsupervised Clustering of Gene Expression Programs

To compare global gene expression patterns across datasets, large-scale heatmaps were constructed for each dataset clustered using unsupervised methods (orthogonal non-negative matrix factorization for gene programs and hierarchical clustering for cells). First, multiple datasets were integrated together by keeping only the intersection of genes found across all datasets (n=18379 genes). The PopAlign framework was then used to filter highly variable genes, and normalize the datasets. Normalization was done by dividing each transcript count by the sum total within the cell, scaling by 10,000, adding a +1 pseudocount, and then logging. To find gene programs, 5,000 cells were randomly sampled across the integrated dataset, and then orthogonal non-negative matrix factorization was run find a set of 16 feature vectors. The top genes were discovered within each feature, and this gene list was used to organize the gene expression heatmaps for each dataset (popalign.plot_top_gene_features). Cells within each dataset were clustered using scipy hierarchical clustering (scipy.cluster.hierarchy) using correlation distance, and linkage-complete. Gene programs were then manually reorganized into groups which were Universal across all datasets, or more specifically enriched in the Natural Embryo, D5, or D6 stem cell-derived embryo-like structures. A gene set enrichment analysis was then run based on the hypergeometric test (popalign.enrichment_analysis) on these gene groups using Reactome-signaling gene sets to identify specific signaling pathways that are up-regulated.

Statistics and Reproducibility

Statistical tests were performed on GraphPad Prism 8.4.3 software. Figure descriptions indicate the statistical tests used and number of independent experiments performed in each analysis. All error bars defined in the legends. Unless otherwise noted, each experiment was performed at least two times. Statistical significance: $p<0.05$ was considered statistically significant (*), $p<0.01$ (), $p<0.001$ (*), $p<0.0001$ (****).

TABLE 2

List of Primary Antibodies

| Targeted Protein | Species | Dilution | Catalog No. | Vendor |
| --- | --- | --- | --- | --- |
| PARD6 | Rabbit | 1:200 | sc-166405 | Santa Cruz Biotechnology |
| E-Cadherin (Clone 36) | Mouse | 1:200 | 610182 | BD Biosciences |
| OCT3/4 | Rabbit | 1:200 | sc-9081 | Santa Cruz Biotechnology |
| SOX2 | Rabbit | 1:200 | D6D9 | Cell Signaling Technologies |
| GATA3 | Goat | 1:200 | AF2605 | R&D Systems |
| PODXL | Mouse | 1:20 | MAB1658 | R&D Systems |
| SOX17 | Goat | 1:200 | AF1924 | R&D Systems |
| FOXA2 | Rabbit | 1:200 | D56D6 | Cell Signaling Technologies |
| GATA6 | Goat | 1:200 | AF1700 | R&D Systems |
| Alexa Fluor® 488 Phalloidin (F-ACTIN) | N/A | 1:500 | A12379 | Thermo Fisher Scientific |
| TFAP2C | Goat | 1:200 | AF5059 | R&D Systems |
| KRT18 | Mouse | 1:200 | Ab668 | Abcam |
| Anti-GFP | Rat | 1:1000 | 04404-84 | Nacalai Tesque |

TABLE 3

List of Primers for RT-qPCR

| Gene | SEQUENCE | SEQ ID NO |
| --- | --- | --- |
| GATA3-FW Primer | AAGGCATCCAGACCAGAAACCG | 1 |
| GATA3-RV Primer | AGCATCGAGCAGGGCTCTAACC | 2 |
| PLAC8-FW Primer | GTTTCACCATCTTGGTCAGG | 3 |
| PLAC8-RV Primer | CTGTAATTCCAGCACCTTGG | 4 |
| CDX2-FW Primer | CCGAACAGGGACTTGTTTAGAG | 5 |
| CDX2-RV Primer | CTCTGGCTTGGATGTTACACAG | 6 |
| KRT8-FW Primer | ACCCTCAACAACAAGTTTGCCTCC | 7 |

TABLE 3-continued

List of Primers for RT-qPCR

| Gene | SEQUENCE | SEQ ID NO |
| --- | --- | --- |
| KRT8-RV Primer | TCCACTTGGTCTCCAGCATCTTGT | 8 |
| KRT18-FW Primer | ACACAGTCTGCTGAGGTTGGAG | 9 |
| KRT18-RV Primer | TGCTCCATCTGTAGGGCGTAG | 10 |
| NANOG-FW Primer | ACACTGGCTGAATCCTTCCTCTCC | 11 |
| NANOG-RV Primer | CGCTGATTAGGCTCAACCATACTC | 12 |
| POU51F-FW Primer | TCTCGCCCCCTCCAGGT | 13 |
| POU51F-RV Primer | GCCCCACTCCAACCTGG | 14 |
| KLF4-FW Primer | CCCACATGAAGCGACTTCCC | 15 |
| KLF4-RV Primer | CAGGTCCAGGAGATCGTTGAA | 16 |
| SOX17-FW Primer | GAGCCAAGGGCGAGTCCCGTA | 17 |
| SOX17-RV Primer | CCTTCCACGACTTGCCCAGCAT | 18 |
| PDGFRA-FW Primer | CTCCCTGGCTGTTCTGATCG | 19 |
| PDGFRA-RW Primer | TGCCAACCCTGTTCCAAAGT | 20 |
| PLCB1-FW Primer | GGAAGCGGCAAAAAGAAGCTC | 21 |
| PLCB1-RV Primer | CGTCGTCGTCACTTTCCGT | 22 |

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

---

What is claimed is:

1. An in vitro method of generating an expanded pluripotency (EP) structure in three dimensions, the method comprising:

(a) contacting pluripotent stem cells (PSCs) with EP media and culturing the PSCs in the EP media to generate expanded pluripotent stem cells (EPSCs);

(b) contacting at least 5 EPSCs with a first substrate and a composition capable of supporting generation of an EP structure, wherein the composition comprises 20% to 30% EP media, 20% to 30% trophoblast stem cell (TSC) media, 45% to 55% in vitro fertilization (IVF) media, and an ALK5 kinase inhibitor, and wherein the composition further comprises FGF2 to facilitate cavitation of the EP structure and one or more of: a TGFβ ligand, a WNT agonist, and a ROCK inhibitor; and
(c) culturing the EPSCs in the composition for at least 4 days, and wherein step (c) comprises reducing the concentration of FGF2 in the composition by half and removing the ALK5 kinase inhibitor after at least 48 hours of culturing in the composition, wherein the EPSCs self-organize to generate the EP structure, wherein the EP structure comprises a single outside layer, an enlarged cavity, and an internal acentric compartment.

2. The in vitro method of claim 1, wherein the composition comprises 15 ng/ml to 25 ng/ml BMP4, 1.5 µM to 2.5 µM CHIR99021, 35 ng/ml to 45 ng/ml FGF2, 4.5 µM to 6 µM Y-27632, and 1.5 µM to 2.5 µM A83-01.

3. The in vitro method of claim 1, wherein the PSCs are induced pluripotent stem cells (iPSCs) or mammalian embryonic stem cells (ESCs).

4. The in vitro method of claim 3, wherein the PSCs, iPSCs, or ESCs are genetically modified.

5. The in vitro method of claim 1, wherein the EPSCs form dome-shaped colonies, and wherein step (b) comprises isolating single EPSCs by contacting the dome-shaped colonies with a cell detachment enzyme and resuspending the isolated single EPSCs in EP media.

6. The in vitro method of claim 1, wherein the first substrate comprises a dish, a U-plate, a flask, or a microwell plate, and wherein the microwell plate comprises inverted pyramidal microwells.

7. The in vitro method of claim 1, wherein the EP media comprises a basal media, N2 supplement, 0.1% to 2% non-essential amino acids, 0.01 mM to 0.2 mM beta-mercaptoethanol (BME), Penicillin-streptomycin, 5 ng/ml to 15 ng/ml leukemia inhibitory factor (LIF), 0.5 mM to 1.5 mM CHIR99021, 0.5 mM to 1.5 mM S-(+)-Dimethindenemaleate, and/or 1.5 mM to 2.5 mM Minocycline HCl.

8. The in vitro method of claim 1, wherein the TSC media comprises a basal media, 0.01 mM to 0.2 mM BME, 0.1% to 1% fetal bovine serum (FBS), 0.1% to 1% Penicillin-streptomycin, 0.1% to 1% bovine serum albumin (BSA), 0.1% to 2% ITS-X, 1 ng/ml to 2 ng/ml ascorbic acid, 45 ng/ml to 55 ng/ml EGF, 1.5 mM to 2.5 mM CHIR99021, 0.4 mM to 1 mM A83-01, 0.5 mM to 1.5 mM SB431542, 0.5 mM to 1.5 mM valproic acid (VPA), and 4.5 mM to 6 mM Y-27632.

9. The in vitro method of claim 1, wherein the IVF media comprises a continuous culture media.

10. The in vitro method of claim 1, wherein step (c) comprises culturing the EPSCs in hypoxic conditions, and wherein the hypoxic conditions comprise 5% oxygen.

11. The in vitro method of claim 1, wherein the single outside layer of the EP structure comprises one or more cells expressing KRT18, GATA3, or both, and wherein the internal acentric compartment of the EP structure comprises one or more cells expressing SOX2, SOX17, OCT4, FOXA2, or any combination thereof.

12. The in vitro method of claim 1, wherein the EP structure comprises 60 to 260 cells and/or wherein the EP structure is 100 µm to 200 µm in diameter.

13. The in vitro method of claim 1, wherein expression of one or more trophectoderm marker genes, one or more epiblast marker genes, one or more hypoblast marker genes, or any combination thereof, are increased in the EP structure by at least 2-fold following at least four days of culture in the composition relative to the EPSCs generated in step (a), wherein the one or more trophectoderm marker genes comprise GATA3, PLAC8, CDX2, KRT8, KRT18, or any combination thereof, wherein the one or more epiblast marker genes comprise KLF4, and wherein the one or more hypoblast marker genes comprise PDGFRA, GATA6, or both.

14. The in vitro method of claim 1, further comprising:
(d) contacting the EP structure with a second substrate and in vitro culture (IVC) media, wherein the IVC media comprises:
  (i) insulin, an insulin analogue, or an insulin receptor agonist;
  (ii) estrogen, an estrogen analogue, or an estrogen receptor agonist; and
  (iii) progesterone, a progesterone analogue, or a progesterone receptor agonist; and
(e) culturing the EP structure in the IVC media for at least 24 hours, wherein the EP structure reorganizes to form a reorganized EP structure comprising an outer compartment, an inner compartment, and an internal lumen.

15. The in vitro method of claim 14, wherein the second substrate comprises a dish, a U-plate, a flask, or a microwell plate.

16. The in vitro method of claim 14, wherein the outer compartment comprises one or more cells expressing one or more extra-embryonic markers, and the inner compartment comprises one or more cells expressing one or more embryonic markers, and wherein the one or more extra-embryonic-markers comprise GATA3, KRT18, FOXA2, TFAP2, or any combination thereof and the one or more embryonic markers comprise SOX2.

17. The in vitro method of claim 1, further comprising: removing one or more cells from the EP structure and culturing the one or more cells to produce differentiated cells.

18. The in vitro method of claim 1, wherein the ALK5 kinase inhibitor is A83-01.

* * * * *

SEQUENCE LISTING

<160> NUMBER OF SEQ ID NOS: 22

<210> SEQ ID NO 1
<211> LENGTH: 22
<212> TYPE: DNA
<213> ORGANISM: Artificial Sequence
<220> FEATURE:
<223> OTHER INFORMATION: GATA3- FW Primer

<400> SEQUENCE: 1
aaggcatcca gaccagaaac cg                                          22

<210> SEQ ID NO 2
<211> LENGTH: 22
<212> TYPE: DNA
<213> ORGANISM: Artificial Sequence
<220> FEATURE:
<223> OTHER INFORMATION: GATA3- RV Primer

<400> SEQUENCE: 2
agcatcgagc agggctctaa cc                                          22

<210> SEQ ID NO 3
<211> LENGTH: 20
<212> TYPE: DNA
<213> ORGANISM: Artificial Sequence
<220> FEATURE:
<223> OTHER INFORMATION: PLAC8- FW Primer

<400> SEQUENCE: 3
gtttcaccat cttggtcagg                                         20

<210> SEQ ID NO 4
<211> LENGTH: 20
<212> TYPE: DNA
<213> ORGANISM: Artificial Sequence
<220> FEATURE:
<223> OTHER INFORMATION: PLAC8- RV Primer

<400> SEQUENCE: 4
ctgtaattcc agcaccttgg                                         20

<210> SEQ ID NO 5
<211> LENGTH: 22
<212> TYPE: DNA
<213> ORGANISM: Artificial Sequence
<220> FEATURE:
<223> OTHER INFORMATION: CDX2- FW Primer

<400> SEQUENCE: 5
ccgaacaggg acttgtttag ag                                      22

<210> SEQ ID NO 6
<211> LENGTH: 22
<212> TYPE: DNA
<213> ORGANISM: Artificial Sequence
<220> FEATURE:
<223> OTHER INFORMATION: CDX2-RV

<400> SEQUENCE: 6
ctctggcttg gatgttacac ag                                      22

<210> SEQ ID NO 7
<211> LENGTH: 24
<212> TYPE: DNA
<213> ORGANISM: Artificial Sequence
<220> FEATURE:
<223> OTHER INFORMATION: KRT8-FW Primer

<400> SEQUENCE: 7
accctcaaca caagtttgc ctcc                                     24

<210> SEQ ID NO 8
<211> LENGTH: 24
<212> TYPE: DNA
<213> ORGANISM: Artificial Sequence
<220> FEATURE:
<223> OTHER INFORMATION: KRT8-RV Primer

<400> SEQUENCE: 8
tccacttggt ctccagcatc ttgt                                    24

<210> SEQ ID NO 9
<211> LENGTH: 22
<212> TYPE: DNA
<213> ORGANISM: Artificial Sequence
<220> FEATURE:
<223> OTHER INFORMATION: KRT18-FW Primer

<400> SEQUENCE: 9
acacagtctg ctgaggttgg ag                                      22

<210> SEQ ID NO 10
<211> LENGTH: 21
<212> TYPE: DNA
<213> ORGANISM: Artificial Sequence

```
<220> FEATURE:
<223> OTHER INFORMATION: KRT18-RV

<400> SEQUENCE: 10
tgctccatct gtagggcgta g                                              21

<210> SEQ ID NO 11
<211> LENGTH: 24
<212> TYPE: DNA
<213> ORGANISM: Artificial Sequence
<220> FEATURE:
<223> OTHER INFORMATION: NANOG-FW Primer

<400> SEQUENCE: 11
acactggctg aatccttcct ctcc                                           24

<210> SEQ ID NO 12
<211> LENGTH: 25
<212> TYPE: DNA
<213> ORGANISM: Artificial Sequence
<220> FEATURE:
<223> OTHER INFORMATION: NANOG-RV Primer

<400> SEQUENCE: 12
cgctgattag gctccaacca tactc                                          25

<210> SEQ ID NO 13
<211> LENGTH: 17
<212> TYPE: DNA
<213> ORGANISM: Artificial Sequence
<220> FEATURE:
<223> OTHER INFORMATION: POU51F-FW Primer

<400> SEQUENCE: 13
tctcgccccc tccaggt                                                   17

<210> SEQ ID NO 14
<211> LENGTH: 17
<212> TYPE: DNA
<213> ORGANISM: Artificial Sequence
<220> FEATURE:
<223> OTHER INFORMATION: POU51F-RV Primer

<400> SEQUENCE: 14
gccccactcc aacctgg                                                   17

<210> SEQ ID NO 15
<211> LENGTH: 20
<212> TYPE: DNA
<213> ORGANISM: Artificial Sequence
<220> FEATURE:
<223> OTHER INFORMATION: KLF4-FW

<400> SEQUENCE: 15
cccacatgaa gcgacttccc                                                20

<210> SEQ ID NO 16
<211> LENGTH: 21
<212> TYPE: DNA
<213> ORGANISM: Artificial Sequence
<220> FEATURE:
<223> OTHER INFORMATION: KLF4-RV Primer

<400> SEQUENCE: 16
caggtccagg agatcgttga a                                              21
```

```
<210> SEQ ID NO 17
<211> LENGTH: 21
<212> TYPE: DNA
<213> ORGANISM: Artificial Sequence
<220> FEATURE:
<223> OTHER INFORMATION: SOX17-FW

<400> SEQUENCE: 17
gagccaaggg cgagtcccgt a                                           21

<210> SEQ ID NO 18
<211> LENGTH: 22
<212> TYPE: DNA
<213> ORGANISM: Artificial Sequence
<220> FEATURE:
<223> OTHER INFORMATION: SOX17-RV Primer

<400> SEQUENCE: 18
ccttccacga cttgcccagc at                                          22

<210> SEQ ID NO 19
<211> LENGTH: 20
<212> TYPE: DNA
<213> ORGANISM: Artificial Sequence
<220> FEATURE:
<223> OTHER INFORMATION: PDGFRA-FW Primer

<400> SEQUENCE: 19
ctccctggct gttctgatcg                                             20

<210> SEQ ID NO 20
<211> LENGTH: 20
<212> TYPE: DNA
<213> ORGANISM: Artificial Sequence
<220> FEATURE:
<223> OTHER INFORMATION: PDGFRA-RW Primer

<400> SEQUENCE: 20
tgccaaccct gttccaaagt                                             20

<210> SEQ ID NO 21
<211> LENGTH: 21
<212> TYPE: DNA
<213> ORGANISM: Artificial Sequence
<220> FEATURE:
<223> OTHER INFORMATION: PLCB1

<400> SEQUENCE: 21
ggaagcggca aaaagaagct c                                           21

<210> SEQ ID NO 22
<211> LENGTH: 19
<212> TYPE: DNA
<213> ORGANISM: Artificial Sequence
<220> FEATURE:
<223> OTHER INFORMATION: PLCB1-RV Primer

<400> SEQUENCE: 22
cgtcgtcgtc actttccgt                                              19
```